United States Patent [19]
Yuasa et al.

[11] Patent Number: 6,085,238
[45] Date of Patent: Jul. 4, 2000

[54] VIRTUAL LAN SYSTEM

[75] Inventors: Hiroyoshi Yuasa, Kanagawa; Tadashi Satake, Chiba; Mario Jose Cardona, Tokyo; Hisataka Fujii; Akira Yasuda, both of Saitama; Koji Yamashita, Kanagawa; Satoru Suzaki, Kanagawa; Hideki Ikezawa, Kanagawa; Masami Ohno; Akira Matsuzaki, both of Chiba; Junichi Suzuki, Osaka; Junko Nakano, Chiba, all of Japan

[73] Assignee: Matsushita Electric Works, Ltd., Osaka, Japan

[21] Appl. No.: 08/844,791

[22] Filed: Apr. 22, 1997

[30] Foreign Application Priority Data

| Apr. 23, 1996 | [JP] | Japan | 8-101649 |
| Apr. 23, 1996 | [JP] | Japan | 8-127753 |
| Dec. 24, 1996 | [JP] | Japan | 8-357371 |
| Dec. 27, 1996 | [JP] | Japan | 8-351480 |
| Jan. 31, 1997 | [JP] | Japan | 9-019333 |

[51] Int. Cl.[7] ............................................. H04L 12/28
[52] U.S. Cl. ........................... 709/223; 709/243; 370/409
[58] Field of Search .................................. 370/401, 402, 370/422, 409; 395/500; 709/223, 228, 243

[56] References Cited

U.S. PATENT DOCUMENTS

| 4,413,338 | 11/1983 | Renoulin et al. | 370/458 |
| 4,897,874 | 1/1990 | Lidinsky et al. | 370/422 X |
| 4,922,503 | 5/1990 | Leone | 370/402 |
| 5,023,780 | 6/1991 | Brearley | 370/409 |
| 5,483,647 | 1/1996 | Yu et al. | 709/217 |
| 5,511,168 | 4/1996 | Perlman et al. | 709/243 |
| 5,522,045 | 5/1996 | Sandberg | 709/215 |
| 5,539,884 | 7/1996 | Robrock, II | 709/227 |
| 5,550,816 | 8/1996 | Hardwick et al. | 370/397 |
| 5,617,421 | 4/1997 | Chin et al. | 370/402 |
| 5,684,800 | 11/1997 | Dobbins et al. | 370/401 |
| 5,751,967 | 5/1998 | Raab et al. | 709/228 |
| 5,752,003 | 5/1998 | Hart | 709/223 |
| 5,764,911 | 6/1998 | Tezuka et al. | 709/223 |

*Primary Examiner*—Zarni Maung
*Assistant Examiner*—Patrice Winder
*Attorney, Agent, or Firm*—Greenblum & Bernstein, P.L.C.

[57] ABSTRACT

A virtual LAN system forms a virtual group which is based on elements having physical attribute or logical attribute and constituting a virtual LAN, sets a client address and priority of the virtual group in a virtual group registration table, and allocates unicast and broadcast traffic bands in group units.

26 Claims, 67 Drawing Sheets

FIG. 3

| VIRTUAL GROUP NAME | | | | | | | | |
|---|---|---|---|---|---|---|---|---|
| PRIORITY | PERMISSIBLE DELAY TIME SETTING | MULTICAST SETTING | SERVER NAME | SERVER ADDRESS | GROUP TYPE | ACCESS METHOD | COMMUNICATION PROTOCOL | |
| MAC ADDRESS | NETWORK ADDRESS | USER-DEFINED ADDRESS | ROUTING CONNECTION PORT | CLIENT NAME (TYPE OF MACHINE) | HOME SWITCH NAME | HOME SWITCH PORT | CLIENT DISTANCE | |
| | | | | | | | | |
| | | | | | | | | |
| | | | | | | | | |
| | | | | | | | | |
| | | | | | | | | |

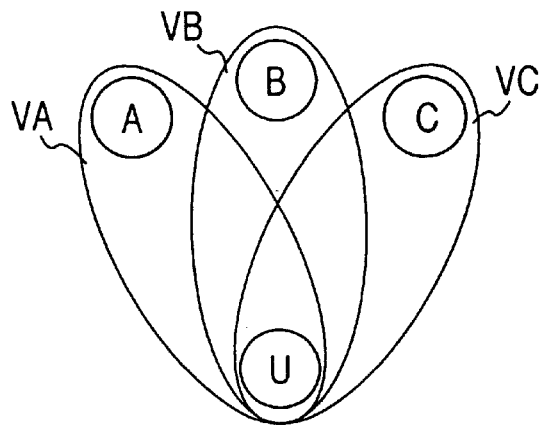 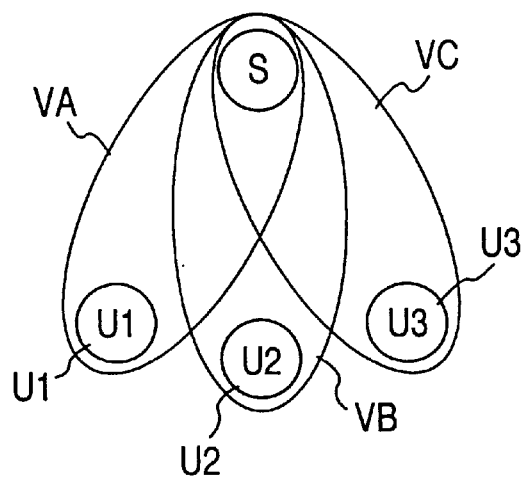
FIG. 5(a)   FIG. 5(b)
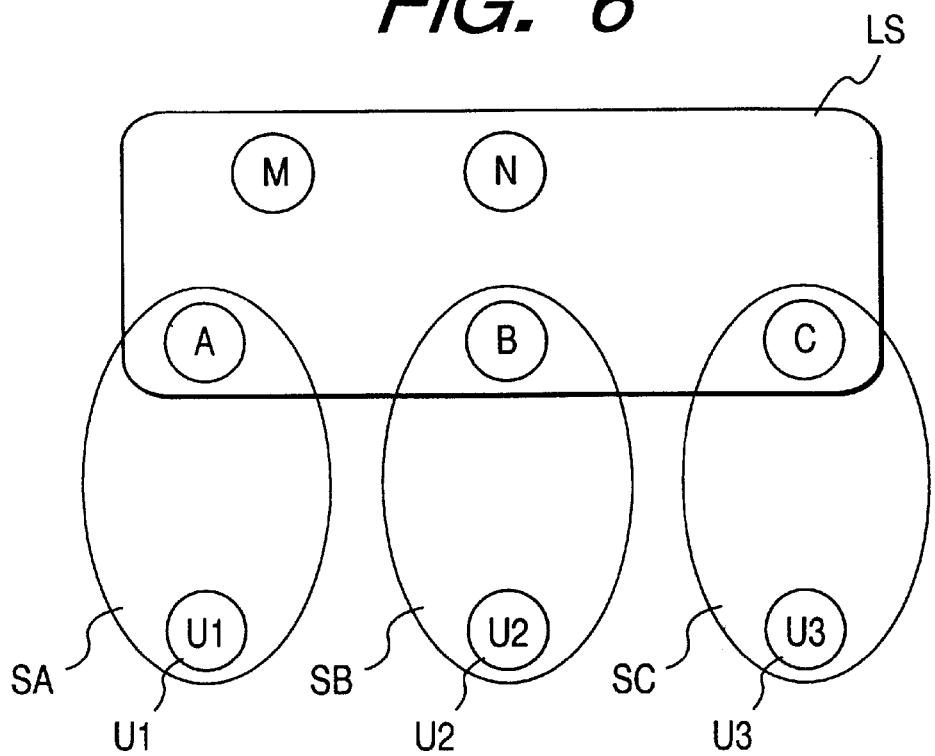
FIG. 6

FIG. 10

| SWITCHING HUB ATTRIBUTE | | MICRO-SEGMENT | SWITCHING HUB | | | | | | | | SEGMENT ATTRIBUTE | | | |
|---|---|---|---|---|---|---|---|---|---|---|---|---|---|---|
| | | | PORT (MEMBER OF MICROSEGMENT) | | | | | | | | PRIORITY | FILTER | ADDED SERVICE | EXPANSION PORT |
| | | | P1 | P2 | P3 | P4 | P5 | P6 | P7 | P8 | | | | |
| PATTERN | A | S1 | | | | | | | | | | | | |
| | | S2 | 1 | | | | | | | | 3 | 1 | | 1 |
| | | S3 | | 1 | | | | | | | 2 | 1 | | 1 |
| | | S4 | | | 1 | 1 | | | | | 2 | 1 | | 1 |
| | | S5 | | | | | 1 | 1 | | | | | | |
| | | S6 | | | | | | | | | | | | |
| | | S7 | | | | | | | 1 | 1 | 3 | 1 | | |
| | | S8 | 1 | | 1 | | | | | | 3 | 1 | | 1 |
| | | S9 | | | | | | | | | | | | |
| | | S10 | | | | | 1 | | | | 1 | | RUTING | 1 |
| | | S11 | | | | | | | | | | | | |
| | | S12 | | | | | | | 1 | 1 | 3 | 1 | | 1 |
| | | S13 | | | | | | | | | | | | |
| | | S14 | | | | | | | | | | | | |

Tbl

FIG. 15
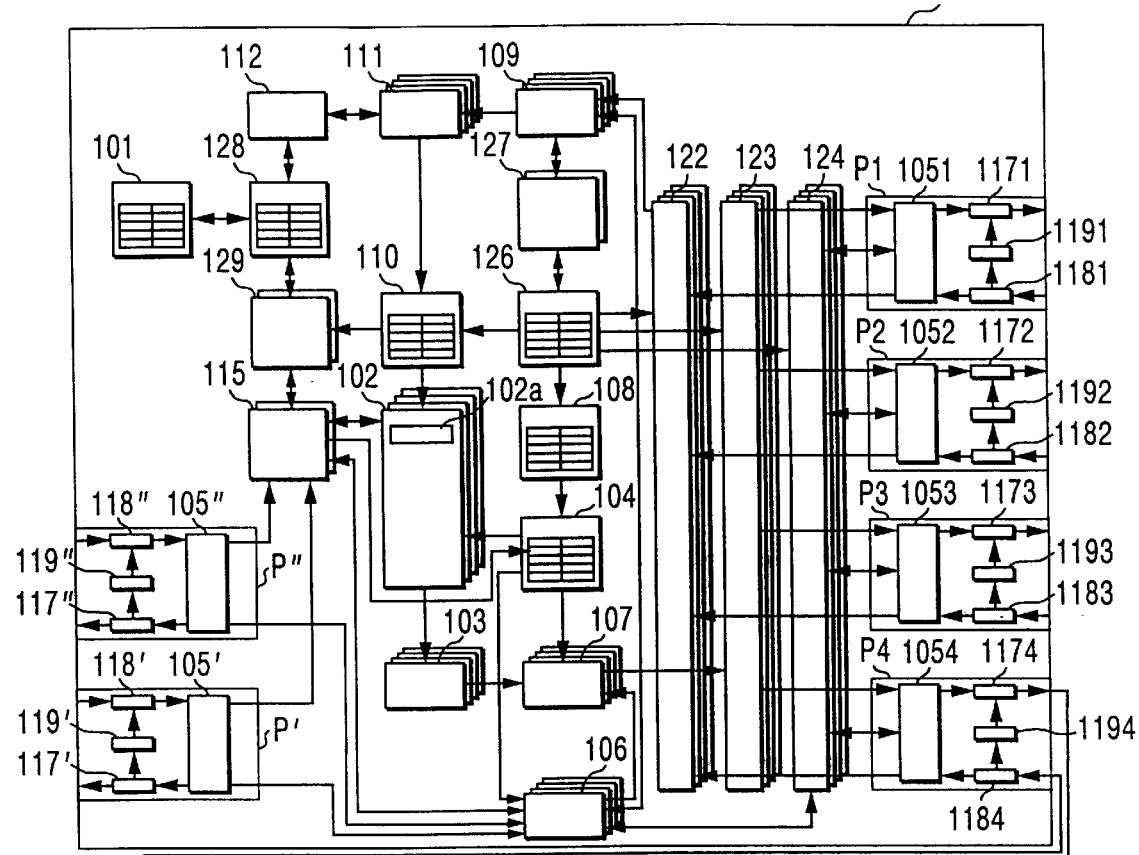
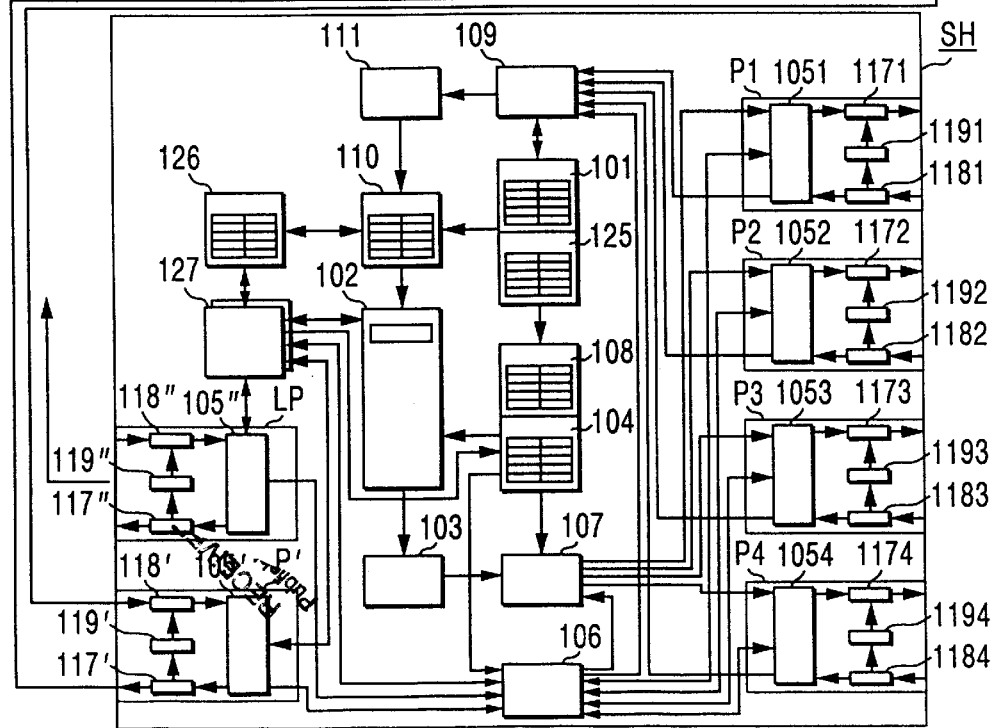

FIG. 20

| LOCAL SITE VLAN-ID | | | | VLAN-ID (VIRTUAL GROUP ID) | |
|---|---|---|---|---|---|
| CLIENT ADDRESS | PORT ID | CLIENT ADDRESS | PORT ID | VLAN-ID (VIRTUAL GROUP ID) | SUBNET ID |
| | | | | | |
| | | | | | |
| | | | | | |
| | | | | | |

FIG. 23

| LOCAL SITE VLAN-ID | | | | |
|---|---|---|---|---|
| CLIENT ADDRESS | PORT ID | CLIENT ADDRESS | PORT ID | VLAN-ID (VIRTUAL GROUP ID) | MULTICAST PORT ADDRESS |

FIG. 24

| LOCAL SITE VLAN-ID | | | | |
|---|---|---|---|---|
| CLIENT ADDRESS | PORT ID | CLIENT ADDRESS | PORT ID | VLAN-ID (LOCAL VLAN) | SUBNET ID (GROBAL VLAN) |

FIG. 26

| LOCAL SITE VLAN-ID CLIENT ADDRESS | PORT ID | CLIENT ADDRESS | PORT ID | VLAN-ID | GATEWAY |
|---|---|---|---|---|---|
| | | | | | |
| | | | | | |
| | | | | | |
| | | | | | |

FIG. 36

| VIRTUAL GROUP NAME | | | | | | | |
|---|---|---|---|---|---|---|---|
| CLIENT NAME | USER | SERVICE NAME | SERVER NAME | PARAMETER NAME | PARAMETER VALUE | PARAMETER NAME | PARAMETER VALUE |
| | | | | | | | |
| | | | | | | | |
| | | | | | | | |
| | | | | | | | |
| | | | | | | | |
| | | | | | | | |

FIG. 38

| VIRTUAL GROUP NAME | | | | | | | |
|---|---|---|---|---|---|---|---|
| PRIORITY | PERMISSIBLE DELAY TIME SETTING | MULTICAST SETTING | SERVER NAME | SERVER ADDRESS | GROUP TYPE | ACCESS METHOD | COMMUNICATION PROTOCOL |
| MAC ADDRESS | NETWORK ADDRESS | USER-DEFINED ADDRESS | ROUTING CONNECTION PORT | CLIENT-DEFINED POINTER | HOME SWITCH NAME | HOME SWITCH PORT | CLIENT DISTANCE |
| | | | | | | | |
| | | | | | | | |
| | | | | | | | |
| | | | | | | | |
| | | | | | | | |

FIG. 44

| DIFFERENT SYSTEM NAME | BA SYSTEM | | | | | | |
|---|---|---|---|---|---|---|---|
| VIRTUAL GROUP NAME | SERVICE NAME | PARAMETER NAME | THRESHOLD/ OBJECT VALUE | LINKAGE ITEM | LINKAGE CONDITION | LEARNING VALUE | CLIENT NAME |
| CAD GROUP | AIR CONDI- TIONING | ROOM TEMPERATURE | 25°C | HUMAN SENSOR | HUMAN PASITION | AIR CURRENT PATTERN | U001C |
| | | | | | | | |
| | | | | | | | |
| | | | | | | | |
| | | | | | | | |
| | | | | | | | |

FIG. 50

| VIRTUAL GROUP NAME | | | | | | | |
|---|---|---|---|---|---|---|---|
| PRIORITY | PERMISSIBLE DELAY TIME SETTING | MULTICAST SETTING | SERVER NAME | SERVER ADDRESS | GROUP TYPE | ACCESS METHOD | COMMUNICATION PROTOCOL |
| MAC ADDRESS | NETWORK ADDRESS | USER-DEFINED ADDRESS | ROUTING CONNECTION PORT | CLIENT NAME (TYPE OF MACHINE) | HOME SWITCH NAME | HOME SWITCH PORT | CLIENT DISTANCE |
| | | | | | | | |
| | | | | | | | |
| | | | | | | | |

FIG. 51

| CLIENT NAME | U001C | | | USER NAME | | TARO | |
|---|---|---|---|---|---|---|---|
| VIRTUAL GROUP NAME | AVERAGE BAND | PEAK BAND | DELAY TIME | PARAMETER NAME | PARAMETER VALUE | PARAMETER NAME | PARAMETER VALUE |
| CAD-R | 32K | 128K | 5ms | TIME-OUT | 3 MINUTES | | |
| CAD-G | 25M | 100M | 0.5ms | BUFFER SIZE | AUTOMATIC | | |
| ACCOUNTING | | 10M | 100ms | | | | |
| | | | | | | | |

FIG. 61(a)

| VIRTUAL GROUP NAME | | | | | | | |
|---|---|---|---|---|---|---|---|
| PRIORITY | PERMISSIBLE DELAY TIME SETTING | MULTICAST SETTING | SERVER NAME | SERVER ADDRESS | GROUP TYPE | ACCESS METHOD | COMMUNICATION PROTOCOL |
| MAC ADDRESS | NETWORK ADDRESS | USER-DEFINED ADDRESS | ROUTING CONNECTION PORT | CLIENT-DEFINED POINTER | HOME SWITCH NAME | HOME SWITCH PORT | CLIENT DISTANCE |
| | | | | | | | |
| | | | | | | | |
| | | | | | | | |
| | | | | | | | |

FIG. 61(b)

| VIRTUAL GROUP NAME | | | | | | | |
|---|---|---|---|---|---|---|---|
| CLIENT NAME | USER | SERVICE NAME | SERVER NAME | PARAMETER NAME | PARAMETER VALUE | PARAMETER NAME | PARAMETER VALUE |
| | | | | | | | |
| | | | | | | | |
| | | | | | | | |
| | | | | | | | |
| | | | | | | | |
| | | | | | | | |

FIG. 66(a)

| VIRTUAL (VLAN) GROUP NAME | | | | | | | |
|---|---|---|---|---|---|---|---|
| PRIORITY | PERMISSIBLE DELAY TIME SETTING | MULTICAST SETTING | SERVER NAME | SERVER ADDRESS | GROUP TYPE | ACCESS METHOD | COMMUNICATION PROTOCOL |
| MAC ADDRESS | NETWORK ADDRESS | USER-DEFINED ADDRESS | ROUTING CONNECTION PORT | CLIENT NAME (TYPE OF MACHINES) | BRANCH LINE SWITCH NAME | BRANCH LINE SWITCH PORT | CLIENT DISTANCE |
| | | | | | | | |
| | | | | | | | |
| | | | | | | | |

FIG. 66(b)

| CLIENT NAME | U001C | | | RESIDENT ROOM | | 302 | |
|---|---|---|---|---|---|---|---|
| VIRTUAL (VLAN) GROUP NAME | AVERAGE BAND | PEAK BAND | DELAY TIME | PARAMETER NAME | PARAMETER VALUE | PARAMETER NAME | PARAMETER VALUE |
| CAD-R | 32K | 128K | 5ms | TIME-OUT | 3 MINUTES | | |
| CAD-G | 25M | 100M | 0.5ms | BUFFER SIZE | AUTOMATIC | | |
| ACCOUNTING | | 10M | 100ms | | | | |

FIG. 66(C)

| SYSTEM NAME | BA SYSTEM | | | | | | |
|---|---|---|---|---|---|---|---|
| VIRTUAL (VLAN) GROUP NAME | SERVICE NAME | PARAMETER NAME | THRESHOLD/ OBJECT VALUE | INTERLOCK ITEM | INTERLOCK CONDITION | LEARNING VALUE | CLIENT NAME |
| CAD GROUP | AIR CONDI- TIONING | ROOM TEMPERATURE | 25°C | HUMAN SENSOR | HUMAN POSITION | AIR CURRENT PATTERN | U001C |
| | | | | | | | |
| | | | | | | | |
| | | | | | | | |
| | | | | | | | |
| | | | | | | | |

VIRTUAL LAN SYSTEM

BACKGROUND OF THE INVENTION

1. Field of the Invention

This invention relates to a virtual local area network (LAN) related to logical configuration management of a LAN and more particularly to a LAN segmentation system for controlling a traffic flow of a LAN appropriately and using transmission media efficiently for improving the utilization factor of the entire network and a logical configuration management system of a LAN for facilitating management of move, change, addition, etc., of computers.

Particularly, the invention relates to a virtual LAN (VLAN) for logical segmentation of a network so as to form a structure independent of a physical world so as to be able to change the network dynamically following business structure change of work groups, projects, etc., of organizations including enterprises based on LAN switching technologies.

Specifically, the invention relates to priority service and QOS (quality of service) guarantee technique for automatically reconfiguring a network in response to move of terminals, etc., and supporting the transmission quality of a transmission band, delay time, etc., on demand.

Specifically, the invention relates to a port segment switching system for setting a common microsegment to a plurality of ports of each switching hub for a plurality of switching hubs.

Specifically, the invention relates to a virtual network switching system for mapping logical network segments to physical traffic segments for enabling dynamic reconfiguration.

Specifically, the invention relates to a virtual network switching system for enabling customization of network configuration, function, and service to suit the user such as a network administrator of a work group or a department in an environment in which a plurality of servers for providing service making good use of resources of various environmental facilities of an enterprise such as network distributed management and building automation (BA) are distributed over a network.

Further, the invention relates to an intelligent building wiring system. It relates to a distributed integrated wiring system for a network for integrating an enterprise network system occupying an important part with communication processing of information communication technology (IT), intelligent building communication, office automation (OA), and BA.

2. Description of the Prior Art

In an in-house network, a host centralized network with channel connection of online transaction terminals centering on a host computer system combining a database server and an application server with a communication control function has been used mainly as a network of an account system of a financial institution or a business system of an enterprise. In addition, in an information system network using a LAN connecting personal computers (PCs) as terminals and a host computer on a TCP/IP protocol basis, a client and centralized server network is a paradigm, wherein most employees connect PCs as their own client machines to the network.

Further, a distributed server and client network has become pervasive together with a catchword of right-sizing. In the network, server machines operate as application servers and database servers of packaged application software replacing a host computer as enterprise servers supporting online transaction and distributed database functions in the operating system of a workstation (WS) server or a PC server and are connected on the network for network computing at the enterprise level or globally replacing a conventional host computer.

Global network computing as seen in a derivative field in which speedy approval is given making free use of servers distributed worldwide supports worldwide enterprise activities in combination with internet and database replication technologies.

In an internet and an intranet as an in-house network, WWW (world-wide web) servers and desktop WWW browsers distributed over the network spring into wide use. Particularly, a database connected to WWW servers can be easily accessed integrally in a GUI (graphical user interface) environment with multimedia of images, data, voice, etc., as an object, thus the demand for the WWW multimedia network is increasing explosively.

Computers become easy to use and personal owing to operating systems and WWW technologies with an excellent GUI and are connected to a network for all employees to share information and immediately providing information for business efficiency improvement and prompt decision making, thereby enhancing intellectual productivity. Thus, business application of information communication technologies moves and an enterprise or an enterprise model is becoming a network-type distribution form. Further, information communication networking technologies support global enterprise activities like virtual enterprises connected by networks. Expandability and innovation that can deal speedily with change in the enterprise activities are increasingly demanded for the network and information communication technologies. At the same time, high speed and high performance are demanded in addition to reliability, integrity, and economy because all persons working in offices, etc., use networks.

To improve intellectual production in offices, a more intelligent network service function making free use of the information communication technologies is demanded in addition to providing the amenities of building facilities such as air-conditioning and sanitary facilities, lighting facilities, and disaster prevention facilities.

Development of higher-performance digital information communication technologies or network and computing machines is pursued with the widespread use of networks and advanced technology innovation for widening and speeding up networks. Further, the product life of the network machine itself is short and the cycle time also becomes short; more advanced new products to which new functions are added appear on the market one after another in a short term and old products are made out-of-date very quickly. On the other hand, for competition between enterprises and innovation of enterprise activities, it becomes necessary to replace old network machines with new network machines keeping up with the state-of-the-art technology innovation in a short time. Thus, it becomes an important challenge to economically provide a migration path for gradual network introduction and machine expansion, enhance network security, and offering intelligent network service.

By the way, for multimedia transmission in an internet or an intranet, an RSVP (resource reservation protocol) for preferentially passing one-way data traffic of stream type of telephone or video conference on a connectionless IP protocol basis is developed and a peer-to-peer network of a video conference system, etc., by IP multicasting at the internet level is also developed. The RSVP itself is not a routing protocol and operates with unicasting and multicasting routine protocols like an internet control protocol occupying the TCP area on the IP. The receiving party issues a transmission quality guarantee (QoS) request. In the router and the host at node, a packet classifier determines an input packet route and QoS, a packet scheduler determines forwarding for each packet, admission control determines whether or not there are sufficient resources to support the requested QoS, and policy control determines whether or not the user is authorized to use the resources. The RSVP itself transmits and handles QoS control parameters as opaque data. The RSVP is designed to be able to be expanded to a very large member, group, and multicast group having topology of a tree structure according to router "soft state" (use of state transition by software).

On the other hand, in a connection-oriented ATM (asynchronous transfer mode) system, development of LAN emulation corresponding to the conventional LAN bridge, MPOA for providing a multiprotocol router on LAN emulation, an IP-over-ATM system for passing the IP on ATM, an IP-over-RSVP system for passing the RSVP on ATM, an IP switching system for switching only the IP on ATM, a 1-PNNI system for routing internet protocols on a private signaling protocol between ATM switches, and ATM-native transmission quality guarantee (QoS) technique is also pursued.

Hitherto, center units of information communication facility machines such as a center line concentrator of LAN and telephones, a BA monitor controller, and electric equipment of a distribution board, etc., in an intelligent building have been gathered at a center of an electric room, etc., under an electric shaft (EPS) to reduce in network maintenance and management costs and provide security. That is, the servers at the enterprise level and important network machines on network management are gathered in the network center and management is centralized in such a manner that a telephone switching system is installed in a switching system room and that a disaster prevention system and a BA central monitor panel are installed in a central monitor room in the building. Subcentral units of information communication facility machines such as a floor line concentrator for controlling information communication terminals, a BA monitor controller, and electric equipment for each floor are installed in a wiring closet on each floor together with a floor distribution frame (floor IDF), etc. Generally, they are mounted on a 19-inch rack from which star wiring is installed to outlets on each floor by an advanced wiring system.

The wires of a machine room subsystem from the network center, the switching system room, and the central monitor room are collected as a trunk at a main distribution frame (MDF). A trunk line wiring subsystem as a backbone is formed from the MDF to the floor IDF in the wiring closet on each floor and wires from the IDF to the terminals or outlets in the floor make up a branch line wiring subsystem. It is ideal to wire from the distribution frame (IDF) to a wall face or floor outlet with a 4-pair twisted pair line at the shortest distance as star connection. The information lines of the trunk line wiring subsystem are housed in the EPS together with a power distribution system extending straight from the bottom floor to the top floor of the building. The room through which the EPS passes on each floor becomes the wiring closet, thus here the wiring closet and the electric shift (EPS) are handled the same.

On a comparatively large floor, a room distribution frame (room IDF) is installed in a work group or on a wall face of a room, etc., and wiring is installed with twisted pair lines using multiple twin cable in room IDF units from the floor IDF in the wiring closet to the room IDFs in the work groups.

Functionally, the wiring from the floor IDF to the room IDFs becomes a form in which the wiring closet is distributed to the floor, thus here is called a floor trunk line wiring system. A room line concentrator for controlling the information communication terminals for each room may be installed in the floor IDF.

In a room, the information terminals such as PCs can be laid out like an island structure in response to desk placement. Thus, the island is called a zone and a zone wiring system for installing a zone wiring box on the floor is also available. Fixed floor wiring is from the floor IDF or room IDF to the zone wiring box and a flexible wiring system is applied from the zone wiring box to a deskside receptacle.

In floor wiring, there is an access floor under which wiring is stored and wiring box storage places are provided combining power wiring for supplying power to the information terminals such as PCs and telephone/LAN information wiring. In LAN wiring, there is a type wherein only passive connectors are built in the zone wiring box and a type wherein a repeater HU having a plurality of several active ports is built in as a zone line concentrator. Deskside information receptacles include those of a type wherein only passive modular connectors are built in and those of a type wherein a table tap repeater hub having several active ports is built in as a deskside line concentrator. Ethernet of collision detection type (CSMA/CD) is often used as a LAN access method that terminals use; in information wiring, as LANs become widespread and the number of terminals increases, the advanced wiring system with twisted pair lines previously used for telephone wiring in USA utilizes a wiring change management function with a cross batch panel of an IDF.

In Ethernet, a 10BASE-T system at a transmission speed of 10 Mb/s with a twisted pair line becomes popular at desktops. Twisted pair lines as floor wiring are gathered in a floor line concentrator installed in a wiring closet and the floor line concentrator is provided with a signal repeater function, is connected to a higher-speed trunk LAN, and is provided with a bridge/router function for segmenting network traffic. A main router connected to the external internet, a switching system connected to telephone lines, a host computer, a file server, and a center line concentrator connected to a high-speed trunk LAN are installed in a network center.

The center line concentrator and floor line concentrator are mounted on a so-called 19-inch rack in the chassis form, box form, stack form, etc. The repeater, the bridge, the router, and the like are connected to each other as multivendors according to a signal system and communication protocol conforming to the standard.

In recent years, Ethernet with twisted pair lines has also been speeded up to 100 Mb/s to 1 Gb/s; the transmission distance with an unshielded twisted pair line (UTP) of the CAT5 grade has become 50–100 m. In the advanced wiring system, although the transmission speed 10 Mb/s is mostly applied for the time being, CAT5-grade unshielded twisted pair lines are used from the beginning in expectation of speeding up for the future or incombustible optical fiber wiring fixedly embedded in a wall, etc., enabling longer-distance, higher-speed transmission is also used partially.

As the number of terminals grows and the use band of each terminal increases, it becomes necessary to improve the line processing capability of each floor line concentrator in addition to speeding up transmission on wiring to enhance traffic throughput and hold the transmission delay time short. A controller chip of an Ethernet switching system utilizing the high-speed data processing capability of a semiconductor processor is commercially available, and a switching hub with a plurality of ports capable of communicate at a transmission speed of 10 or 100 Mb/s independently at the same time is used as a line concentrator. When. such Ethernet switching ports are connected to specific segments in the line concentrator for each port and are filtered based on MAC addresses, they are called port switches or configuration switches; when the ports are filtered to arbitrary segments based on MAC addresses for each port, they are simply called LAN switches. The port or configuration switches and the LAN switches are called layer 2 LAN switches. In a server-client network, connection to the server and connection to the backbone are speeded up. An Ethernet switching hub having the capability of appropriately selecting the port transmission speed in response to traffic in such a manner that connection to the server or connection to the backbone is made on a big pipe of 100 Mb/s and that connection to other ports is made at 10 Mb/s is available. Also, an Ethernet switching hub having a function of automatically recognizing that the terminal connected to each port is at 10 Mb/s or 100 Mb/s is available. If a repeater hub at the transmission speed 10 Mb/s, 100 Mb/s is used as a deskside line concentrator or a zone line concentrator to which one to several terminals are connected, a collision scarcely occurs and an area connected to the repeater hub and bridged by switch port is called a microsegment.

The microsegment is defined locally and is positioned as a subdivided segment in a virtual LAN segment; it is a unit in which several PCs (personal computers) can share media without a collision. In a configuration switching device, microsegments are set in port units and are reconfigured. The virtual LAN segment is defined on an upper layer of a LAN system and is common to sites, buildings, and floors covered by network management; the microsegment is defined locally on a low-order layer of a configuration switching device installed in a wiring closet on each floor and is closed in the configuration switching device. A single segment of wiring only or repeater connection is between the configuration switching device in the wiring closet and a desktop.

Since most of traffic concentrates on network backbone (trunk) and server connection, high-speed expandability is required and expansion to Ethernet at 100 Mb/s to 1 Gb/s is intended for the sever connection. A backbone of a frame riser with a 100-Mb/s LAN switch installed in a center line concentrator and a LAN switch with a 100-Mb/s interface installed in a floor line concentrator is used. Further, if expandability and transmission quality guarantee (QoS) are required, a backbone of a cell riser with an ATM switch installed in a center line concentrator and a LAN switch with an ATM interface installed in a floor line concentrator is used.

Hitherto, with an FDDI system used for a trunk LAN, a main router with an FDDI interface connected to an external system has been installed in a center line concentrator, an FDDI-Ethernet bridge router has been placed in a floor line concentrator, frame conversion between the FDDI and Ethernet has been executed, and segmentation has been made according to a routing protocol. However, with the widespread use of the layer 2 LAN switches, a system is available wherein a main router connected to an external system and a layer 2 LAN switch are installed in a center line concentrator, a layer 2 LAN switch is installed in a floor line concentrator, a backbone is made a single subnet flat for a routing protocol, LAN switch segments are made broadcast domains to form an independent LAN, and segment-to-segment traffic is passed through the main router. Further, an implicit VLAN with segments entered in a table as a MAC address group to form implicit virtual LAN segments and an explicit VLAN forming explicit virtual LAN segments with a tag identifiable for each group inserted in a packet are available. In such layer 2 VLANs with the layer 2 LAN switches, the switch filtering function can be used to arbitrarily set segments independent of physical wiring across floor line concentrators, enabling segmentation in response to the enterprise organization or work groups. To form layer 2 LAN switches by ATM LAN emulation, a virtual LAN is formed on VPI/VCI connection; transmission quality guarantee (QoS) is not provided in the LAN emulation.

However, to segment a flat subnet into layer 2 subnets, every broadcast concentrates on the main router and segment-to-segment traffic also concentrates on the main router. Thus, it is feared that the processing capability of the main router will becomes a bottleneck or a one-point failure point and that a failure of the main router will cause the entire network to stop.

When the servers managed in a centralized manner in the network center are accessed or overlapped segments across segments are formed, communication traffic across layer 2 LAN switch segments increases. Then, a switch called a layer 3 LAN switch filtered based on the routing protocol address or the protocol type has been developed for floor line concentrators. With the layer 3 LAN switch, layer 3 virtual network segments based on logically defined protocol addresses independently of physical wiring like MAC addresses or ports are formed and may be called virtual subnet. Since the layer 3 LAN switch contains a router function, traffic across layer 2 subnets can also be directly switched not via the main router; subnets rather than flat subnets can be classified according to management policy or a fire wall for the routing protocol can be provided for enhancing security. If the layer 3 LAN switch is formed in an MPOA system on ATM LAN simulation, standardization is not yet complete, thus the layer 3 LAN switch may be installed under specifications proper to each vendor and limited transmission quality guarantee (QoS) is also provided. A backbone LAN system of routing between ATM switches in an I-PNNI system and using a layer 3 LAN switch as the edge LAN switch is also developed.

An IP switch system or tag switch system on which recent attention is focused is a layer 3 LAN switch on an ATM switch developed uniquely by a LAN vendor for which standardization is proposed by the LAN vendor.

High performance of center and floor line concentrators to a higher-end system moves to a layer 2 virtual LAN and a layer 3 virtual network integrating the routing and switching technologies to deal with an increase in backbone traffic.

SUMMARY OF THE INVENTION

The technical problems described later are solved and the results are totalized, whereby the following problem is solved: A comfortable environment is provided for an office so as to cope dynamically with layout change, etc., containing an information network infrastructure like tenant building service of an intelligent building.

An intelligent building service for providing a residential environment of a layout-free office with a facility network such as BA and an OA/TC network integrated by an information wiring system in units such as workgroups or tenants is provided. The network configuration is changed automatically in response to layout change such as a network connection machine move, addition, etc.

VLAN is used for virtual network service providing a comfortable office environment making free use of IT, and integrated management of service is executed in units. Network segmentation is dynamically changed in response to a network user request. To provide network service for the user, the agent automatically allocates resources in response to a user request. The virtual network service using the VLAN provides a comfortable environment integrating the facility network and OA/TC network autonomously in a distributed manner.

(1) Since the current means for setting different virtual LAN groups for each terminal rather than in port units adds an extra header or tag to a packet, if a machine of a different vendor not understanding the header or tag definition intervenes, the virtual LAN group cannot be expanded via the machine of the different vendor.

It is an object of the invention to provide a virtual LAN for forming unique virtual groups supporting unicast and multicast priority processing for each terminal with no extra header or tag added to a packet and moreover independently of LAN switch ports in conformity with the conventional standard and dynamically executing automatic configuration management for a terminal move.

Further, headers or tags for setting different virtual LAN groups for each terminal rather than in port units are added to packets and virtual LAN groups according to the standard or locally defined are used for virtual network service for providing a comfortable office environment integrating the facility network and OA/TC network and making full use of IT. On the other hand, unique virtual LAN groups supporting unicast and multicast priority processing for each terminal with no extra header or tag added to a packet and moreover independently of LAN switch ports are used for the already existing terminals in conformity with the conventional standard and automatic configuration management is also executed dynamically when the already existing terminal moves.

(2) It is an object of the invention to provide a port segment switching system enabling a common microsegment to be set among switching hubs in port units.

(3) By the way, hitherto, one main router or one route server has borne routing table management in communication between intranet VLANs and communication with the internet. Thus, as intranet packets are speeded up, it becomes necessary to speed up the main router, the traffic amount of the main router increases, and the main router becomes very expensive.

It is therefore an object of the invention to provide a network switching system for decreasing traffic of the main router and reducing costs.

(4) It is therefore an object of the invention to provide a virtual network system that can support a function enabling the user to easily construct and customize a virtual network capable of integrating access to network resources required by the user.

It is another object of the invention to provide a virtual network system for enabling the user to easily set network segmentation and customize access to resources containing local and private resources without relying on a professional administrator of centralized management of a network.

It is still other object of the invention to provide a virtual network system which enables layout-free service that can customize a user office environment and provides a comfortable environment in response to user purpose and organization.

It is still other object of the invention to provide a virtual network system for forming virtual groups supporting unicast and multicast priority processing for each terminal with no extra header or tag added to a packet and independently of switch ports in conformity with the conventional standard and dynamically executing automatic configuration management for a terminal move, addition, or change.

(5) It is therefore an object of the invention to provide a distributed integrated wiring system for providing optimum amenity (comfortable residential environment) for each resident so that the residents in the building furthermore improve in personal or group intellectual productivity, providing service for the resident in the building autonomously under local conditions meeting local requirements and centralized management service for raising the entire efficiency by conventional integrating at the whole building level, and facilitating update, expandability, and maintainability of information communication facility equipment and electric facility equipment in response to technology innovation for enabling expansion from a small or medium-scaled network to a comparatively large-scaled network and raising investment efficiency.

The solution means listed below are integrated, whereby the following distributed integrated information wiring system is configured: Virtual network service for customizing a user environment distributed for each residential room unit and using building facilities and information communication facilities by logically forming virtual groups dynamically handling change factors such as user requests and building layout change and appropriately allocating resources and guaranteeing QoS in a virtual network relating the logical attribute to physical attribute.

| | Virtual network | |
|---|---|---|
| Change factor | User environment | Logical attribute |
| User request<br>Move<br>Addition<br>Change<br>Free layout | Residential unit<br>User class | Application<br>Transport<br>Subnet<br>Network |
| Physical attribute | Facilities | |
| Segment<br>Device<br>Physical address<br>Port address | Building facilities<br>Information communication<br>facilities | |
| Virtual network service | Function | |
| Customization | Virtual group<br>Virtual agent<br>Coordination problem solving | |
| Quality | Service | |
| QoS | Amenity<br>Information communication<br>Virtual space | |

According to a first aspect of the invention, there is provided a virtual LAN system: forming a virtual group which is based on elements having physical attribute or logical attribute and constituting a virtual LAN; setting a client address and priority of the virtual group in a virtual group registration table; and allocating unicast and broadcast traffic bands in group units.

According to a second aspect of the invention, there is provided a virtual LAN system including a virtual group agent having a virtual group registration table and a virtual group learning circuit; wherein the virtual group agent forms a virtual group for each terminal based on characteristics of a packet without adding an extra header or tag to the packet and independently of LAN switch ports, sets a client address and priority of the virtual group in the virtual group registration/routing table, and allocates unicast and multicast traffic bands in group units; and whereby the virtual group agent executes dynamic automatic configuration management for a terminal move by the virtual group learning circuit.

In the virtual LAN system according to the first aspect may further includes: a port segment switching system including: one or more switching hubs having a plurality of switching hub ports, a packet being transmitted and received in microsegment units to which the switching hub ports belong; wherein the virtual group of which members are the switching hub ports is formed in such a manner that microsegment units to which the switching hub ports belong function as a virtual repeater; and whereby the switching hub ports are combined arbitrarily so as to set a common microsegment to the plurality of switching hubs.

The above virtual LAN system may further comprise a plurality of segment patterns of microsegments previously registered in the each switching hub, the segment patterns being selected by time period or in switching hub units, thereby forming the virtual group of the microsegment, the virtual group having ports set by the segment patterns as members thereof.

And a plurality of link paths may be set in each switching hub for daisy-chaining the switching hubs, the virtual group of the microsegments is set to link path, switching hub ports being members of the virtual group, and whereby the virtual group of the plurality of microsegments are multiplexed among the switching hubs.

Further, a plurality of switching hubs may form a plurality of virtual LANs, the virtual group of the microsegments constituting members of the virtual LANs, switching hub ports being members of the virtual group, and a single microsegment or microsegments as members of virtual members are multiplexed among the switching hubs.

In the above virtual LAN system, VLAN-IDs for identifying a plurality of virtual LANs may be set, the VLAN-IDs and segment IDs for identifying the virtual group of microsegments to which ports belong are entered in a VLAN management table, and the segment ID is added to a packet between the switching hubs so as to multiplex a single microsegment or microsegments as members of the virtual members among the switching hubs.

In the virtual LAN system according to the first aspect of the invention, the local switches for processing routing in virtual LANs as local intranet segments of the virtual LAN system may provided; and a local router switch for filtering packets so as to send only internet segment traffic from the local switches to a main router for processing routing in global internet segments.

In the above virtual LAN system, the main router manage network subnets, a gateway is set in the virtual group registration/routing tables contained in the local switches, and a packet entered in the gateway is encapsulated and forwarded to the main router, whereby the packet can be routed to a different local switch and can take part in a common virtual group from a segment in a different subnet.

In the virtual LAN system according to the second aspect, the virtual group agents may have the virtual group registration/routing table in which the different virtual groups in network management and network service are formed in a virtual network into a plurality of segments; and the virtual group agents customize the network management and the network service dynamically in coordination with users in response to user demands.

In the above virtual LAN system connection ports of the virtual groups may be distributed to a plurality of switches distributed over a network; the virtual group registration/routing table and the virtual group agents are placed in the switches in a distributed manner; utilities such as building automation utilities of air conditioning, lighting, security, etc., are segmented into the virtual groups; and the virtual group registration/routing table distributed to the switches is managed dynamically; the virtual group agents coordinate with each other in response to a request for setting a virtual network related to resource use of a different system from the user; thereby executing network service of customizing the utilities and automatic configuration for a user.

In the above virtual LAN system, client addresses of the virtual groups and a user environment may be set in the virtual group registration/routing table; the virtual group agents coordinate with each other in automatic response to a user's network resource use request, a terminal move, addition, change, etc., segment resources of a different system into virtual groups in coordination with a different system management server, and dynamically manage the virtual group registration/routing table distributed to the switches; thereby customizing the linkage conditions of the building automation utilities and the utilities of the different system for automatic configuration.

In the above virtual LAN system, connection ports of the virtual groups may be distributed to a plurality of switches distributed over a network; the virtual group registration/routing table and the virtual group agents are placed in the switches in a distributed manner; the virtual group agents coordinate with each other in automatic response to a user's network resource use request, a terminal move, addition, change, etc., in accordance with constraints and rules of conflict detection/negotiation/plan correction/learning preset for a network environment for the agents so as to dynamically manage the virtual group registration/routing table distributed to the switches; thereby customizing network management and network service and executing automatic configuration thereof.

In the above virtual LAN system, connection ports of the virtual groups may be distributed to a plurality of switches distributed over a network; the virtual group agents have three types of agents different in character, virtual network agents, virtual user agents, virtual network service agents; the virtual group registration/routing table and the virtual network agents are placed in the switches in a distributed manner; wherein user environment table and the virtual user agents are placed in the switches or terminals in a distributed manner; virtual network service agents segment resources of a different system into virtual groups and dynamically manage the virtual group registration/routing table distributed to the switches in coordination with virtual network agents and a different system management server; and whereby the virtual user agents and the virtual network agents distributed to the switches coordinate with each other for customizing the utilities of the different system in response to a virtual network setting request related to resource use of the different system from a user for automatic configuration.

In the above virtual LAN system, the virtual group agents may have the following three types of agents different in character; virtual network agents, virtual user agents and virtual network service agents; the virtual network agents are placed in the switches in a distributed manner; wherein user environment table and the virtual user agents are placed in the switches or terminals in a distributed manner; virtual network service agents segment resources of a different system into virtual groups and dynamically manage the virtual group registration/routing table distributed to the switches in coordination with virtual network agents and a different system management server; and whereby the virtual user agents and the virtual network agents distributed to the switches coordinate with each other for customizing the utilities of the different system in response to a virtual network setting request related to resource use of the different system from a user for automatic configuration.

In the above virtual LAN system, the user environment table and virtual user agents may be placed in the switches or terminals in a distributed manner; the virtual network service agent is built in a local network manager of a distributed management system; the virtual user agent and the virtual network agents distributed to the switches coordinate with each other in automatic response to a user's network resource use request, a terminal move, addition, change, etc.; the virtual network service agent dynamically manages the virtual group registration/routing table distributed to the switches in coordination with the virtual network agent and a virtual network management server for managing and operating a multivendor virtual network; thereby customizing a multivendor integrated virtual network environment in addition to network management conforming to standard for automatic configuration in the local network manager.

In the above virtual LAN system, the user environment table and virtual user agents may be placed in the switches or terminals in a distributed manner; the virtual network service agent is built in a local network manager of a distributed management system; the virtual user agent and the virtual network agents distributed to the switches coordinate with each other in automatic response to a user's network resource use request, a terminal move, addition, change, etc.; the virtual network service agent dynamically manages the virtual group registration/routing table distributed to the switches in coordination with the virtual network agent and a virtual network management server for managing and operating a multivendor virtual network; thereby customizing a multivendor integrated virtual network environment in addition to network management conforming to standard for automatic configuration in the local network manager.

In the above virtual LAN system, the user environment table and virtual user agents may be placed in the switches or terminals in a distributed manner; the virtual network service agent is built in a network management manager for integrated management; the virtual user agent and the virtual network agents distributed to the switches coordinate with each other in automatic response to a user's network resource use request, a terminal move, addition, change, etc.; the virtual network service agent dynamically manages the virtual group registration/routing table distributed to the switches in coordination with the virtual network agent and a virtual network management server for managing and operating a multivendor virtual network; thereby customizing a multivendor integrated virtual network environment in addition to network management conforming to standard for automatic configuration.

In the above virtual LAN system, the user environment table and virtual user agents may be placed in the switches or terminals in a distributed manner; the virtual network service agent is built in a network management manager for integrated management; the virtual user agent and the virtual network agents distributed to the switches coordinate with each other in automatic response to a user's network resource use request, a terminal move, addition, change, etc.; the virtual network service agent dynamically manages the virtual group registration/routing table distributed to the switches in coordination with the virtual network agent and a virtual network management server for managing and operating a multivendor virtual network; thereby customizing a multivendor integrated virtual network environment in addition to network management conforming to standard for automatic configuration.

In the above virtual LAN system, the user environment table and virtual user agents may be placed in the switches or terminals in a distributed manner; linkage conditions of building automation utilities and utilities of a different system are set in a user environment setting area; the virtual user agent and the virtual network agents distributed to the switches coordinate with each other in automatic response to a user's network resource use request, a terminal move, addition, change, etc., in accordance with constraints and rules of conflict detection/negotiation/plan correction/learning preset for a network environment for the agents; and the virtual network agent coordinates with a virtual network management server for dynamically managing the virtual group registration/routing table distributed to the switches; thereby customizing the linkage conditions of the building automation utilities and the utilities of the different system, autonomously observing the state of each utility, learning an optimum linkage condition for automatic setting thereof.

In the above virtual LAN system, the user environment table and virtual user agents may be placed in the switches or terminals in a distributed manner; linkage conditions of building automation utilities and utilities of a different system are set in a user environment setting area; the virtual user agent and the virtual network agents distributed to the switches coordinate with each other in automatic response to a user's network resource use request, a terminal move, addition, change, etc., in accordance with constraints and rules of conflict detection/negotiation/plan correction/learning preset for a network environment for the agents; and the virtual network agent coordinates with a virtual network management server for dynamically managing the virtual group registration/routing table distributed to the switches; thereby customizing the linkage conditions of the building automation utilities and the utilities of the different system, autonomously observing the state of each utility, learning an optimum linkage condition for automatic setting thereof.

In the virtual LAN system according to the first aspect of the invention, a plurality of virtual LANs of the virtual LAN system are placed in an intelligent building system for executing communication and control used by a resident, such as an office, a plant, a hospital, or a building in a distributed manner; network service resources are distributed to a plurality of residential units into which the intelligent building system is divided, so that service for the resident can be provided autonomously under local conditions meeting local requirements; a local node of each residential unit, into which functions and resources of local network service are integrated, a plurality of local nodes autonomously providing network service; a center node into which common resources and common network service functions required for use of common building facilities, common service, and centralized management of the entire system are integrated; and services of the distributed virtual LANs are integrated in the local nodes and the center node.

In the above virtual LAN system, an integrated network service equipment may be installed in the center node, and a distributed network service equipment is placed in the local node; and building wiring comprises: backbone wirings connecting the center node and floor integrated wiring closets; floor trunk lines connecting the floor integrated wiring closets and equipment storage units placed in construction space such as space below a floor that can be accessed from shared space of the building; and floor branch lines connecting the equipment storage units and zone boxes or outlets; wherein the local node is the floor integrated wiring closet or the equipment storage unit.

In the virtual LAN system according to the first aspect of the invention, a plurality of virtual LANs of the virtual LAN system are placed in an information communication network environment in a distributed manner; residential units to which information communication service functions and resources and building facility service functions and resources required for local network service for a resident are distributed, so that network service for the resident in the information communication network environment in a building such as an office, a plant, or a hospital can be provided autonomously under local conditions meeting local requirements; a local network service server into which network service functions of local information communication service like a virtual network configuration setting a multicast group such as an electronic conference using multimedia or providing virtual common information space different from physical placement through a network and local building facility service like residential environment service such as air conditioning and lighting are integrated; distributed network service equipment into which communication, control, and monitor functions for providing local information communication resources and building facility resources used as resources for providing the local network service and service for a local resident autonomously under local conditions; a common network service server into which common information communication service such as access to an internet, WAN connection, and message communication throughout the entire building and common building facility service such as energy saving, building automation, and disaster and crime prevention are integrated; an integrated network service equipment into which common information communication facility resources and common building facility resources as common network service resources used as resources for providing the common network service and common service resources required for centralized management and communication, control, and monitor functions required for use of common and entire systems, common service, and centralized management are integrated; and services of the distributed virtual LANs are integrated in the local network service server, distributed network service equipment, common network service server, and integrated network service equipment.

In the above virtual LAN system, the integrated network service equipment may be installed in a center node, and the distributed network service equipment is placed in a local node; and building wiring comprises: backbone wirings connecting the center node and floor integrated wiring closets; floor trunk lines connecting the floor integrated wiring closets and equipment storage units placed in construction space such as space below a floor that can be accessed from shared space of the building; and floor branch lines connecting the equipment storage units and zone boxes or outlets; wherein the local node is the floor integrated wiring closet or the equipment storage unit.

In the virtual LAN system according to the second asepct, the registration/routing tables and the virtual group agents may be placed in a network in a distributed manner; network service functions of local information communication service and building facility service are integrated into a local network service server; communication, control, and monitor functions for providing local information communication resources and building facility resources and service for a local resident autonomously under local conditions are integrated into a distributed network service equipment; a common information communication service and common building facility service are integrated into a common network service server; common information communication facility resources, common building facility resources, and communication, control, and monitor functions required for use of an entire system, common service, and centralized management are integrated into an integrated network service equipment; local information communication service and local building facility service of building automation utilities, utilities of a different system, etc., common information communication service, common building facility service, and their linkage conditions can be set in a user environment unit or residential room unit setting area of the virtual group registration/routing table; the virtual group agents coordinate with each other in automatic response to a user's network resource use request, a terminal move, addition, change, etc., and segment the information communication resources and building facility resources into virtual groups and dynamically manage the virtual group registration/routing tables in coordination with the local network service server and the common network service server; and thereby customizing the linkage conditions of the local and common services for automatic configuration and providing the network service for the local resident autonomously under local conditions.

In the virtual LAN system according to the second aspect, the virtual group agent may comprise virtual network service agent, virtual network agent and virtual user agent; virtual network service agent, virtual group registration/routing tables, virtual network agents, user environment/residential unit environment table and virtual user agents are placed in a network in a distributed manner; network service functions of local information communication service and building facility service are integrated into a local network service server; communication, control, and monitor functions for providing local information communication resources and building facility resources and service for a local resident autonomously under local conditions are integrated into a distributed network service equipment; a common information communication service and common building facility service are integrated into a common network service server; common information communication facility resources, common building facility resources, and communication, control, and monitor functions required for use of an entire system, common service, and centralized management are integrated into a network service equipment; local information communication service and local building facility service of building automation utilities, utilities of a different system, etc., common information communication service, common building facility service, and their linkage conditions can be set in a user environment or residential room unit environment setting area of the table; the virtual user agents, the virtual network service agents and the virtual network agents distributed to switches coordinate with each other in automatic response to a user's network resource use request, a terminal move, addition, change, etc., in accordance with constraints and rules of conflict detection/negotiation/plan correction/learning preset for the agents; the virtual network service agent dynamically manages the virtual group registration/routing table in coordination with the local network service server and the common network service server; thereby customizing the linkage conditions of the local and common services, autonomously observing the state of each utility, learning optimum linkage conditions, and automatically setting the conditions for providing the network service for the local resident autonomously under local conditions.

BRIEF DESCRIPTION OF THE DRAWINGS

In the accompanying drawings:

FIG. 3 is a drawing to show formats of a virtual group registration table and a virtual group routing table;

FIGS. 5(a) and 5(b) are image charts of virtual service group;

FIG. 6 is an image chart of switched group;

FIG. 10 is an illustration to show a segment management table in the switching hub in the invention;

FIG. 15 is a block diagram to show a system configuration of the invention;

FIG. 20 is an illustration-to show the format of a virtual group registration/routing table of the invention;

FIG. 23 is an illustration to show the format of a virtual group registration/routing table in the fifth embodiment of the invention;

FIG. 24 is an illustration to show the format of a virtual group registration/routing table of the invention;

FIG. 26 is an illustration to show the format of a virtual group registration/routing table of the invention;

FIG. 36 is an illustration to show the structure of a client definition table of the invention;

FIG. 38 is an illustration to show the structure of a virtual group registration/routing table of the invention;

FIG. 44 is an illustration to show the structure of a virtual network service table of the invention;

FIG. 50 is an illustration to show the structure of a virtual group registration/routing table of the invention;

FIG. 51 is an illustration to show the structure of a user environment table of the invention;

FIG. 61(a) is an illustration of a virtual group registration/routing table in the invention and FIG. 61(b) is an illustration of a client definition-table in the invention;

FIG. 66(a) is an illustration of a virtual group registration/routing table in the invention, FIG. 66(b) is an illustration of a user environment table/residential unit environment table in the invention, and FIG. 66(c) is an illustration of a virtual network service table in the invention.

DETAILED DESCRIPTION OF THE PREFERRED EMBODIMENTS

1st Embodiment

Figure 1:
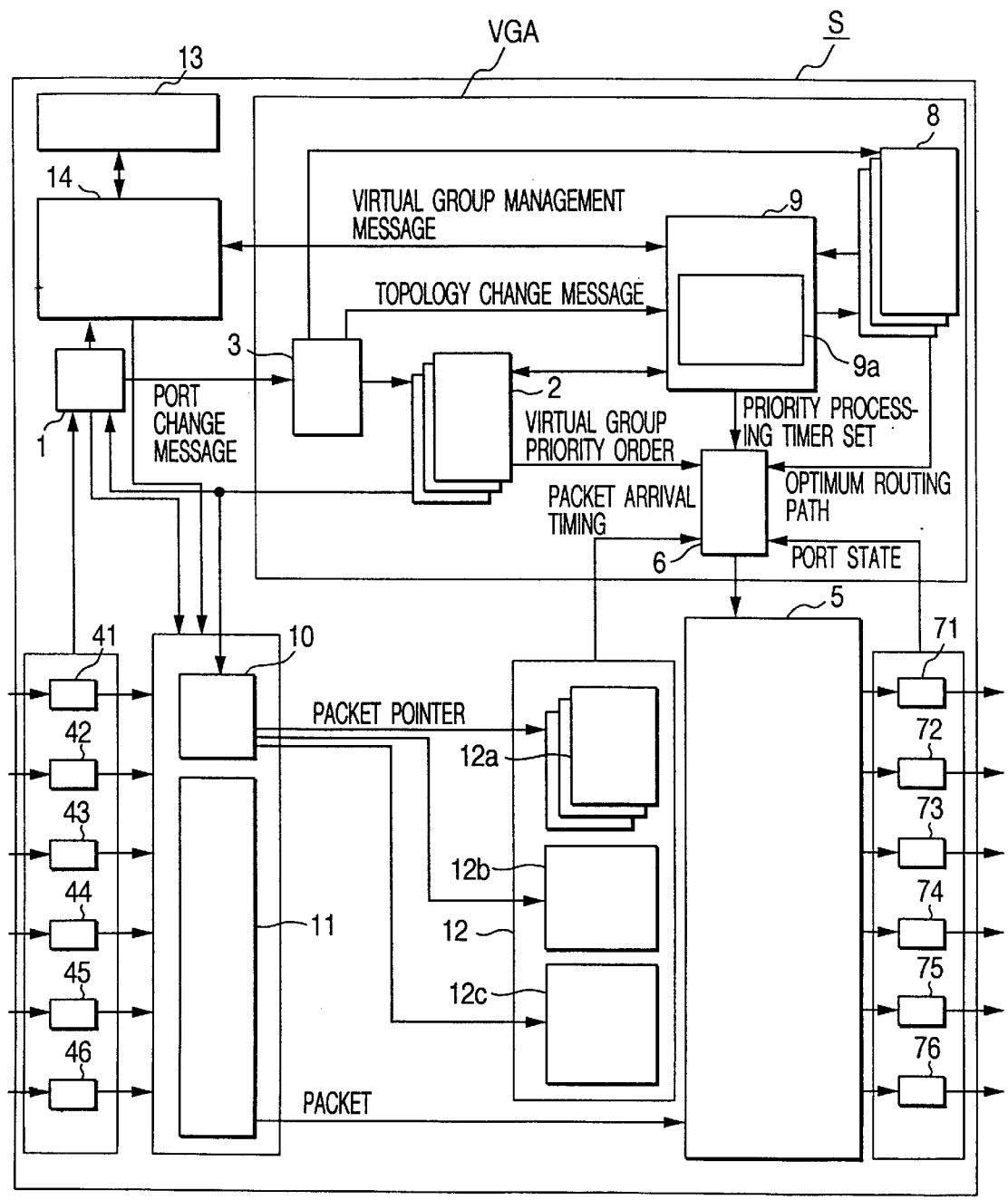
FIG. 1 is a block diagram of a VLAN switch using the invention.
Figure 2:
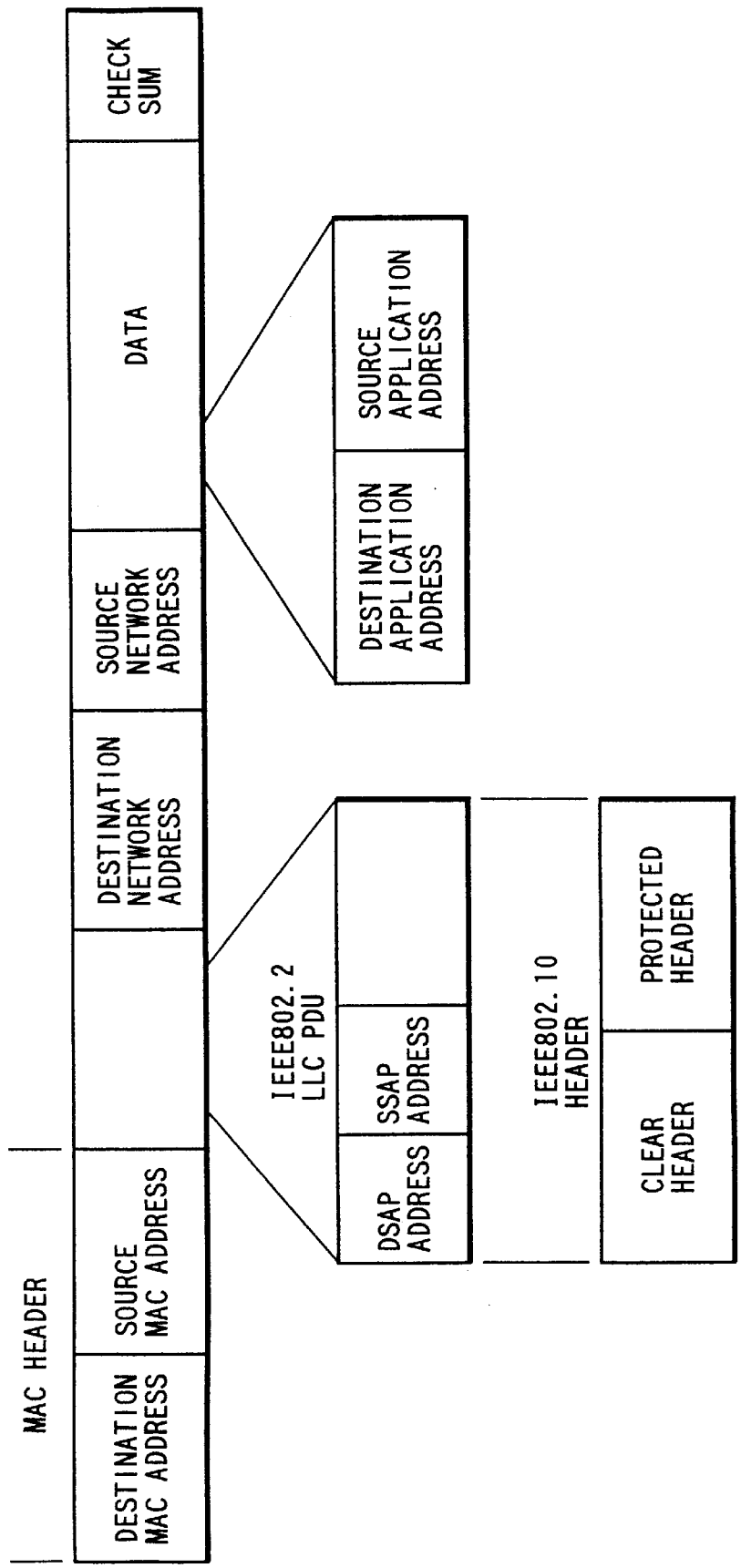
FIG. 2 is a drawing to show MAC frame format of a general LAN.

FIG. 1 shows a LAN switch having an important role in a virtual LAN in a first embodiment of the invention. The virtual LAN of the invention forms a virtual group for each terminal according to client addresses in a packet without adding an extra header or tag to the packet of a frame format in conformity with a standard as shown in FIG. 2 and independently of LAN switch ports.

The client address represents a feature set of a MAC address determined by a medium access method of LAN, a network address determined by a network operating system or communication protocol, an application address defined by application software or the user.

In a LAN switch S shown in FIG. 1, a virtual group identification section 1 collates a pair of client addresses (1) and (2) of a destination and a source of a packet with a virtual group registration table 2 of a virtual group agent VGA, identifies a virtual group containing both the client addresses, and when input ports 41 . . . differ although a client address match is found as a result of the virtual group identification for a terminal move, outputs a port change message to a virtual group learning section 3 of the virtual group agent VGA.

The virtual group learning section 3 executes dynamic automatic configuration management for a terminal move. When receiving the port change message, the virtual group learning section 3 updates the virtual group registration table 2 provided in a virtual group agent VGA and executes dynamic automatic configuration management.

The virtual group registration table 2 is provided for each group. As shown in FIG. 3, the priority for each virtual group and client address can be set. A virtual group control section 6 in the virtual group agent VGA allocates a band of each traffic type of unicast, multicast, and broadcast in group units in response to the virtual group priority.

The virtual group control section 6 causes a forwarding section 5 to transfer a packet to a-specified output port 71 . . . by scheduling control.

A virtual group routing table 8 provided in the virtual group agent VGA enters the optimum connection port address indicating which port of LAN switches distributed over the LAN the virtual group is connected to. It is prepared for each virtual group. The virtual group routing table 8 shown in FIG. 1 has a similar structure to that of the virtual group registration table 2 for virtual group identification and virtual group learning. In the LAN switch S in FIG. 1, a pair of client addresses (1) and (2) of the destination and the source of a packet are collated with the virtual group registration table 2 and the virtual group containing both the client addresses of the packet destination and source is identified. Thus, the virtual group routing table 8 can be defined as the same structure as the virtual group registration table 2 as shown in FIG. 3, and they can be brought together on installation.

The optimum connection port address is entered in the virtual group routing table 8 of the structure in FIG. 3 as the routing connection port. That is, in the distributed LAN switch configuration, another LAN switch is cascaded to a port of one LAN switch, thus the connection port to which a LAN switch is connected becomes a port name corresponding to the optimum route leading to the home switch to which the terminal is connected.

When ports differ although a client address match is found as a result of the virtual group identification for a terminal move, the virtual group identification section 1 outputs a port change message, the virtual group learning section 3 sends a topology change message to a virtual group distributed management section 9, which then learns in response to the topology change and dynamically updates the virtual group routing table 8.

By the way, if the connection ports of virtual groups are distributed over the LAN switches distributed over the network and the virtual group registration tables 2 and the virtual group routing tables 8 are distributed over the LAN switches, the virtual group identification section 1 of each LAN switch collates input port 41 . . . and the packet source address with the virtual group registration table 2 and detects topology change such as a terminal move, and the virtual group learning section 3 automatically updates the virtual group registration table 2 and the virtual group routing table 8.

The virtual group distributed management section 9 as virtual group agent dynamically manages the virtual group registration tables 2 and the virtual group routing tables 8 distributed over the LAN switches in cooperation with other LAN switches based on topology change detection of a terminal move, a LAN switch move, etc., whereby virtual groups can be shared among the LAN switches of the network.

Virtual group agents VGA distributed over the LAN switches can also be installed in virtual group servers each acting as a representative in virtual group units or for a virtual group cluster. In this case, the virtual group server can manage the state of the virtual group agent VGA and mediate communication between the agents VGA and also dynamically manages the virtual group registration tables and the virtual group routing tables in cooperation as a VLAN switch agent function. The virtual group registration tables and the virtual group routing tables updated and managed in the virtual group server are cached in the distributed LAN switches and the virtual group sever distributes change information in the tables to the LAN switches.

In FIG. 1, a packet from input port 41 . . . is stored in an area of a buffer 11 specified by a buffer management section 10 and at the same time, the buffer management section 10 generates a pack pointer pointing to the storage location of the packet. If the virtual group identification section 1 collates a pair of the client addresses of the packet destination and source with the virtual group registration table 2 and identifies the corresponding virtual group, the packet pointer is stored in a virtual group queuing section 12a of a buffer pointer queuing table 12 for queuing the virtual group only with the pointer without moving the data in the buffer 11. If the packet is a broadcast packet, its packet pointer is stored in a broadcast queuing section 12b. Further, if the packet contains a unicast address and does not correspond to any virtual group, the pointer pointing to the storage address of the packet in the transmission buffer is queued on an unknown group queuing section 12c.

When the virtual group control section 6 detects the port state of output ports 71 ... and finds an output port 71 ... idle, it instructs the forward section 5 to send the packet. The forwarding section 5 reads the pointer of the specified packet from the buffer 11 and sends the packet data in the buffer 11 pointed to by the pointer through the idle output port 71 ...

For scheduling control of forwarding the packets, the virtual group control section 6 uses a priority processing timer (not shown) in the virtual group control section 6 and forwards the packets in the virtual group queuing order at short time intervals according to the virtual group priorities.

Generally, virtual groups for executing communication of video information, etc., with much traffic are given high priority; virtual groups for online system transaction, feedback control, etc., even with low traffic for which reliable message transmission within the permissible time is required are also given high priority.

The timing interval of processing of packets of virtual groups with low priority in batch processing, file transfer, etc., is the longest; the buffer 11 is scanned in a shorter period for virtual groups with higher priority and the packet of the virtual group with the highest priority is handled first.

The packet assigned high priority is forwarded within the permissible time set in the priority processing timer by the virtual group distributed management section 9 after the data is input.

The following three types of virtual groups are formed according to client addresses and virtual groups different in definition method of protocol layer, etc., can be operated solely or be mixed:

(1-1) VLAN group at second layer level of OSI protocol layer model with MAC address defined as client address;

(1-2) VLAN group at third layer level of OSI protocol layer model with a plurality of network addresses depending on communication protocol or network operating system defined as client address; and (1-3) Virtual custom group with application address defined by user or application software as client address.

Here, the configuration in (1-1) is called a second-layer LAN switch, that in (1-2) a third-layer LAN switch, and that in (1-3) a custom LAN switch.

The virtual groups are identified in the order of virtual custom group, virtual network group, and VLAN group as the custom LAN switch. Operation as the third-layer LAN switch in the virtual network group order or as the second-layer LAN switch for identifying virtual groups only with MAC addresses is performed according to the installation state or selection. Thus, for the client addresses in the virtual group registration table 2 and the virtual group routing table 8, the network address and the user-defined address are blank in the second-layer LAN switch, the user-defined address is blank in the third-layer LAN switch, and all of the MAC address, network address, and user-defined address are specified in the custom LAN switch.

When ports differ although a client address match is found as a result of the virtual group identification in the layer order of the virtual custom group, virtual network group, and VLAN group for a terminal move, a port change message is output. Thus, the virtual group learning section 3 performs different operation depending on whether or not the home switch of the terminal is changed. If no home switch change is made, the virtual group learning section 3 updates the home switch port in the virtual group registration table 2, thereby executing dynamic automatic configuration management. If home switch change is made, the virtual group distributed management section 9 of a new home switch to which the terminal is moved exchanges a virtual group management message for updating the home switch name and the home switch port in each of the virtual group registration tables 2 of other LAN switches.

By the way, as shown in FIG. 1, the LAN switch S contains the virtual group routing table 8 for each virtual group and the buffer pointer queuing table 12. Since another LAN switch is cascaded to a port of one LAN switch in the distributed LAN switch configuration, a plurality of virtual groups and a plurality of terminals are assigned for each port and the LAN switch to which each terminal is directly connected is the home switch of the terminal and the terminal is connected to a port of the home switch.

If the terminal is directly connected to one LAN switch, the home switch name in the virtual group routing table 8 of the LAN switch is the switch name of the terminal. If the terminal is not directly connected to one LAN switch, the home switch name differs and the routing connection port in the virtual group routing table 8 is the port name corresponding to the optimum route leading to the home switch to which the terminal is connected.

When the virtual group learning section 3 sends a topology change message to the virtual group distributed management section 9 for a terminal move, the virtual group distributed management section 9 of a new home switch to which the terminal is moved exchanges a virtual group management message for updating the home switch name and the home switch port in each of the virtual group registration tables 2 of other LAN switches. The virtual group distributed management section 9 of a LAN switch adjacent to the home switch updates the routing connection port and client distance in the virtual group routing table 8 and sends a virtual group management message to another adjacent LAN switch for providing update information of the virtual group registration table 2 and the virtual group routing table 8 accompanying the topology change. When receiving the virtual group management message, the LAN switch updates the virtual group registration table 2 and the virtual group routing table 8 of the LAN switch according to the update information of the virtual group registration table 2 and the virtual group routing table 8 accompanying the topology change, and sends the virtual group management message to other LAN switches in sequence for updating the virtual group registration table 2 and the virtual group routing table 8, thereby learning for the terminal move and dynamically updating the virtual group routing table 8.

The virtual group distributed management section 9 exchanges a management message with other LAN switches as virtual group agent for exchanging LAN switch management information such as the MAC addresses and virtual groups of the LAN switches, thereby entering the connection port leading to the optimum routing path with a minimum number of LAN switch repetition stages for each LAN switch in the routing connection port of the virtual group routing table 8 of each LAN switch and setting the priority processing timer of scheduling responsive to the number of LAN switch repetition stages to provide the delay time for priority processing.

In the LAN switch S shown in FIG. 1, which LAN switch connected to which port is seen by virtual group identification and virtual group learning. Further, since the virtual group distributed management section 9 exchanges change information of the virtual group routing table 8 with other LAN switches, if LAN switch topology change information is entered, a virtual group management message is transferred in sequence between the adjacent LAN switches, thereby learning for the terminal move and updating the virtual group routing table 8 dynamically.

Since the client addresses of members are generated for each virtual group and the optimum routing path between members of each virtual domain is entered in the virtual group routing table 8, the virtual group control section 6 selects an optimum routing path between ports in each virtual group and forwards a packet by setting the priority processing timer. Thus, the delay time of a packet with high priority is provided.

For a move or change of the LAN switch S itself, the virtual group distributed management section 9 updates the routing connection port and the client distance in the virtual group routing table 8 by transferring a virtual management message in sequence between the adjacent LAN switches.

For multicast and broadcast of virtual group, forwarding processing to ports is performed in sequence based on the virtual group routing table set by the virtual group distributed management section 9.

Seeing the client address of the destination, the packet is forwarded to the previously learned port. A broadcast packet and a packet with a destination address not contained in the table are output from a switch domain, thus are multicasted to all ports.

In response to a virtual group change request, the agent of the home switch of the terminal updates the virtual group registration table 2 and the virtual group routing table 8.

By the way, general LAN application is a client-server model wherein a plurality of clients share a database in the server; multiple access to the database is made in online transaction processing of account-system jobs. Thus, the delay time introduces a problem because of synchronization. High-speed communication and small delay time are required for data extraction (query) to grasp, analyze, and simulate information and support decision making and for dataware houses which want to know the result as early as possible interactively. In a video conference in multicast communication, a larger amount of data needs to be sent in small delay time. In this case, high priority is applied and the data amount increases. A virtual corporation via WAN requires server-to-server communication at remote sites and electronic commerce needs to interactively communicate with a large number of terminals at remote sites. Monitor control messages for maintaining and managing the network must be handled at the highest priority.

Figure 4:
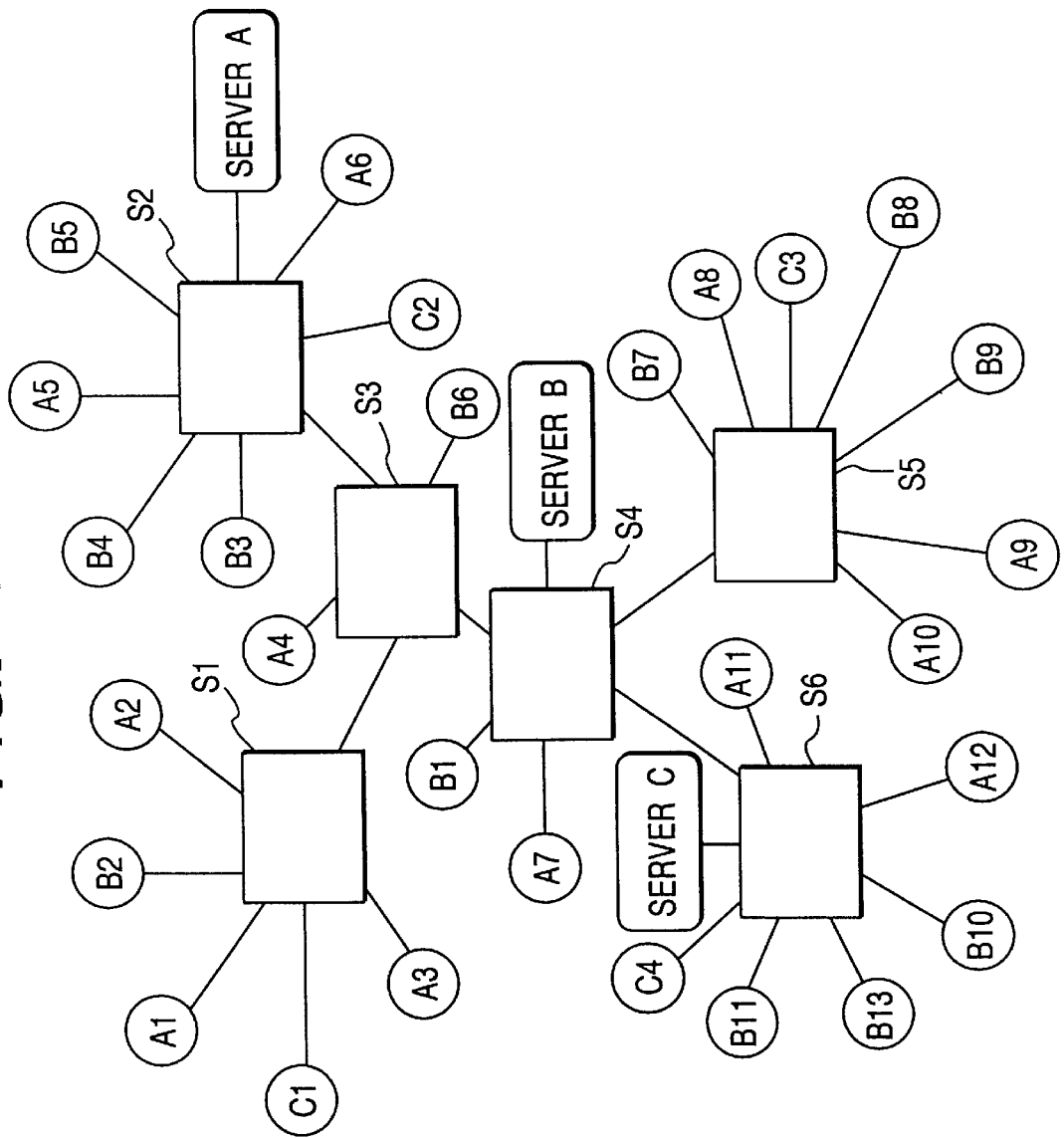
FIG. 4 is a system block diagram of one embodiment of the invention.

FIG. 4 is a system block diagram of a network using the virtual LANs of the invention. In the system, a plurality of LAN switches S1 . . . each comprising virtual group agent VGA shown in FIG. 1 are distributed, and terminals A1 . . . , B1 . . . , and C1 . . . connected to the LAN switches S1 . . . belong to different virtual groups. To be noted here, only one VLAN group (second layer level) can be defined for each MAC address of a network interface card (NIC) of each terminal, but a plurality of virtual network groups (third layer level) different in communication protocol can be defined and a plurality of virtual custom groups can be defined at the application level. FIG. 4 shows communication with the terminals A1 . . . , B1 . . . , and C1 as one virtual group for simplicity.

This is abstracted as shown in FIGS. 5(a), 5(b) and 6. FIG. 5(a) shows that client U belongs to virtual groups VA, VB, and VC and are connected to different server A, B, or C depending on the application or project. FIG. 5(b) shows that clients U1 . . . belonging to virtual groups VA, VB, and VC are connected to server S common to the virtual groups VA, VB, and VC.

FIG. 6 represents VLAN groups (second layer level) as switched domains SA, SB, and SC and a wall for communication among the switched domains SA, SB, and SC and broadcast as routing service between switched domains LS, and shows placement of network service server N and network management server M among the switched domains SA, SB, and SC.

Figure 7:
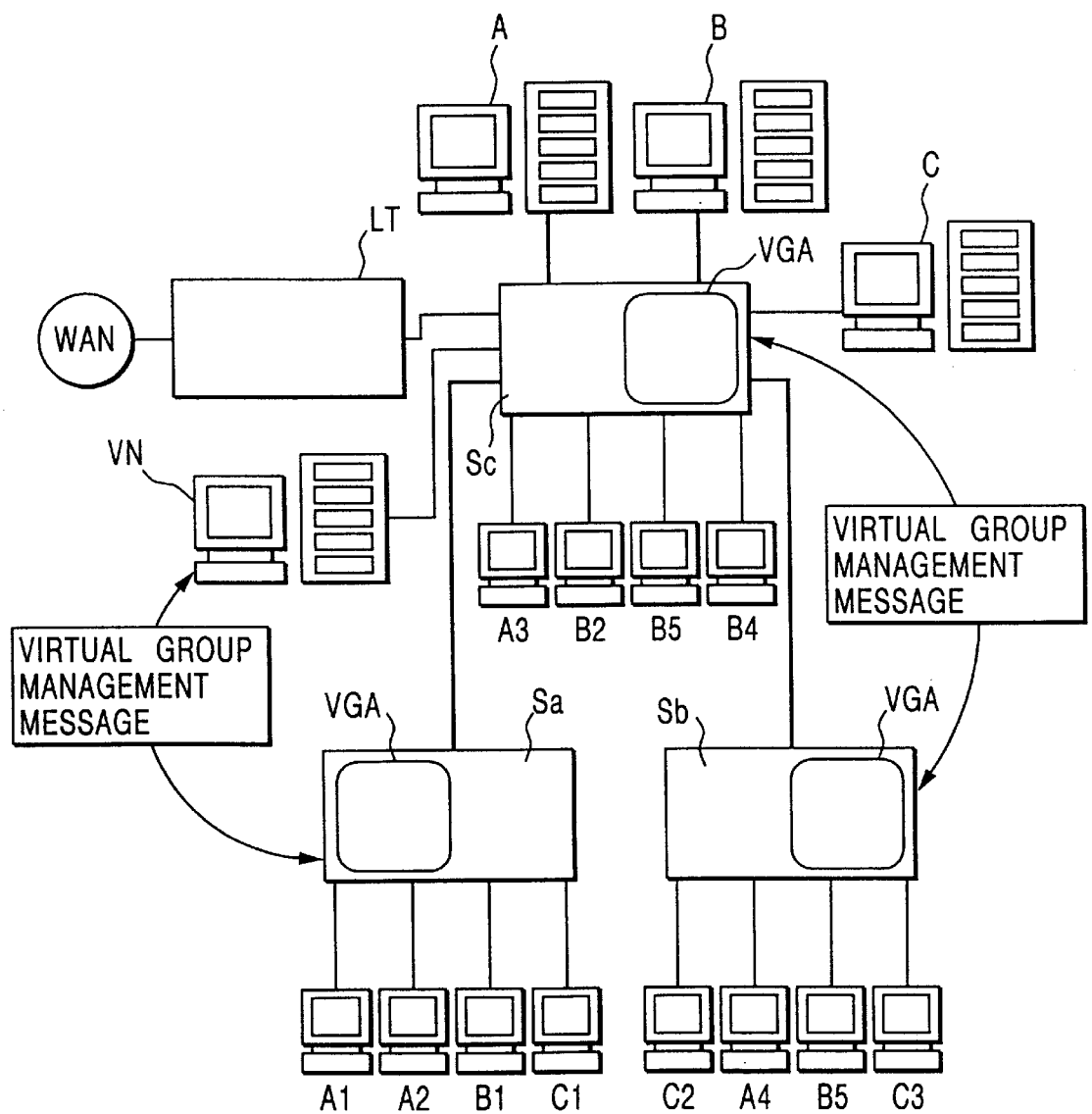
FIG. 7 is a block diagram of virtual group service.

FIG. 7 shows the concept of the virtual group service. Each of distributed LAN switches Sa . . . comprises virtual group agent VGA and the virtual group agents support the virtual group dynamically in cooperation. As a result, virtual group registration tables 2 and virtual group routing tables 8 provide dynamic virtual group configuration for the optimum routing and a terminal move as shared table TB.

The virtual group agent VGA of each of the LAN switches Sa . . . in FIG. 7 comprises virtual group learning section 3, virtual group registration table 2, virtual group routing table 8, virtual group distributed management section 9, and virtual group control section 6 as important components, as shown in FIG. 1. In addition, a port change message extraction function in the virtual group control section 6 also becomes an important component.

The virtual group identification section 1 codes client addresses (1) and (2) together by a hash function and collates the hash function with the virtual group registration table 2 coded by hash functions, so that an increase in the delay time does not introduce a problem as compared with the format of adding a header or tag to a packet.

At the second layer level of OSI protocol layer model with MAC addresses defined as client addresses, in conformity with the conventional standard, an extra header or tag is not added to a packet and VLAN group is supported for terminals in conformity with the conventional standard. In this case, the virtual group identification section 1 of the LAN switch S collates a pair of MAC addresses 1 and 2 of the packet destination and source with the virtual group registration table 2 and identifies a virtual group containing both the MAC addresses.

At the third layer level of OSI protocol layer model with a plurality of network addresses depending on communication protocol defined as client addresses, in conformity with the conventional standard, an extra header or tag is not added to a packet and VLAN group is supported for terminals in conformity with the conventional standard. In this case, the virtual group identification section 1 of the LAN switch S collates a pair of network addresses (1) and (2) of the packet destination and source with the virtual group registration table 2 and identifies a virtual group containing both the network addresses.

At the application level of OSI protocol layer model with application addresses defined by the user or application software as client addresses, in conformity with the conventional standard, an extra header or tag is not added to a packet and virtual custom group setting wherein different medium access methods and communication protocols are mixed is supported. In this case, the virtual group identification section 1 collates a pair of application addresses (1) and (2) of the packet destination and source with the virtual group registration table 2 and identifies a virtual group containing both the application addresses.

Normally, for each client address, the client name is entered in the virtual group registration table 2 of the format shown in FIG. 3. Different client names can also be entered for each VLAN group, each virtual network group, and each virtual custom group. If a VLAN group, virtual network group, and virtual custom group are defined for one MAC, VLAN group definition rows, virtual network group definition rows, and virtual custom group definition rows are contained in the virtual group registration table 2.

The virtual group identification section 1 collates addresses with the virtual group registration table 2 in the order of the virtual custom group definition rows, the virtual network definition rows, and the VLAN group definition rows.

The machine type is also entered in the client name so that the client name is also the identification code of the machine type such as LAN switch, terminal or the like. If the machine type is LAN switch, the virtual group distributed management section 9 enters the MAC address directly connected to a port of the LAN switch or indirect connection in a switch connection map 9a. Thus, connection map information of the entire network is provided by using the virtual group registration table 2 and the switch connection map 9a in combination. Since connection of adjacent ports is seen, topology is drawn on a connection relation chart, which is called a map. If topology is a tree structure, route search is easy to make. If topology is meshes, distances of routes as transmission time need to be compared. If LAN switches having the same transmission speed are connected at multiple stages, the number of stages is assumed to be the distance. For example, how many paths from terminal A1 to terminal A9 exist is reflected in the numeral in the client distance of each terminal in each virtual group routing table 8.

The configuration of the forwarding section 5 depends on the switch configuration method. Most of known systems adopt a shared high-speed parallel bus; the band width of the bus is set to about twice the sum total of port transmission bands and the configuration is often used for a chassis-type back plane. In a parallel configuration with a crosspoint switch, input buffer type, output buffer type, and the like are available. Since the buffer 11 is a shared memory, the entire configuration of the LAN switch in FIG. 1 is buffer sharing type (store and forward switching type), but the above-mentioned switching methods can be used in combination for the forwarding section 5.

Check sum in the frame format in FIG. 2 is not executed, whereby the LAN switch S can be operated as cut-through type. The operation mode of the LAN switch S, namely, the store and forward switching type for executing check sum or the cut-through type for executing no check sum can be defined in the group type in the virtual group registration table 2. The cut-through type enhances the throughput of the LAN switch S, but cannot filter a defective packet. For the forwarding priority, the priority set in the virtual group registration table 2 takes precedence over the operation mode of the switch.

Since the LAN switches S are connected at multiple stages, the packet transmission delay time varies depending on how ports are idle in each LAN switch S and the queuing wait time. Thus, it is necessary to insure the transmission time in cooperation as a system.

As a control packet between the LAN switches S, a virtual group management message is exchanged between the virtual group distributed management sections 9. Normally, network management protocols such as SNMP (RFC1157: Simple network management protocol) for managing each device on a subnetwork based on MIB (management information base) and RMON (RFC1271: Remote monitoring) for managing the entire subnetwork are exchanged between a network management protocol agent 13 and an external network manager for supporting the industry standard such as collection of statistical information. Numeral 14 in FIG. 1 is a switch communication protocol control section.

In a general network, virtual group information is added to packets or packets are classified according to information of subnet addresses, etc., of a third-layer protocol of OSI protocol layer model, and the LAN switch S references the information. It is intricate to change subnet setting, etc., in router segmentation; network management and maintaining costs introduce a problem that cannot be bypassed in a system involving change of close to 30 percent of terminals for a year.

VLAN groups of the invention for registering virtual groups only with MAC addresses are intended for priority processing, learning load distribution, and raising of routing efficiency. In priority processing, for example, priorities are assigned in the order of a management group, a time critical group insuring the delay time, a switch control group for updating registration tables dynamically, high-speed terminals, and low-speed terminals requiring no priority processing from high to low. SNMP or RMON network management is set in the management group.

Normally, the management group and time critical group with high priority are registered statically and the switch control group, high-speed terminals, and low-speed terminals requiring no priority processing are registered after dynamic learning.

To concentrate a plurality of virtual groups VA . . . on client U as shown in FIG. 5(a) or on server S as shown in FIG. 5(b), the client address is defined with a pair of destination and source addresses for identifying a specific one of the virtual groups VA . . . Thus, one client can belong to a plurality of VLAN groups at the second layer level for a plurality of servers A . . . with a single MAC address. To ensure that one client belongs to a plurality of virtual groups VA . . . with a single MAC address, if a server network interface card (NIC) supports only a single MAC address, it is necessary to connect to LAN switch with more than one NIC and assign a MAC address for each virtual group VA . . . or support a plurality of virtual groups in virtual network group or virtual custom group at the third layer level or higher with a single MAC address.

Network service server N shown in FIG. 6 or virtual network service server VN shown in FIG. 7 manages the agents of the LAN switches S1 . . . (Sa . . . ) and communication with other networks of different systems outside the virtual group. The virtual group agents VGA of the LAN switches S1 . . . (Sa . . . ) exchange a virtual group management message with each other for managing the terminals A1 . . . , B1 . . . , and C1 . . . in cooperation.

Figure 8:
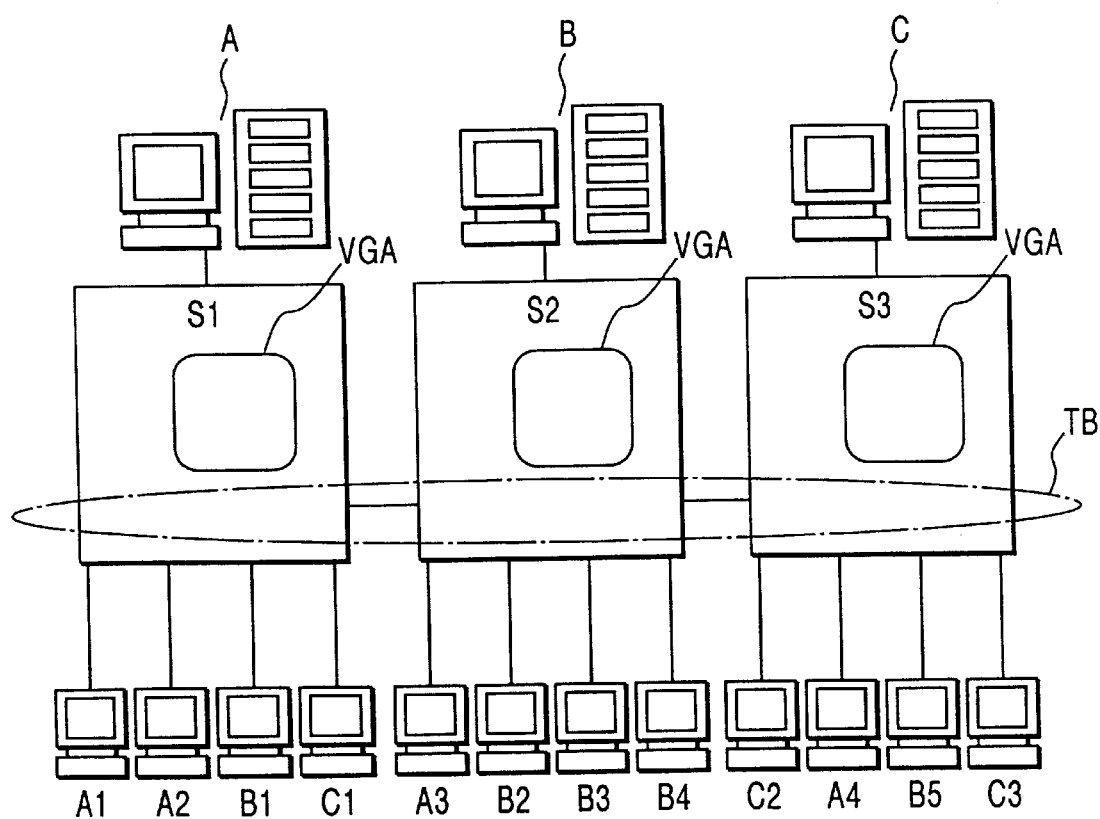
FIG. 8 is a block diagram of a closed system.

A virtual group management message is also exchanged between the network service server N or virtual network service server VN and the virtual group agents VGA of the LAN switches S1 . . . (Sa . . . ) for constructing shared table TB as shown in FIG. 8 for forming a cooperation virtual group and supporting communication of the virtual group with an external system. The shared table TB contains the virtual group registration tables 2 and the virtual group routing tables 8 in FIG. 1.

In the configuration example shown in FIG. 6, the network service server N can also manage the virtual group registration tables 2 and the virtual group routing tables 8, in which case the network service server N collates a lookup table cached in the LAN switch S with a client address.

In the configuration shown in FIG. 6, broadcast from server A . . . can also be transmitted to the entire virtual group in server-to-server connection. For example, a virtual service corresponding to the virtual group VA can be received at only the terminals belonging to the virtual group VA. Broadcast delivered to clients is limited to the virtual group VA . . . and the network service server N follows unknown group broadcast from clients in cooperation with the virtual group server A . . . For the unknown group broadcast, the virtual group server A . . . sees the protocol type of packet and delivers the broadcast to a specific network service server N or virtual group server A . . . The network service server N sets a new virtual group. M in FIG. 6 denotes a network management server and SA . . . denotes a switched domain.

For example, for multicast for each virtual group A . . . with virtual group server A . . . assigned for each virtual group VA . . . , according to multicast setting previously registered in the virtual group agent VGA of the LAN switch S1 . . . by each server A . . . for a multicast request issued to the server A . . . from each client and multicast processing performed by the server A . . . for each client, the LAN switch S1 . . . stores a multicast message packet pointer in the virtual group queuing table for multicast and executes multicast processing, whereby the LAN switch S1 . . . supports the multicast of virtual group VA . . . in cooperation with server A . . . in each virtual group VA . . . In this case, the LAN switch S1 . . . may have a server function.

For broadcast with virtual group server A . . . assigned for each virtual group VA . . . , according to broadcast setting previously registered in the virtual group agent VGA of the LAN switch S1 . . . by each server A . . . so that if the server A . . . can deal with a broadcast request issued from each client by a communication protocol handled by the server A . . . , it responds to the broadcast request or that if the server A . . . cannot deal with the broadcast request, it forwards the request to router LT, the LAN switch S1 . . . stores a multicast message packet pointer in the broadcast queuing table and forwards broadcast to the router LT, whereby the LAN switch S1 . . . supports the broadcast of virtual group VA . . . in cooperation with server A . . . in each virtual group VA . . . The LAN switch operating as a VLAN group at the second layer level routes broadcast for virtual group VA . . . , but depends on external router LT for communication with other than the virtual group VA . . .

In the above described embodiment, the virtual group is formed based on characteristics of a packet without adding an extra header or tag to the packet and independently of LAN switch port. However, it is also possible to include the port or tag as the client address of the virtual group based of the characteristics of a packet.

As known well, the general tag is inserted into the header of the packet as shown in the header of IEEE802.10 in FIG., 2. In IEEE802.1Q draft (D5) (see FIG. 17), the section in which identification of the virtual group and user priority information are described is called "Tag Header". Tag indicates VLAN segment as the group name to be a subject of the priority processing, not the destination address. Further, tag switch of Cisco Systems, Inc. includes the identification code for high-speed table lookup in the flow label area of IPv6 of layer 3 which flow the packet with cut-through, or in the VCI area of ATM of layer 2. Tag shows a flowing path with cut-through and a standardization of IETF is proposed.

That is, tag of IEEE802.1Q corresponds to VLAN-ID tag, and tag of Cisco Systems, Inc. means tag information on the lookup table inside of the tag switch for cut-through. As a result, these tags correspond to the logical address of the layer 3 and physical address of the layer 2. So "port and tag" means "port address and tag in coordination with standard".

Not only the numeral representing distributed order such as memory address or group name, but also the name defined by user can be adapted to the address or group name. The user-defined address in the virtual group registration table and the virtual group routing table in FIG. 3 is an address which is set at the application level, and corresponds to MAC address, home switch and home switch port on the above tables.

On the other hand, VLAN-ID or identification information to be cut-through is located in the header of the switching tag in layer 2 and layer 3. If these informations are called "tag name", the tag name corresponds to the virtual group name. Accordingly, tag header includes priority information, and the actual switch includes the lookup table which make the tag name as same in the virtual group registration table and the virtual group routing table correspond to MAC address, home switch and home switch port. The swith can also cope with the tag in coordination with standard.

On the other hand, the port as the client address member can be denoted by the sign for identifying the port such as P1 to P8 in FIG. 10. They are often called merely "port" or "port number". The port is managed on a segment management table inside the switch by the only port number as shown in FIG. 10. It seems that the combination of sign for identifying the switch (home switch), and port number (home switch port) corresponds to the port address in view of the other switch or management machine.

As described above, the first embodiment relates to a basic function of the virtual LAN.

2nd Embodiment

Figure 9:
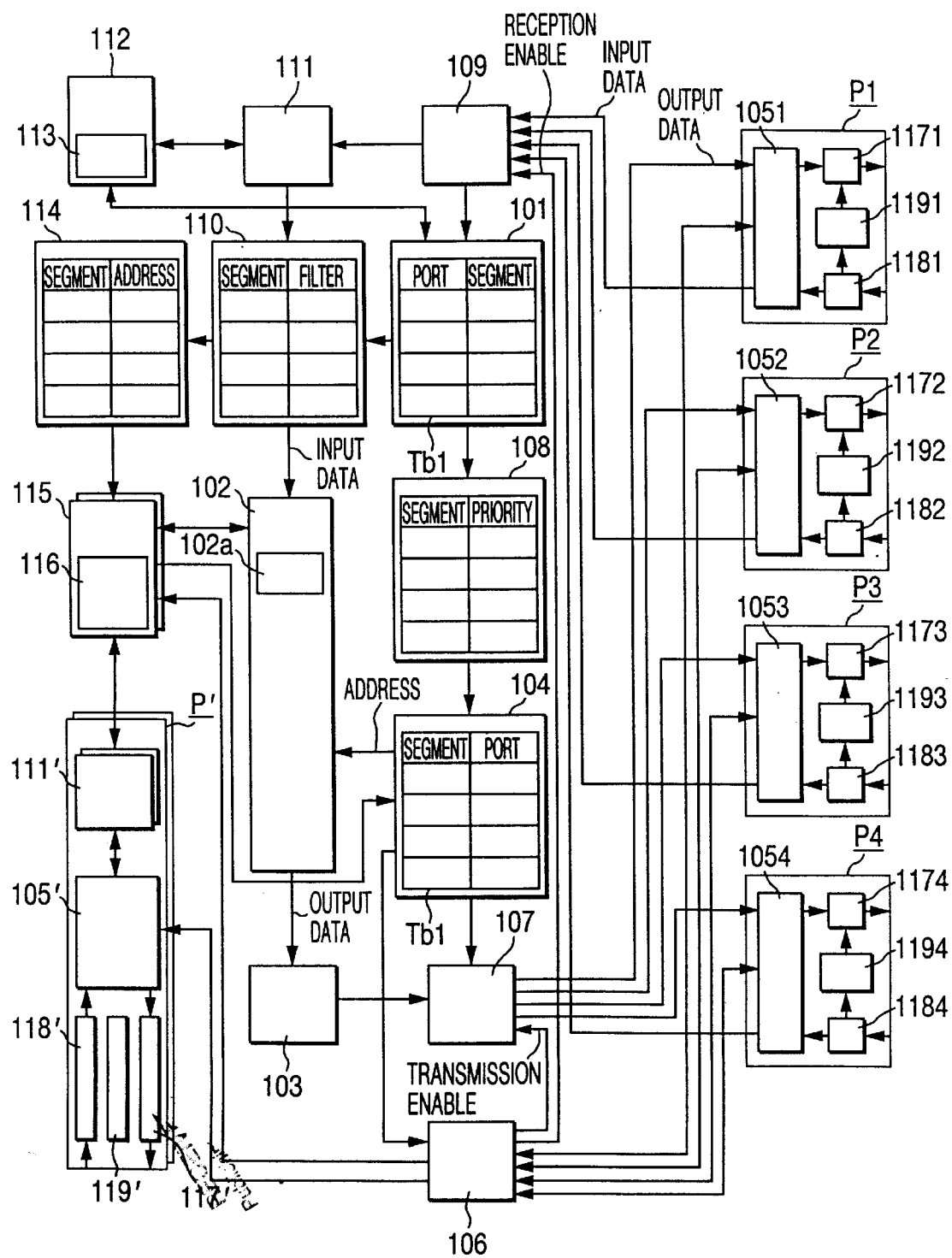
FIG. 9 is a block diagram to show a switching hubof the invention.

FIG. 9 is a block diagram of a switching hub in a second embodiment, which can be adopted to the virtual LAN system according to the present invention. Various devices, such as computers and LAN connection machines, are connected to four ports P1–P4 for forming a LAN. The access method to the LAN is CSMA/CD and the transmission line specification is 10BASE-T, 100BASE-TX, or the like.

A reception signal received at a reception section 1181–1184 of each port P1–P4 passes through a data input control section 109 and a clock component is removed by a transmission line decoding section 111 for extracting a data component. This extracted data component is sent to a filter control section 110 as input data of a reception packet. The filter control section 110 controls broadcast or multicast filtering and if the destination address of the input data is broadcast or multicast, determines whether or not the input data is to be transferred to another microsegment. The input data filtered by the filter control section 110 is temporarily stored in a buffer 102. The address of the storage location of the data in the buffer 102 is specified by a buffer control section 102a. The data in the buffer 102 is transmission line coded by a transmission line coding section 103 and is sent to a data output control section 107 from which the resultant data is transferred to the port P1 . . . specified by a switch control section 104.

On the other hand, a segment management section 101 has a segment management table. Tb1 as shown in FIG. 10 for indicating and managing which microsegments S1–S14 each port P1–P4 belongs to (which microsegments S1–14 each port is a member of). That is, in the switching hub, a packet is transmitted and received in microsegment S1 . . . units and common microsegments S1 . . . are set in any desired combination in port P1 . . . units and are shared among switching hubs without referencing the network addresses of the devices connected to the ports P1 . . . (MAC addresses, IP addresses, etc., assigned to a network interface for accessing the network). The ports P1 . . . are members of the microsegments S1 . . . and the segment management section 101 indicates and manages which microsegments S1 . . . each port P1 . . . belongs to, whereby the switching hubs share the microsegments S1 . . . and the switching control section 104 of each switching hub broadcasts a packet to the ports P1 . . . belonging to each microsegment S1 . . . without specifying the port P1 . . . as the destination address of the packet.

Therefore, the switching hub itself is a member of the microsegments S1 . . . , but specification of which switching hub the port P1 . . . belongs to is not made as the switching hub at the port P1–P4 level and which switching hub . . . exists at which port P1 . . . is not significant either. That is, it is necessary to indicate which microsegments S1 . . . exist for each switching hub and which ports P1 . . . are set as members of each microsegment S1 . . .

As a logical upper-level process of the switching hubs, microsegments S1 . . . are managed by the segment management section 101 as common segments among the switching hubs and are formed by the switch control section 104. Wiring topology with the microsegments S1 . . . set in any desired combination for each of distributed switching hubs is formed as a physical layout. The function of the upper-level process is executed by the segment management sections 101 and the switch control sections 104 of the switching hubs in cooperation. Packets are transmitted and received between the ports P1 . . . of the switching hubs registered as members of the microsegments S1 . . . as if they were virtual repeaters sharing media.

To share the microsegments S1 . . . among the switching hubs, the segment management sections 101 of the switching hubs need to exchange attribute information of common microsegments S1 . . . with each other according to a segment management protocol of a kind of an upper-level process. In communication between the switching hubs, segment ID information together with each packet must be exchanged in some form.

In the switching hub, setting the correspondence between the microsegments S1 . . . and the ports P1 . . . is not fixed and can be changed; different microsegments S1 . . . can be assigned to each port P1 . . . for each switching hub. To change such assignment of the microsegments S1, the switch control section 104 delivers packet data in response to the segment management table Tb1. That is, in one microsegment S1 . . . , a packet is broadcasted to the ports P1 . . . of members as if each switching hub were a virtual repeater. When the packet is transmitted, if a transmission enable signal indicating that the port P1 . . . of the output destination is ready to transmit is input to the data output control section 107 from a collision signal control section 106, the packet is sent from the data output control section 107 to the port P1 . . . of the output destination, as described later.

As shown in the segment management table Tb1 in FIG. 110, one port P1 . . . can be set multiply as members of a plurality of microsegments S1 . . . The switch control section 104 references the segment management table Tb1 and broadcasts input data to all microsegments S1 . . . to which the port P1 . . . to which the input data is input belongs. For example, input data to the port P1 set as members of two microsegments S3 and S8 is transferred to all other ports belonging to the microsegments S3 and S8, P2 (member of microsegment S3) and P3 (member of microsegment S8). Such operation of the switch control section 104 is realized by a general microprocessor; it can also be accomplished by sequence control by a reprogrammable logic controller with a truth value table referencing the segment management table stored in a rewritable memory.

Further, priority can be set in the segment management table Tb1 as an attribute of each microsegment S1–S14, and a priority processing control section 108 is provided for controlling the operation of the switch control section 104 along a priority processing schedule in response to the priority. For example, a program for delivering packets in the order of the ports P1 . . . processes a plurality of packets output from the same port P1 . . . according to the priority assigned to the packets from high to low. A program for delivering packets in the order of the microsegments S1 . . . processes the microsegments S1 . . . according to the priority assigned to the microsegments S1 . . . from high to low. However, as the wait time is prolonged, data of a microsegment S1 . . . even with low priority is handicapped and is assigned pseudo high priority for processing.

The segment management section 1 assigns priority to each microsegment S1 . . . and the priority processing control section 108 controls the switch control section 104 for performing priority processing common to the switching hubs among the microsegments S1 . . . , as described above. In addition, optional added service can be set in response to the priority. The priority processing control section 108 has a priority processing lookup table consisting columns of microsegment numbers S1 . . . , port numbers P1 . . . , priority, and added service. In routing added service of an added service processing task, according to an added service lookup table of addresses, switching hubs, and ports P1 . . . , for example, port P1 . . . which has a large traffic amount or needs to shorten the delay time is registered as a member of microsegment S2 . . . with high priority, and only packets of the microsegment S2 . . . with high priority are routed based on the network addresses rather than broadcasted to microsegments S3 . . .

That is, since the microsegment S10 is set to added service of routing in the segment management table Tb1 shown in FIG. 10, a routing table is referenced only for the microsegment S10, and direct communication with the ports P1 connected to devices of specific terminals, etc., is executed preferentially. As a result, multicasting to ports P1 . . . not related is not executed. In this case, a virtual address learning section, address learning table (routing table), and forwarding section common to the switching hubs are required. However, since the addresses are referenced only for the microsegment S10 with high priority, the objects are limited to the switching hubs and ports P1 . . . belonging to the microsegment S10, the calculation amounts required for address learning, collation, and routing lessen, the switching hub costs can be reduced, and performance can be enhanced. Only the microsegments with high priority can be connected to VLAN and other microsegments can also be set as local segments.

By the way, if a signal indicating that the port P1 . . . of the output destination is ready to transmit is input to the data output control section 107 from the collision signal control section 106, packet data is sent from the data output control section 107 to the port P1 . . . specified by the switch control section 104. Port transmission/reception enable/disable control for thus controlling whether or not transmission/ reception is enabled for each port P1–P4 is performed by collision detection control sections 1051–1054 of the ports P1–P4, the collision signal control section 106, the data input control section 109, and the data output control section 107 for avoiding a data collision or congestions in the microsegments S1 . . . ; effective use of the bands can be made.

The collision detection control sections 1051–1054 output a carrier signal or a jam signal when reception is disabled, and output a silent when reception is enabled. If the collision detection control section 1051–1054 does not output a carrier signal or a jam signal, the collision signal control section 106 enables data to be output from the data output control section 107 to the port P1 . . . containing the collision detection control section 1051–1054. Therefore, when a carrier signal is detected from a reception signal in the collision detection control section 1051 . . . of each port P1 . . . , the corresponding port P1 . . . does not transmit a packet. When the collision detection control section 105 detects a collision with another carrier signal during the transmission, it transmits a jam signal. The ports P1–P4 are provided with retiming clock extraction sections 1191–1194, respectively, for extracting a clock from a reception signal, conforming to the standard required for interconnection, such as retiming of a clock at the transmission time.

When CSMA/CD is adopted as the access method as in the embodiment, using a medium access control function, the collision signal control section 106 sends a transmission enable signal to the data output control section 107 and a reception enable signal to the data input control section 109 and at the same time, port state signals from the collision detection control sections 1051–1054 of the ports P1–P4 are input/output and the input/output timing of signals from the ports P1–P4 is adjusted, thereby providing the port transmission/reception enable/disable control. For example, to make data input from other ports P2–P4 wait during data input from the port P1, data input from the ports P2–P4 other than the port P1 is disabled and a carrier signal is sent from the ports P2–P4 for preventing data (packet) from being output from the devices connected to the ports P2–P4. To make data output to the port P1 from other microsegments wait during data output from the port P1, a transmission enable signal is not sent to the data output control section 107 for stopping transmission. The control logics are executed by performing multicast control for each microsegment based on a truth value table of combinations with the state of the sections such as the presence/absence of a collision of each port P1–P4, presence/absence of transmission state, and presence/absence of reception state.

By the way, in the embodiment, a network management agent 112 is provided with a segment control API (application programming interface) section 113 so that microsegments can be set and changed dynamically from application software, etc., in microsegment units common to the switching hubs. That is, the ports P1 . . . can be assigned to the microsegments with high priority in response to user's demand by using external network management software or application software under the network operating system of the server, etc., through the segment control AP1 section 113. Alternatively, a server can be dynamically added only to the microsegments with high priority as added service. Further, routing-between the microsegments of port segment switch of the invention can be executed as external router application through the segment control API section 113.

The switching hub of the embodiment comprises an expansion port (high-speed port) P' serving as a big pipe for sever connection and backbone connection, as shown in FIG. 1. 111', 105', 117', 118', 119' respectively denote transmission line coding section, collision detection control section, transmission section, reception section and retiming clock extraction section of the expansion port P'. A speed change control section 115 is provided for synchronizing the transmission speed between the high-speed expansion port P' and other ports P1–P4 (low-speed ports). The speed change control section 115 temporarily stores data in the buffer 102 in conversation with the buffer control section 102a, lessens the transmission wait time of the low-speed ports P1–P4, and controls the timing so as to avoid a reception overflow.

For input/output. packets to/from the high-speed expansion port P', only the packets belonging to the microsegments set in the switching hub are transferred through the expansion port P' and the network addresses are learned and entered in an address table of an address management section 114 together with microsegment information. On the other hand, for input packets to the low-speed ports P1–P4 from the high-speed expansion port P', the microsegments are identified from the network addresses based on the address table of the address management section 114 and a reception packet segment sort section 116 of the speed change control section 115 sorts the packets by microsegment belonging to the destination address of each packet. In this case, the microsegment information is closed in the switching hub and is not propagated to the outside from the expansion port P', but an extra header, etc., not conforming to the standard is not added to the packets input/output to/from the expansion port P', thus interconnection to a standard high-speed LAN machine can be made. As shown in FIG. 10, expansion port access in the switching hub is set in the segment management table Tb1 as a segment attribute. The reception packets of the microsegments assigned the expansion port access attribute (for example, microsegments S2, S3, . . . ) are sorted by the reception packet segment sort section 116 and other microsegments not assigned the expansion port access attribute become local microsegments in the switching hub.

3rd Embodiment

Figure 11:
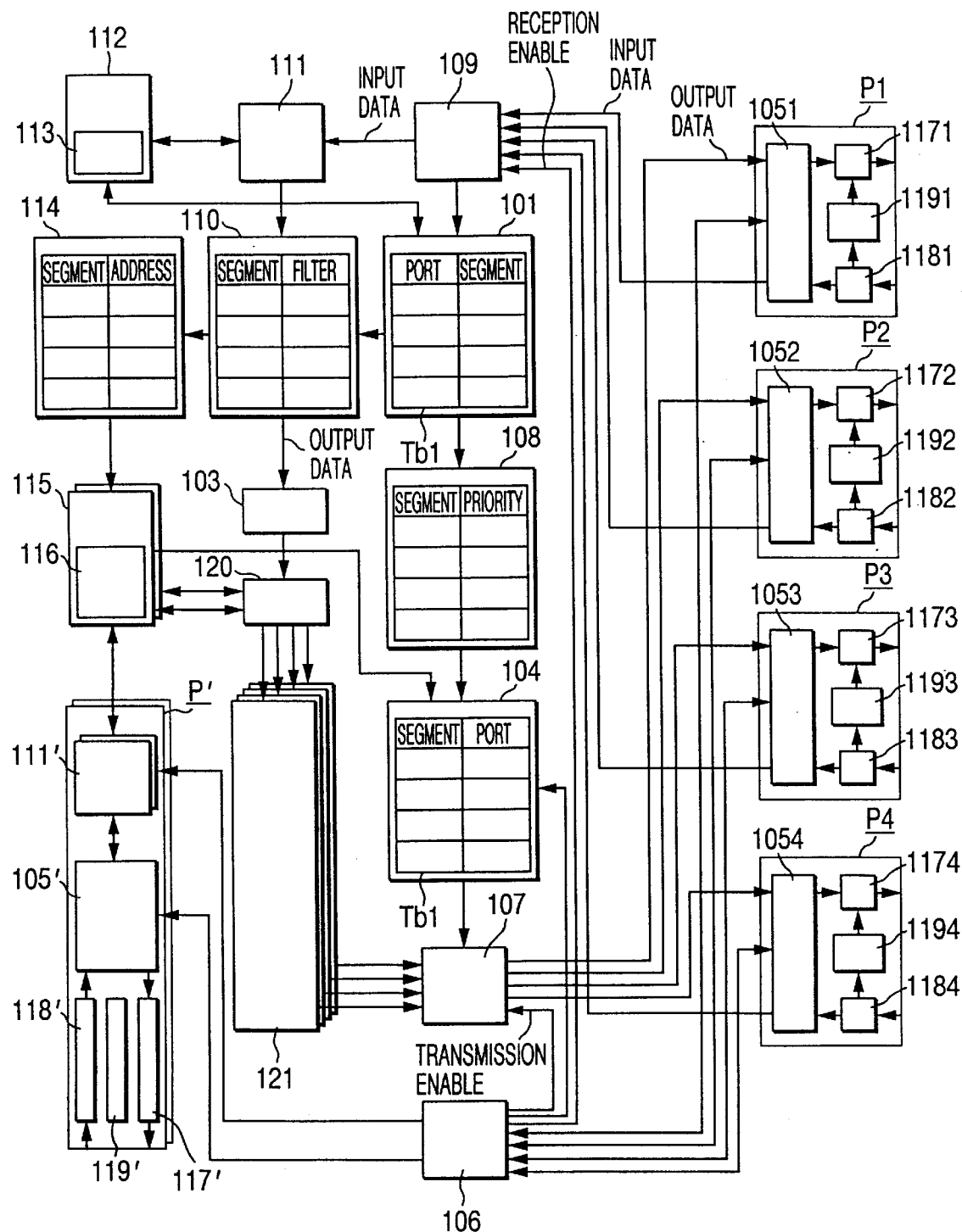
FIG. 11 is a block diagram to show a switching hub of the invention.

FIG. 11 is a block diagram to show a switching hub in a third embodiment of the invention, which can be adopted to the virtual LAN system according to the present invention. Parts identical with or similar to those previously described with reference to FIG. 9 are denoted by the same reference numerals in FIG. 11 and will not be discussed again.

The switching hub in the third embodiment is characterized by the fact that a filter control section 110 is followed via a transmission line coding section 103 by a bus-to-bus bridge control section 120, followed by a plurality of segment share buses 121 and that input packets are stored in a buffer and then microprocessor software, a programmable logic controller, and the like perform combination logic and sequence control based on a truth value table, thereby performing communication processing in microsegment units.

That is, since broadcast in a microsegment sends the same data to ports P1 . . . , output of the same microsegment can be sent from the ports P1 . . . at the same time by hardware through the segment share bus 121. A switch control section 104 controls a collision signal control section 106, a data output control section 107, and a data input control section 109 for controlling data input from the ports P1 . . . , whereby data can be broadcasted.

Since the number of terminals in a microsegment and very little occurrence of a traffic collision are the normal network design standard, installation of standard repeater chips in combination is also practical. Nowadays, it is becoming possible to design a complex function provided by combining a repeater module with a library of ASICs (application specific integrated circuits), and the segment share buses 121 can also be formed in an IC. The bus-to-bus bridge control section 120 has a function of delivering a packet to the segment share buses 121 and an expansion ports P' . . . at the same time for broadcasting or multicasting between the microsegments.

4th Embodiment

Figure 12:
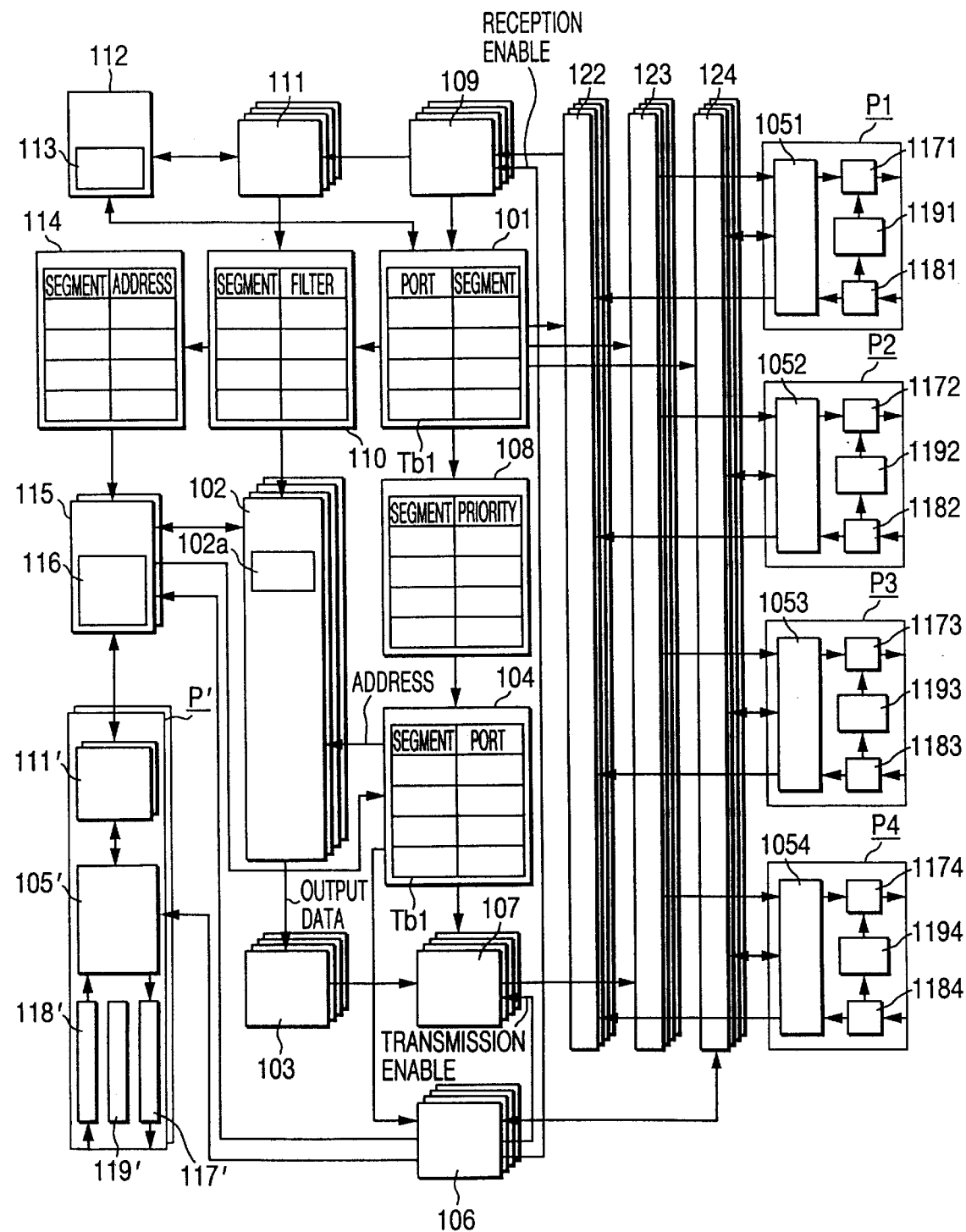
FIG. 12 is a block diagram to show a switching hub of the invention.

FIG. 12 is a block diagram to show a switching hub in a fourth embodiment of the invention. Parts identical with or similar to those previously described with reference to FIG. 9 are denoted by the same reference numerals in FIG. 12 and will not be discussed again.

The switching hub in the fourth embodiment is characterized by the fact that more than one process through which data passes is provided so that processing for each microsegment is performed in parallel. Specifically, ports P1–P4 are preceded by a plurality of input segment selection sections 122, a plurality of output segment selection sections 123, and a plurality of collision signal segment selection sections 124. These input segment selection sections 122, output segment selection sections 123, and collision signal segment selection sections 124 are a bus configuration and signals of ports that the sections 122–124 have are selectively connected by a selector device, etc.

In the fourth embodiment, simultaneous data input/output through the ports P1 . . . belonging to different microsegments is enabled by combining a store and forward switching function in a buffer 102, the input segment selection sections 122, and the output segment selection sections 123.

5th Embodiment

Figure 13:
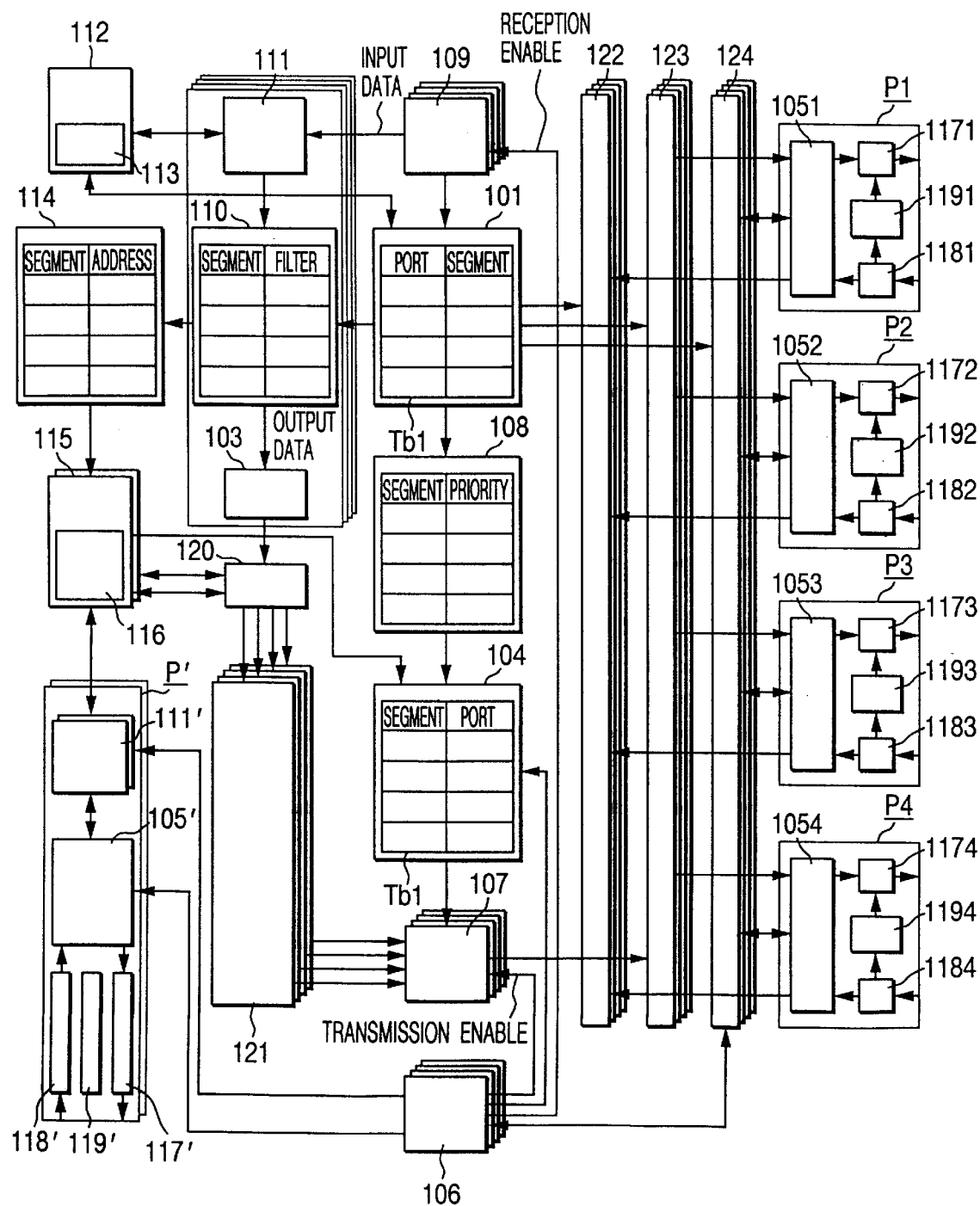
FIG. 13 is a block diagram to show a switching hub of the invention.

FIG. 13 is a block diagram to show a switching hub in a fifth embodiment of the invention. The switching hub in the fifth embodiment is provided by mixing the switching hub configuration in the fourth embodiment with the switching hub configuration in the third embodiment.

That is, the switching hub in the fifth embodiment is provided with more than one process through which data passes in the switching hub configuration in the third embodiment so that processing for each microsegment is performed in parallel. Thus, in addition to simultaneous transmission of broadcasting on segment share buses 121 as in the fourth embodiment, simultaneous data input/output through ports P1 . . . belonging to different microsegments is enabled by combining input segment selection sections 122 and output segment selection sections 123.

6th Embodiment

In the second to fifth embodiments we have discussed, external application programs, etc., are used to set and change the microsegments S1 . . . In a sixth embodiment of the invention, each switching hub is provided with a segment pattern control section 125 in which a plurality of segment patterns (where which microsegments S1 . . . ports P1–P4 are members of are indicated) SP1 . . . are previously registered, and segment patterns SP1 . . . of microsegments can be selected for each switching hub by time period or in hub units.

Figure 14:
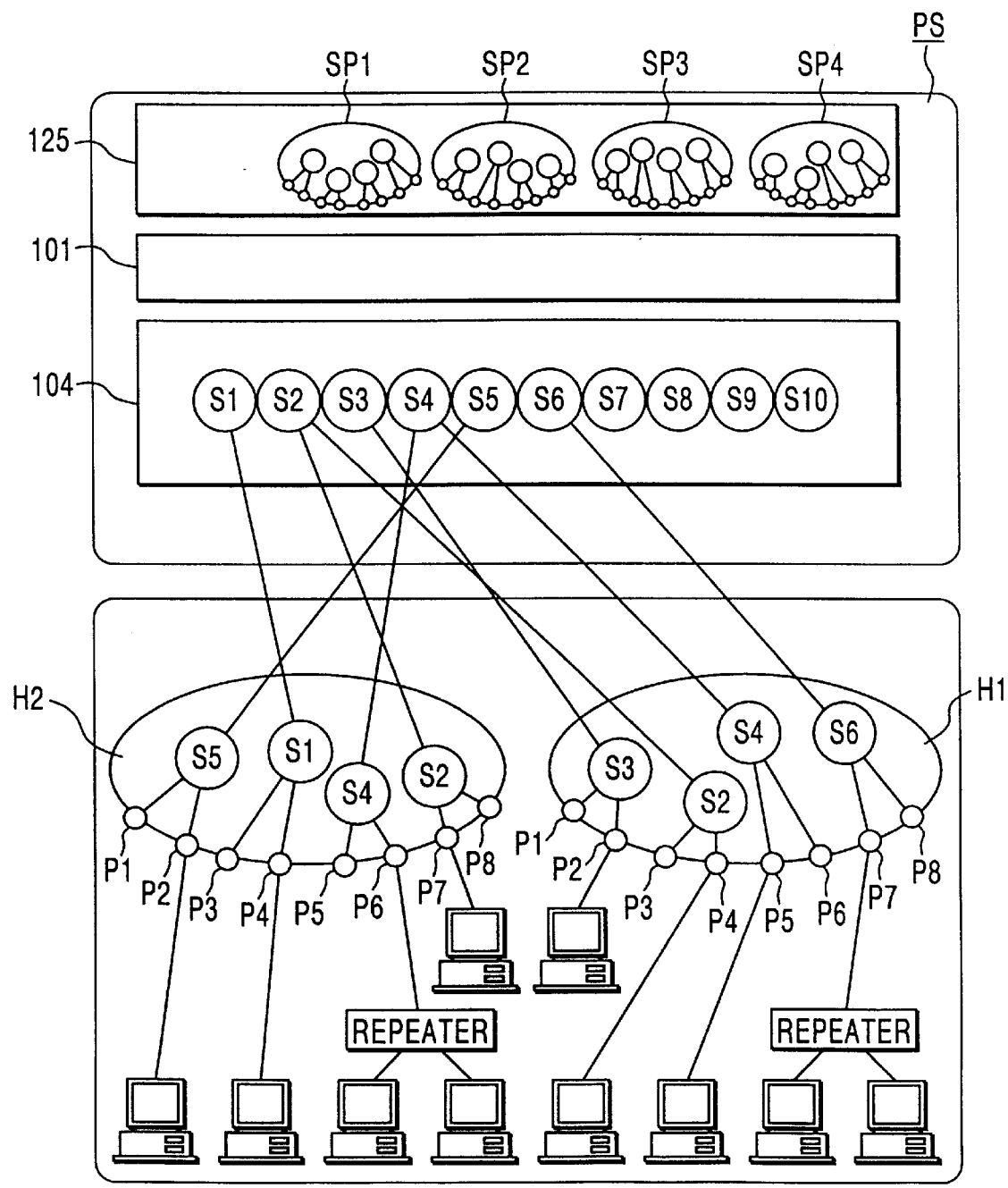
FIG. 14 shows a schematic diagram of a system configuration.

FIG. 14 is a schematic diagram to conceptually represent a system configuration in the sixth embodiment. An upper-level process PS superior to switching hubs H1 . . . is shared actually by the switching hubs H1 . . .

If each switching hub is provided with the segment pattern control section 125 in which a plurality of segment patterns SP1 . . . are previously registered, and segment patterns SP1 . . . of microsegments can be selected for each switching hub by time period or in switching hub units, combination patterns of segments (segment patterns) for a conference room, an office, a design department, etc., fitted to a layout of an installation site are provided and can be selected and set matching the application in switching hub units, and construction and management can be executed promptly and reliably.

7th Embodiment

FIG. 15 shows a system configuration in a seventh embodiment of the invention wherein a master switching hub MH and a slave switching hub SH are interconnected by a high-speed expansion port P'. This expansion port P' is set as a link path and packets of microsegments registered as segment attribute common to the master switching hub MH and the slave switching hub SH are multiplexed for transmission. However, the basic configuration of the master switching hub MH is similar to that of the switching hub of the fourth embodiment and the basic configuration of the slave switching hub SH is similar to that of the switching hub of the second embodiment. Therefore, parts identical with or similar to those previously described with reference to FIGS. 9 and 12 are denoted by the same reference numerals in FIG. 15 and will not be discussed again.

In the master switching hub MH and the slave switching hub SH of the seventh embodiment, the correspondence between links of packets passing through link paths and microsegments is entered in link tables of link path management sections 26, and link path control sections 27 multiplex/demultiplex and sort microsegments based on the link path tables. The link indicates a microsegment path provided by various multiplexing methods and the microsegments are common to the switching hubs MH and SH, the packets passing through the link path are expanded and microsegment information is added, whereby a plurality of microsegments as link path members can be multiplexed for transmission between the switching hubs MH and SH. Therefore, common microsegments are set in port P1 . . . units between the switching hubs MH and SH, whereby the switching hubs MH and SH can be interconnected by packet multiplexing.

Link information, which is sent via a link path, is propagated from an expansion port. When broad-band frequency modulation is executed as a multiplexing method, each carrier frequency band becomes a link ID, corresponding to a microsegment ID. When time-division multiplexing is executed, each time slot becomes a link ID, corresponding to a microsegment ID.

On the other hand, to relate physically different links to microsegments as in frequency multiplexing, the correspondence between the links and microsegments is entered in the link tables and the link path control sections 127 can also multiplex/demultiplex and sort the microsegments. If a plurality of link path expansion ports P' exist, a table by link path indicating the corresponding expansion port P' . . . is managed as a link of the link tables of the link path management sections 126.

By the way, the switching hubs MH and SH may be interconnected by placing another switching hub therebetween as a repeater. Also in this case, the expansion port is set as a link path; particularly, to interconnect the switching hubs MH and SH via different LAN machines as repeaters, the link ID for each of link paths set as tags of type that can be used with the different LAN machines and the segment ID common to the switching hubs MH and SH are entered in the link tables of the link path management sections 126, whereby the segment ID is added to a packet passing through the expansion port P', microsegments as link path members are multiplexed among the switching hubs MH and SH for transmission, and common microsegment in port P1 . . . units can be set.

Figure 17:
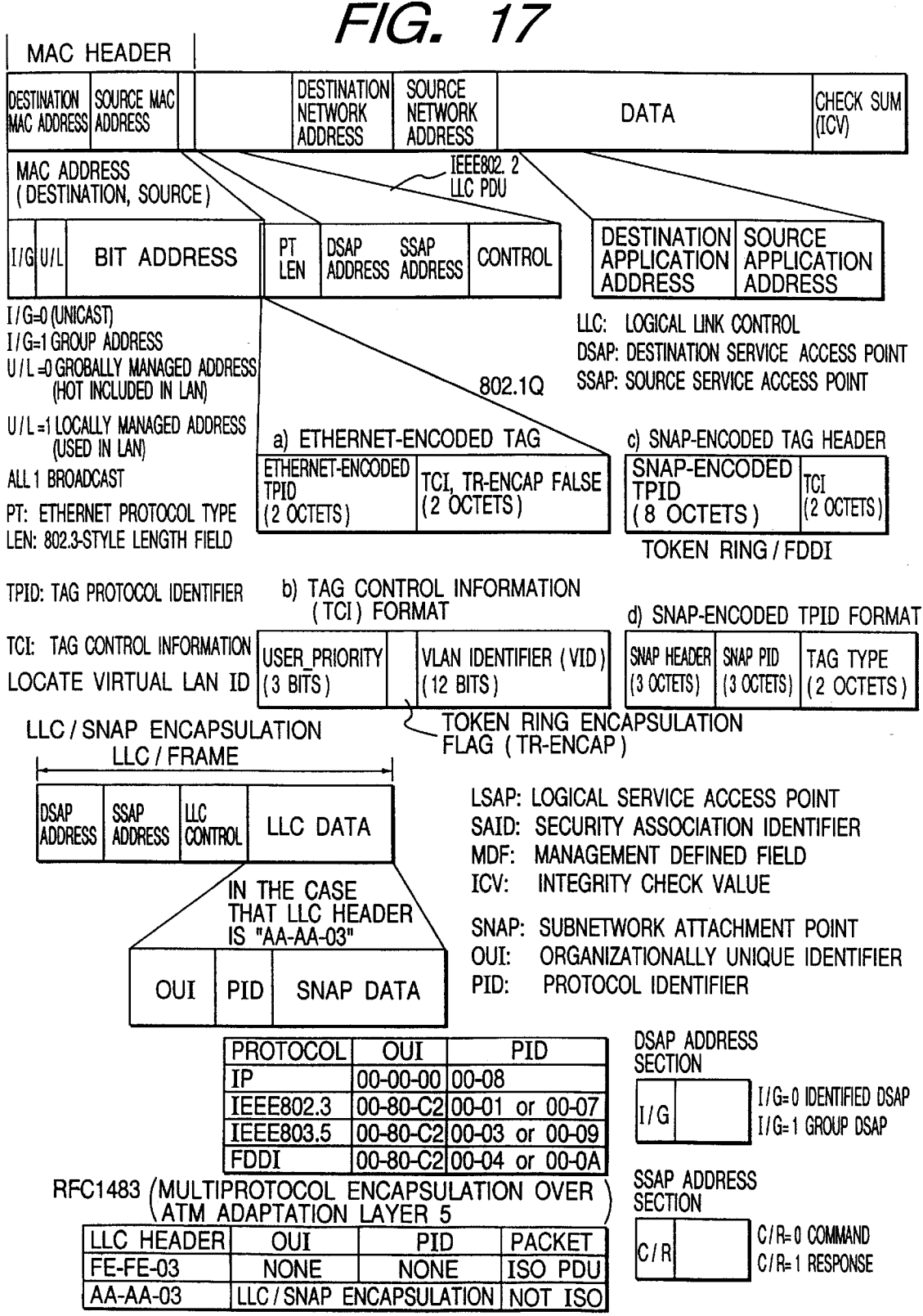
FIG. 17 is an illustration to show a general LAN MAC frame format.

As the tag, a VLAN tag using an IEEE 802.1Q header, for example, as shown in FIG. 17 can be used. Such a tag is used as the link ID for each link path and the segment ID common to the switching hubs MH and SH and the-corresponding link ID are entered in the link tables of the link path management sections 126. The link ID is added to a packet passing through the expansion port P' and microsegments as link path members are multiplexed among the switching hubs MH and SH for transmission, whereby a common microsegment in port P1 . . . units can be relayed by different LAN machines among the switching hubs MH and SH for expanding the segment range. If the switching hubs MH and SH are interconnected by placing a single switching hub therebetween as a repeater, the link and segment IDs can also be made the same for omitting the link table.

The slave switching hub SH is provided with a link port LP for enabling other slave switching hubs to be daisy-chained by a link path. If the link port LP is thus provided for enabling a large number of slave switching hubs SH to be daisy-chained, the number of ports of the microsegment common to the switching hubs MH, SH . . . can be increased.

By the way, the master switching hub MH is connected to a VLAN backbone by the expansion port p' and is connected through the VLAN backbone to other LAN machines having a virtual LAN function, such as a VLAN switch. The LAN machines connected to the VLAN backbone support a VLAN management function and a VLAN-to-VLAN routing function, and every microsegment-to-microsegment routing is supported via the VLAN backbone. The master switching hub MH also comprises an expansion port P" for VLAN server connection. If a VLAN managing and supporting server is connected to the expansion port P", the master switching hub MH can also support the VLAN function.

Further, the master switching hub MH comprises a VLAN management section 128 having a VLAN management table and a VLAN control section 129, and VLAN-IDs common to the LAN machines of VLAN switches, etc., are set in the VLAN management table of the VLAN management section 128 together with the segment ID.

The VLAN control section 129 multiplexes a single microsegment or microsegments as VLAN members by broad band, time division, or any other method such as sending VLAN-ID on a control line separate from packet data for transmission among the switching hubs. The VLAN control section 129 demultiplexes received VLAN multiplexed data and references the VLAN management table for sorting the data to microsegments, whereby a common microsegment in port P1 . . . units can be set among the switching hubs MH and SH via a VLAN switch and VLAN member devices connected to the VLAN switch and devices of microsegments formed by the master switching hub MH and the slave switching hub SH can be set as one microsegment in port P1 . . . units for communicating with each other. When broad-band frequency modulation is executed as a multiplexing method, each carrier frequency band is VLAN-ID, corresponding to a microsegment ID. When time-division multiplexing is executed, each time slot is VLAN-ID, corresponding to a microsegment ID. For VLAN connection setting change, the network management agent 112 of the master switching hub MH transfers a VLAN setting signal in conversation with a network manager (not shown), whereby the correspondence between the microsegment and VLAN group can be changed by the VLAN management section 128.

By the way, the slave switching hub SH comprises a segment pattern control section 125 enabling previous setting/selection of a segment pattern. The segment pattern control section 125 is connected to the segment management section 101. A segment management table and a pattern name responsive to each pattern are entered in a segment pattern table of the segment pattern control section 125 and the segment management table of a specified segment pattern is copied into the segment management section 101, whereby the correspondence indicating which segment each port belongs to is set in the segment management section 101.

Figure 16:
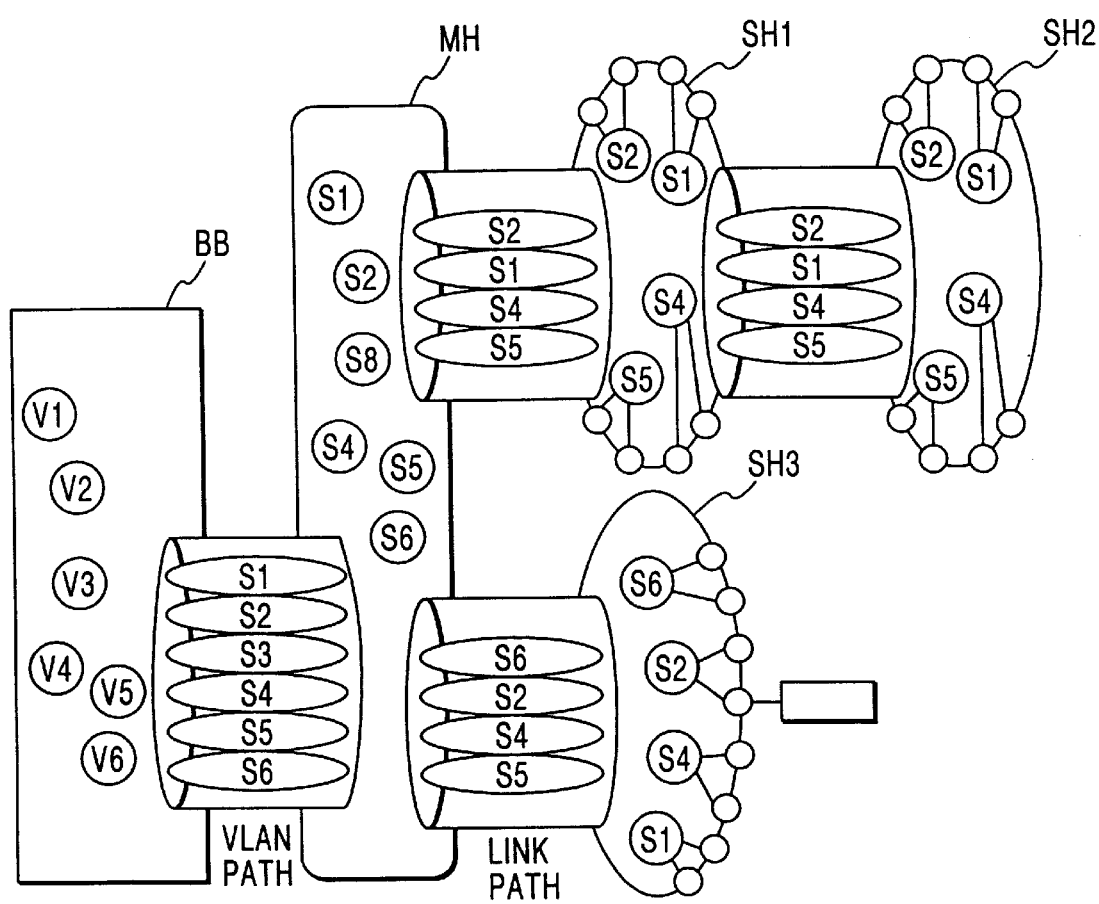
FIG. 16 is a schematic diagram of the system configuration.

FIG. 16 is a schematic diagram of the system configuration of the seventh embodiment. FIG. 17 shows a general LAN MAC frame format. The master switching hub MH is connected to backbone BB by a VLAN path and the master switching hub MH and slave switching hubs SH1–SH3 are connected by link paths. Ports P1 . . . of the slave switching hubs SH1–SH3 and VLANV1-VLANV6 of the backbone BB can become members of a common microsegment through the master switching hub MH.

If the VLAN switch becomes a parent switch, the VLAN-ID of thee VLAN switch can be made the same as the segment ID of the master switching hub MH for omitting the VLAN management table of the VLAN management section 128. Since all packets in a microsegment are broadcasted, VLAN definition of the VLAN switch needs to be set to a multicast group (broadcast group) to use such a broadcast function in the VLAN group. On the VLAN switch side, the VLAN group is defined with address and broadcast and multicast are closed in the VLAN group. To unicast a packet only to the destination address, the packet is broadcasted in the microsegment and in the VLAN group, the address of the device connected for each port of the VLAN switch is learned in an address table and switched.

To multiplex microsegments as VLAN members, the following system is also available:

The VLAN management section 128 sets VLAN-IDs common to the VLAN switches in the VLAN table as a microsegment lookup table together with the segment IDs corresponding to the VLANs. The VLAN control section 129 adds VLAN-ID as tag to a single microsegment or microsegments as VLAN members, thereby transmitting VLAN multiplexed packet. The VLAN control section 129 collates the VLAN-ID tag of the received VLAN multiplexed data (packet) with the VLAN table for sorting the data to microsegments, whereby a common microsegment in port P1 . . . units can be set among the switching hubs via the VLAN switch and the VLAN member devices connected to the VLAN switch and microsegment devices can communicate with each other as one segment.

By the way, in the embodiment, the VLAN-ID corresponding to a microsegment can be set from an external network management system (not shown). This means that the network management system can set the VLAN-ID in the VLAN management table of the VLAN management section 128 through the network management agent 112 of the master switching hub MH. In doing so, in conversation with a LAN machine having a VLAN function connected to the backbone BB, such as a VLAN switch, or the network management system, the VLAN management agent 112 of the master switching hub MH sets the VLAN-ID in the VLAN management section 128 and the microsegment can be managed integratedly from the LAN machine having a VLAN function, such as a VLAN switch, or the network management system. If the segment ID is made the same code as the VLAN-ID, the VLAN management table of the VLAN management section 128 can be omitted and a common microsegment in port units among the LAN machines having a VLAN function and the switching hubs can be expanded as a VLAN multicast group for configuring an economical system in response to the traffic concentration degree and network availability.

If the VLAN management section 128 enters destination and source addresses of network addresses, VLAN-IDs, and segment IDs in the VLAN management table in batch and as in VLAN multiplexing, microsegments mapped to VLANs are multiplexed for transmission with no VLAN-ID tag added to a packet, a standard LAN machine or router of another vendor such as WAN may intervene in the backbone BB. In this case, by making the VLAN-ID and microsegment ID the same, the destination and source addresses and the segment ID are entered in the VLAN management table, data is VLAN multiplexed with no tag for transmission among the switching hubs, and the VLAN control section 129 can sort the received VLAN multiplexed data to microsegments.

As described above, if one port P1 . . . is multiply set as members of microsegments S1 . . . , traffic from terminals to a server is little; in contrast, when traffic from a server to terminals is much, server connection ports are set to members of one microsegment and terminals are set to members of microsegments, whereby segmentation matching a traffic pattern is enabled at the level of ports S1 . . . not via a router or a third-layer switch of OSI protocol layers. Thus, by interconnection with VLAN enabling traffic segmentation with practical performance in a comparatively simple circuit configuration, VLAN management and segment-to-segment routing can be relegated to a backbone LAN machine of a vendor widespread like the high-end de facto standard, and access-channel LAN machines in a floor are used as the master switching hub MH and the slave switching hub SH of the port segment switching system of the invention, whereby traffic can be finely segmented to desktop terminals. As a result, microsegment change of ports P1 . . . can be made flexibly by remote control without replacing a crosspatch, a modular connector, etc., in a wiring closet, so that an electronic crosspatch function capable of reconfiguring microsegments economically and dynamically with good performance at high speed can be provided.

Further, the following constitution can be adopted to the port segment switch in the present invention. That is, when the terminal is moved between the ports in one switch, or when the terminal is moved between the switches, the switch which is over layer 2 of the virtula LAN system on the back born side and connected to the expansion port detects the correspondence change of MAC address or network address with the microsegment, so that the virtual group agent executes the dynamic automatic configulation management.

As described above, the second to seventh embodiments are settings which are located on the most physical layer side, and construct the base of the information wiring.

8th Embodiment

Figure 18:
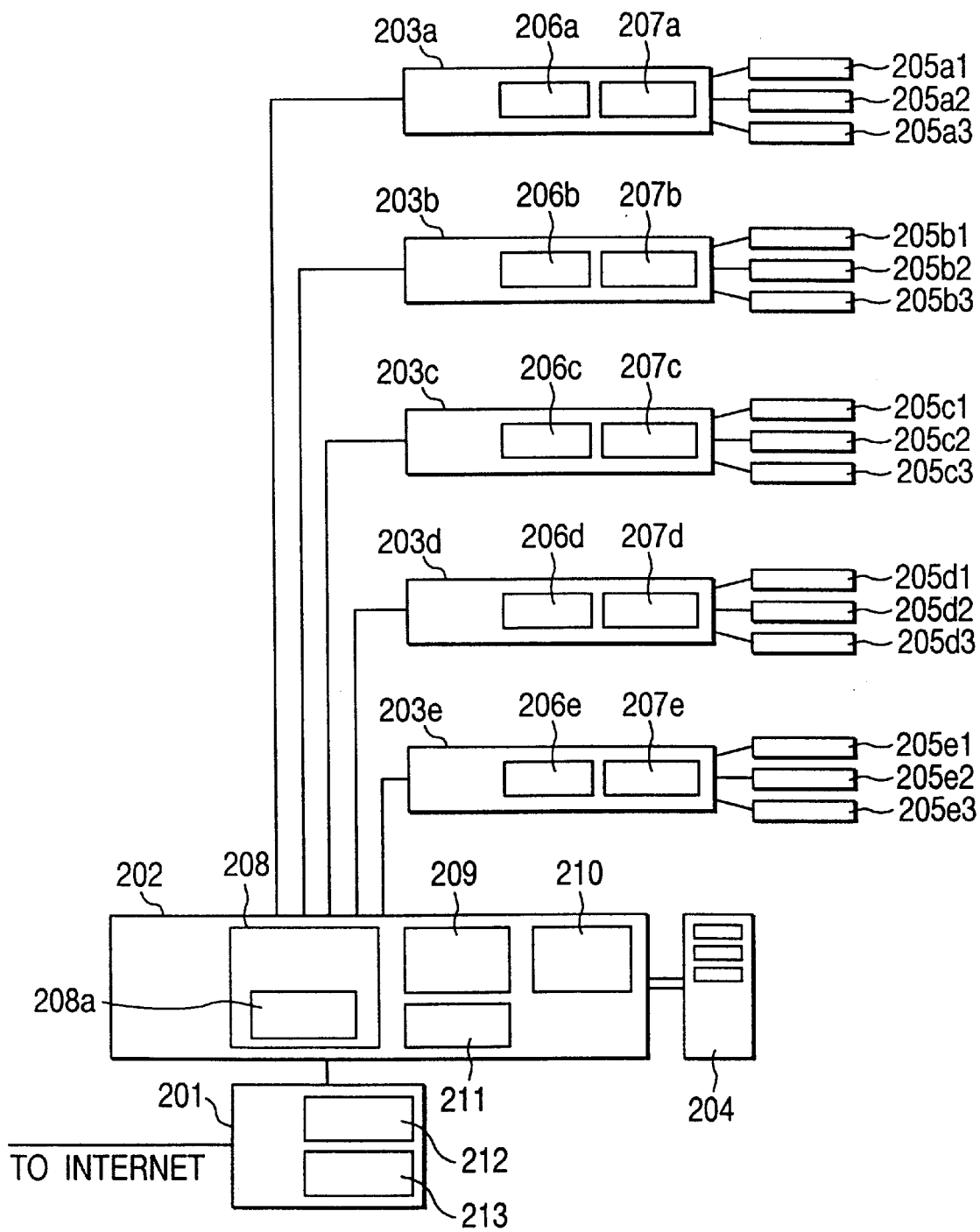
FIG. 18 is a system block diagram of the invention.

FIG. 18 is a system block diagram to show an eighth embodiment, which can be adapted to the virtual LAN system according to the present invention, wherein a VLAN as a local intranet segment and a global internet segment are connected by a main router 201. An internet backbone and a local router switch 202 as an intranet segment member are connected to ports of the main router 201.

Local switches 203a, 203b, 203c, 203d and 203e, and an application/database server (simply, server) 204 are connected to ports of the local router switch 202. Terminals 205a1 . . . , 205b1 . . . , 205c1 . . . , 205d1 . . . , and 205e1 such as desktop personal computers are connected to ports of the local switches 203a . . .

The local switches 203a . . . have the same configuration, each comprising an intranet routing section 206a . . . having a cache for processing intranet routing and a VLAN learning/identification/forwarding section 207a . . .

On the other hand, the local router switch 202 comprises an intranet route server 208 having an intranet routing table section 208a, an intranet processing section 209 for performing encapsulation, fragmentation, and reassembling in the intranet, a VLAN learning/identification/forwarding section 210, and a filtering section 211 for filtering packets between the intranet and internet.

The main router 201 comprises an internet routing table section 212 for processing internet routing and a fire wall section 213 for protecting the intranet against an illegal invasion from the internet.

By the way, conventional main routers and internet protocols are designed to route packets in the global internet and not to route only a VLAN for a local intranet.

Then, in the embodiment, a VLAN as a local intranet segment and a global internet segment are separated from each other and packets are filtered so that VLAN routing is processed by the local switches 203a . . . close to the terminals 205a1 . . . and the local router switch 202 and that only internet segment traffic is sent from the local router switch 202 to the main router 201, and the main router 201 processes routing to the internet or another LAN, such as a remote intranet, in the internet routing table section 212.

That is, each local switch 203a . . . prepares an intranet routing table in the intranet routing section 206a . . . and processes routing the VLAN as an intranet segment by the intranet routing section 206a . . . based on the prepared routing table, and only internet segment traffic is sent to the port of the local router switch 202 to which the main router 201 is connected, thereby filtering packets. The local router switch 202 and the local switches 203a . . . cache the routing information (routing table contents) mutually.

Specifically, the filtering is executed as follows:

For example, a packet is transmitted only through the local switch 203a between the terminals 205a1 and 205a2 connected to the same local switch 203a, and is not forwarded to the local router switch 202 or other local switches 203b . . . Packet transmission from the terminal 205a1 connected to one local switch 203a to the terminal 205b1 connected to another local switch 203b is executed through the local switches 203a and 203b and the local router switch 202. At this time, in the local router switch 202, the VLAN learning/identification/forwarding section 210 references the intranet routing table in the intranet routing table section 208a. If the destination address of the received packet matches an intranet address (for example, MAC address of terminal 205b1 . . . connected to any local switch 203b . . . connected to any port of the local router switch 202), the section 210 transmits the packet to the corresponding local switch 203b and not to the main router 201. On the other hand, if the destination address of the packet received at the local router switch 202 does not match any intranet address as a result of referencing the intranet routing table in the intranet routing table section 208a, the local router switch 202 transmits the packet to the main router 201, which then references the internet routing table in the internet routing table section 212 for routing the packet to the internet.

A packet transmitted from the internet to the intranet is checked for security by the fire wall section 213 of the main router 201. If no problem is found, the packet is transmitted from the main router 201 to the local router switch 202. The local router switch 202 references the intranet routing table in the intranet routing table section 208a for routing the packet. The packet data transferred between the main router 201 and the local router switch 202 is encapsulated, fragmented, and reassembled by the intranet processing section 209 of the local router switch 202, thereby enabling communication between different protocols of an internet protocol and an intranet protocol (VLAN protocol).

As described above, according to the invention, traffic of the main router 201 is reduced and the processing capability of the main router 201 is limited to performance required for internet (WAN) connection, thus the load for the main router 201 is lightened as compared with management of the intranet routing table by the main router 201 as in the conventional system. Moreover, the local switches 203a . . . and the local router switch 202 perform intranet routing processing, enabling high-speed routing. Thus, system costs are drastically decreased and intranet routing performance can be enhanced.

9th Embodiment

Figure 19:
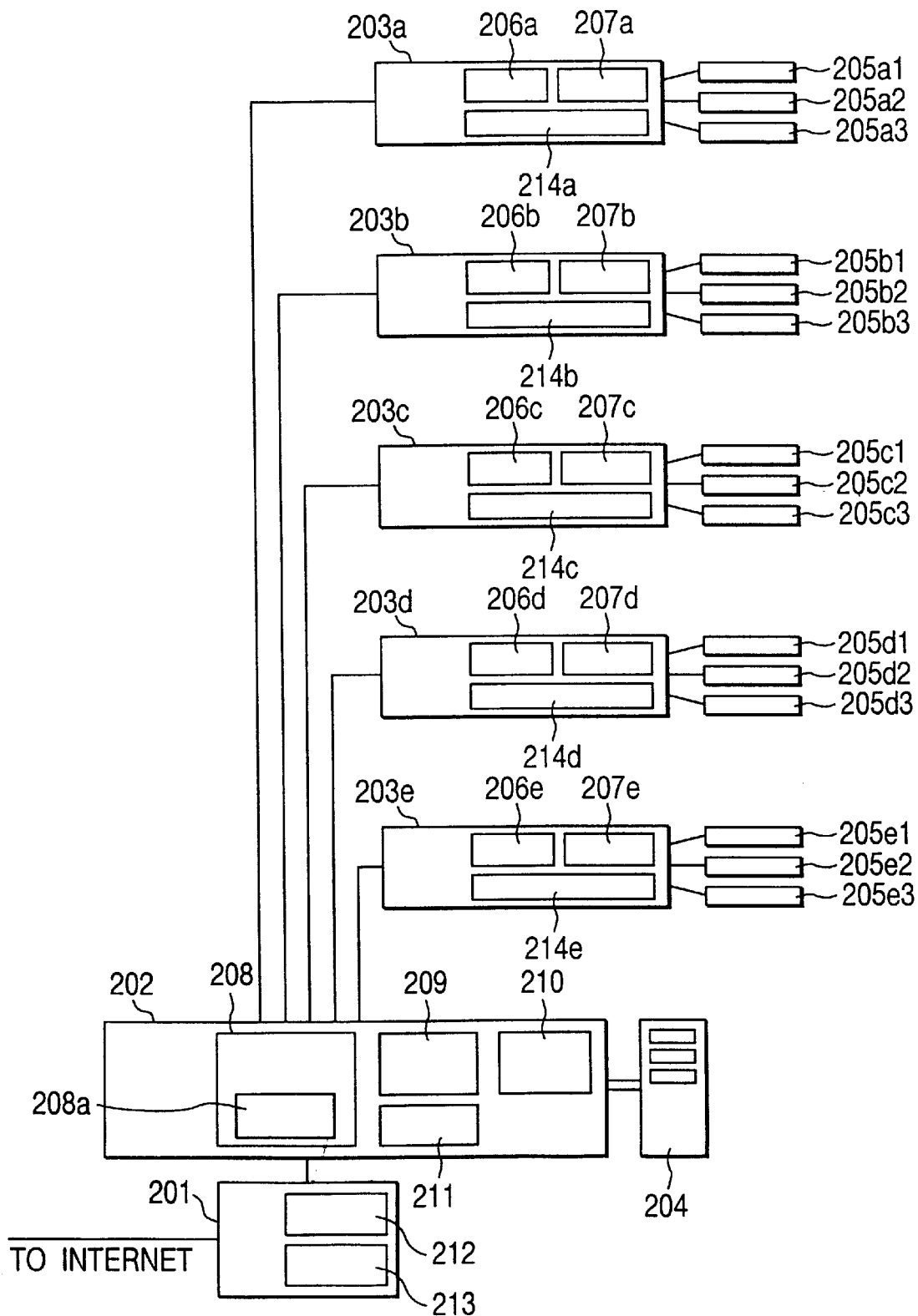
FIG. 19 is a system block diagram of the invention.

FIG. 19 is a system block diagram to show a ninth embodiment of the invention. Parts identical with or similar to those previously described with reference to FIG. 18 are denoted by the same reference numerals in FIG. 19 and will not be discussed again.

The ninth embodiment of the invention is characterized by the fact that local switches 203a . . . comprise virtual group registration/routing table sections 214a . . . in which client addresses and virtual group IDs (VLAN-IDs) of virtual groups (VLANs) are entered. That is, in the local switch 203a . . . , the client addresses and virtual group IDs (VLAN-IDs) of the virtual groups entered in the virtual group registration/routing table section 214a . . . are referenced and only when the destination virtual group ID of a transmission packet does not match the virtual group ID of the local site entered in the virtual group registration/routing table section 214a . . . , the packet is forwarded from the local switch 203a . . . through a local router switch 202 to a main router 201. If the destination virtual group ID differs from the source virtual group ID and matches the virtual group ID of the local site, the packet is forwarded to the port of the local switch 203a . . . corresponding to the destination client address.

The local switches 203a . . . of the ninth embodiment thus filter packets local for the main router 1 based on the client addresses and virtual group IDs (VLAN-IDs) of the virtual groups entered in the virtual group registration/routing table sections 14a . . .

FIG. 20 shows a virtual group registration/routing table in the virtual group registration/routing table section 214a . . . , wherein the client addresses of the virtual groups (VLANs), such as MAC addresses of terminals 205a1 . . . , the port IDs of the ports of the local switches 203a . . . and the virtual group IDs (VLAN-IDs) to identify the virtual groups (VLANs) are entered.

If the virtual groups (VLANs) are defined with network addresses, for example, if a virtual group is defined for each subnet address of an internet protocol (IP), the subnet address becomes the virtual group ID (VLAN-ID) of the virtual group. Even if the virtual groups are defined at the data link layer level of the port IDs of the ports of the local switches 203a . . . or the local router switch 202, the MAC addresses of the local switches 203a . . . , and the like, the local switches 203a . . . are provided with a routing function using the virtual group IDs, whereby the MAC addresses, etc., can be handled as virtual group IDs containing the case where the destination virtual group ID of the transmission packet is the same as the destination subnet ID of the internet protocol.

Expansion of a packet by adding a virtual group ID, etc., to enable routing intranet VLANs as in the embodiment deviates from the standard and is not originally required for the end system. However, for the intranet, the local switches 203a . . . are provided with the virtual group registration/routing table sections 214a . . . and routing processing based on the virtual group IDs only among the virtual groups in the intranet can be performed. Here, intranet routing sections 206a . . . use the virtual group registration/routing tables in the virtual group registration/routing table sections 214a . . . as intranet routing tables.

On the other hand, for a packet conforming to the standard and having no virtual group ID, if virtual groups are defined at the data link layer level of port IDs, MAC addresses, etc., a virtual group determined by the destination and source client addresses of the transmission packet is not defined and an intranet VLAN learning/identification section 207a . . . determines that the destination and source client addresses of the transmission packet are not contained in the same virtual group. That is, the source and destination belong to different virtual groups, thus the intranet routing section 206a . . . references the intranet routing table and routes the packet to the port of the local switch 203a . . . corresponding to the destination client address.

Likewise, if the destination and source virtual group IDs of a transmission packet are described as tags, when the destination virtual group ID differs from the source virtual group ID, the intranet routing section 206a . . . references the intranet routing table and routes the packet to the port of the local switch 203a . . .

If the intranet VLAN learning/identification section 207a . . . of one local switch 203a . . . references the virtual group registration/routing table in the virtual group registration/routing table section 214a . . . and finds a match between the destination virtual group ID and the local site virtual group ID, it determines that the packet is an intranet frame, and unicasts the packet to the port of a member of the virtual group to which the destination client address belongs. This can be realized because the number of nodes in the intranet is limited and thus the size of the virtual group registration/routing table in the local switch 203a . . . is limited.

On the other hand, only when the destination virtual group ID of a transmission packet does not match the local site virtual group ID or subnet ID, a filtering section of the local router switch 202 filters the local packet so as to forward the transmission packet to the main router 201. Thus, traffic in the main router 201 is limited to communication with external systems (internet), so that the main router 201 may comprise a small routing table and buffer and also a routing processor of a small capacity.

When the terminal 205a1 . . . moves between remote and local sites in the standard case wherein the remote site subnet ID differs from the local site subnet ID, the virtual group ID (VLAN-ID) does not change.

As described above, a virtual subnet configuration wherein management of the virtual group registration/routing table (intranet routing table) does not concentrate on the main router 201 can also be realized in multilayer switching with layer 202 (data link layer) and layer 203 (network layer); multicast is efficiently processed for shortening the delay time and multiports are supported. Virtual groups (VLANs) independent of internet protocol subnets can be formed and VLAN routing can be processed by the local router switch 202 and the local switches 203a . . . separately from internet routing.

10th Embodiment

In a tenth embodiment of the invention, virtual group IDs and subnet IDs can be set in virtual group registration/routing tables in virtual group registration/routing table sections 214a . . . of local switches 203a . . . in the same configuration as the ninth embodiment. (See FIG. 20.) Only when the destination virtual group ID of a transmission packet does not match any virtual group ID of local site VLANs registered in the virtual group registration/routing table, an intranet processing section 209 of a local router switch 202 encapsulates the destination virtual group ID in an internet protocol packet with the destination subnet ID and forwards and the resultant packet to a main router 201. If the destination client address differs from the virtual group ID of the source client address and the destination subnet ID matches the local site subnet ID, the local router switch 202 unicasts or multicasts the packet to the port corresponding to the destination client address.

Since the remote site virtual group IDs in the embodiment differs from local site virtual group IDs, when terminal 205a1 . . . moves between remote and local sites, the virtual group ID of the moving terminal 205a1 . . . needs to be changed.

By the way, if the virtual groups (VLANs) are assumed to be local segmentation used in the intranet, they can be tunneled in the internet. That is, since virtual group ID (VLAN-ID) information to identify the virtual groups (VLANs) is encapsulated in a packet to be transmitted to an internet segment, the packet is not routed with the virtual group ID (VLAN-ID) in the internet segment and is routed with the virtual group ID (VLAN-ID) only in local segments. The number of virtual group (VLAN) segments as the intranet and the number of terminals in the segments are extremely small as compared with those in the internet and the routing calculation amount may be small accordingly. The virtual groups (VLANs) can be defined with port IDs, MAC addresses, network addresses as segment members, and are routed by the local switches 203a . . . as logical subnets.

A site identification code to identify local or internet is placed in a predetermined location of a packet, whereby subnet identifier (subnet ID) of internet protocol of VLAN-ID becomes the same as local VLAN subnet and internet access subnet, and remote and local sites are integrated to a VLAN segment with the same VLAN-ID.

When a transmission packet in a VLAN is forwarded to the internet or WAN (wide area network), the site and VLAN-ID of the packet are encapsulated in the packet to the internet. If the site identification code differs, segmentation to another area is executed by the local router switch 202, thus a different internet protocol subnet is used. Only when the internet protocol subnet ID does not match the local subnet ID, the packet is forwarded from the local router switch 202 to the main router 201. Although it is burdensome to set subnets in the local router switch 202 and the local switches 203a . . . , the subnet of the local router switch 202 can be grouped by the site identification codes of the local switches 203a . . . , thus setting the subnets is facilitated.

11th Embodiment

Figure 21:
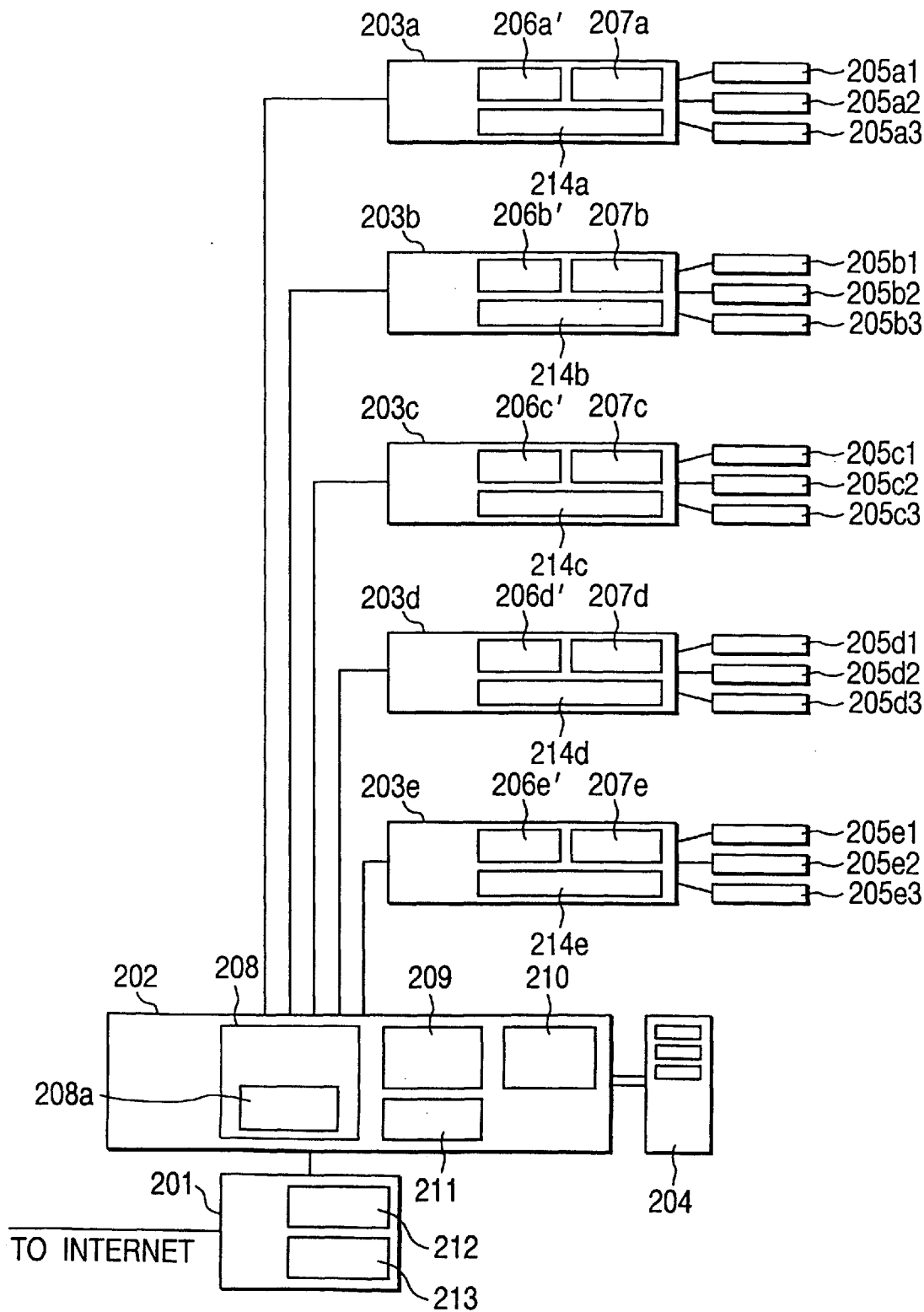
FIG. 21 is a system block diagram of the invention.

FIG. 21 is a system block diagram to show a eleventh embodiment of the invention, wherein intranet routing/bridge sections 206a' . . . are provided in place of the intranet routing sections 206a . . . of the local switches 203a . . . in the second embodiment. Each of the intranet routing/bridge sections 206a' . . . comprises an address learning table in which the destination client addresses and port IDs of transmission packets are learned and entered. Also in the eleventh embodiment, client addresses, port IDs, virtual group IDs, and subnet IDs can be set in virtual group registration/routing tables in virtual group registration/routing table sections 214a . . . as shown in FIG. 20. Other parts are identical with or similar to those of the ninth embodiment and therefore will not be discussed again.

For transmission packets other than those with the virtual group ID registered, namely, packets with the client address or port ID only registered, the virtual group ID column of the virtual group registration/routing table becomes blank. Then, in the eleventh embodiment, the intranet routing/bridge section 206a' . . . of local switch 203a . . . collates the client address or port ID of the transmission packet with the address learning table. If the client address or port ID is not entered, the intranet routing/bridge section 206a' . . . forwards the packet to a main router 201 through a local router switch 202. On the other hand, for the transmission packet with the virtual group ID registered, the virtual group registration/routing table section 214a . . . collates the virtual group ID of the transmission packet with the virtual group registration/routing table. As a result, when the virtual group ID matches the subnet ID of the local switch 203a . . . or local virtual group ID, the packet is forwarded to the destination port or local switch 203a . . .

12th Emobodiment

Figure 22:
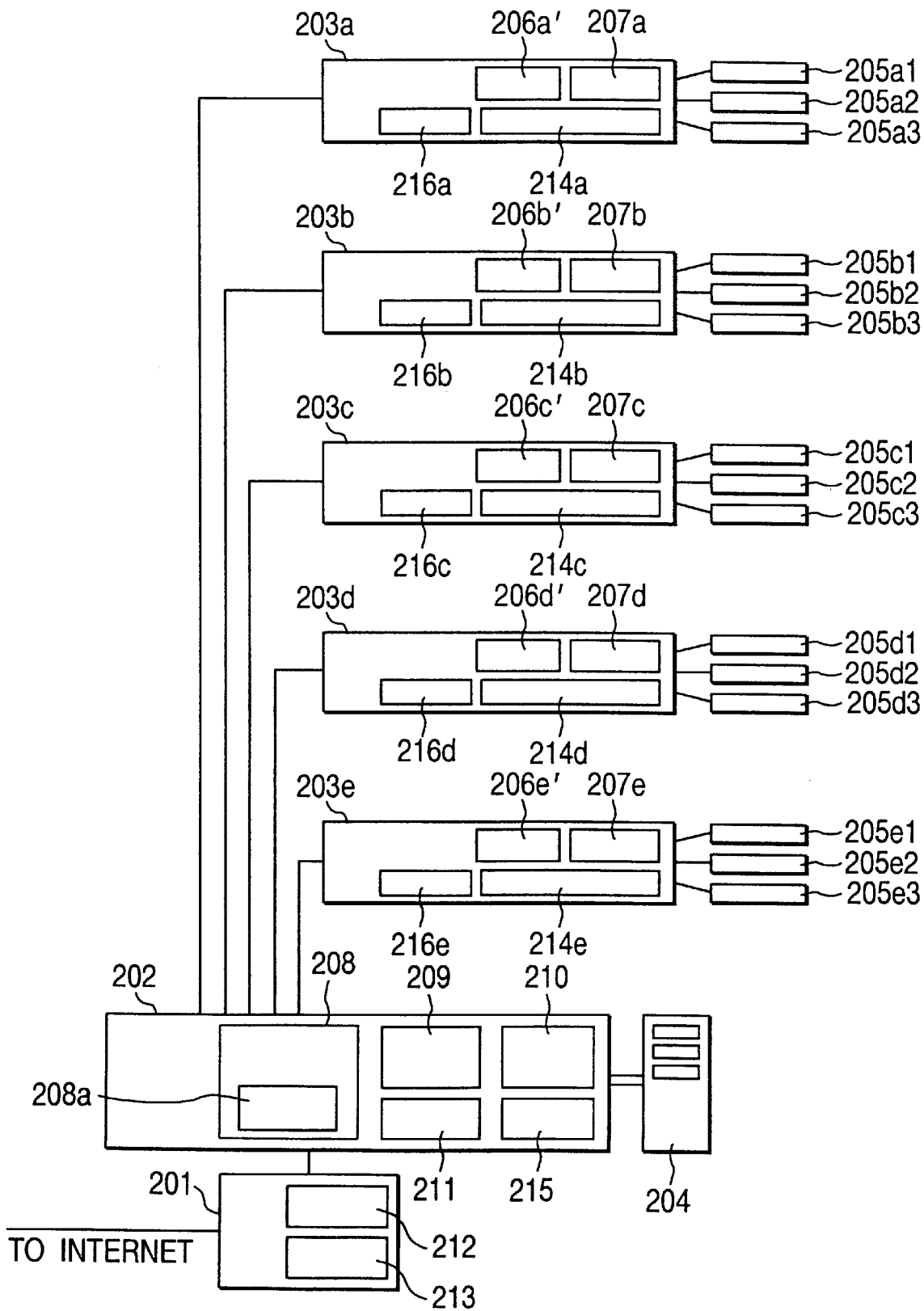
FIG. 22 is a system block diagram of the invention.

FIG. 22 is a system block diagram to show a twelfth embodiment of the invention. Parts identical with or similar to those previously described with reference to FIG. 21 are denoted by the same reference numerals in FIG. 22 and will not be discussed again.

The twelfth embodiment of the invention is characterized by the fact that a local router switch 202 and local switches 203a . . . are provided with multicast segment sections 215, 216a, 216b, 216c, 216d, and 216e, each of which is made of a branch circuit made of a repeater, a bus, or the like for causing a physical signal of a packet to branch for each virtual group.

Further, multicast port addresses connected to the branch circuits (multicast segment sections 216a . . . ) as shown in FIG. 23 can be entered in a virtual group registration/routing table contained in a virtual group registration/routing table section 214a . . . of each local switch 203a . . .

If a multicast port address is specified as the destination address of a transmission packet (multicast specification), the local switch 203a . . . forwards the transmission packet to the multicast segment section 216a . . . for multicasting the transmission packet at the same time. Thus, the system of the fifth embodiment has the advantage of the delay time shortened as compared with normal transmitting of a transmission packet copy to the ports in order. If two or more multicast segment sections 216a . . . are provided in each local switch 203a . . . and are allocated to different segments, more than one multicast can be executed in parallel. Priority may be assigned to multicast and unicast (generally, higher priority is assigned to multicast).

13th Embodiment

In a thirteenth embodiment of the invention, IDs indicating local virtual groups (VLAN-IDs) and IDs indicating global virtual groups (subnet IDs) as shown in FIG. 24 can be set in virtual group registration/routing tables contained in virtual group registration/routing table sections 214a . . . of local switches 203a . . . in the same configuration as the second embodiment. Transmission packets with the subnet ID indicating a global virtual group are forwarded to a main router 201 from a local router switch 202.

Therefore, local virtual group routing can be processed by the local router switch 202 and the local switches 203a . . . separately from routing to a global virtual group, and traffic of the main router 201 is reduced and the load for the main router 201 is lightened.

Duplicate client addresses can be set as members of virtual groups and priority can be assigned to local and global virtual groups.

14th Embodiment

Figure 25:
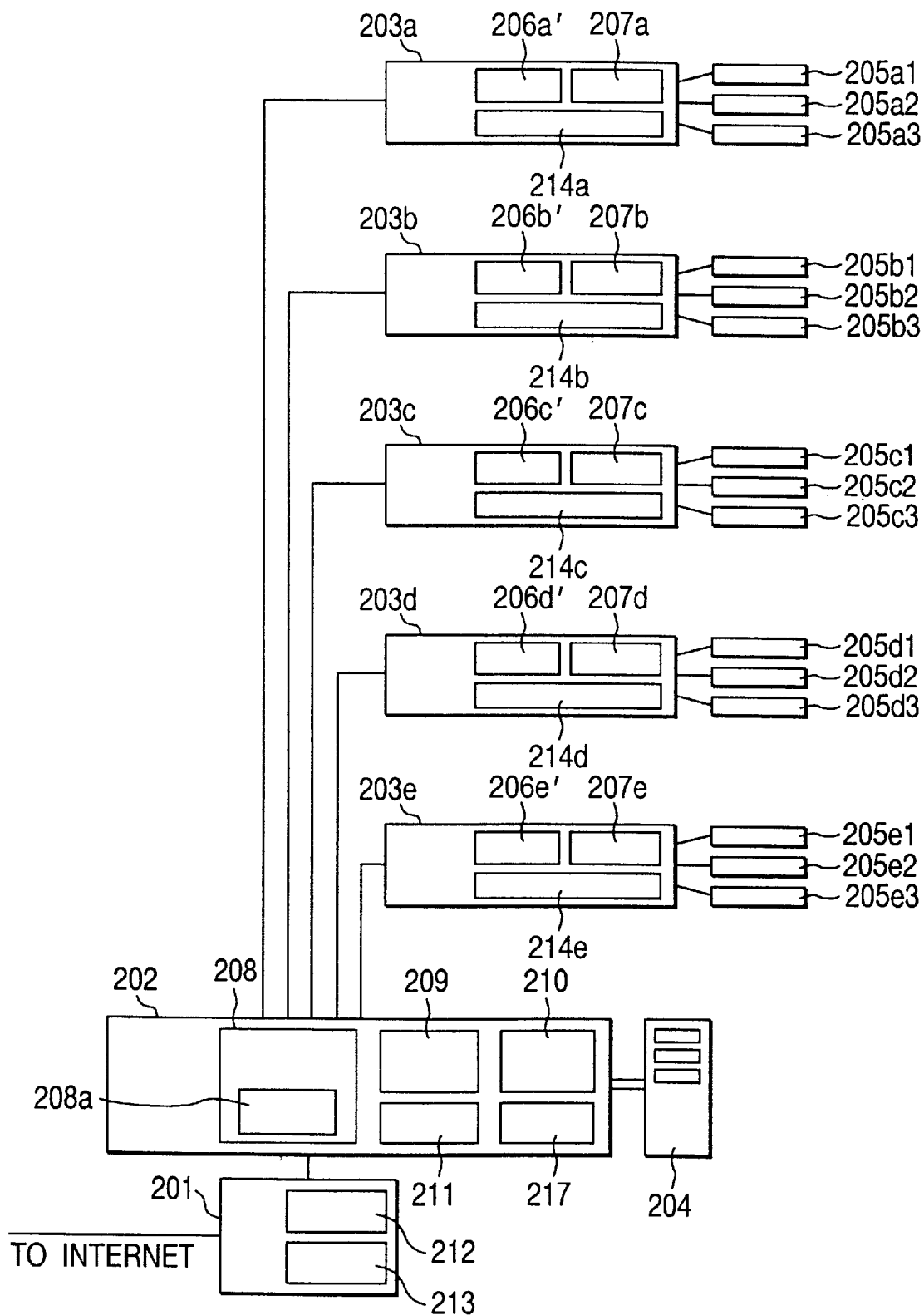
FIG. 25 is a system block diagram of the invention.

FIG. 25 is a system block diagram to show a fourteenth embodiment of the invention. Parts identical with or similar to those previously described with reference to FIG. 19 are denoted by the same reference numerals in FIG. 25 and will not be discussed again. That is, the fourteenth embodiment of the invention is characterized by the fact that a local router switch 202 is provided with a gateway encapsulation/reassembling section 217 and that the address of the gateway encapsulation/reassembling section 217 (gateway address) is entered in virtual group registration/routing tables contained in virtual group registration/routing table sections 214a . . . of local switches 203a . . . as shown in FIG. 26.

That is, in a network for managing subnets by a main router 201 as in the seventh embodiment, the gateway address can be entered in the virtual group registration/ routing table of each local switch 203a . . . If the destination address of a transmission packet matches the gateway address, the transmission packet is sent to the gateway encapsulation/reassembling section 217 of the local router switch 202. The gateway encapsulation/reassembling section 217 encapsulates the transmission packet and forwards the packet to the main router 201, which then routes the packet to another local switch 203a . . . , thereby enabling taking part in a common virtual group (VLAN group) from segments of different subnets. This means that the gateway encapsulation/reassembling section 217 specially enables taking part in any desired virtual segment from different virtual segments.

As described above, in a network for managing local subnets by the local switches 203a . . . , the local switches 203a . . . can form a common virtual group beyond local segments and the virtual groups can be made to take precedence over the subnets.

15th Embodiment

Figure 27:
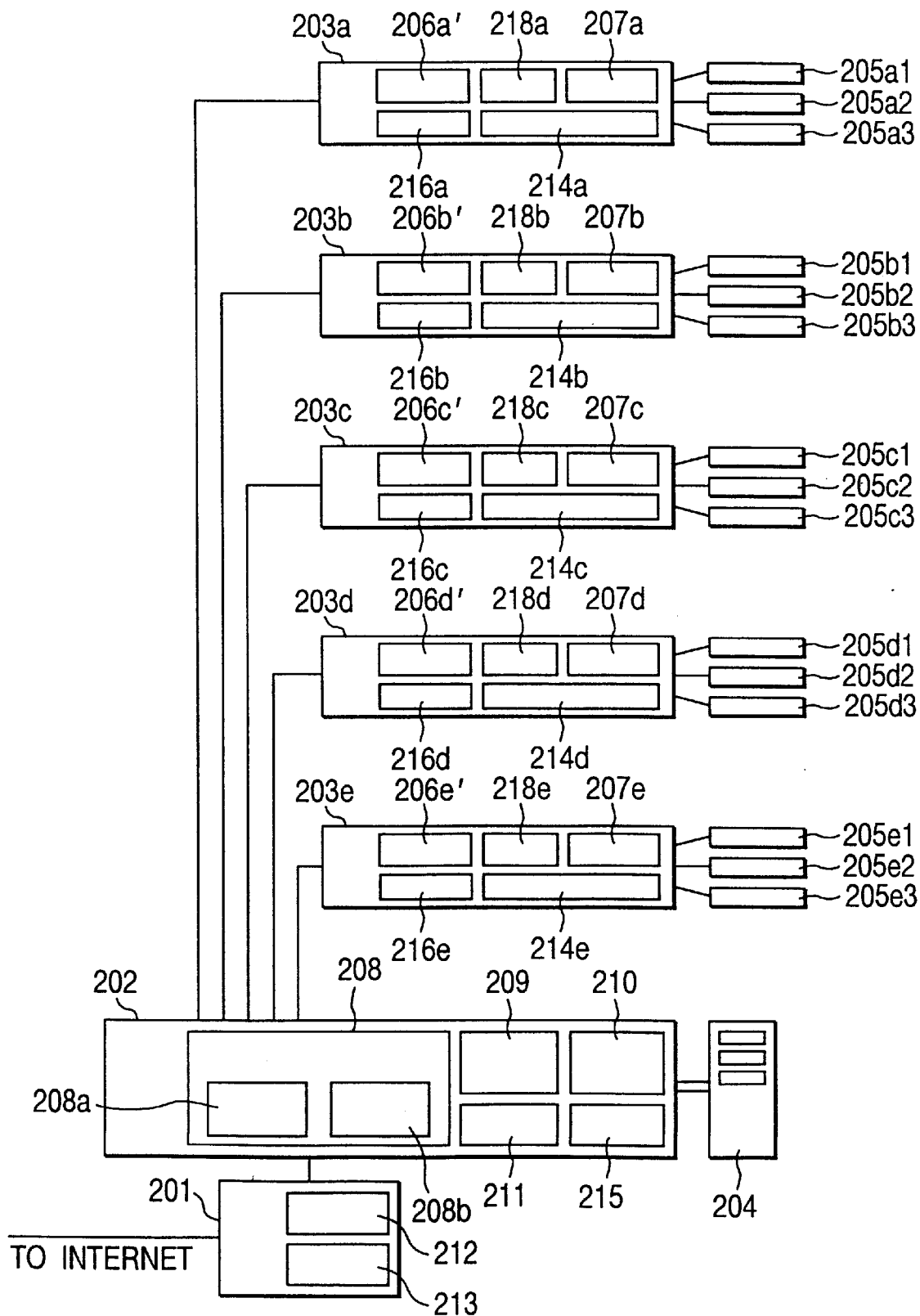
FIG. 27 is a system block diagram of the invention.

FIG. 27 is a system block diagram to show a fifteenth embodiment of the invention. Parts identical with or similar to those previously described with reference to FIG. 22 are denoted by the same reference numerals in FIG. 27 and will not be discussed again.

The fifteenth embodiment of the invention is characterized by the fact that an intranet route server section 208 of a local router switch 202 is provided with a routing change sensing/route calculation section 208b and that local switches 203a, 203b, 203c, 203d, and 203e are also provided with routing change sensing/route calculation sections 218a, 218b, 218c, 218d, and 218e respectively.

When a virtual group registration/routing table in a virtual group registration/routing table section 214a . . . of the local switch 203a . . . is updated as a node is added, moved, or changed, the routing change sensing/route calculation sections 218a . . . detects the event and multicasts the update information of the virtual group registration/routing table to the local switches 203a . . . with high priority by using a dedicated multicast segment set in a multicast segment section 216a . . . , whereby the local switches 203a . . . perform distributed processing of local virtual group route calculation.

The route calculation is executed by the parent local switch 203a . . . for each local virtual group, whereby local virtual group share is assigned. As a method of determining the parent local switch 203a . . . , the local switch 203a . . . which becomes the parent of a predetermined local virtual group may be previously determined or the local switch 203a . . . first detecting update of the virtual group registration/routing table may become the parent for executing route calculation.

On the other hand, in the local router switch 202, the routing change sensing/route calculation section 208b of the intranet route server section 208 updates an intranet routing table (which is required to forward packets sent to a main router 201 form external systems to the local switches 203a . . . ) in an intranet routing table section 208a based on the update information multicasted from any local switch 203a . . . for maintaining the table.

For global virtual groups, the main router 201 at each site updates an internet routing table in an internet routing table section 212 according to a router-to-router route calculation protocol. The main router 201 performs processing of access to the global virtual group or any other internet group.

16th Embodiment

Figure 28:
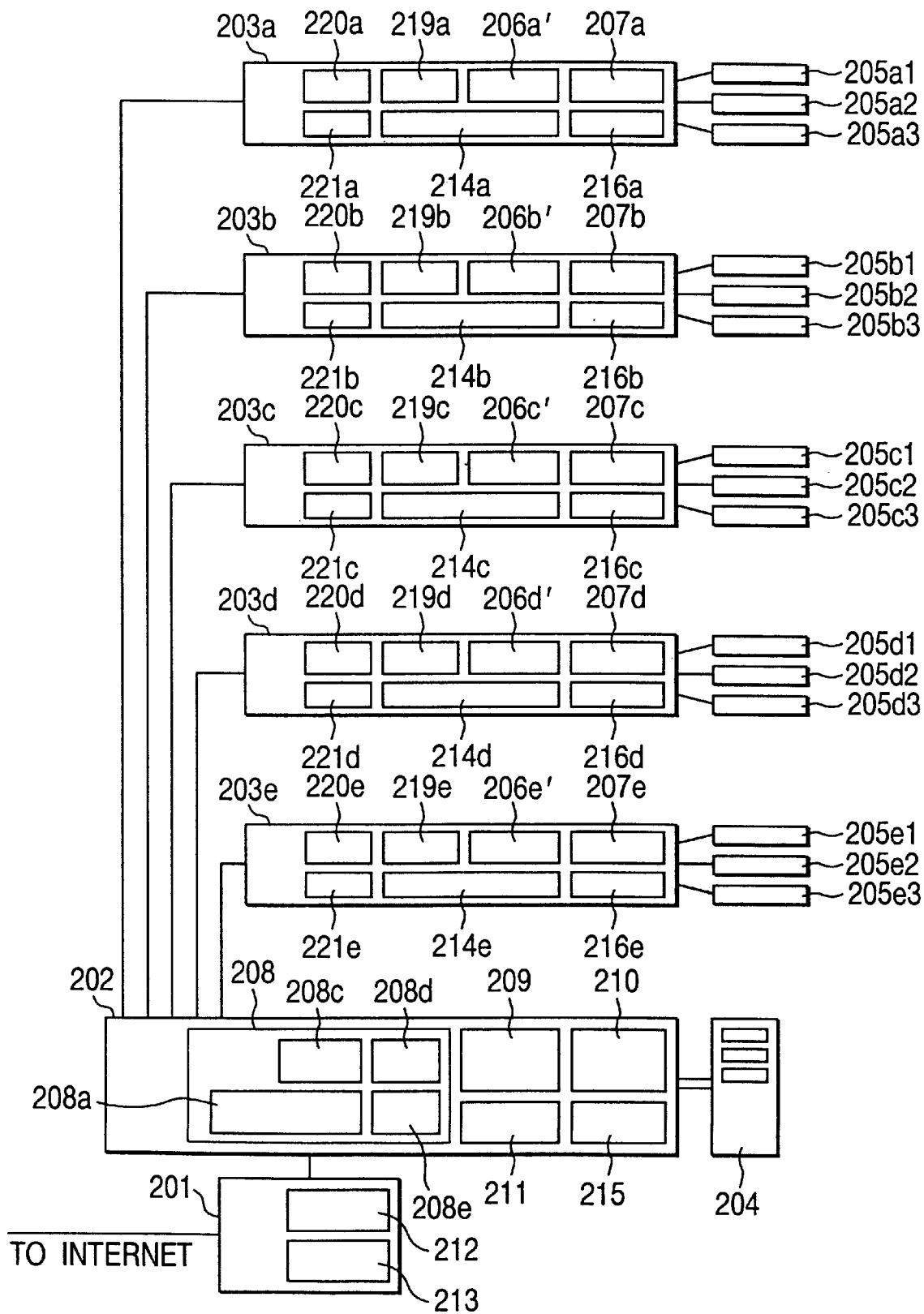
FIG. 28 is a system block diagram of the invention.

FIG. 28 is a system block diagram to show a sixteenth embodiment of the invention. Parts identical with or similar to those previously described with reference to FIG. 22 are denoted by the same reference numerals in FIG. 28 and will not be discussed again.

The sixteenth embodiment of the invention is characterized by the fact that an intranet route server section 208 of a local router switch 202 is provided with a route calculation processor section 208c, a shared memory 208d, and a parallel control kernel section 208e and that each local switch 203a . . . is provided with a route calculation processor section 219a . . . , a shared memory 220a . . . , and a parallel control kernel section 221a . . .

The shared memory 220a . . . of each local switch 203a . . . stores an intranet routing table of local virtual group contained in an intranet routing table section 208a of the local router switch 202, whereby the local switches 203a share the intranet routing table of local virtual group.

On the other hand, the route calculation processor sections 219a . . . of the local switches 203a . . . perform parallel processing of route calculation stored in the intranet routing tables of local virtual group stored in the shared memories 220a . . .

The parallel control kernel sections 221a . . . of the local switches 203a . . . exchange the intranet routing table information in the shared memories 220a . . . in synchronization with each other and manage task assignment to the route calculation processor sections 219a . . . for performing parallel processing of route calculation for maintaining the optimum intranet routing tables. The sections 221a . . . also manage the resources of the route calculation processor sections 219a . . . and the shared memories 220a . . . of the local switches 203a . . . , the intranet routing tables, etc., and control the tasks for integrating the route calculation processor sections 219a into one route calculation processor.

The main router 201 performs processing of access to a global virtual group or any other internet group. The local router switch 202 maintains the intranet routing table required to forward packets sent from external systems to the local switches 203a . . .

17th Embodiment

Figure 29:
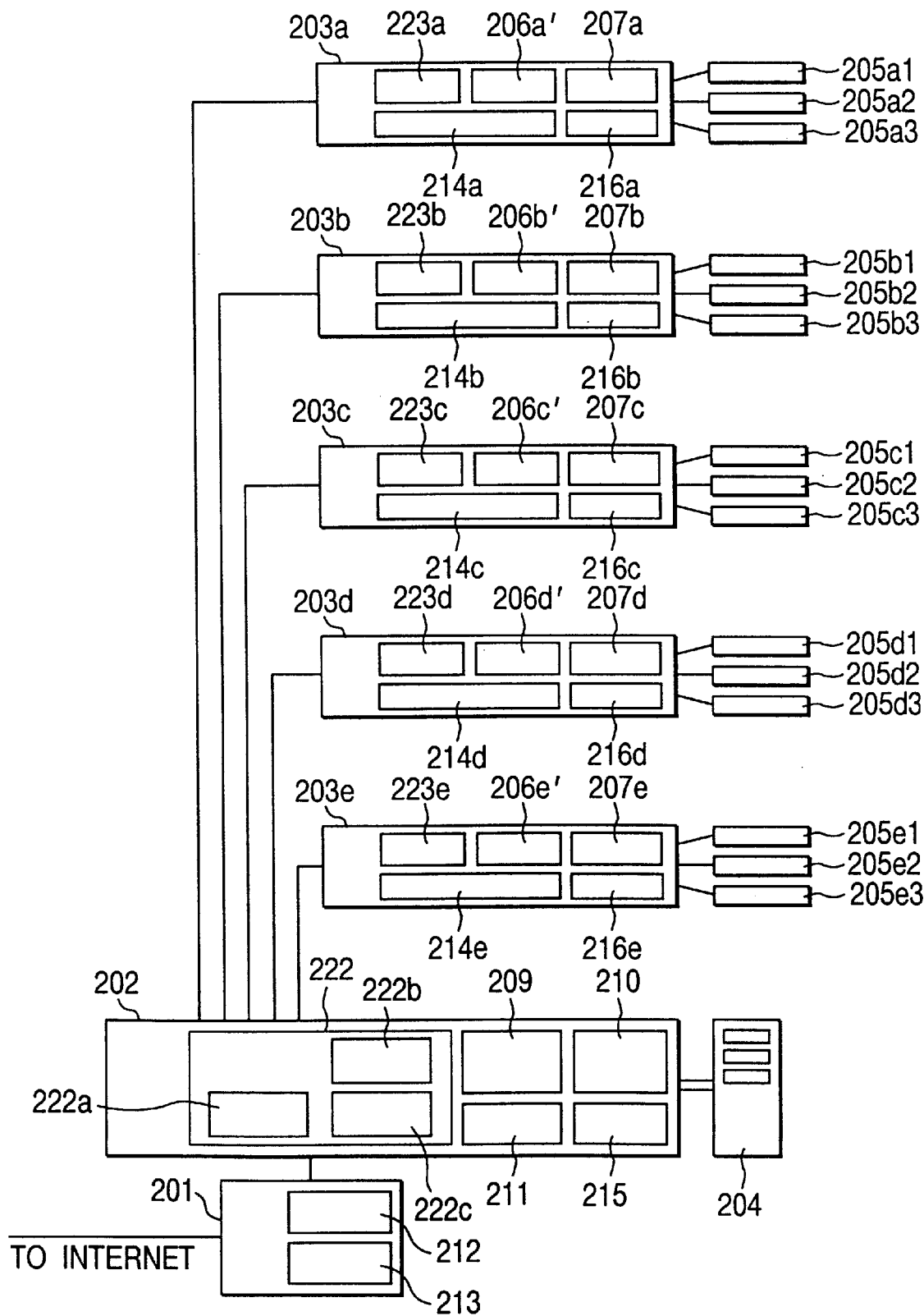
FIG. 29 is a system block diagram of the invention.

FIG. 29 is a system block diagram to show a seventeenth embodiment of the invention. Parts identical with or similar to those previously described with reference to FIG. 22 are denoted by the same reference numerals in FIG. 29 and will not be discussed again.

The seventeenth embodiment of the invention is characterized by the fact that a local router switch 202 and local switches 203a, 203b, 203c, 203d, and 203e are provided with proxy route calculation/protocol control sections 222 and 223a, 223b, 223c, 223d, and 223e respectively.

The proxy route calculation/protocol control section 222 of the local router switch 202 comprises an address conversion table section 222a, a packet edit buffer 222b, and a routing table sharing section 222c for controlling resource management concerning a specific subnet of address space handled by the local switches 203a . . . , address conversion concerning protocols, packet editing, and protocol conversion and sharing a routing table with a main router (or a route server) for standing proxy for route calculation.

On the other hand, the proxy route calculation/protocol control section 223a . . . of each local switch 203a . . . controls resource management of address space concerning a communication protocol with terminals 205a1 . . . connected to the local switch 203a . . . and packet editing and stands proxy for route calculation like the proxy route calculation/protocol control section 222 of the local router switch 202. Particularly, the proxy route calculation/ protocol control sections 223a . . . of the local switches 203a . . . share route calculation concerning a local virtual group subnet.

The main router 201 performs processing of access to a global virtual group or any other internet group, and maintains the routing table required to forward packets sent from external systems to the local switches 203a . . .

That is, in the embodiment, the main router 201, the local router switch 202, and the local switches 203a . . . execute route calculation concerning the intranet in a distributed manner and in cooperation with each other, thereby lightening the route calculation load for the main router 201. Further, communication protocols with the terminals 205a1 . . . managed in the local switches 203a . . . can be used to provide an integrated network for connecting global remote sites via the internet.

18th Embodiment

Figure 30:
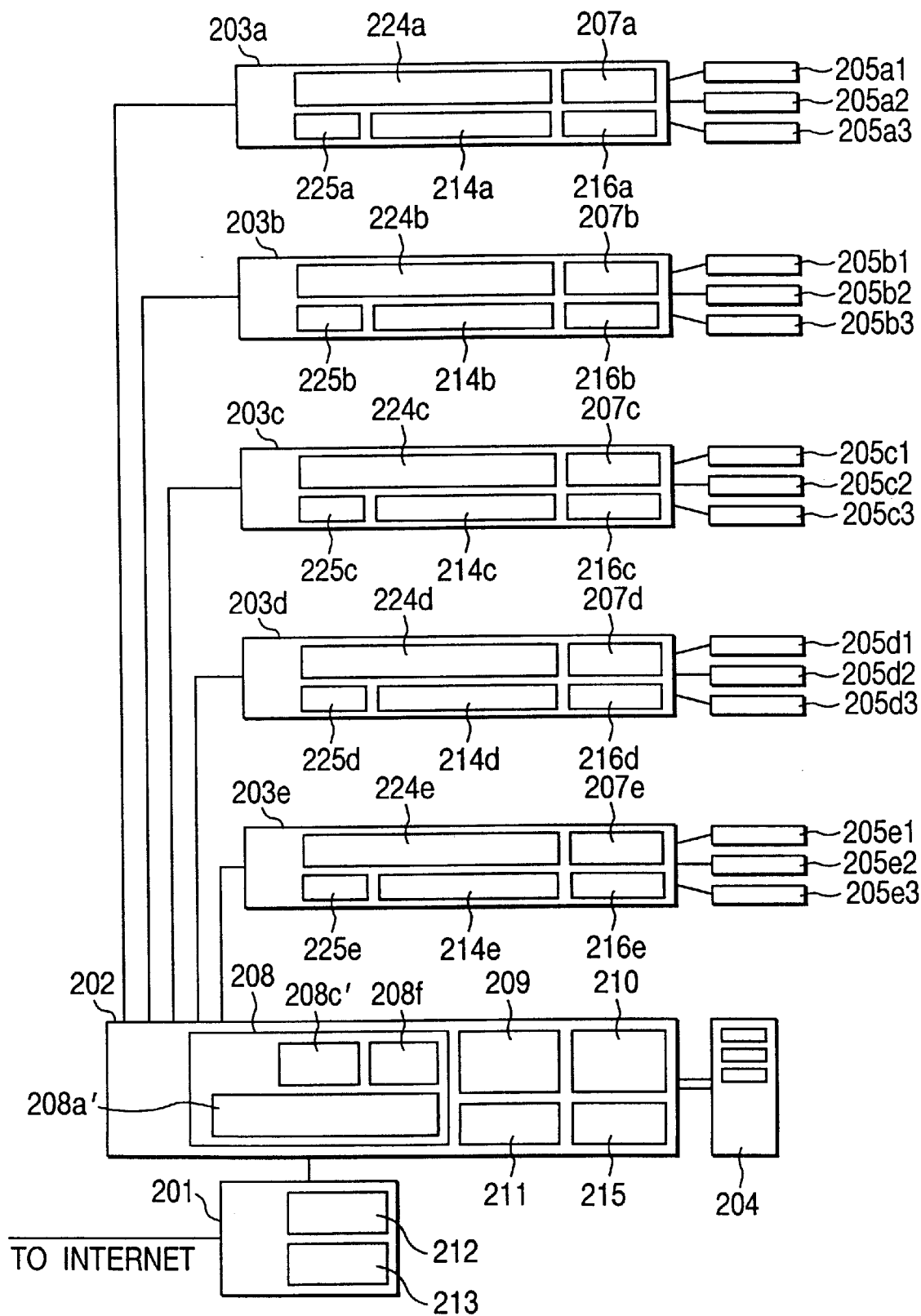
FIG. 30 is a system block diagram of the invention.
Figure 31:
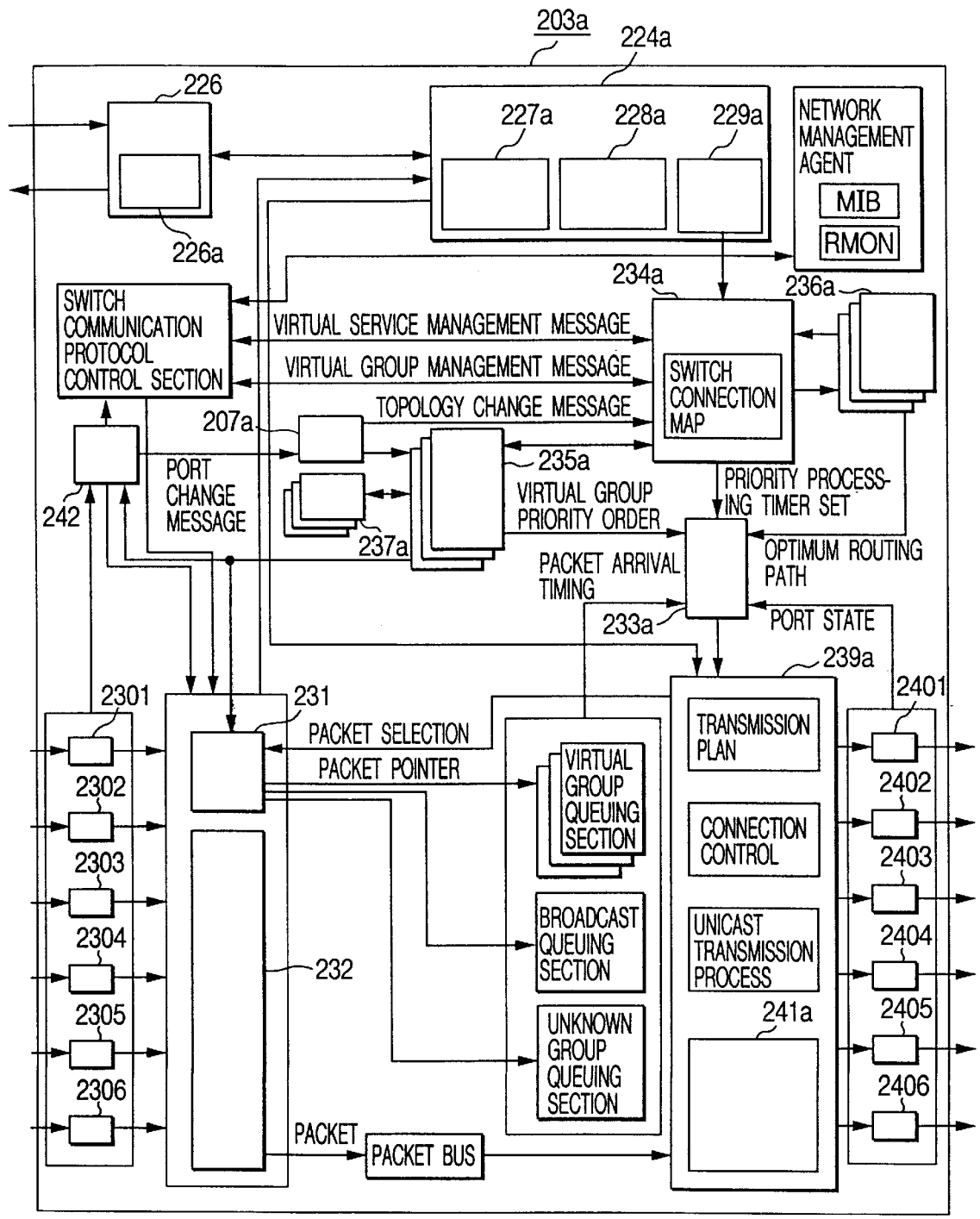
FIG. 31 is a block diagram of a local packet switch in the invention.

FIG. 30 is a system block diagram to show an eighteenth embodiment of the invention. FIG. 31 is a block diagram to show a local packet switch 203a. Other local packet switches 203b . . . also have the configuration shown in FIG. 31. For simplicity, only the local packet switch 3a is illustrated.

The eighteenth embodiment of the invention uses ATM (asynchronous transfer mode) for an interface of a backbone for connecting the local router switch 202 and the local switches 203a . . . in the eighth to seventeenth embodiments and uses the local switches 203a . . . as packet switches (so-called LAN switches). Parts identical with or similar to those previously described with reference to the preceding figures are denoted by the same reference numerals in FIGS. 30 and 31 and will not be discussed again.

The ATM backbone is connected to an ATM interface section 226 contained in the local packet switch 203a. The ATM interface section 226 has a backbone buffer memory 226a for temporarily storing an ATM cell.

An intranet routing/bridge protocol processing section 224a connected to the ATM interface section 226 comprises an ATM LAN emulation client (LEC) section 227a, an IP connection section 228a, and a route calculation section 229a. The IP connection section 228a uses Classical IP and APR over ATM defined in RFC1577 as IP over ATM. The route calculation section 229a updates an intranet routing table (virtual group routing table) for locally preparing the intranet routing table based on the VLAN-ID (virtual group ID) entered in virtual group registration/routing table in virtual group registration/routing table section 214a shown in FIG. 20.

The intranet routing/bridge protocol processing section 224a of the local packet switch 203a routes an intranet packet received via a packet buffer 232 from an input port 2301 . . . according to the virtual group routing table. Therefore, as in the first embodiment, intranet VLAN routing is executed not via a main router 201.

If the VLAN-ID of the packet does not match the VLAN-ID entered in the virtual group registration/routing table (the packet is not destined for the intranet) or the packet has no VLAN-ID, the packet is forwarded as an internet packet to the port of the local router ATM switch 202 to which the main router 201 is connected. Thus, packets are filtered so that only internet segment traffic is sent to the main router 201.

That is, the local packet switch 3a forwards only packets requiring routing in the main router 201 to the main router when the internet or remote site VLAN is accessed. Thus, the main router 201 needs to have a small packet processing capability and moreover the local packet switches 203a . . . support VLAN routing for the intranet, providing a high-performance network at low costs.

Here, intranet routing and internet routing will be discussed briefly. In general routing, if destination and source addresses differ in network address subnet in the header of a packet for subnets segmented based on routing protocol network addresses, the router forwards the packet to the destination segment port.

In the internet, routing is executed according to the standard global internet protocol (IP); in the intranet, VLAN segments are identified according to locally defined VLAN-ID and routing is executed. In layer 203 VLAN, segmentation to virtual subnets is executed. In layer 202 VLAN, segmentation to virtual segments (normally, broadcast domains) is executed. Therefore, if the internet protocol subnets are in a one-to-one correspondence with the intranet virtual subnets or virtual segments, VLAN-IDs are converted into internet protocol subnets on the internet.

On the other hand, VLAN-IDs may be set independently of internet protocol subnets, a plurality of virtual subnets or virtual segments may be set in a router internet subnet, or a VLAN virtual subnet or virtual segment may be set across router internet subnets. In this case, the LAN switches (local router switch 202 and local switches 203a . . . which need to execute routing based on VLAN-ID, comprise an intranet routing table apart from an internet routing table. In the above-mentioned IPv6, a local address and a provider address are separated at the header. A fire wall section 213 of the main router 201 has a function of changing an internet IP address and an intranet IP address to different addresses.

In the internet, routing cannot be executed to local VLAN-IDs or local intranet IP addresses, thus the addresses may be encapsulated by an intranet processing section 209 of the local router switch 202 and furthermore the resultant capsule may be encrypted for transmission.

By the way, routing normally is first checked on a packet network layer, then arrives at a data link layer bridge. For priority processing as to which virtual groups high priority is to be assigned, a virtual group control section 233a sets virtual group priorities in response to the protocol difference, subnet, and VLAN-ID (LLC/SNAP).

On the other hand, the main router 201 processes routing connected to the internet or LAN according to the internet routing table. The local packet switches 203a cache routing information mutually in the intranet routing/bridge protocol processing sections 224a, thereby lightening the routing load for the main router 201, whereby the processing capability of the main router 201 is limited to performance required for internet (WAN) connection, and the local packet switches 203a . . . enable high-speed routing for the intranet. Thus, system costs are drastically decreased and intranet routing performance can be enhanced.

As shown in FIG. 31, a virtual group distributed management section 234a manages a virtual group registration table 235a, a virtual group routing table 236a, and a client definition table 237a. A virtual group identification section 242 and an intranet VLAN learning/identification section 207a reference the tables 235a–237a and the virtual group control section 233a controls a forwarding section 239a for forwarding unicast and multicast to output ports 2401–2406. The main router 201, the local router ATM switch 202, and the local packet switches 203a . . . share the functions described in the ninth to seventeenth embodiments.

A multicast segment switch 241a contained in the local packet switch 203a is equivalent to the multicast segment section 216a described in the twelfth embodiment. If a transmission packet is destined for multicast, it is forwarded to the output port 2401 . . . indicated by the multicast port address entered in the virtual group registration table 235a and the virtual group routing table 236a. The multicasted packet is not a transmission packet copy and is made to branch as a physical signal by the multicast segment switch 241a. Thus, the delay time can be shortened as compared with the case where the transmission packet is copied and multicasted to the output ports 2401 . . . in sequence.

As in the thirteenth embodiment, VLAN-IDs of local virtual groups (local VLANs) and subnet IDs of global virtual groups (global VLANs) as shown in FIG. 24 can be set in the virtual group registration/routing tables of the local packet switches 203a . . . The virtual group identification section 242 identifies a packet to which VLAN-ID is added by a buffer management section 231 or a packet to which VLAN-ID is already added according to the client address of the packet, and if the packet is to be transmitted to a global virtual group, it is forwarded to the main router 201. The client address can be set multiply as members of virtual groups. A priority assignment column to local and global virtual groups can be added to the virtual group registration/ routing table. A virtual group priority message from the virtual group registration/routing table is sent to the virtual group control section 233a and priority control in the forwarding section 239a is performed.

As in the fourteenth embodiment, the route calculation sections 229a . . . contained in the intranet routing/bridge protocol processing sections 224a . . . of the local packet switches 203a . . . share the route calculation function and perform parallel processing of route calculation stored in the intranet routing table of local virtual group. A parallel processing kernel section (not shown) of each local packet switch 203a . . . is installed as an operating system of a CPU (not shown) of the local packet switch 203a . . . as a route calculation processor forming the route calculation section 229a . . . The parallel processing kernel sections exchange intranet routing table information stored in a shared memory in synchronization with each other, manage task assignment to the route calculation section 229a . . . , and perform parallel processing of routing calculation for maintaining the optimum routing table.

The virtual group distributed management sections 234a . . . installed in the parallel processing kernel sections manage the resources of the route calculation sections 229a . . . and the shared memories of the local packet switches 203a . . . the intranet routing tables, etc., and control the tasks for integrating the route calculation sections 229a . . . of the local packet switches 203a . . . into one route calculation section.

The main router 201 performs processing of access to a global virtual group or any other internet group and maintains the routing table required to forward packets sent from external systems to the local packet switches 203a . . .

19th Embodiment

Figure 32:
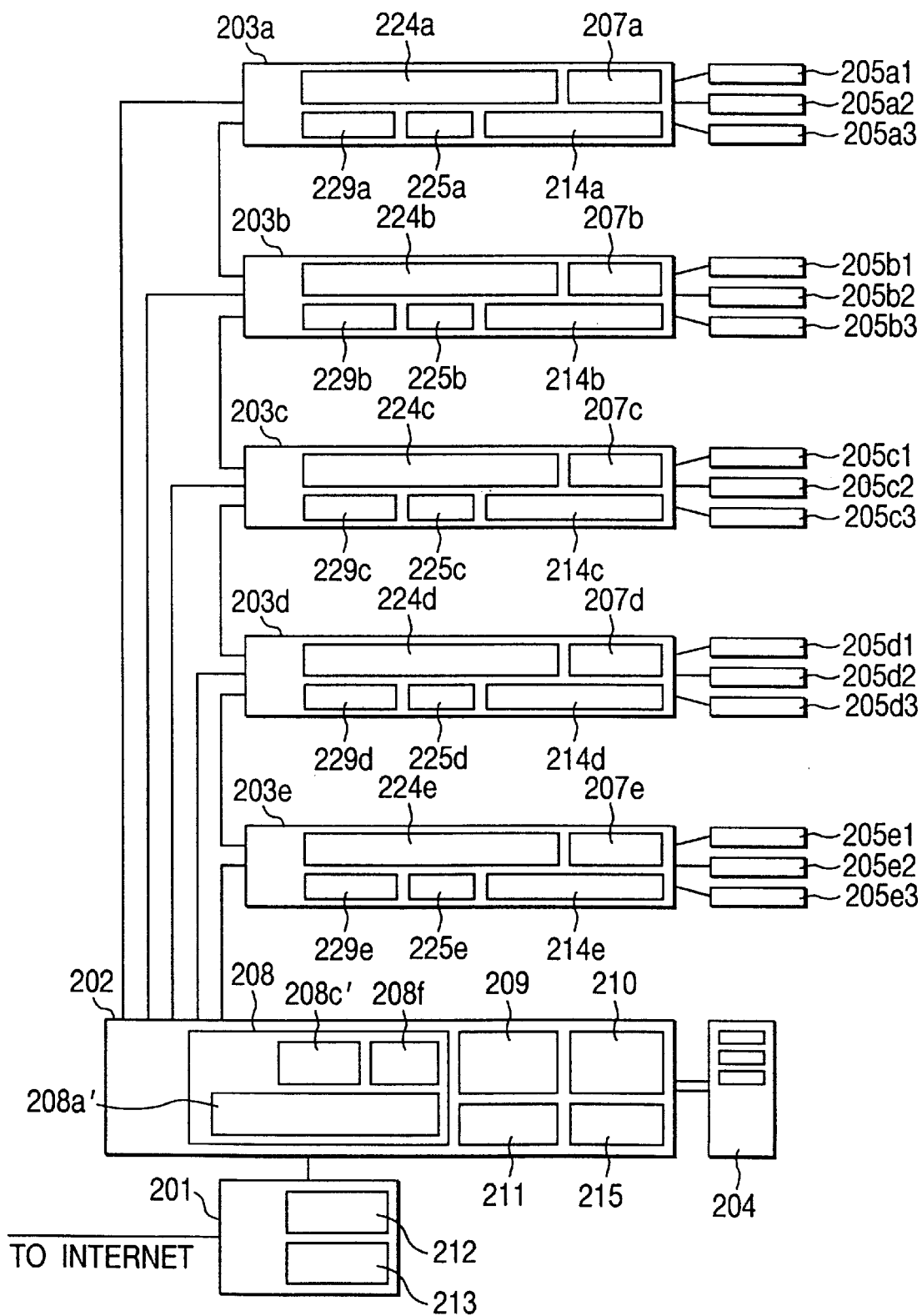
FIG. 32 is a system block diagram of the invention.
Figure 33:
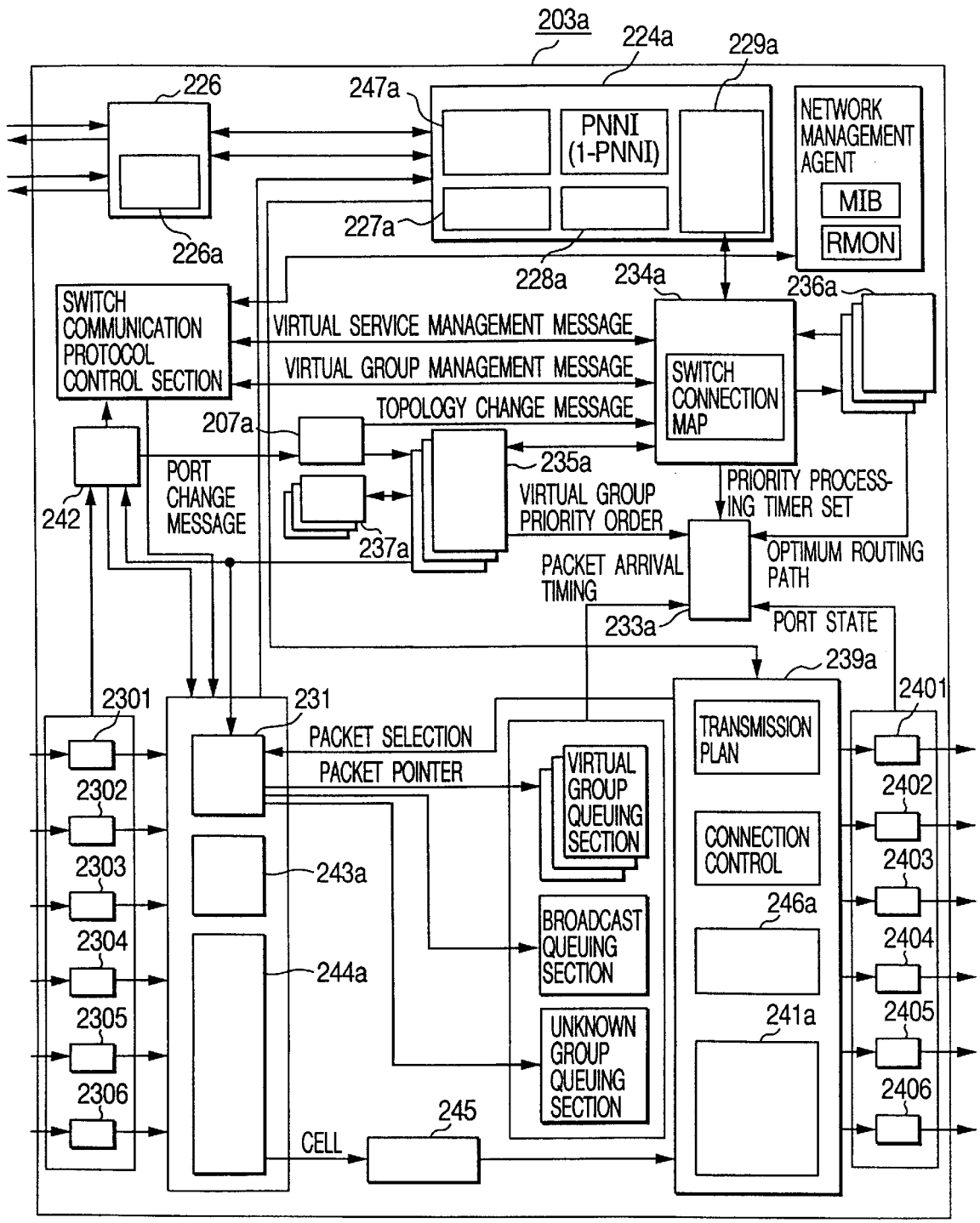
FIG. 33 is a block diagram of a local ATM packet switch in the twelfth embodiment of the invention.

FIG. 32 is a system block diagram to show a nineteenth embodiment of the invention. FIG. 33 is a block diagram to show a local packet switch 203a . Parts identical with or similar to those previously described with reference to FIGS. 30 and 31 are denoted by the same reference numerals in FIGS. 32 and 33 and will not be discussed again.

The local switch 203a is a cell switch (so-called ATM switch, hereinafter called local ATM switch) and comprises an ATM interface section 226 to which an ATM backbone is connected as in the eighteenth embodiment.

It further comprises a cell conversion section 243a for decomposing a packet from an input port 2301 . . . into ATM cells, a cell buffer 244a for temporarily storing ATM cells, a cell bus type switch 245a for sending ATM cells from the cell buffer 244a to a forwarding section 239a, and a packet conversion section 246a for composing the ATM cells sent through the cell bus type switch 245a into the original packet. On the other hand, an intranet routing/bridge protocol processing section 224a . . . contained in the local ATM switch 203a comprises internet protocol processing facilities in the ATM, such as an ATM LAN emulation client (LEC) section 227a and an MPOA section 247a.

The ATM interface section 226 once converts ATM cells into a packet for identifying and filtering packets according to virtual groups. Therefore, processing at the packet level is similar to that in the eighteenth embodiment, and facilities similar to the local switches 203a . . . of the eighth to seventeenth embodiments can be installed.

By the way, the cell conversion section 243a of the local ATM switch 203a in the twelfth embodiment may be changed to the packet conversion section 246a, the cell buffer 244a to a packet buffer, the packet conversion section 246a of the forwarding section 239a to the cell conversion section 243a, the cell bus type switch 245a to a packet bus type switch, and the local ATM switch 203a to a packet switch rather than the cell switch. Also in this case, processing at the packet level is similar to that in the eighteenth embodiment, and facilities similar to the local switches 203a . . . of the eighth to seventeenth embodiments can be installed. However, normally cells are relayed intact in the ATM switch and virtual group identification and tagging are entered in the packet switch and cell switch edge portion, thus the configuration of the eighteenth embodiment is general.

In the nineteenth embodiment, the local ATM switches 203a . . . each comprising the ATM interface section 226 are connected to each other and route intranet packets directly to adjacent local ATM switches according to an intranet routing table for providing redundancy for the backbone.

The following method is also possible if the end system can deal with the method: A plurality of protocols may be provided in each end system and classified into those covering internet access segments and those covering VLAN segments. Alternatively, a plurality of MAC addresses and network addresses may be provided for the internet protocol of each end system and classified into addresses corresponding to internet access segments and addresses corresponding to VLAN segments.

As described above, the eighth to nineteenth embodiments of the present invention relate to the technique to combine the internet in conformity with the standard with the unique intranet and use together with.

20th Embodiment

Figure 34:
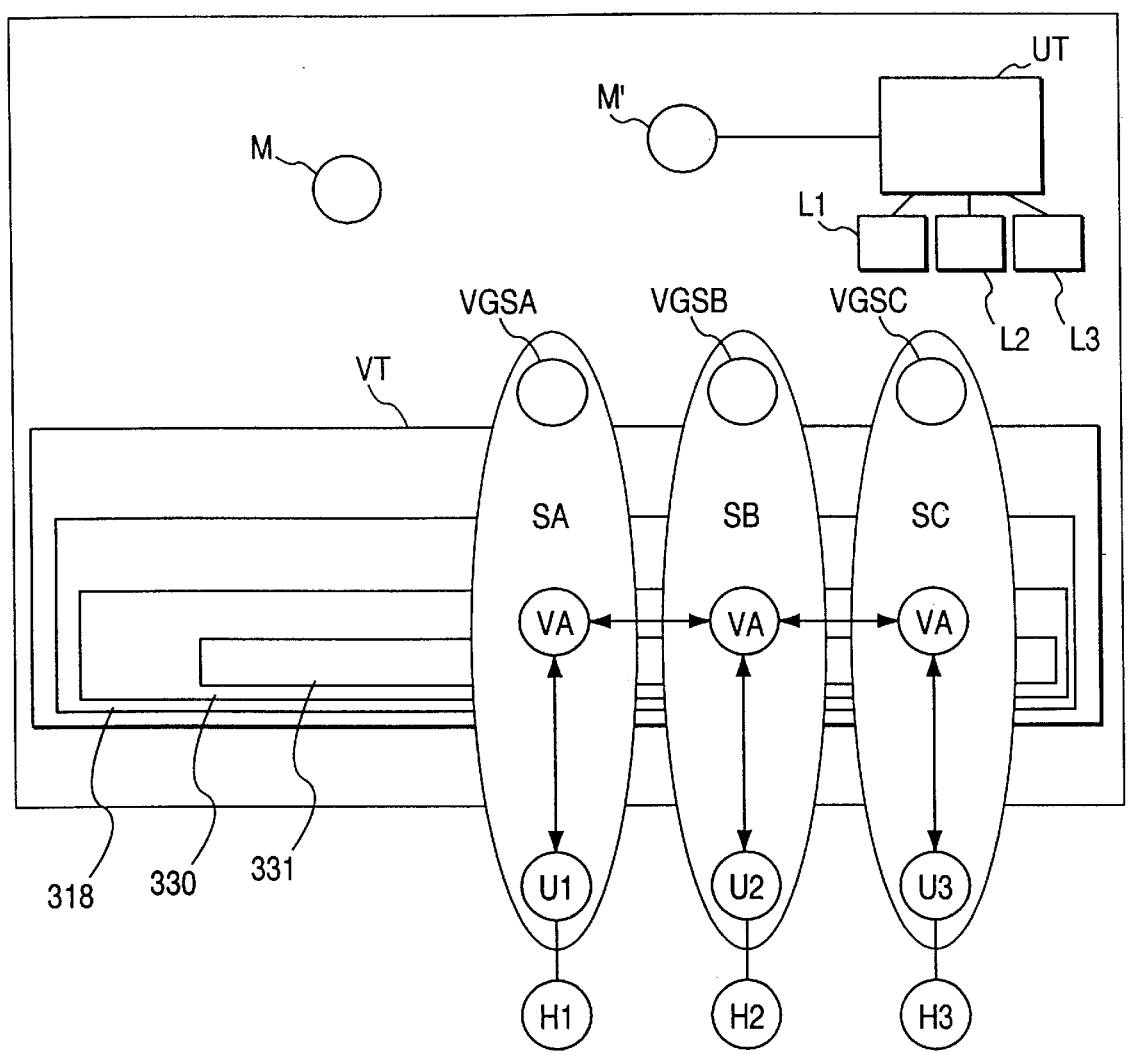
FIG. 34 is a conceptual block diagram to show a configuration example of the invention.

FIG. 34 shows a system configuration of a twentieth embodiment of the invention, which can be adopted to the virtual LAN system according to the present invention. As shown here, in a virtual network divided into segments SA . . . , virtual group agents VA . . . can set client addresses of virtual groups and a user environment for each virtual group in a virtual group registration/routing table VT wherein segment configurations of different virtual groups in network management, network service, groupware, etc., are set, and customize network management and network service dynamically in coordination with users H1 . . . through clients U1 . . . in response to user demands for providing a virtual network environment as a user environment meeting the user demands such as unicast and multicast traffic band allocation in virtual group units.

The virtual group registration/routing table VT can take a format in which it is divided into parts for each group if the table is not of small scale. The table VT includes a client definition table 318, a user environment setting table 330, and an linkage table with a different system 331.

The virtual group originally is set for each work group for users to collaborate with each other for a specific purpose. To enable the user H1 . . . to customize the virtual group, as shown in FIG. 34, the client address of the virtual group and a user environment with virtual group setting for each group can be set in the client definition table 318 and the user environment setting table 330 of the virtual group registration/routing table VT from the viewpoint of the user H1 . . . The virtual group agent VA automatically customizes network management and network service dynamically in coordination with user H1 . . . in response to change in user H1 . . . demands for providing a virtual network environment as a user environment meeting the user H1 . . . demands such as unicast and multicast traffic band allocation in virtual group units. The services to be customized include facilities use service concerning utilities UT, computing service concerning groupware, amenity service concerning a residential or amenity environment of the user H1 . . . , networking service concerning the virtual group, and administration service concerning network management, for example.

The virtual group does not change a packet, and the virtual group agent VA in switch S supports. There is no problem via WAN.

In FIG. 34, VGSA . . . denotes a virtual group server, M denotes a virtual network management server, M' denotes a virtual network management server in a different system, and UT denotes security utilities such as lighting L1, air conditioning L2, and locking L3.

Next, switch S used with the above embodiment will be discussed with specific examples.

Figure 35:
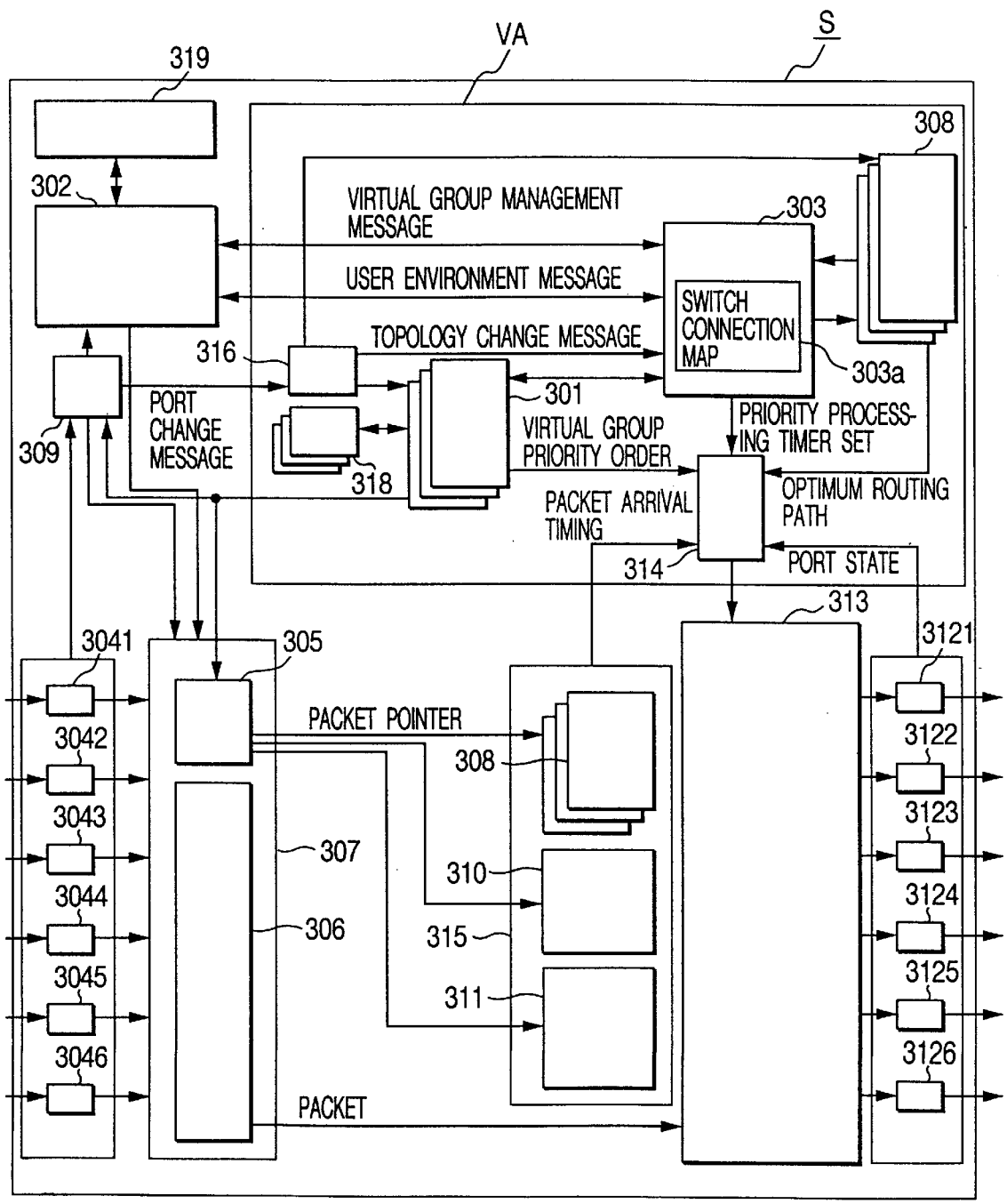
FIG. 35 is a block diagram of a switch of the invention.

FIG. 35 shows the configuration of the switch S. A user environment is set in a client definition table 318 shown in FIG. 36. The client definition table 318 is connected to a virtual group registration table 301 in a virtual group agent VA built in the switch S in FIG. 35, and is pointed to by a pointer in the virtual group registration table 301 shown in FIG. 38.

A switch communication protocol communication section 302 sends a user environment message to a virtual group distributed management section 303.

A packet from an input port 341 . . . is stored in an area of a packet buffer 306 specified by a buffer management section 305 of a buffer section 307 and at the same time, the buffer management section 305 generates a pack pointer pointing to the storage location of the packet.

If a virtual group identification section 309 collates a pair of the client addresses of the packet destination and source with the virtual group registration table 301 and identifies the corresponding virtual group, the packet pointer is stored in a virtual group queuing section 308 of a buffer pointer queuing table 315 for queuing the virtual group only with the pointer without moving the data in the packet buffer 306 of a shared memory. If the packet is a broadcast packet, its packet pointer is stored in a broadcast queuing section 310.

Further, if the packet contains a unicast address and does not correspond to any virtual group, the pointer pointing to the storage address of the packet in the packet buffer 306 is queued on an unknown group queuing section 311.

When a virtual group control section 314 detects the port state of output ports 3121 . . . and finds an output port 3121 . . . idle, it instructs a forwarding section 313 to send the packet. The forwarding section 313 reads the pointer of the specified packet from the buffer pointer queuing table 315 and sends the packet data in the packet buffer 306 pointed to by the pointer through the idle output port 3121 . . .

For scheduling control of forwarding the packets, the virtual group control section 314 uses a timer in the virtual group control section 314 and forwards the packets in the virtual group queuing order at short time intervals according to the virtual group priorities.

Generally, virtual groups for executing communication of video information, etc., with much traffic are given high priority; virtual groups for online system transaction, feedback control, etc., even with low traffic for which reliable message transmission within the permissible time is required can also be given high priority.

The timing interval of processing of packets of virtual groups with low priority in batch processing, file transfer, etc., is the longest; the transmission buffer is scanned in a shorter period for virtual groups with higher priority and the packet of the virtual group with the highest priority is handled first.

The packet assigned high priority is forwarded within the permissible time set in the priority processing timer by the virtual group distributed management section 303 after the data is input.

Here, the following three types of virtual groups, (1-1) VLAN group, (1-2) Virtual network group and (1-3) Virtual custom group described in the first embodiment are formed according to client addresses and virtual groups different in definition method of protocol layer, etc., can be operated solely or be mixed.

The virtual custom groups most match organizations such as enterprises as main client addresses of segmentation of a virtual network of the invention.

The virtual network groups also become virtual network objects.

The virtual groups are identified in the order of virtual custom group, virtual network group, and virtual LAN group as the custom LAN switch. Operation as the third-layer switch in the virtual network group order or as the second-layer switch for identifying virtual groups only with MAC addresses is performed according to the installation state or selection. Thus, for the client addresses in the virtual group registration table and a virtual routing table, the network address and the user-defined address are blank in the second-layer switch, the user-defined address is blank in the third-layer switch, and all of the MAC address, network address, and user-defined address are specified in the custom switch.

When ports differ although a client address match is found as a result of the virtual group identification in the layer order of the virtual custom group, virtual network group, and virtual LAN group for a terminal move, a virtual group learning section 316 in the virtual group agent VA shown in FIG. 35 receives a port change message from the virtual group identification section 309 and outputs a topology change message. The virtual group learning section 316 performs different operation depending on whether or not the home switch of the terminal is changed. If no home switch change is made, the virtual group learning section 316 updates the home switch port in the virtual group registration table 301, thereby executing dynamic automatic configuration management.

If home switch change is made, the virtual group distributed management section 303 of a new home switch to which the terminal is moved exchanges a virtual group management message for updating the home switch name and the home switch port in each of the virtual group registration tables 301 of other switches.

The switch S contains the virtual group routing table 308 for each virtual group and the buffer pointer queuing table 315. Since another switch is cascaded to a port of one switch in the distributed switch configuration, a plurality of virtual groups and a plurality of terminals are assigned for each port and the switch to which each terminal is directly connected is the home switch of the terminal and the terminal is connected to a port of the home switch.

If the terminal is directly connected to one switch, the home switch name in the virtual group routing table 308 of the switch is the switch name of the terminal. If the terminal is not directly connected to one switch S1 . . . , the home switch name differs and the routing connection port in the virtual group routing table 308 is the port name corresponding to the optimum route leading to the home switch to which the terminal is connected.

When the virtual group learning section 316 sends a topology change message to the virtual group distributed management section 303 for a terminal move, the virtual group distributed management section 303 of a new home switch to which the terminal is moved exchanges a virtual group management message for updating the home switch name and the home switch port in each of the virtual group registration tables 301 of other switches. The virtual group distributed management section 303 of a switch adjacent to the home switch updates the routing connection port and client distance in the virtual group routing table 308 and sends a virtual group management message to another adjacent switch S1 . . . for providing update information of the virtual group registration table 301 and the virtual group routing table 308 accompanying the topology change. When receiving the virtual group management message, the switch updates the virtual group registration table 301 and the virtual group routing table 308 of the switch according to the update information of the virtual group registration table 301 and the virtual group routing table 308 accompanying the topology change, and sends the virtual group management message to other switches in sequence for updating the virtual group registration table 308 and the virtual group routing table 308, thereby learning for the terminal move and dynamically updating the virtual group routing table 308.

As the virtual group registration table 301 is updated in response to the port change message, the topology change message, and a user environment message processed by the virtual group distributed management section, the client definition table 318 shown in FIG. 36 is also updated and the setup user environment is also inherited for a physical move of the network and is automatically updated by learning.

The virtual group distributed management section 303 exchanges a management message with other switches and receives a user environment message according to a user request as virtual group agent VA for exchanging switch management information such as the MAC addresses and virtual groups of the switches, thereby entering the connection port leading to the optimum routing path with a minimum number of switch repetition stages for each switch in the routing connection port of the virtual group routing table 308 of each switch and setting the priority processing timer of scheduling responsive to the number of switch S repetition stages to provide the delay time for priority processing.

Each switch S can see which switch connected to which port by virtual group identification and virtual group learning. Further, the virtual group distributed management section 303 exchanges change information of the virtual group routing table 308 with other switches S. If a user environment message according to a user request and switch S topology change information are entered, a virtual group management message is transferred in sequence between the adjacent switches S, thereby learning for the terminal move and updating the virtual group routing table 308 dynamically.

Since the client addresses of members are registered for each virtual group and the optimum routing path between members of each virtual domain is entered in the virtual group routing table 308, the virtual group control section 314 selects an optimum routing path between ports in each virtual group and forwards a packet by setting the priority processing timer. Resultantly, the delay time of a packet with high priority is provided.

For a move or change of the switch S itself, the virtual group distributed management section 303 updates the routing connection port and the client distance in the virtual group routing table 308 by transferring a virtual management message in sequence between the adjacent switches.

For multicast and broadcast of virtual group, forwarding processing to ports is performed in sequence based on the virtual group routing table 308 set by the virtual group distributed management section 303.

Seeing the client address of the destination, the packet is forwarded to the previously learned port. A broadcast packet and a packet with a destination address not contained in the table are output from a switch domain, thus are multicasted to all ports.

In response to a virtual group VA change request, the agent of the home switch of the terminal updates the virtual group registration table 301 and the virtual group routing table 308.

The optimum connection port address indicating which port of switches S distributed over the network the virtual group VA is connected to is entered in the virtual group routing table 308 of each switch S distributed over the network. This means that the routing table is formed for each virtual group.

To show the structure of the virtual group routing table 308, the virtual group registration table 301 for virtual group identification and virtual group learning and the virtual group routing table 308 for forwarding from output ports are divided for the switch S shown in FIG. 35.

In the embodiment, the client addresses of the destination and the source of a packet are collated with the virtual group registration table 301 and the virtual group containing both the client addresses of the packet destination and source is identified. Thus, as shown in FIG. 38, the virtual group registration table 301 and the virtual group routing table 308 can be defined as the same structure and can also be brought together on installation.

The optimum connection port address is entered in the virtual group routing table 308 in FIG. 38 as the routing connection port. That is, in the distributed switch configuration, another switch is cascaded to a port of one switch, thus for the port to which a switch is connected, the connection port becomes a port name corresponding to the optimum route leading to the home switch S1 . . . to which the terminal is connected.

When a port change message is output when ports differ although a client address match is found as a result of the virtual group identification for a terminal move, the virtual group learning section 316 sends a topology change message to the virtual group distributed management section 303, which then learns in response to a user environment message according to a user request and the topology change and dynamically updates the virtual group routing table 308.

The virtual group identification section 9 collates a pair of client addresses (1) and (2) of the packet destination and source with the virtual group registration table 301 and identifies the virtual group containing both the client addresses of the packet destination and source.

The virtual group learning section 316 dynamically executes automatic configuration management for a terminal move. That is, when ports differ although a client address match is found as a result of the virtual group identification for a terminal move, the virtual group learning section 316 outputs a port change message for dynamically updating the virtual group registration table 301, thereby executing automatic configuration management automatically.

Client addresses and the priority for each virtual group can be set in the virtual group registration table 301 and the virtual group routing table 308 of each group in the switch S As shown in FIG. 38. The virtual group control section 314 allocates a band of each traffic type of unicast, multicast, and broadcast in group units in response to the virtual group priority. The forwarding section 313 transfers a packet to a specified port by scheduling control of the virtual group control section 314.

In the configuration in which the connection ports of virtual groups are distributed to the switches distributed over the network and the virtual group registration tables 301 and the virtual group routing tables 308 are distributed to the switches, the virtual group identification section 309 of each switch S has the virtual group learning section 316 for collating input port 341 . . . and the packet source address with the virtual group registration table 301, detecting topology change such as a terminal move, and automatically updating the virtual group registration table 301 and the virtual group routing table 311. The virtual group distributed management sections 303 of the switches S as virtual group agents VA dynamically manage the virtual group registration tables 301 and the virtual group routing tables 308 distributed to the switches S in coordination with each other based on topology change detection of a terminal move, a switch S move, etc., whereby virtual groups can be shared among the switches S in the network.

Virtual group agents VA distributed to the switches can also be installed in virtual group servers VGS each acting as a representative in virtual group units or for a virtual group cluster. The virtual group servers VGS can manage the state of the virtual group agent VA and mediate communication between the agents VA and also dynamically manage the virtual group registration tables 301 and the virtual group routing tables 308 in coordination with each other as a switch S agent function. The virtual group registration tables 301, the client definition tables 318, and the virtual group routing tables 308 updated and managed in the virtual group servers VGS are cached in the distributed switches S and the virtual group sever VGS distributes change information in the tables to the switches S.

A virtual group is formed for each terminal according to client addresses entered in a packet without adding an extra header or tag to the packet of a frame format in conformity with a standard as shown in FIG. 2 and independently of switch S ports. The client address represents a feature set of a MAC address determined by a medium access method of LAN, a network address determined by a network operating system or communication protocol, an application address defined by application software or user H1 . . .

General LAN application is a client-server model wherein a plurality of clients share a database in the server; multiple access to the database is made in online transaction processing of account-system jobs. Thus, the delay time introduces a problem because of synchronization. High-speed communication and small delay time are required for data extraction (data query) to grasp, analyze, and simulate information and support decision making and for dataware houses which want to know the result as early as possible interactively. In a video conference in multicast communication, a larger amount of data needs to be sent in small delay time; high priority is applied and the data amount increases. A virtual corporation via WAN requires server-to-server communication at remote sites and electronic commerce needs to interactively communicate with a large number of terminals at remote sites. Monitor control messages for maintaining and managing the network must be handled at the highest priority.

Figure 37:
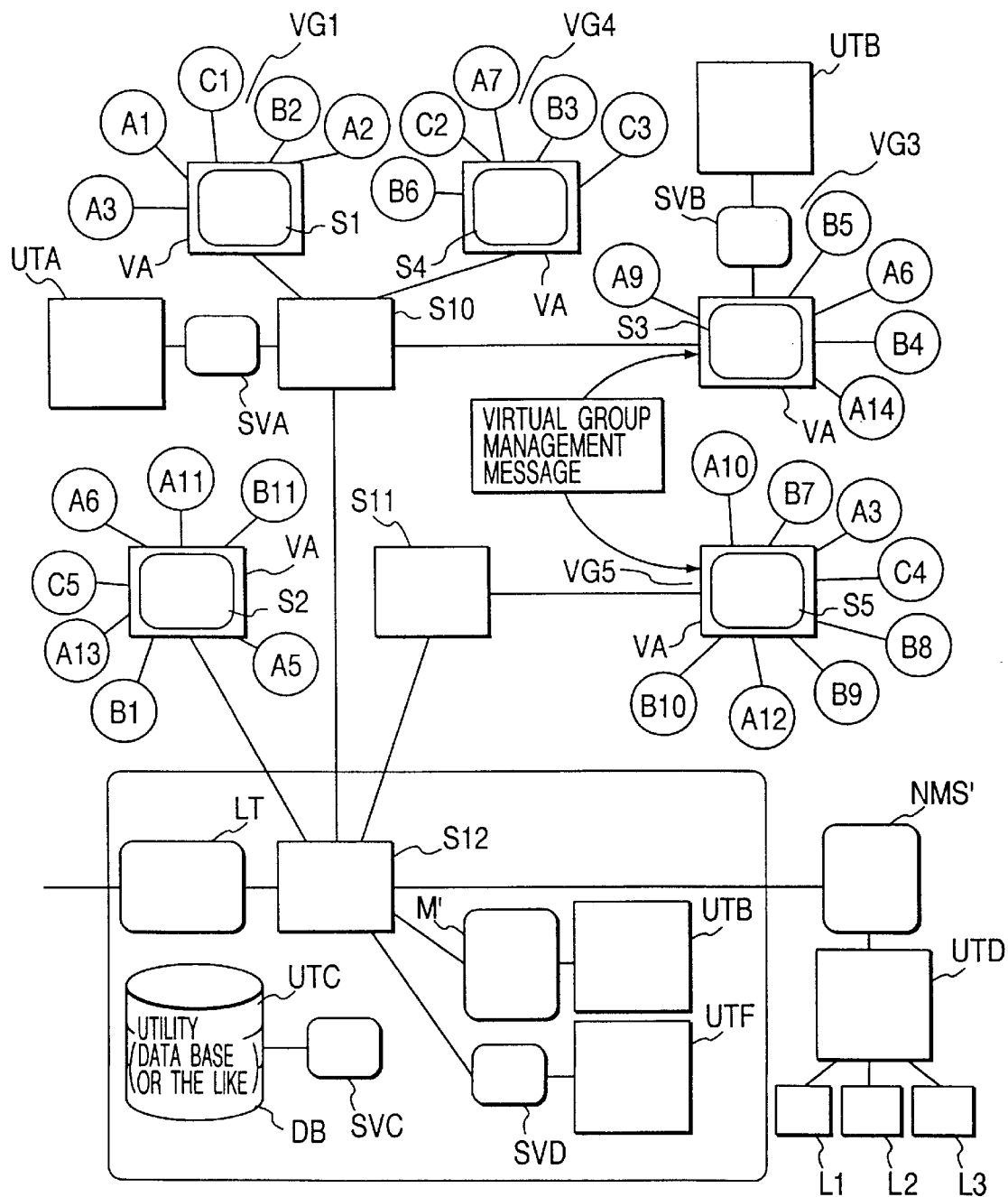
FIG. 37 is a block diagram of a network system of the invention.

In the network shown in FIG. 37, a plurality of switches are placed in a distributed manner like S1 . . . as local switches and terminals A1 . . . , B1 . . . , and C1 . . . connected to the switches S1 . . . belong to different virtual groups VG1 . . . To be noted here, only one virtual LAN group (second layer level) can be defined for each MAC address of a network interface card (NIC) of each terminal, but a plurality of virtual network groups (third layer level) different in protocol can be defined and a plurality of virtual custom groups can be defined at the application level. FIG. 37 shows communication with the terminals A1 . . . , B1 . . . , C1 as one virtual group VG for simplicity.

Figure 39:
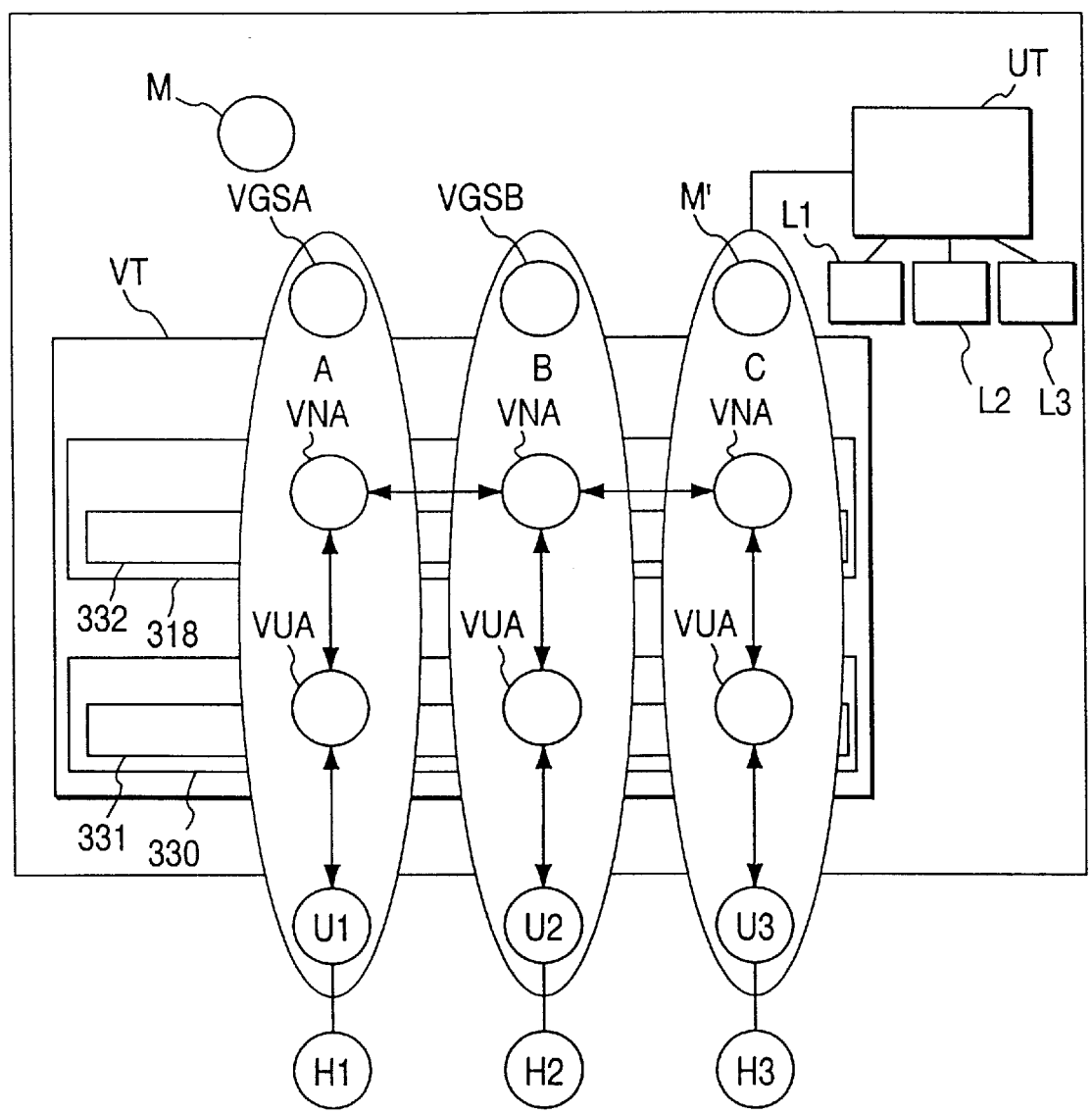
FIG. 39 is a conceptual block diagram to a configuration example of the invention.

The system shown in FIG. 37 is abstracted as shown in FIG. 39. In this case, virtual LAN groups (second layer level) are represented as switched domains and communication between the switched domains and broadcast wall are represented as routing service between switched domains, and placement of network service server and network management server NMA among the switched domains are shown.

As shown in FIG. 37, the virtual group agent VA of the switch S shown in FIG. 35 is placed in the distributed switches S1 . . . and the virtual group agents VA . . . support the virtual group dynamically in coordination with each other. As a result, virtual group registration tables 301 and virtual group routing tables 308 provide dynamic virtual group configuration for the optimum routing and a terminal move as shared table, as shown in FIG. 38.

If the portions of the virtual group agent VA are summarized as portions seeming to be easiest to understand from the conventional switch configuration, the virtual group learning section 316, the virtual group registration table 301, the virtual group routing table 308, the virtual group distributed management section 303, and the virtual group control section 314 become important components, as shown in FIG. 35. In addition, a port change message extraction function in the virtual group identification section 309 also becomes an important function. The virtual group identification section 309 codes client addresses (1) and (2) together by a hash function and collates the hash function with the virtual group registration table 301 coded by hash functions, so that an increase in the delay time does not introduce a problem as compared with the format of adding a header or tag to a packet.

At the second layer level of OSI protocol layer model with MAC addresses defined as client addresses, in conformity with the conventional standard, an extra header or tag is not added to a packet and terminals A1 . . . , B1 . . . , C1 . . . and virtual LAN groups in conformity with the conventional standard are supported.

In this case, the virtual group identification section 309 of collates a pair of MAC addresses (1) and (2) of the packet destination and source with the virtual group registration table and identifies a virtual group containing both the MAC addresses. Further, at the third layer level of OSI protocol layer model with a plurality of network addresses depending on protocol defined as client addresses, in conformity with the conventional standard, an extra header or tag is not added to a packet and virtual network groups VG1 . . . of terminals A1 . . . , B1 . . . , C1 . . . in conformity with the conventional standard are supported.

In this case, the virtual group identification section 309 collates a pair of network addresses (1) and (2) of the packet destination and source with the virtual group registration table 301 and identifies a virtual group VG containing both the network addresses.

Further, at the application level of OSI protocol layer model with application addresses defined by the user or application software as client addresses, in conformity with the conventional standard, an extra header or tag is not added to a packet and virtual custom group setting wherein different medium access methods and protocols are mixed is supported.

In this case, the virtual group identification section 309 collates a pair of application addresses (1) and (2) of the packet destination and source with the virtual group registration table 301 and identifies a virtual group VG containing both the application addresses.

Normally, for each client address, the client name is entered in the virtual group registration table 301 in FIG. 38 and the virtual group routing table. Different client names can be entered for each virtual LAN group, each virtual network group, and each virtual custom group. If a virtual LAN group, virtual network group, and virtual custom group are defined for one MAC, virtual LAN group definition rows, virtual network group definition rows, and virtual custom group definition rows are contained in the virtual group registration table 301 and the virtual group routing table 308. Further, client definition table pointer is contained.

The virtual group identification section 309 collates addresses with the virtual group registration table 302 in the order of the virtual custom group definition rows, the virtual network definition rows, and the virtual LAN group definition rows.

The machine type is also entered in the client name so that the client name is also the identification code of the machine type such as switch or terminal. If the machine type is switch, the virtual group distributed management section enters the MAC address directly connected to a port of the switch or indirect connection in a switch connection map. Connection map information of the entire network is provided by using the virtual group registration table and the switch connection map in combination. Since connection of adjacent ports is seen, topology is drawn on a connection relation chart, which is called a map. If topology is a tree structure, route search is easy to make. If topology is meshes, distances of routes as transmission time need to be compared. If switches having the same transmission speed are connected at multiple stages, the number of stages is assumed to be the distance. For example, how many paths from terminal A1 to terminal A9 exist is reflected in the numeral in the client U distance of each terminal in each virtual group routing table 308.

The configuration of the forwarding section 313 depends on the switch configuration method. Most of known systems adopt a shared high-speed parallel bus; the band width of the bus is set to about twice the sum total of port transmission bands and the configuration is often used for a chassis-type back plane. In a parallel configuration with a crosspoint switch, input buffer type, output buffer type, and the like are available. Since the packet buffer 306 is a shared memory, the entire configuration in FIG. 35 is buffer sharing type (store and forward switching type), but the above-mentioned switching methods can be used in combination for the forwarding section 313.

Check sum in the frame format in FIG. 2 is not executed, whereby the LAN switch S can be operated as cut-through type. The operation mode of the switch, namely, the store and forward switching type for executing check sum or the cut-through type for executing no check sum can be defined in the group type in the virtual group registration table. The cut-through type enhances the throughput of the switch, but cannot filter a defective packet. For the forwarding priority, the priority set in the virtual group registration table takes precedence over the operation mode of the switch. Since the switches are connected at multiple stages, the packet transmission delay time varies depending on how ports are idle in each switch and the queuing wait time. Thus, it is necessary to insure the transmission time in coordination as a system.

As a control packet between the switches, a virtual group management message is exchanged between the virtual group distributed management sections 303. Normally, network management protocols such as SNMP (RFC1157: Simple network management protocol) for managing each device on a subnetwork based on MIB (management information base) and RMON (RFC1271: Remote monitoring) for managing the entire subnetwork are exchanged between a network management protocol agent 319 and an external network manager for supporting the industry standard such as collection of statistical information.

In a virtual general network, virtual group information is added to packets or packets are classified according to information of subnet addresses, etc., of a third-layer protocol of OSI protocol layer model, and the switch references the information. It is intricate to change subnet setting, etc., in router segmentation; network management and maintaining costs introduce a problem that cannot be bypassed in a system involving change of close to 30 percent of terminals for a year.

Virtual LAN groups of the invention for registering virtual groups only with MAC addresses are intended for priority processing, learning load distribution, and raising of routing efficiency. In priority processing, for example, priorities are assigned in the order of a management group, a time critical group insuring the delay time, a switch control group for updating registration tables dynamically, high-speed terminals, and low-speed terminals requiring no priority processing from high to low. SNMP or RMON network management is set in the management group.

Normally, the management group and time critical group with high priority are registered dynamically and the switch control group, high-speed terminals, and low-speed terminals requiring no priority processing are registered after dynamic learning. In the system example of the embodiment of the invention shown in FIGS. 34 and 37, the network management service server can also manage the virtual group registration tables 301 and the virtual group routing tables 308, in which case the server collates a lookup table cached in the switch S1 . . . with a client address. In the configuration shown in FIG. 34, broadcast from a server . . . can also be transmitted to the entire virtual group in server-to-server connection.

Virtual service of segment A can be received at only the terminals belonging to the virtual group VG1. Broadcast delivered from client U is limited to the virtual group VG to which the client U belongs and the network service server follows unknown group broadcast from the client U in coordination with the virtual group server VGS. For the unknown group broadcast, the virtual group server VGS sees the protocol type of packet and delivers the broadcast to a specific network service server or virtual group server VGS. The network service server sets a new virtual group.

21st Embodiment

In a twenty-first embodiment of the invention, as shown in FIG. 37, connection ports of virtual groups VG1 . . . are distributed to switches S1 . . . and S10 . . . distributed over a network and virtual group registration/routing table VT and virtual group agent are placed in the switches S1 . . . and S10 . . . in a distributed manner.

As shown in FIG. 39, the virtual group agent VA segments various utilities UT such as BA utilities UT of security, etc., such as air conditioning L2, lighting L1, and locking L3 into virtual groups VG and dynamically manages the virtual group registration/routing table VT distributed to the switches S1 . . . , whereby the virtual group agents VA execute network service of customizing the utilities UT and automatic configuration for user H1 . . . in coordination with each other in response to a request for setting virtual network management server M related to resource use of a different system from the user H1 . . .

Figure 40:
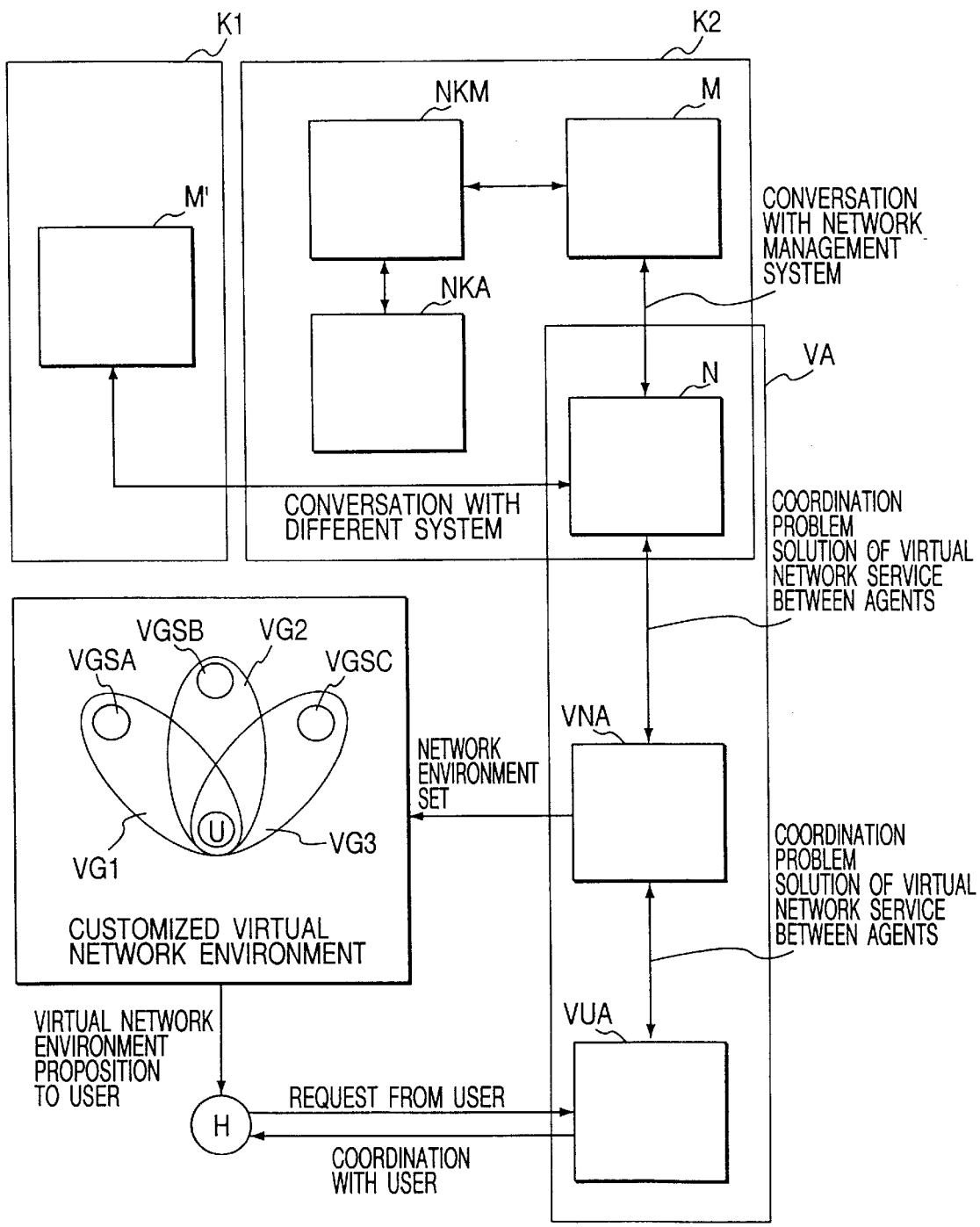
FIG. 40 is a conceptual illustration of roles/characters and function of agents of the invention.

If the virtual group agent VA is made up of two types of agents different in role/character, namely, virtual network agent VNA and virtual user agent VUA, these agents VNA and VUA execute network service of customizing the utilities UTA . . . and automatic configuration for the user H1 . . . in coordination with each other in a configuration wherein the virtual group registration/routing table VT for supporting a user environment and the virtual network agent VNA are placed in the switches S1 . . . in a distributed manner and a user environment table 30 and the virtual user agent VUA are placed in the switches S1 . . . or terminals A1 . . . , B1 . . . , C1 . . . in a distributed manner. That is, as shown in FIG. 40, the virtual user agent VUA accepts a utility customization request made by the user H1 . . . through conversation with the user H1 . . . and manages the user environment table 330 and the virtual network agent VNA manages the virtual group registration/routing table VT for segmenting various utilities UT . . . into virtual groups and executing network service of automatic configuration for supporting the user environment.

22nd Embodiment

In a twenty-second embodiment of the invention, as shown in FIG. 37, connection ports of virtual groups VG1 . . . are distributed to switches S1 . . . distributed over a network, and virtual group registration/routing table VT and virtual group agent VA are placed in the switches S1 . . . in a distributed manner. In this configuration, as shown in FIG. 38, a different system linkage table 331 of a user environment setting area for each group in the virtual group registration/routing table VT is formed and linkage conditions of utilities UT of building automation BA and utilities UT of a different system can be set. In automatic response to user H1 . . . network resource use requests, terminal move, addition, change, etc., the virtual group agents VA coordinate with each other and segment the resources of a different system into virtual groups in coordination with a different system management server and dynamically manage the virtual group registration/routing table VT distributed to the switches S1 thereby customizing the linkage conditions of the building automation utilities and different system utilities for automatic configuration.

As shown in FIG. 34, the different system linkage table 31 of a user environment setting area for each group in the virtual group registration/routing table VT is formed and the linkage conditions of the building automation utilities and different system utilities can be set and are customized for automatic configuration.

23rd Embodiment

Figure 41:
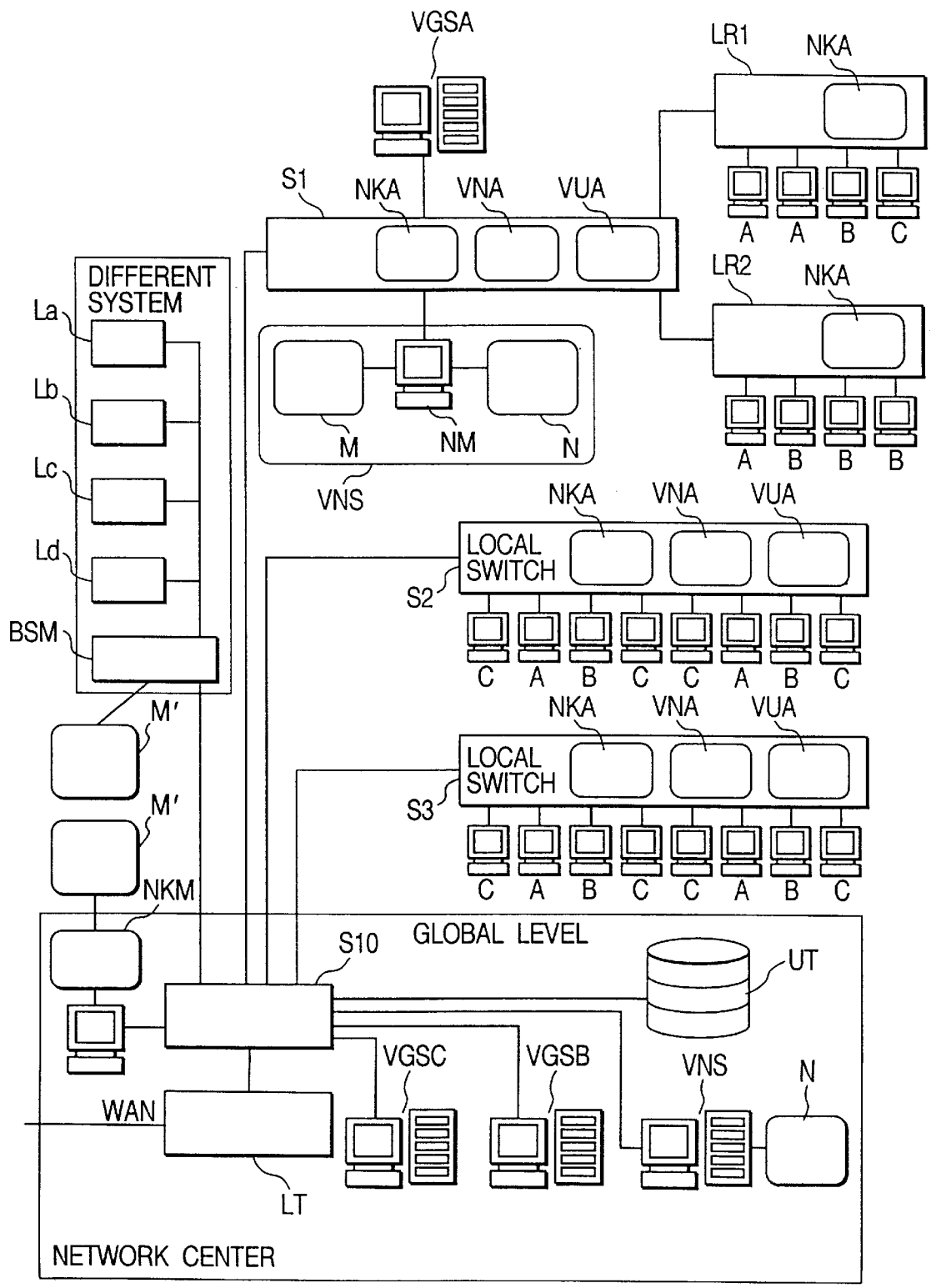
FIG. 41 is an illustration to show the structure of another virtual group registration/routing table of the invention.

In a twenty-third embodiment of the invention, as shown in FIG. 37, connection ports of virtual groups VG1 . . . are distributed to switches S1 ... distributed over a network, and virtual group registration/routing table VT and virtual group agent VA are placed in the switches S1 ...... in a distributed manner. In this configuration, the client addresses of the virtual groups VG1 ... and a user environment can be set in the virtual group registration/routing table VT. As shown in FIG. 41, the virtual group agents VA distributed to the switches S1 ... dynamically manage the virtual group registration/routing table VT in coordination with each other in automatic response to user's network resource use requests, terminal move, addition, change, etc., in accordance with constraints and rules of conflict detection/negotiation/plan correction/learning preset for the network environment for the agents, thereby customizing network management and network service to the user environment and customizing the virtual network environment of user's virtual network definition/setting, network resource use requests, and terminal move, addition, change, etc., to the user environment for automatic configuration.

The virtual group agent VA is made up of the three types of agents different in role or character: virtual user agent VUA, virtual network agent VNA, and virtual network service agent N, as shown in FIG. 40. The agents customize the virtual network environment to the user environment for automatic configuration in coordination with each other as in a conceptual diagram shown in FIG. 42.

Figure 42:
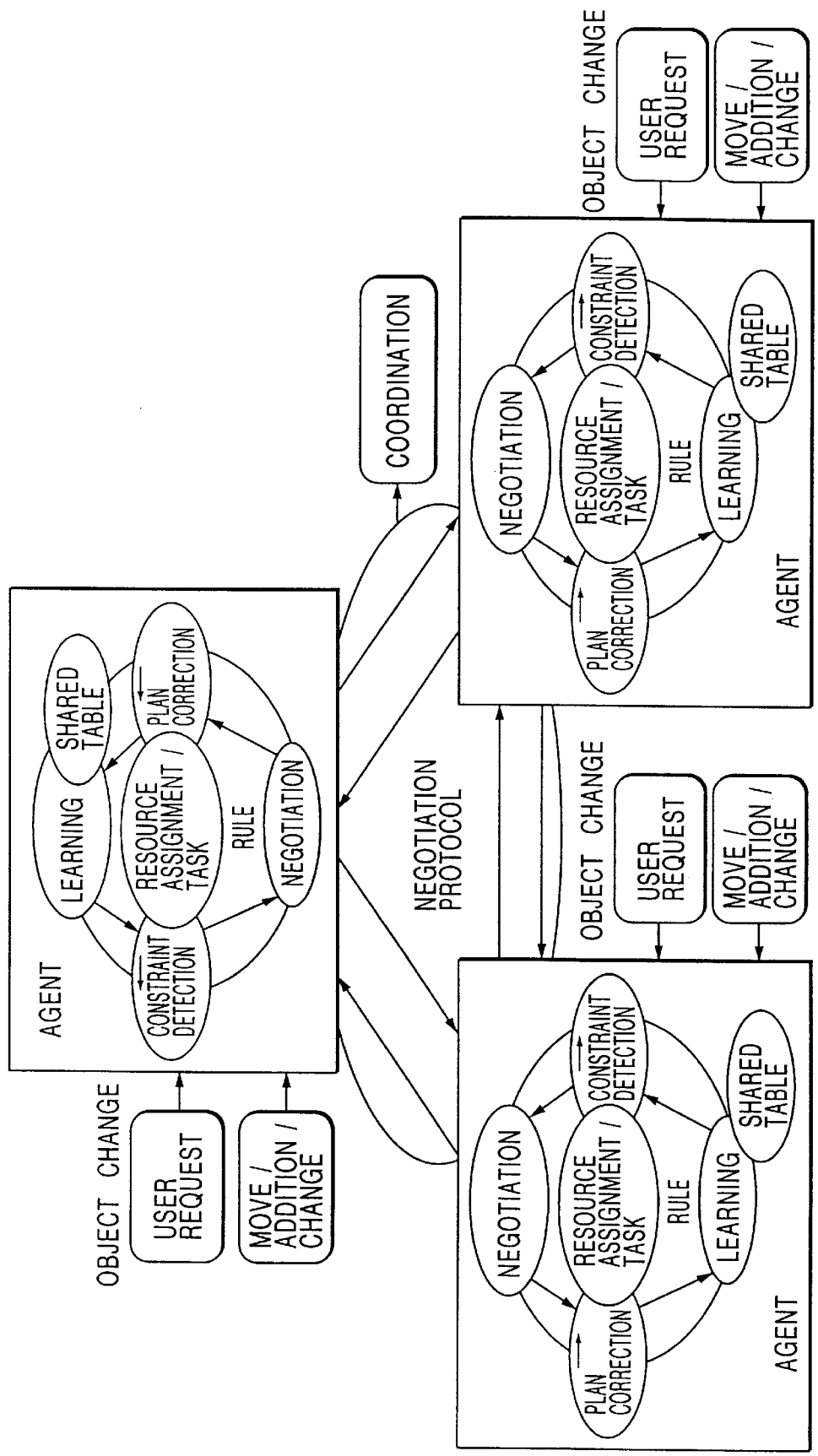
FIG. 42 is a conceptual system block diagram of agents of the invention.

As shown in FIG. 42, the virtual group agents VA (virtual user agent VUA, virtual network agent VNA, and virtual network service agent N as shown in FIG. 40) distributed to the switches S1 ... customize the virtual network environment to the user environment in coordination with each other in automatic response to user's network resource use requests, terminal move, addition, change, etc., in accordance with the constraints and rules of conflict detection/negotiation/plan correction/learning preset for the network environment for the agents.

The network configuration, function, and service are customized so as to fit the end user by the agent function. The individual agents do not know all information concerning the network and get necessary information by negotiation.

24th Embodiment

Figure 43:
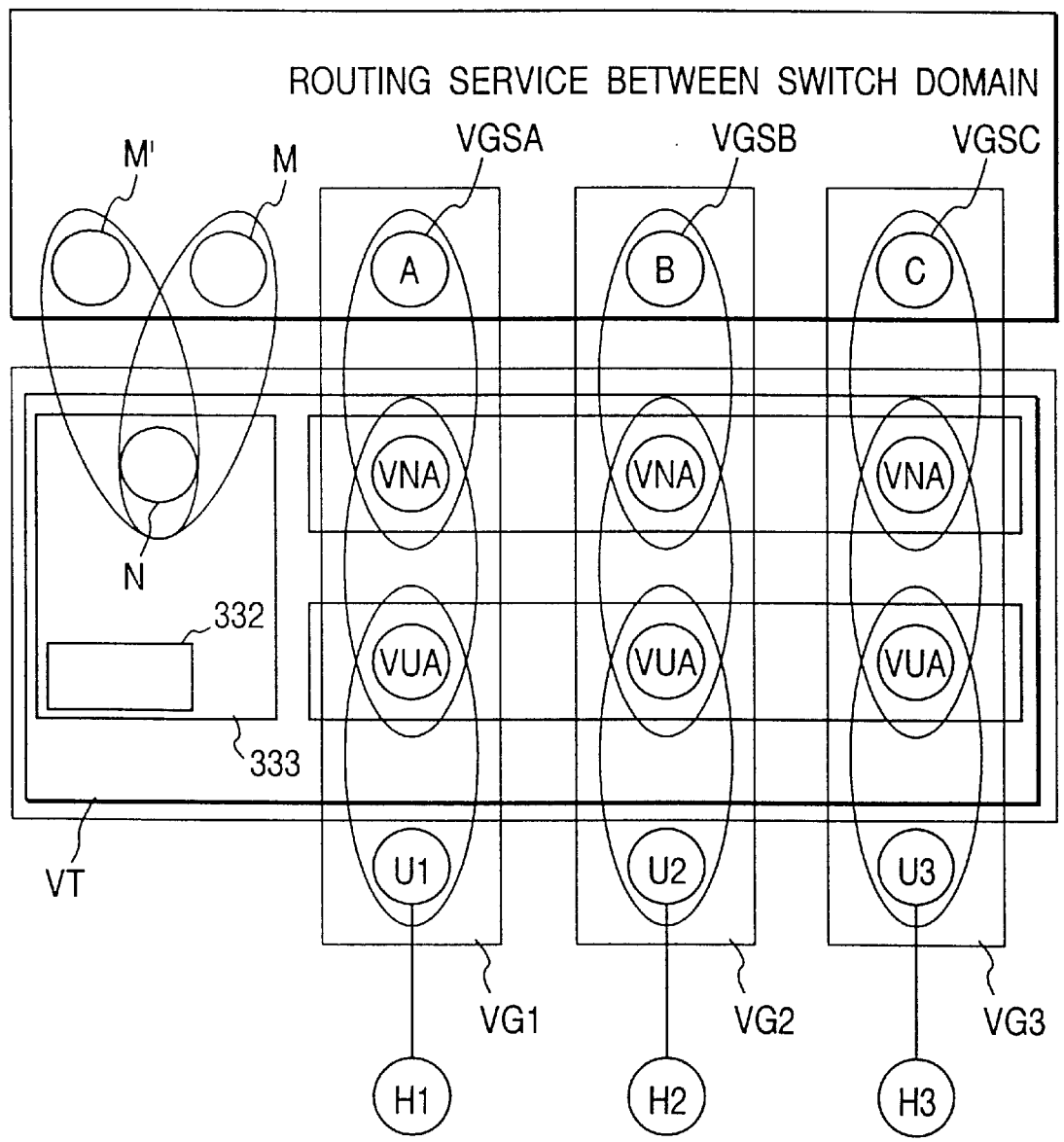
FIG. 43 is a conceptual block diagram to a configuration example of the invention.

In a twenty-fourth embodiment of the invention, as shown in FIG. 37, connection ports of virtual groups VG1 ... are distributed to switches S1 ... distributed over a network and as shown in FIG. 43, a virtual group agent VA is made up of three types of agents different in role/character, namely, virtual network agent VNA, virtual user agent VUA, and virtual network service agent N, a virtual group registration/routing table VT and the virtual network agent VNA are placed in the switches S1 ... in a distributed manner, and a user environment table 330 and the virtual user agent VUA are placed in the switches S1 ... or terminals A1 ... , B1 ..., C1 ... in a distributed manner. In FIG. 43, numeral 333 denotes a virtual network service table.

The virtual network service agent N is placed in any desired location in the network as shown in FIG. 41 (virtual network server VNS in FIG. 41). It manages a virtual network service table 333 of a structure shown in FIG. 44 and segments resources of a different system into virtual groups VG1 ... in coordination with a different system management server M'.

Further, the virtual network service agent N dynamically manages the virtual group registration/routing table VT distributed to the switches in coordination with the virtual network agent VNA, whereby the virtual user agent VUA and the virtual network agents VNA distributed to the switches customize the utilities UT of the different system to the user environment and execute automatic configuration of a network environment in coordination with each other in response to a request for setting virtual network related to resource use of the different system from the user H1.

The agents VNA, VUA, and N customize the utilities UT of a different system to a user environment and execute automatic configuration of a network environment in coordination with each other in a configuration wherein the virtual group registration/routing table VT for supporting the user environment and the virtual network agent VNA are placed in the local switch S1 ... in a distributed manner, the user environment table 330 and the virtual user agent VUA are placed in the local switch S1 ... or terminal A1 ... , B1 ..., C1 ... in a distributed manner, and the virtual network service agent N is placed in any desired location in the network.

The virtual network agent VNA, the virtual user agent VUA, and the virtual network service agent N have roles/characters and functions as shown in FIG. 40. That is, the virtual user agent VUA accepts a utility customization request made by the user H through conversation with the user H and manages the user environment table 30, the virtual network agent VNA dynamically manages the virtual group registration/routing table VT, and the virtual network service agent N segments the resources of a different system into virtual groups.

25th Embodiment

In a twenty-fifth embodiment of the invention, as shown in FIG. 37, connection ports of virtual groups VG1 ... are distributed to switches S1 ... distributed over a network, virtual group registration/routing table VT and virtual network agent VNA are placed in the switches S1 ...... in a distributed manner, and a user environment table 330 and a virtual user agent VUA are placed in the switches S1 ... or terminal A1 ... , B1 ... , C1 ... in a distributed manner, and as shown in FIG. 41, a virtual network service agent N is built in a local network manager NM of a distributed management system. In automatic response to user H's network resource use requests, terminal move, addition, change, etc., the virtual user agent VUA and the virtual network agents VNA distributed to the switches S1 ... coordinate with each other and the virtual network service agent N dynamically manages the virtual group registration/routing table VT distributed to the switches S1 ... in coordination with the virtual network agent VNA and a virtual network management server M at global level GL for managing and operating a multivendor virtual network, thereby customizing a multivendor integrated virtual network environment in addition to network management conforming to the standard for automatic configuration in the local network manager NM.

A general distributed management system is made up of a network management manager NKM for executing centralized management of the entire network and local network managers NM for executing distributed management; in local portions, the network management manager NKM in FIG. 40 is replaced with the local network manager NM. In the configuration example shown in FIG. 41, the network manager NM in the local switch S1 ... is contained in a virtual network management system K2 in FIG. 40. In this embodiment, in FIG. 40, virtual network management server M and virtual network service agent N of the virtual network management system K2 are integrated into one at the local level of distributed management.

As shown in FIG. 41, the virtual network service agent N is built in the local network manager NM of the distributed management system and the virtual network service agent N customizes the multivendor integrated virtual network environment in addition to network management conforming to the standard for automatic configuration in the local network in coordination with the virtual network management server for managing and operating the multivendor virtual network.

In the local portions, the network management manager in FIG. 40 is replaced with the network manager.

Generally, functions of automatic handling of virtual network definition/setting, network resource use requests, and terminal move, addition, change, etc., are contained in the virtual network management system. In the embodiment, however, the virtual network service agent N coordinates with the virtual network agent VNA and the virtual network management server and the virtual user agent VUA and the virtual network agents VNA distributed to the switches S1 . . . dynamically manage the virtual group registration/routing table VT distributed to the switches S1 in coordination with each other, thereby customizing the multivendor integrated virtual network environment of automatic handling of user's virtual network definition/setting, network resource use requests, and terminal move, addition, change, etc., to the user environment for automatic configuration. This enables the virtual network environment to be customized to the user environment at the local distributed management level at the standpoint of user H . . . efficiently in a multivendor virtual network management system.

26th Embodiment

Figure 45:
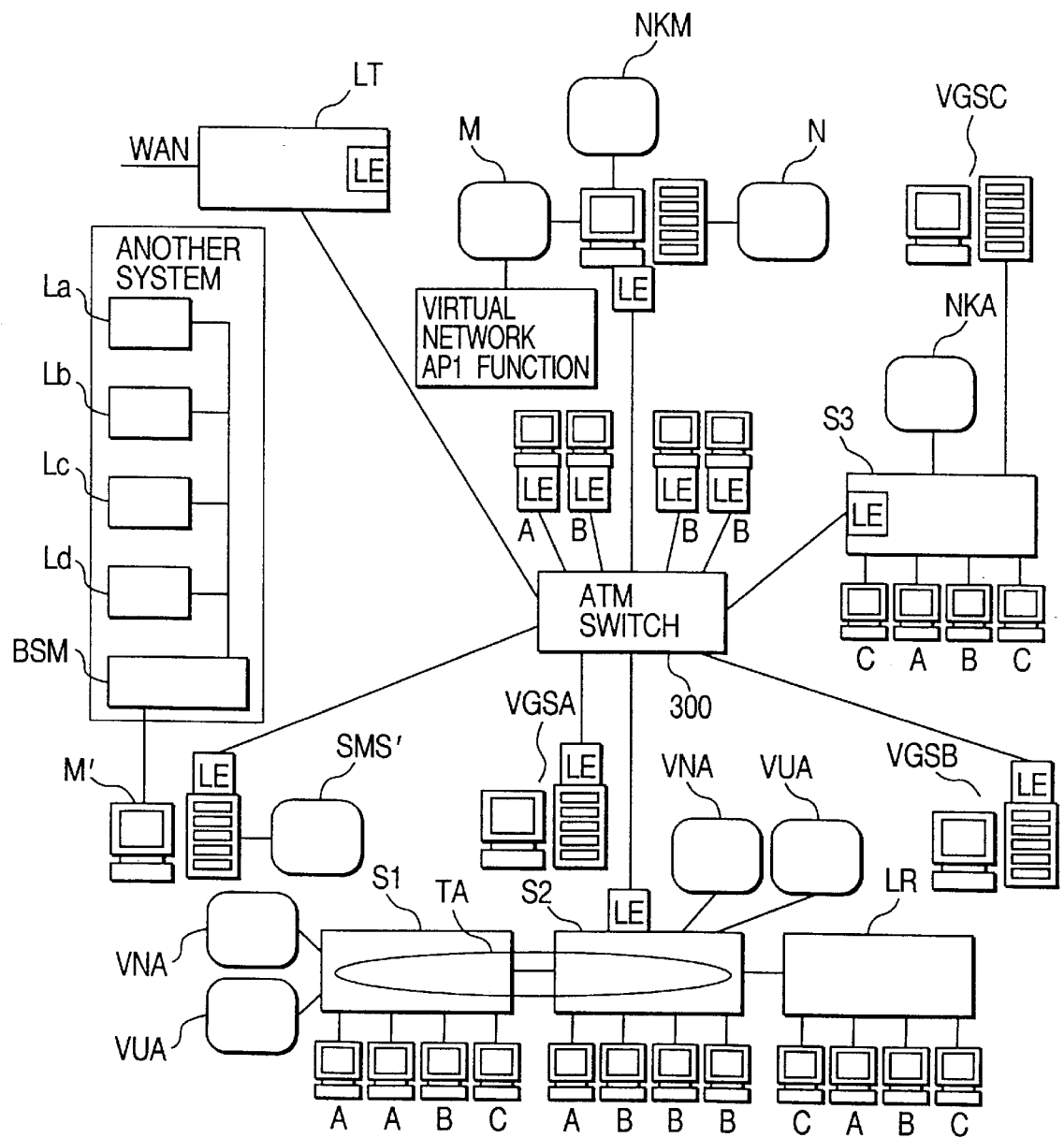
FIG. 45 is a block diagram of a network system of the invention.

In an twenty-sixth embodiment of the invention, as shown in FIG. 37, connection ports of virtual groups VG1 . . . are distributed to switches S1 . . . distributed over a network, virtual group registration/routing table VT and virtual network agent VNA are placed in the switches S1 . . . . . . in a distributed manner, and a user environment table 330 and a virtual user agent VUA are placed in the switches S1 . . . or terminal A1 . . . , B1 . . . , C1 . . . in a distributed manner, and as shown in FIG. 40, a virtual network service agent N is built in a network management manager NKM for integrated management. In automatic response to user H's network resource use requests, terminal move, addition, change, etc., the virtual user agent VUA and the virtual network agents VNA distributed to the switches S1 . . . coordinate with each other and the virtual network service agent N dynamically manages the virtual group registration/ routing table VT distributed to the switches S1 . . . in coordination with the virtual network agent VNA and a virtual network management server M for managing and operating a multivendor virtual network management system K2, thereby customizing a multivendor integrated virtual network environment in addition to network management conforming to the standard for automatic configuration from the standpoint of user H in the integrated network management manager NKM, as shown in FIG. 45. A virtual network server is integrated into the virtual network management server M.

As shown in FIG. 40, the virtual network service agent N is built in the network management manager NKM for integrated management and the virtual network service agent N customizes the multivendor integrated virtual network environment in addition to network management conforming to the standard for automatic configuration in the integrated network management manager NKM, as shown in FIG. 45. The virtual network server is integrated into the virtual network management server M.

Generally, in most vendors, functions of automatic handling of virtual network definition/setting, network resource use requests, and terminal move, addition, change, etc., are contained in the virtual network management system. In the embodiment, however, to enhance the user environment customization function, the virtual network management server M, the virtual network service agent N, and a virtual network service table are placed in multivendor network management manager, as shown in FIG. 45.

FIG. 40 show the roles/characters and functions of the agent. In the embodiment, the virtual network management server M and virtual network service agent N of the virtual network management system are integrated into one. The network management manager in FIG. 45 is contained in the virtual network management system in FIG. 40.

27th Embodiment

In a twenty-seventh embodiment of the invention, as shown in FIG. 37, connection ports of virtual groups VGl are distributed to switches S1 . . . distributed over a network, virtual group registration/routing table VT and virtual network agent VNA are placed in the switches S1 . . . . . . in a distributed manner, and a user environment table 330 and a virtual user agent VUA are placed in the switches S1 . . . or terminal A1 . . . , B1 . . . , C1 . . . in a distributed manner. In this configuration, as shown in FIG. 39, a different system linkage/learning table 332 of a user environment setting area for each group in the virtual group registration/routing table VT is formed and linkage conditions of building automation utilities and utilities of a different system can be set. As shown in FIG. 42, in automatic response to user H1 . . . network resource use requests, terminal move, addition, change, etc., in accordance with constraints and rules of conflict detection/negotiation/plan correction/learning preset for a network environment for the agents, the virtual user agent VUA and the virtual network agents VNA distributed to the switches S1 . . . coordinate with each other and the virtual network agents VNA coordinate with a virtual network management server M for dynamically managing the virtual group registration/routing table VT distributed to the switches S1 thereby customizing linkage conditions of utilities UT of building automation BA and utilities UT of a different system for automatic configuration, autonomously observing the utility UT state, and learning optimum linkage conditions for automatic setting of the conditions. As shown in FIG. 39, the different system linkage/learning table 332 of a user environment setting area for each group in the virtual group registration/routing table VT is formed and the linkage conditions of the building automation utilities and utilities of a different system can be set. As shown in FIG. 42, the linkage conditions of the building automation utilities and utilities of a different system are customized in accordance with the constraints and rules of conflict detection/negotiation/plan correction/learning preset for the network environment for the agents, the utility UT state is autonomously observed, and the optimum linkage conditions are learned and automatically set.

On the other hand, as shown in FIG. 44, the different system linkage/learning table of a user environment setting area for each group in the virtual group registration/routing table VT may also be formed in a virtual network service table. Also in this case, a virtual network service agent N segments the resources of a different system into virtual groups and dynamically manages the virtual group registration/routing table VT distributed to the switches S1 ... in coordination with the virtual network agent VNA and a different system management server, thereby customizing the linkage conditions of the building automation utilities and the utilities of the different system, autonomously observing the utility UT state, and learning optimum linkage conditions for automatic configuration. Also, the facility environment state is autonomously observed and optimum linkage conditions are automatically set. For example, linkage of power outage/power recovery, access security machine, air conditioning, lighting, etc., on CRT display is optimized. The linkage conditions can also be set manually and are automatically tuned by a learning a function.

Figure 46:
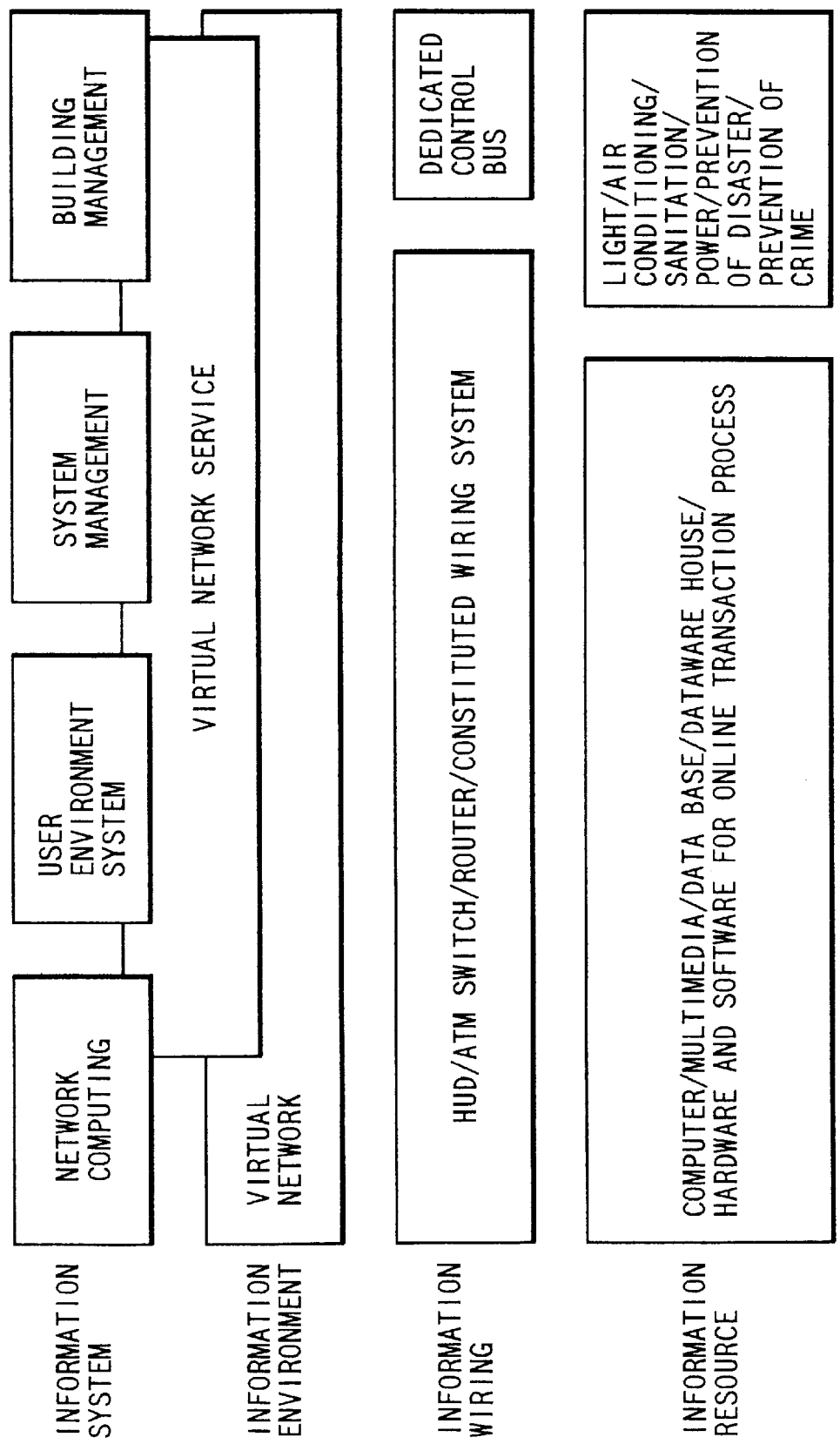
FIG. 46 is an illustration of positioning of virtual network service in the invention.
Figure 47:
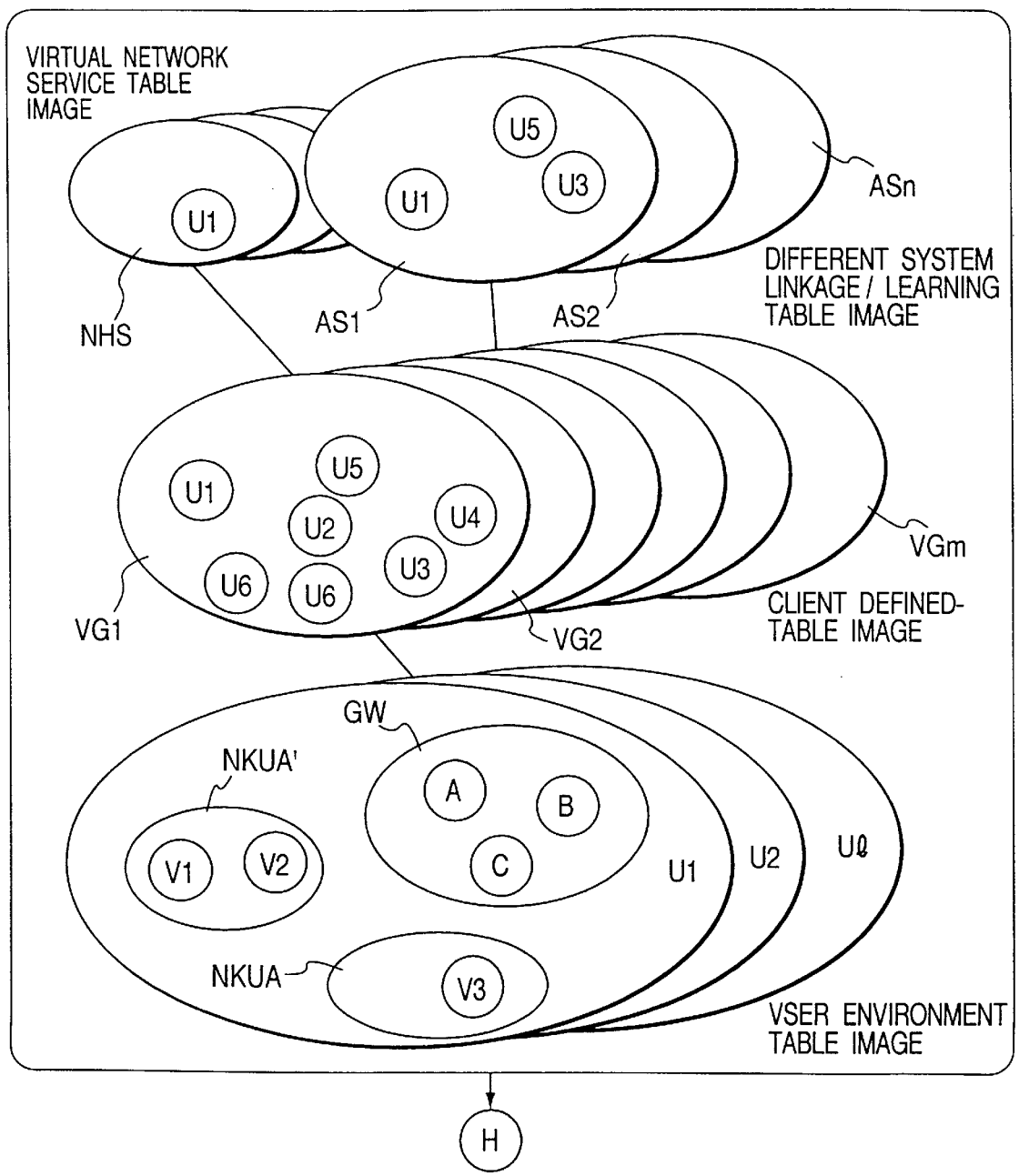
FIG. 47 is an illustration of virtual groups and an user environment.

FIG. 46 shows a concept in virtual network service positioning in the invention. FIG. 47 shows the virtual groups VG1 ... and user environment, wherein NKUA denotes a utility virtual group in a network management system, NKUA' denotes a utility virtual group in another network management system, GW denotes a network computing virtual group, AS1 ... denotes a different system, and NKS denotes a network management system.

The network service server manages the agents of the switches S1 ... and intercommunication with a network adopting a different communication system other than virtual groups. The agents manage the terminals in coordination with the virtual group agents VA of the switches S. The network service server and the virtual group agent VA of each switch S make up one coordination virtual group, and communication of virtual group VG with an external system is supported.

For multicast for each virtual group VG1 ... with virtual group server VGS assigned to each virtual group VG1 ..., according to multicast setting previously registered in the virtual group agent VA of the switch S by each server VGS for a multicast request issued to the server VGS from each client U and multicast processing performed by the server for each client, the switch stores a multicast message packet pointer in the virtual group queuing table 315 for multicast and executes multicast processing, whereby the switch S supports the multicast of virtual group VG in coordination with server VGS of each virtual group VG1. Of course, the switch may have a server function.

For broadcast with virtual group server VGS assigned to each virtual group VG, according to broadcast setting previously registered in the virtual group agent VA of the switch by each server VGS so that if the server VGS can deal with a broadcast request issued from each client U by a protocol handled by the server VGS, it responds to the broadcast request or that if the server VGS cannot deal with the broadcast request, it forwards the request to router LT, the switch S stores a multicast message packet pointer in the broadcast queuing table 315 and forwards broadcast to the router LT, whereby the switch S supports the broadcast of virtual group VG in coordination with server VGS of each virtual group VG. The switch S operating as a virtual LAN group at the second layer level routes broadcast for virtual group VG, but depends on external router LT for communication with other than the virtual group VG.

In the system example shown in FIG. 42, the switch with an ATM interface is connected to the ATM backbone, whereby virtual group relayed by the ATM switch 300 can be expanded via virtual LAN group at the second layer level emulated in ATM.

If the agent of the invention is built in the ATM switch 100, virtual networks of the invention also containing terminals directly connected in ATM can be integrated.

Further, the ATM switch 300 is compatible with multiprotocol and has virtual group agent VA, whereby a shared table is constructed in the ATM switches S1 ... and virtual network groups at the third layer level and virtual custom groups can be supported and customized to a user environment.

Figure 48:
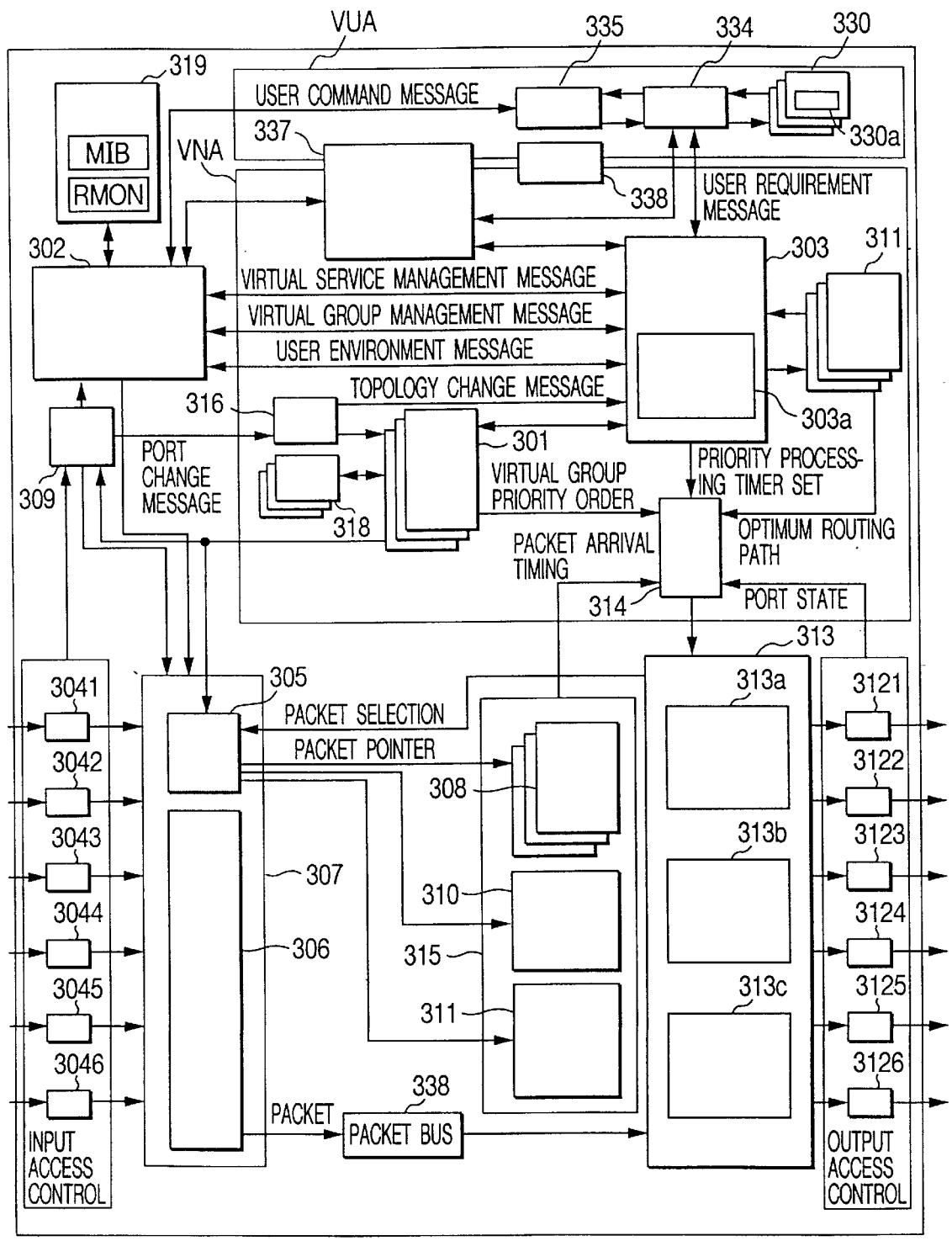
FIG. 48 is a block diagram of a switch of the invention.

FIG. 48 shows another specific configuration example of switch S. In this example, virtual user agent VUA and virtual network agent VNA are built in the switch S and negotiation engine 337 between agents and agent rule engine 342 execute a coordination problem solving algorithm between the agents. The example differs from that in FIG. 35 in that the number of input ports/output ports is expanded by a packet bus 338 for packet multiplexing. The virtual user agent VUA is provided with a user command processing section 335 and a virtual distributed management section 334, and numeral 330a denotes an environment setting parameter in a user environment table 331.

Figure 49:
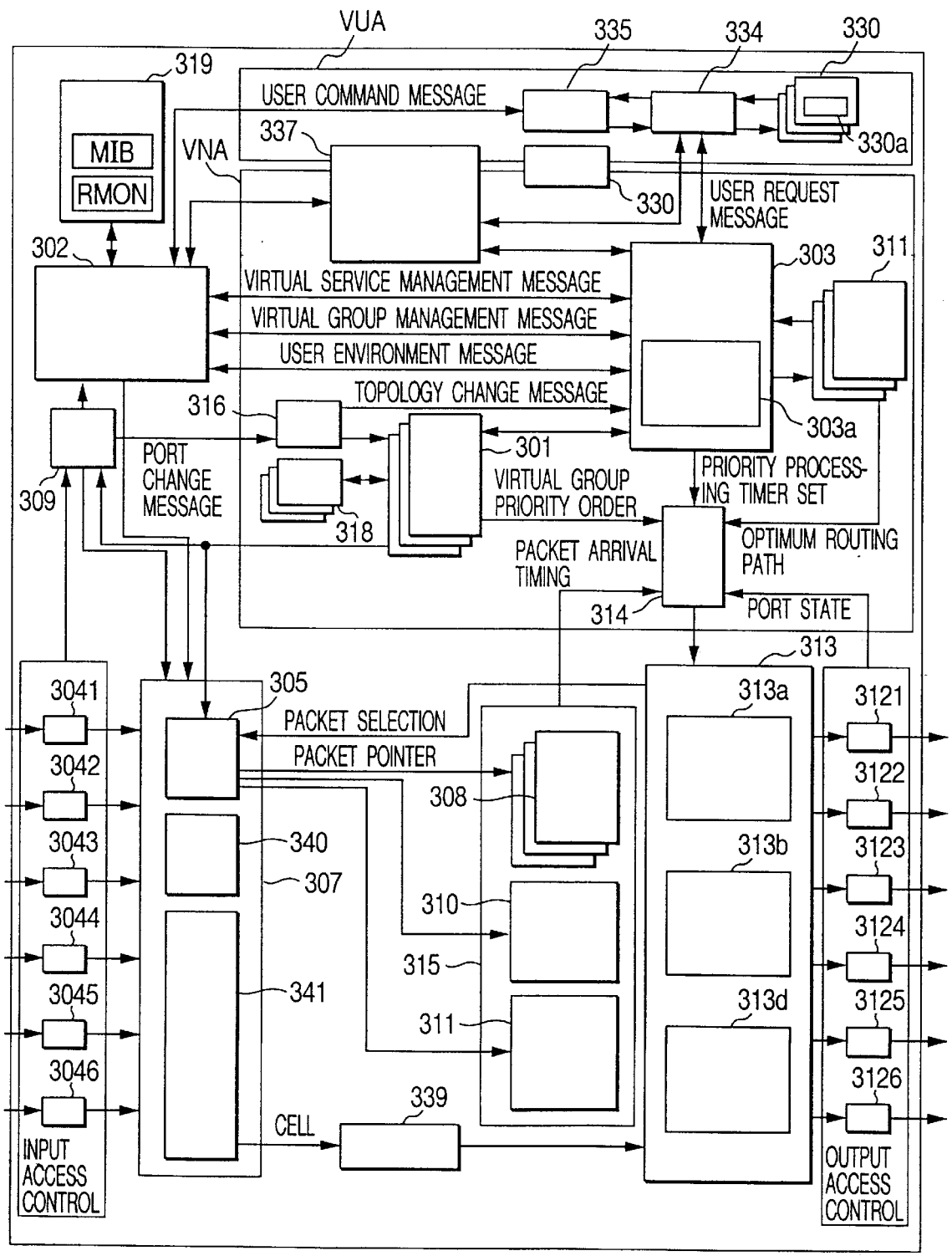
FIG. 49 is a block diagram of a switch of the invention.

FIG. 49 shows another specific example of switch S. The example differs from that in FIG. 48 in that a packet in a cell buffer 341 is dissolved into cells by a cell conversion section 340 and that the cells are multiplexed by a cell bus 339.

If the cells are those into which a packet of a unique system is divided, the cell bus 339 performs cell multiplexing for shortening the packet delay time, raising the bus utilization factor, and the band utilization factor.

If the cells are ATM cells, the cell bus 339 contains a repeater function like an ATM switching system and the number of input ports/output ports can be expanded. That is, in the example in FIG. 49, a switch function of a low-order layer than an ATM adaptation layer is shown from cell conversion to packet conversion; if ATM transmission is executed outside input ports 341 ... or output ports 3121 ..., an ATM addressing access method is supported and if an IEEE802 LAN is applied outside the input ports or output ports, data of the ATM adaptation layer or higher is handled.

FIG. 50 shows another example of the virtual group registration/routing table VT, and FIG. 51 shows another example of the user environment table 330.

As shown in the virtual network configurations described with reference to FIGS. 34, 37 and 51, in the invention, the virtual group registration/routing table VT is called a cluster of various tables. The various tables contain the virtual group registration table 301, the client definition table 331, the virtual group routing table 308, the user environment setting table 318, the user environment table 330, and the different system linkage/learning table 332. In the example in FIG. 35, the virtual group registration table 301 and the virtual group routing table 308 are shown separately, but are combined into a virtual group registration/routing table in FIG. 38. This difference is contained in the range in which it can vary depending on the installation within the claims of the invention with the same function/effect. In FIG. 34, the client definition table 331 is pointed to by a pointer from the virtual group registration/routing table VT; as shown in FIGS. 50, 51 and 44, the virtual group registration/routing table VT, the user environment table 330, and the virtual network service table 333 are represented as independent tables. This is also contained in the range in which it can vary depending on the installation within the claims of the invention. The configuration of the invention is shown as logical configuration/function in the virtual networks in FIGS. 34, 37, and 51, and logically equivalent and physically different installation in one-to-one mapping is contained as shown in FIGS. 51 and 47.

The user environment setting table 318, the user environment table 330, and the virtual network service table 333 are also updated and the setup user environment is also inherited when the network is moved physically, and is updated automatically by learning. FIG. 40 shows that a user belongs to a plurality of virtual groups and is connected to a different server depending on the application or project. FIGS. 34, 39, and 51 represent virtual LAN groups (second layer level) as switched domains and communication between switched domains and broadcast wall as routing service between switched domains, and show placement of network service server and network management server among the switched domains.

28th Embodiment

Figure 52:
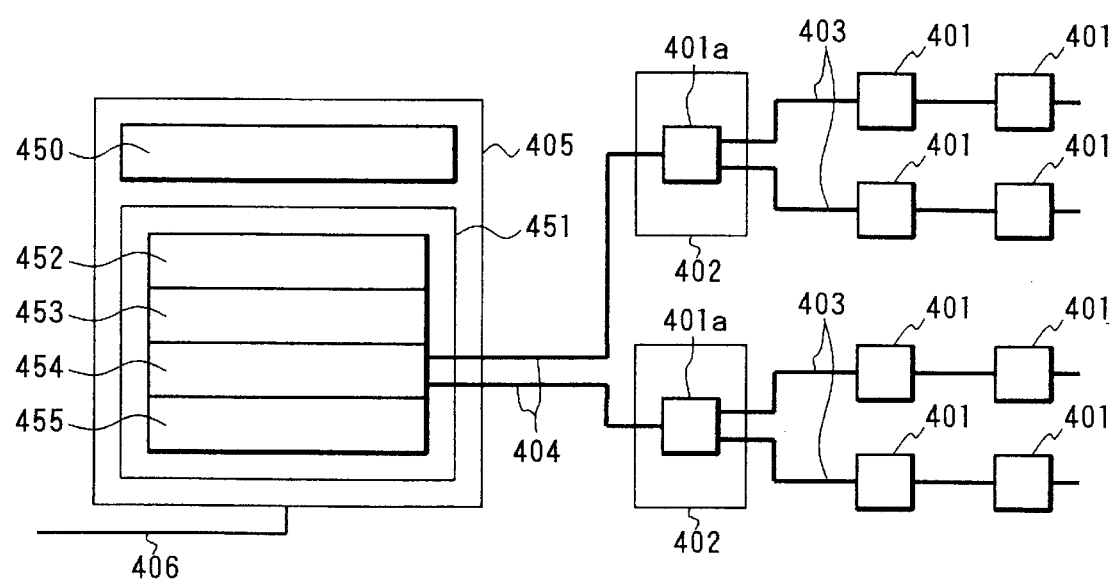
FIG. 52 is a system block diagram of the invention.

FIG. 52 shows a conceptual configuration of a distributed integrated wiring system of the invention, which can be adopted to the virtual LAN system according to the present invention. A building like an intelligent building system of an office, a plant, a hospital, etc., is divided into residential units and a local node 401 . . . for collecting functions of environment measurement, monitor, and control processes and an information communication process using local building facilities is provided for each residential unit. A local node 1a similar to the local node 401 . . . is provided in a floor integrated wiring closet 402. The local nodes 401 and 401a are connected to each other by floor trunk lines 403 . . . , the local nodes 401a provided in the floor integrated wiring closets 402 are connected to a center node 405 via backbone wiring 404, and the center node 405 is connected to an external system over a public switched network 406.

Figure 54A:
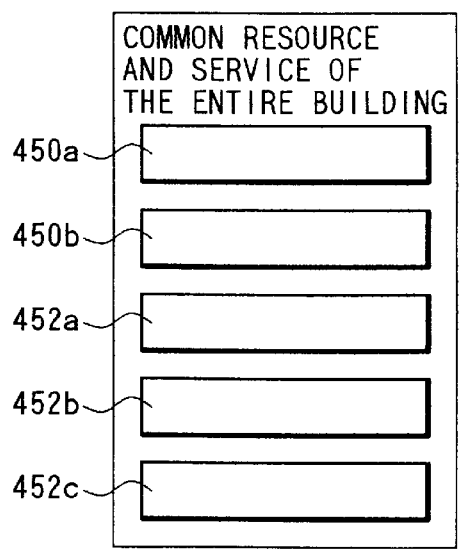
FIG. 54(a) is an illustration of the main part of a center node in the invention and FIG. 54(b) is an illustration of the main part of a local node in the invention.

The center node 405 is made up of a common network service server 450 of the entire building and integrated network service equipment 451. As common resources and service of the entire building, the common network service server 450 bears common building facility service 450a and common information communication service 450b, as shown in FIG. 54(a). The integrated network service equipment 451 is made up of a monitor unit 452, a trunk line facility control unit 453, a trunk line concentration unit 454 including a multiplex circuit, a switch or the like, and a WAN connection unit 455. The monitor unit 452 corresponds to a center control console 452a, the trunk line facility control unit 453 corresponds to common building facility resources 452b, and the trunk line concentration unit 454 (WAN connection unit 455) corresponds to common information communication facility resources 452c, as shown in FIG. 54(a).

Figure 53:
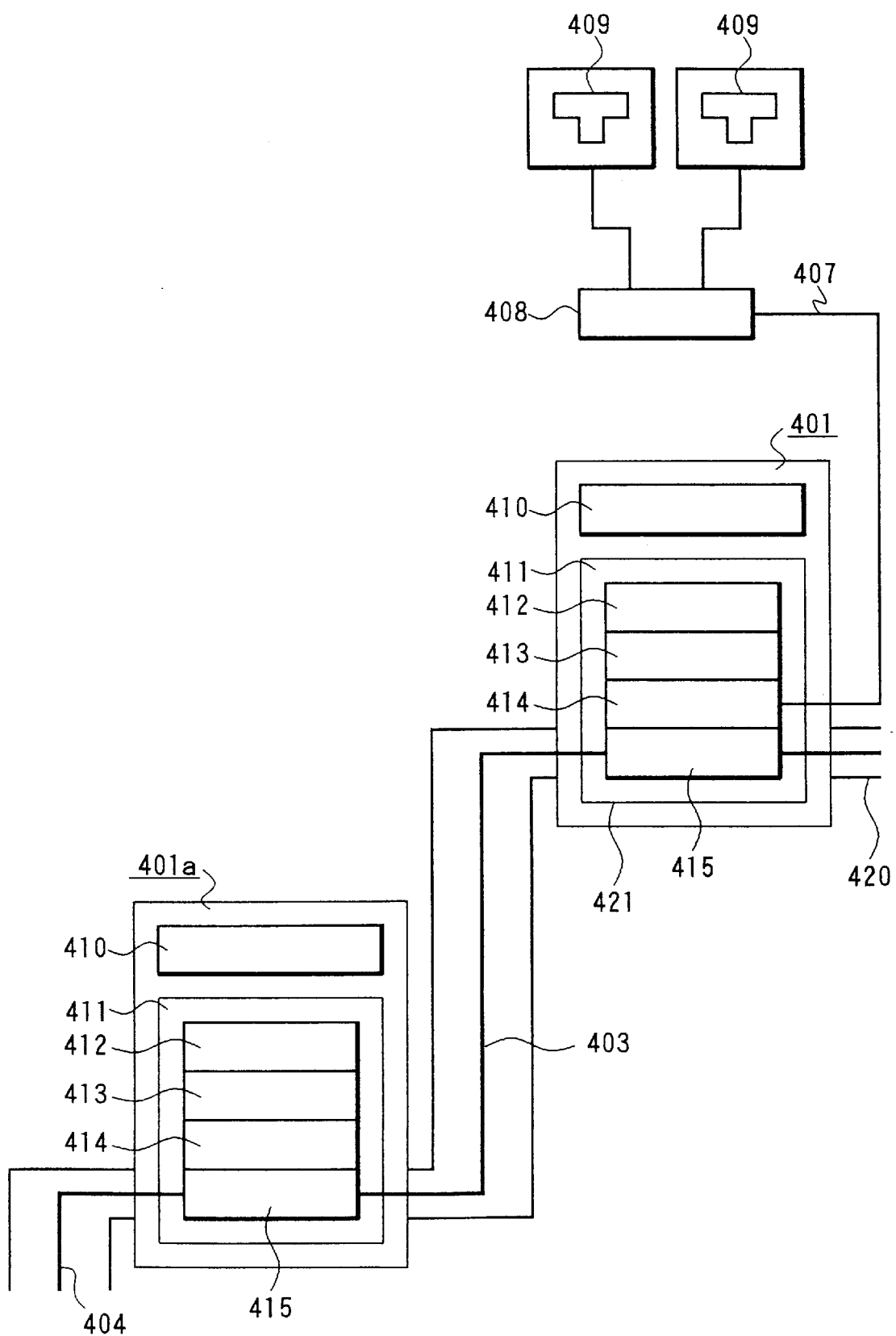
FIG. 53 is an enlarged view of the main part in the the invention.
Figure 54B:
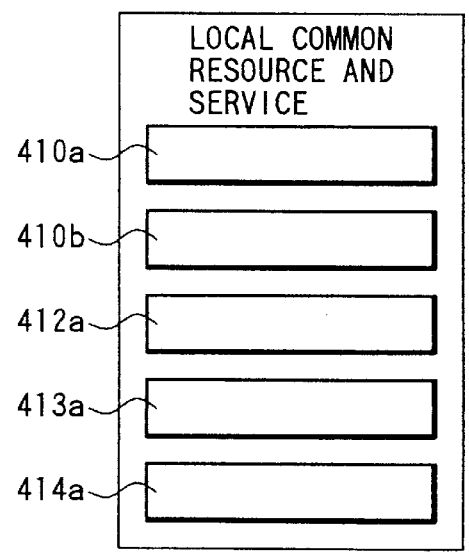

On the other hand, the local node 401, 401a . . . is made up of a local network service server 410 and distributed network service equipment 411, which consists of a monitor unit 412, a branch line facility control unit 413, a branch line concentration unit 414, and a trunk line connection unit 415 as shown in FIG. 53. As local common resources and service, the local network service server 410 of the local node 401, 1a bears local building facility service 410a and local information communication service 410b, as shown in FIG. 54(b). The monitor unit 412 corresponds to a local control console 412a, the branch line facility control unit 13 corresponds to local building facility resources 413a, and the branch line concentration unit 414 (trunk line connection unit 415) corresponds to local information communication facility resources 414a, as shown in FIG. 54(b).

The branch line concentration unit 414 of the local node 401 provided in each residential unit is connected via a floor branch line 407 to a zone wiring box 408 to which outlets 409 are connected.

The distributed network service equipment 411 of the local node 401 provided in each residential unit is housed in an equipment storage unit 421.

The backbone wiring 404 and the floor trunk lines 403 are housed in a conduit tube 420.

According to the configuration as described above, in a first embodiment of the invention, network service is divided into the three types of areas of the entire building, the entire floor, and each residential unit in the floor. The common network service server 450 of the entire building is entered in the center node 405, the local network service server 410 common to the floor is entered in the local node 1a of the floor concentrator, and the local network service server 410 of each residential unit is entered in the local node 401 of the residential unit. In a building with narrow floors, etc., the network service is divided into the entire building and floors, the local network service server 410 is not entered in the local node 401 of the residential unit and only the distributed network service equipment 411 is entered. In contrast, if a building has a wide floor with no service common to the floor and the network service is divided into the entire building and residential rooms, the local network service server 410 common to the floor normally becomes unnecessary in the local node 1a of the floor concentrator. However, it is expected that the local network service server 410 common to the floor bears a backup role of the center node 405. The local nodes 401 and 401a of floors and residential units in which the local network service server 410 is entered form independent networks.

Figure 55:
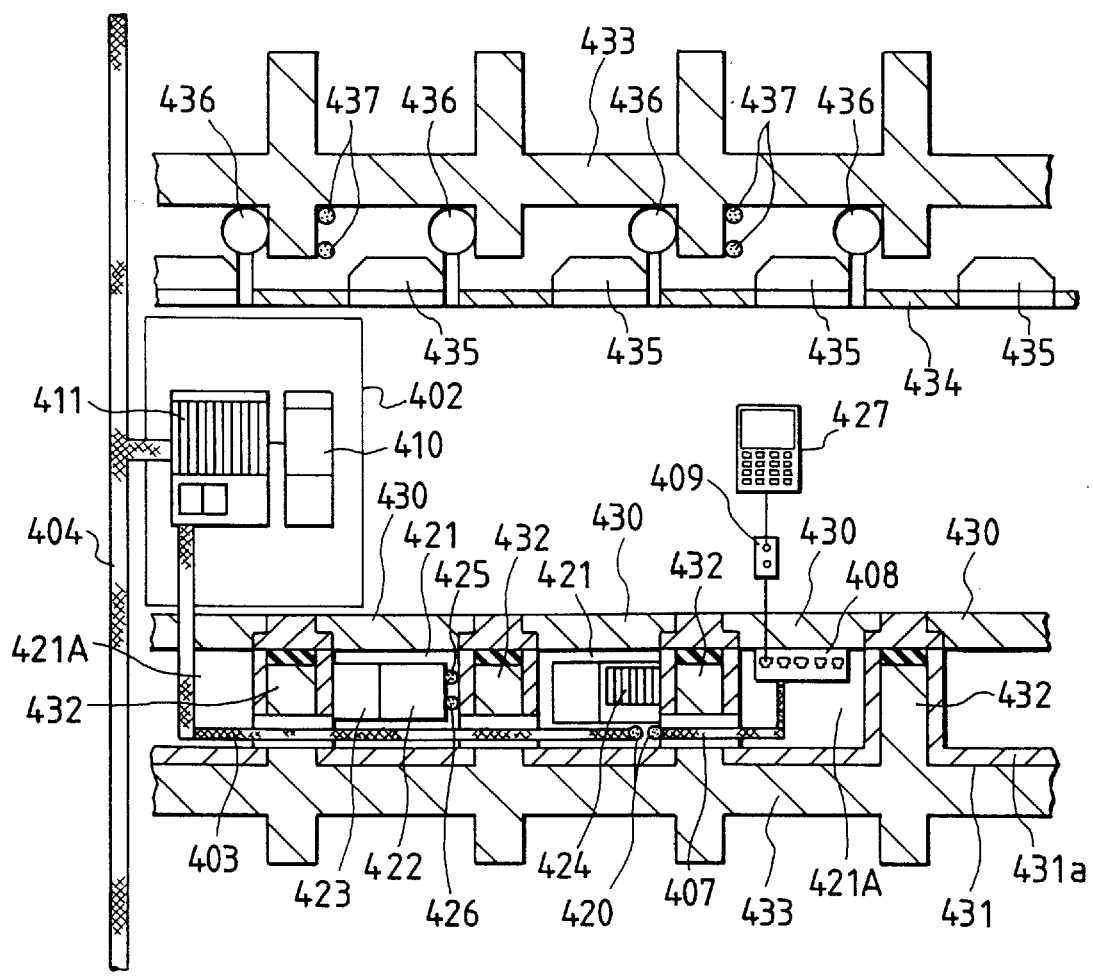
FIG. 55 is an illustration of an actual wiring structure in the the invention.
Figure 56:
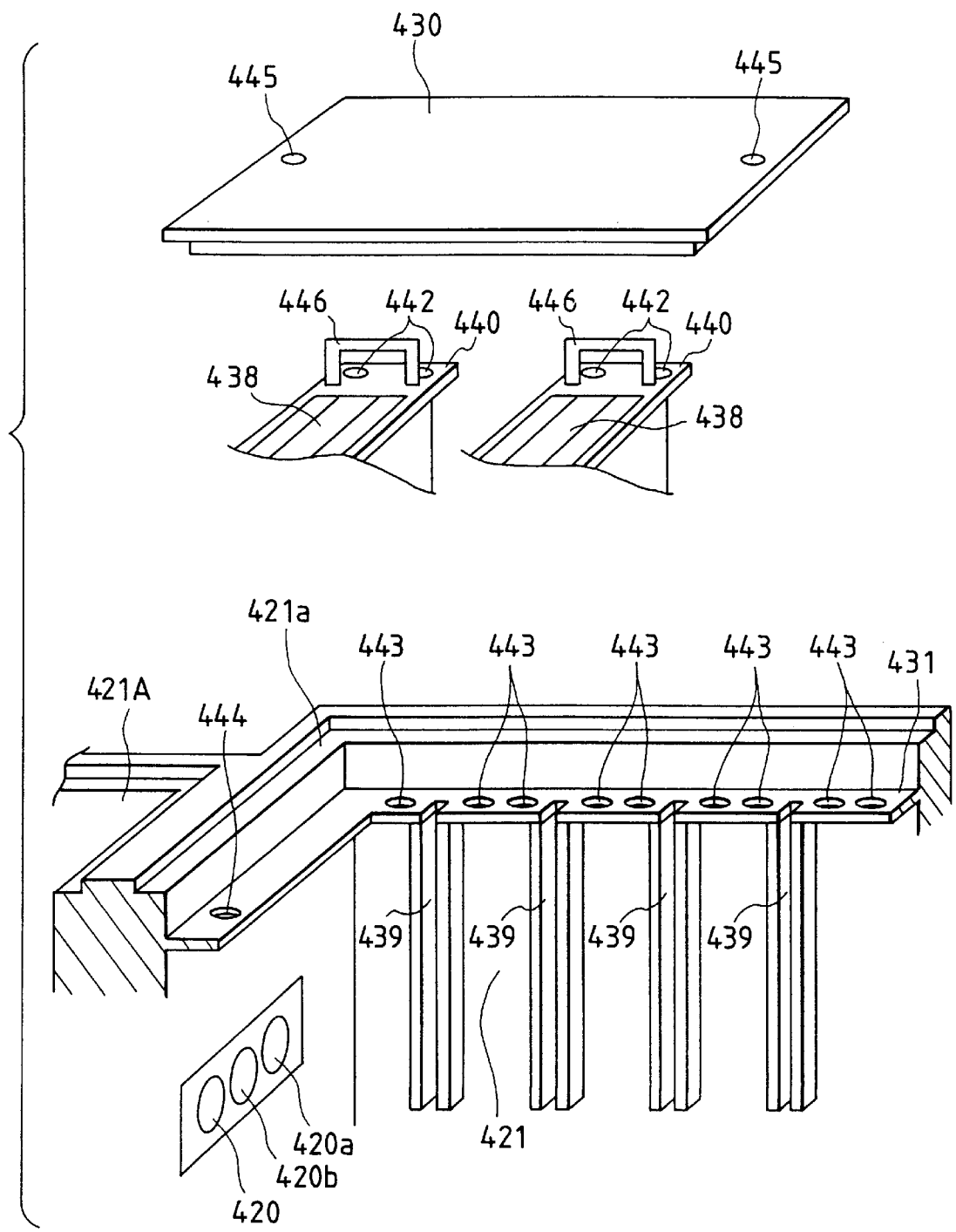
FIG. 56 is an exploded perspective view of the main part in the invention.

FIGS. 55 and 56 show the installation configuration of the embodiment.

Generally, ceiling beams are deep and an access floor is constructed as a high floor for the strength of a building structure and a flat floor. From this point, equipment storage units and electric wire units are placed below the access floor. In this case, the ceiling height for each story must be taken high for a large ceiling space above a suspended ceiling and placement of an access floor, thus the building becomes high for considering the number of stories, increasing costs.

Then, in the embodiment, a floor 31 of the portion where equipment storage units 421 and wiring storage units 421A are installed is not a flat face of a conventional slab and concrete forming like a ceiling turned upside down, as shown in FIG. 55. (A member 31a for water resistance, heat insulation, etc., is put if necessary.) The equipment storage units 421 and wiring storage units 421A hold flatness as a floor like an access floor and sound and vibration insulation functions are added. A beam 433 like projecting above the floor face is disposed, a ceiling beam 433 is made small to a necessary minimum, and the building strength is maintained. Building facility equipment and information communication facility equipment formerly installed in access floor, equipment storage unit, power, communication, OA shaft are housed, the ratio of the shaft area to the floor area is lessened, a storage space that can be used by residents is provided below the floor, the ratio of the storage area to the floor area of a residential room is also lessened, and the height below the floor can be made deeper than a general access floor because the strength is held by the beam 433 like projecting above the floor face. Resultantly, standard rack mount type equipment can be stored and piping for radiation and air conditioning can also be placed on the ceiling.

In more detail, as shown in the figure, a floor material 430 is fitted detachably so as to support on the upper ends of projection bodies 432 of parts of the beam 433 and a so-called access floor is formed with wiring space and storage space provided between the floor material 430 and the beam 433.

A distributed BA controller 422, a distribution panel 423, and distributed information wiring equipment 424 controlled at the local node 401 are stored in the equipment storage unit 421, and power wiring 425 and BA wiring 426 are placed in the equipment storage unit 421 storing the distributed BA controller 422 and the distribution panel 423. The floor material 430 as a lid of the equipment storage unit 421 can be opened and closed. The stored units can be maintained and inspected by removing the floor material 430 and opening the equipment storage unit 421.

The zone wiring box 408 is attached to the lower face of the closed floor material 430 for one of the equipment storage units 421 and is connected to the outlet 409 placed on the floor.

The wiring storage unit 421A below the floor is placed so as to penetrate the equipment storage unit 421, and the floor trunk lines 403 and the floor branch lines 407 as information wiring are put via the conduit tube 420.

On the other hand, the local network service server 10 and the distributed network service equipment 411 making up the local node 1a are stored in the floor integrated wiring closet 402 located on the floor. The distributed network service equipment 411 is connected to the floor trunk lines 403 put below the floor and is also connected to the backbone wiring 404 put in EDO penetrating the building from top to bottom.

An operation panel 427 of the distributed BA controller 422 and the distributed information wiring equipment 424 stored in the equipment storage unit 421 below the floor is taken out by information wiring using the outlet 409 at a proper location on the wall face or desktop as shown in FIG. 55, whereby the unit state can be monitored and controlled without opening the lid of the equipment storage unit 421.

Illuminators 435 and supply openings of air conditioning piping 436 are disposed in a ceiling 434 and power lines 437 and air conditioning piping 436 are disposed in a space between the ceiling 434 and the beam 433.

FIG. 56 is an exploded perspective view of the equipment storage unit 421 portion, partially broken away. As seen in the figure, stored equipment main units 438 are formed according to the standard 19-inch rack mount size and are stored in the equipment storage unit 421 longitudinally. The equipment storage unit 421 is provided with as many guide rails 439 (which may be grooves) as the number of housed units as guides used when the equipment main units 438 are housed or taken out for wiring on inner wall faces and a placement section 441 for placing the peripheries of front panels 440 of the equipment main units 38 on the slightly lower side than the opening and is formed with screw holes 443 for threadably engaging fixing screws 442 passed through the front panels 440. Also, the placement section 441 is formed with screw holes 444 for threadably engaging mounting screws 445 made in the floor material 430 as a lid. The periphery of the floor material 430 can be placed on a step part 421a of the opening of the equipment storage unit 421 made of a soundproofing floor material for forming a flat face together with peripheral soundproofing material. Further, ends of a power wiring cable conduit tube 420a, a BA wiring cable conduit tube 420b, and an information wiring cable conduit tube 420 are opened in a partition from the adjacent unit 421 or 421A. In FIG. 56, numeral 446 is a grip.

The wiring storage unit 421A also has a similar structure for enabling the floor material 430 as a lid to be attached to the opening.

Figure 57:
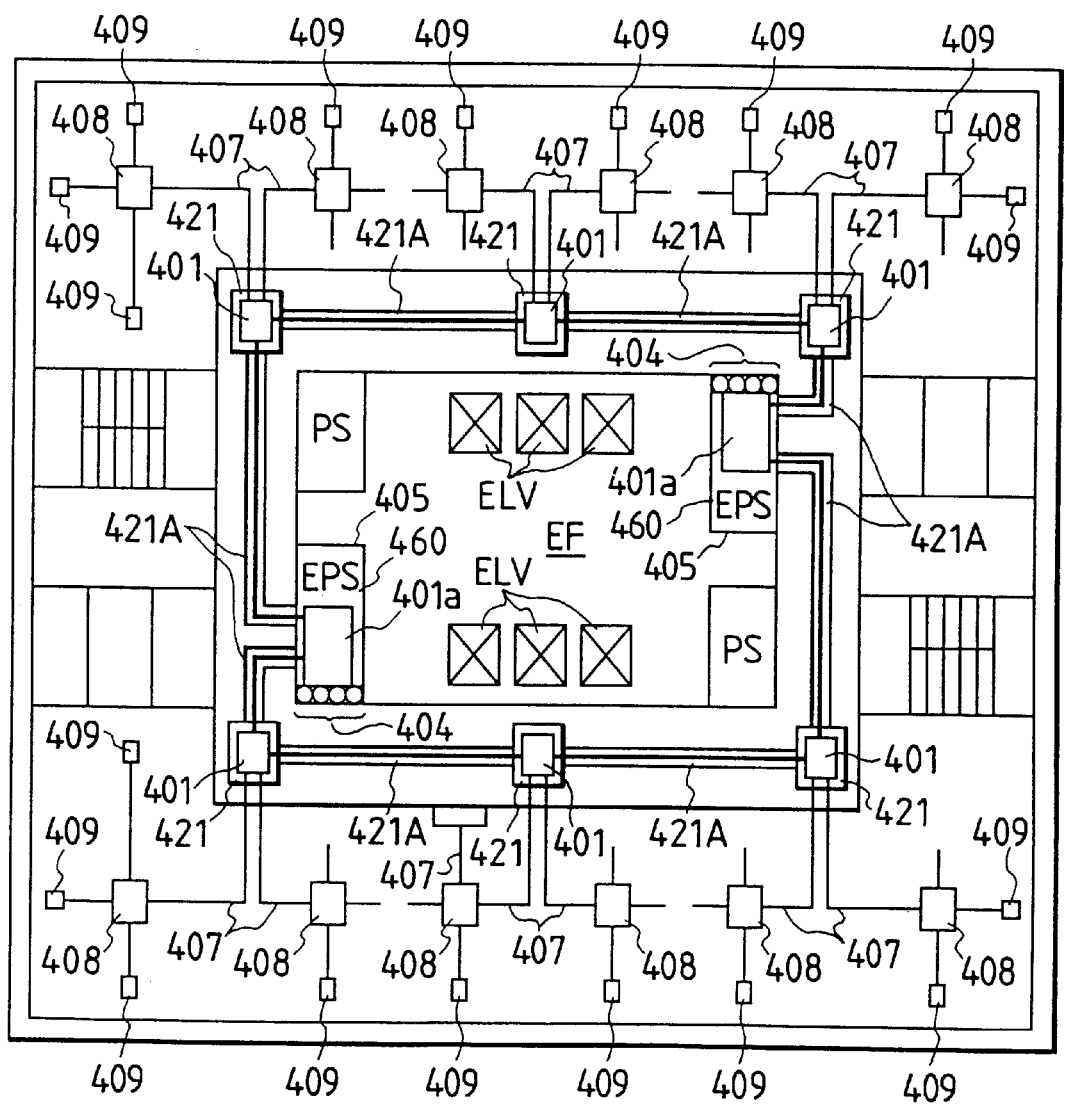
FIG. 57 is a plan view of the actual wiring structure in the invention.

FIG. 57 is a flat wiring block diagram of a corridor portion of a common portion of a floor. In the figure, the center is an elevator floor EF on which elevators ELV are placed, and floor integrated wiring closets 402 for housing the local nodes 1a are placed in EPS 460 in opposed corners. The equipment storage units 421 for housing the local nodes 401 are placed below the elevator floor EF and the wiring storage unit 421A containing the conduit tubes 420, 420a, and 420b are placed below the floor between the equipment storage units 421. The zone wiring box 408 is disposed below the floor of each residential unit and the outlet 409 is connected to the zone wiring box 408. In FIG. 57, PS denotes a shaft.

The local network service server 410 and the distributed network service equipment 411 of the local node 401 are thus placed in the equipment storage units 421 for autonomously performing distributed control of the environment of the corresponding residential unit. The local network service server 410 and the distributed network service equipment 411 of the local nodes 401a are placed in the floor integrated wiring closet 402. The distributed BA controller 422 and the distributed information wiring equipment 424 are stored in the equipment storage unit 421 below the floor, as shown in FIG. 55. Further, a switchboard normally placed in a room is also installed in the equipment storage unit 421 below the floor if it may be placed anywhere other than such a room managed by a building administrator.

Figure 58:
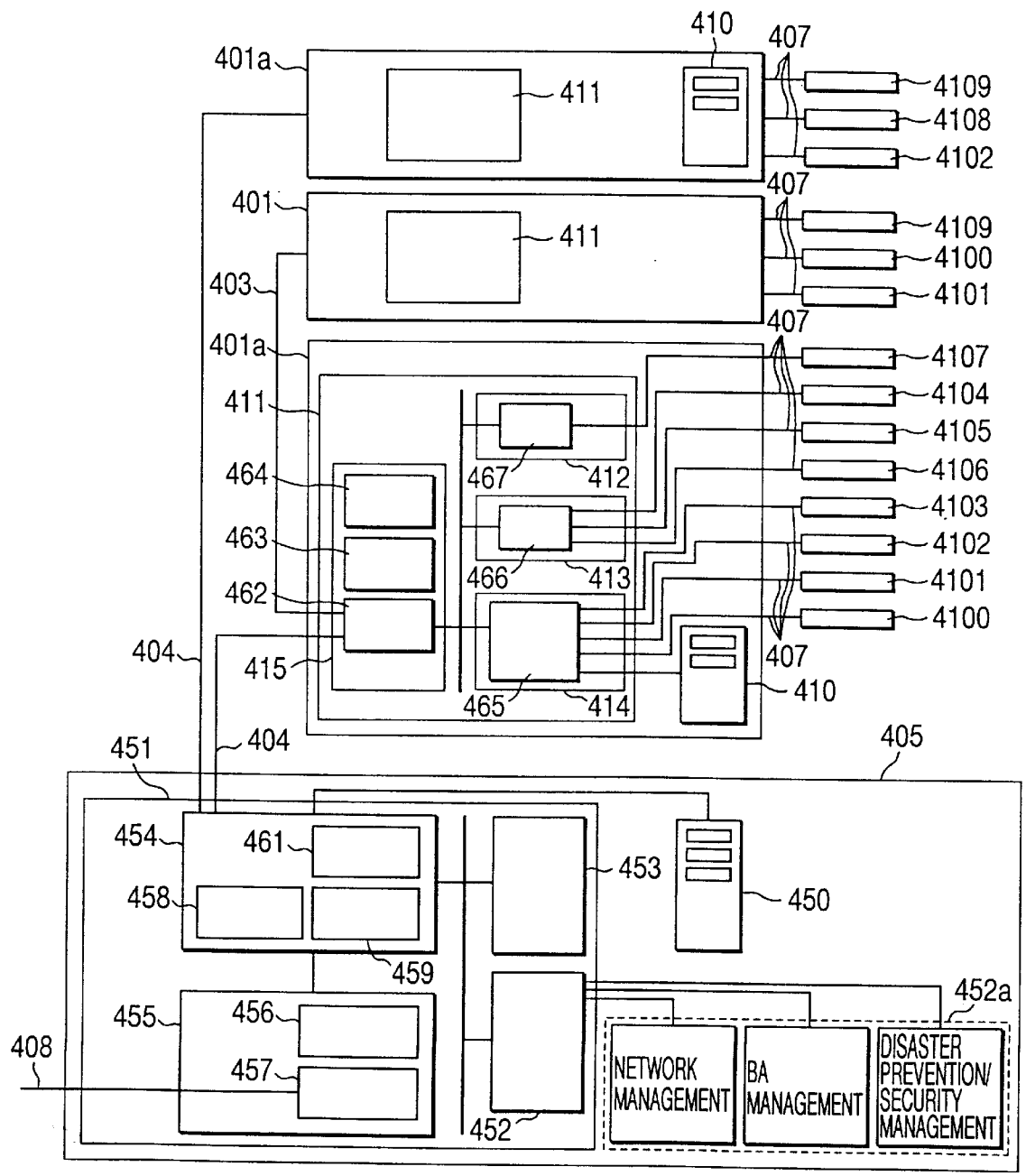
FIG. 58 is a detailed block diagram of the system of the invention.

FIG. 58 shows the configuration of the center node 405 and the local nodes 401 and 401a used with the system of the embodiment.

The common network service server 450 and the integrated network service equipment 451 are installed in the center node 405. The common network service server 450 contains application software and databases of common information communication service related to access to the internet, WAN connection, and message communication across the entire building and common building facility service of energy saving, BA, disaster prevention, crime prevention, etc. Integrated in the integrated network service equipment 451 are the WAN connection unit 455 and the trunk line concentration unit 454 as the common information communication facility resources 452c of common service resources required for providing common network service and centralized management, the trunk line facility control unit 453 as the common building facility resources 452b, and the monitor unit 452 for executing communication, control, and monitor functions required for use of command and entire systems, common service, and centralized management.

The WAN connection unit 455 contains a fire wall 456 and a main router 457, forming a communication interface with the outside of the building. The trunk line concentration unit 454 contains a backbone switch 458, an intranet router 459, and a VLAN learning/identification/filtering section 461. The intranet router 459 handles a routing protocol in the enterprise separated from the outside by the fire wall 456. The VLAN learning/identification/filtering section 461 encapsulates and decapsulates packets for tunneling for transferring VLAN via the internet or WAN and learns and filters connection route addresses for a terminal move, addition, or change. The backbone switch 458 has redundancy using known techniques of layer 402, 403 switching or an ATM switch, etc., in combination and supports a function of multiplex transmission of information requiring high reliability and immediacy such as BA or disaster prevention with any other data communication to the backbone. For this purpose, the QoS function of the ATM switch is promising. The center control console 452a for network management, BA management, and disaster prevention/security management is connected to the monitor unit 452, as shown in FIG. 58.

On the other hand, in.the local node 401a (or 401), the local network service server 410 contains application software and databases of network service for each residential unit such as the network service function of the local building facility service 410a such as office residential environment service of air conditioning, lighting, etc., and the local information communication service 410b of virtual network configuration, etc., for setting a multicast group such as an electronic conference using multimedia or providing virtual common information space different from physical placement through a network. In the distributed network service equipment 411, a trunk line switch 462, a virtual routing table 463, and a router bridge 464 make up the trunk line connection unit 415 and a branch line switch 465 is contained in the branch line concentration unit 414 as the local information communication facility resources 414a used as resources for providing the local network service. The router bridge 464 is forwarded by the switch as layer 402, 403 switching. Further, in the distributed network service equipment 411, a local controller section 466 of BA is contained in the branch line facility control unit 413 as the building facility resources 413a, and the monitor unit 412 executes the communication, control, and monitor functions for providing local resident service under local conditions autonomously.

The monitor unit 412 contains a local management agent 467 for also executing network management according to the SNMP protocol.

Here, VLANs also contain virtual groups based on not only layer 402 addresses, but also layer 403 addresses or user-defined tags.

In the configuration for providing intelligent network service as in the invention, it seems that it is proper to call VLAN a virtual group. However, the representation of "virtual" is general in various fields including the internet, thus VLAN may be more appropriate representation.

W1 business 4100, W2 business 4101, W3 business 4102 (W4 business 4108, W business 4109), and I1 information 4103 connected to the branch line switch 465 denote terminals of business and information system groups, and these groups can be logically configured by a VLAN. Likewise, L1 lighting 4104, S1 sanitation 4105, and A1 air conditioning 4106 connected to the local control section 466 also denote terminals for building facilities and form a LAN according to the communication control traffic type and spatial classification of residential units, etc. Further, an M1 operator console 4107 connected to the local management agent 467 is an operation panel of residential units, wiring closet, etc. In the distributed integrated wiring system of the invention, building facility units and information communication facility units are distributed, network service is integrated in residential units or floor units, VLAN is formed according to the communication control traffic type of each of the building and information communication facility units and spatial classification of residential units, etc., and an office residential environment and network service of the building and information communication facility units can be reconfigured flexibly in free layout in response to a work group move, addition, or change.

Incidentally, as compared FIG. 58 with FIG. 18, it seems that the system comprising the center node and the local node in FIG. 58 is simlar to the system comprising the local intranet segment and the global internet segement in configulation. It seems that the local node corresponds to the local switch in FIG. 18, and the intranet router to the local router switch in FIG. 18 respectively.

Figure 59:
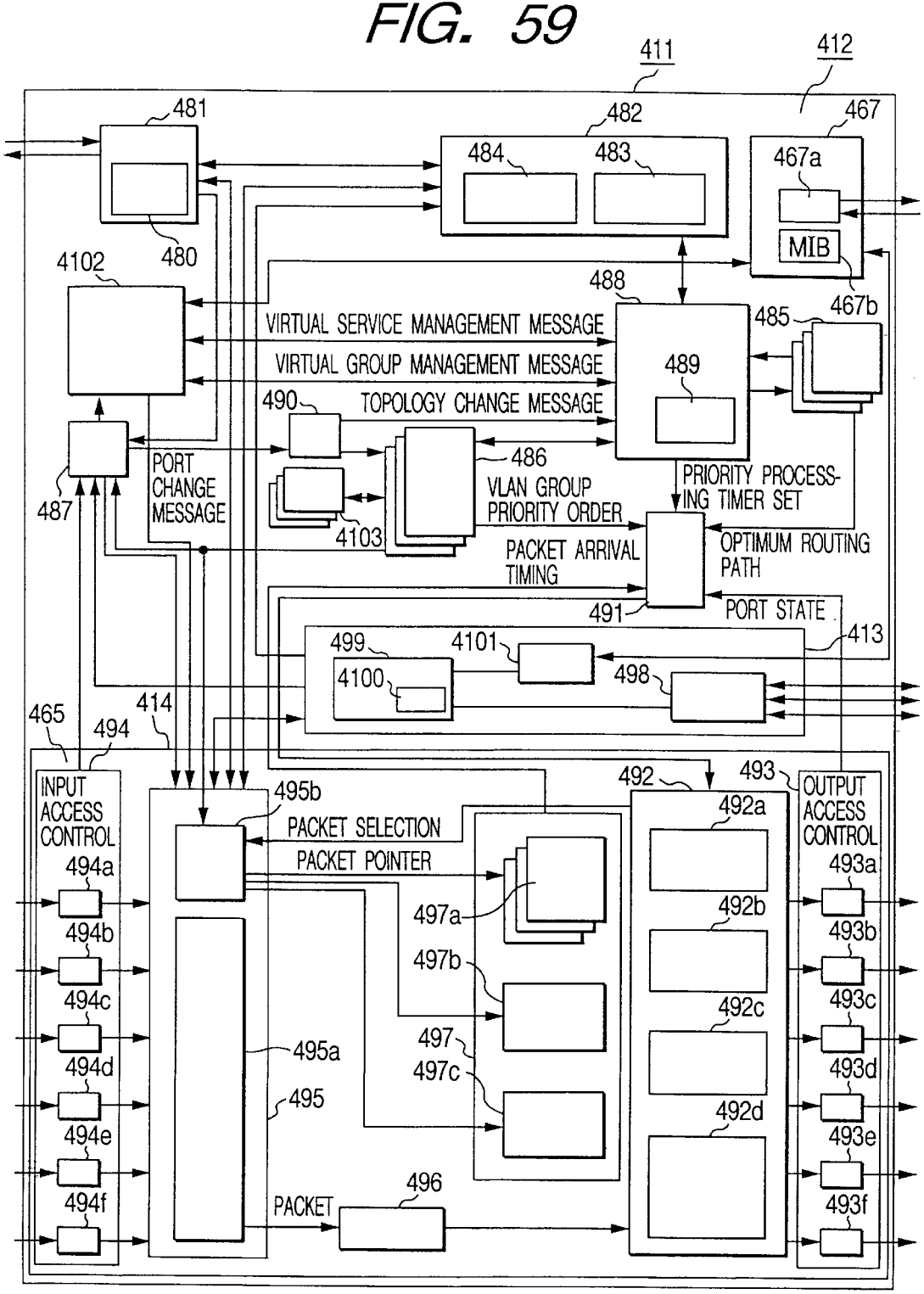
FIG. 59 is a detailed block diagram of distributed network service equipment in the invention.

FIG. 59 shows a specific configuration of the distributed network service equipment 411 used with the embodiment.

An intranet routing/bridge protocol processing section 482 connected to ATM by backbone wiring 404 through a backbone connection ATM interface 481 containing a backbone buffer memory 480 forming the trunk line switch 462 of a trunk line connection unit 415 and constructing the router bridge 464 performs layer 403 route calculation learning/filtering 483 and layer 402 address learning/filtering 484, prepares a virtual routing table 463 of the trunk line connection unit 415, and caches the table in a virtual group routing table 485. Once an address is learned, the intranet routing/bridge protocol processing section 482 is bypassed and cut-through operation is performed. In the embodiment in conformity with the ATM forum standard, like an intranet routing/bridge protocol processing section 482 of the integrated network service equipment 451 described later, the intranet routing/bridge protocol processing section 482 is provided with a function of converting into a LAN packet by LAN emulation from ATM and performing virtual router processing by MPOA of upper layer and function of being capable of handling standard protocols such as 1-PNN1 and IP connection (RFC1577).

The client addresses of virtual groups and the virtual group IDs can be set in virtual group registration tables 486 and virtual routing tables 485 of the distributed network service equipment 411. A local packet is filtered to the main router of the WAN connection unit 455 of the integrated network service equipment 451 so as to forward the packet from the distributed network service equipment 411 to the main router only when the destination virtual group ID is not a virtual group ID at a local site. If the destination virtual group ID is a virtual group ID at a local site, the packet is unicasted to the port of the destination client address.

When node addition, move, or change is detected in the virtual group registration table 486 or virtual routing table 485 of the distributed network service equipment 411, update information of the virtual group registration table 486 or virtual routing table 485 is multicasted to the distributed network service equipment 411 with high priority, whereby the distributed network service equipment 411 performs distributed processing of local virtual group routing calculation. Route calculation processors of the distributed network service equipment 411 share an intranet routing table of local virtual group and parallel control kernel sections (not shown) of the distributed network service equipment 411 exchange the intranet routing table information in shared memories in synchronization with each other for maintaining the optimum virtual group routing tables 485.

A virtual group identification section 487 codes client addresses 401 and 402 together by a hash function and collates the hash function with a virtual group configuration table coded by hash functions, so that an increase in the delay time does not introduce a problem as compared with the format of adding a header or tag to a packet.

That is, at the second layer level of OSI protocol layer model with MAC addresses defined as client addresses, in conformity with the conventional standard, an extra header or tag is not added to a packet and virtual LAN groups are supported for terminals in conformity with the conventional standard.

The virtual group identification section 487 collates a pair of MAC addresses 401 and 402 of the packet destination and source with the virtual group configuration table and identifies a virtual group containing both the MAC addresses.

Further, at the third layer level of OSI protocol layer model with a plurality of network addresses depending on protocol defined as client addresses, in conformity with the conventional standard, an extra header or tag is not added to a packet and virtual network groups are supported for terminals in conformity with the conventional standard.

The virtual group identification section 487 collates a pair of network addresses 401 and 402 of the packet destination and source with the virtual group configuration table and identifies a virtual group containing both the network addresses.

Further, at the application level of OSI protocol layer model with application addresses defined by the user or application software as client addresses, in conformity with the conventional standard, an extra header or tag is not added to a packet and virtual custom group setting wherein different medium access methods and protocols are mixed is supported.

The virtual group identification section 487 collates a pair of application addresses 401 and 402 of the packet destination and source with the virtual group configuration table and identifies a virtual group containing both the application addresses.

Normally, for each client address, the client name is entered in a virtual group registration/routing table (into which the tables 485 and 486 are combined) in FIG. 61(*a*). Different client names can be entered for each virtual LAN group, each virtual network group, and each virtual custom group. If a virtual LAN group, virtual network group, and virtual custom group are defined for one MAC, virtual group definition rows, virtual network group definition rows, and virtual custom group definition rows are contained in the virtual group registration/routing table in FIG. 61(*a*). Further, a pointer to a client definition table 4103 shown in FIG. 61(*b*) is contained.

The virtual group identification section 487 collates addresses with the virtual group registration table 402 in the order of the virtual custom group definition rows, the virtual network definition rows, and the virtual group definition rows.

The machine type is also entered in the client name so that the client name is also the identification code of the machine type such as switch or terminal. If the machine type is switch, a virtual group distributed management section 488 enters the MAC address directly connected to a port of the switch or indirect connection in a switch connection map 489. Connection map information of the entire network is provided by using the virtual group registration table 486 and the switch connection map 489 in combination. Since connection of adjacent ports is seen, topology is drawn on a connection relation chart, which is called a map. If topology is a tree structure, route search is easy to make. If topology is meshes, distances of routes as transmission time need to be compared. If switches having the same transmission speed are connected at multiple stages, the number of stages is assumed to be the distance.

The optimum connection port address is entered in the virtual group registration/virtual group routing table shown in FIG. 61(*a*) as the routing connection port. That is, in the distributed switch configuration, another switch is cascaded to a port of one switch, thus for the port to which a switch is connected, the connection port becomes a port name corresponding to the optimum route reading to the home switch to which the terminal is connected. When a port change message is output when ports differ although a client address match is found as a result of the virtual group identification for a terminal move, the intranet virtual group learning/identification section 490 sends a topology change message to the virtual group distributed management section 488, which then learns in response to a user environment message according to a user request and the topology change and dynamically updates the virtual group routing table 485.

The virtual group identification section 487 collates a pair of client addresses 401 and 402 of the packet destination and source with the virtual group configuration table and identifies the virtual group containing both the client addresses of the packet destination and source.

The virtual group learning section 487 dynamically executes automatic configuration management for a terminal move. When ports differ although a client address match is found as a result of the virtual group identification for a terminal move, the virtual group learning section 16 outputs a port change message and the intranet virtual group learning/identification section 490 dynamically updates the virtual group registration table, thereby executing automatic configuration management dynamically.

Client addresses and the priority for each virtual group can be set in the virtual group registration/routing table of each group in the switch as shown in FIG. 61(*a*). A virtual group control section 491 allocates a band of each traffic type of unicast, multicast, and broadcast in group units in response to the virtual group priority. A forwarding section 492 in the branch line switch 465 forming the branch line concentration unit 414 transfers a packet to a specified output port 493*a* . . . of an output access control section 493 by scheduling control of the virtual group control section 491. The forwarding section 492 consists of processing functions of sending plan 492*a*, connection control 492*b*, unicast sending processing 492*c*, and multicast segment switch 492*d*.

In the configuration in which the connection ports of virtual groups, namely, input ports 494*a* . . . of an input access control section 494 of the branch line concentration unit 414 are distributed to the distributed network service equipment 411 distributed over the network and the virtual group registration tables 486 and the virtual group routing tables 485 are distributed to the distributed network service equipment 411, the virtual group identification section 487 of each switch has the intranet virtual group learning/identification section 490 for collating input port 494*a* . . . and the packet source address with the virtual group registration table 486, detecting topology change such as a terminal move, and automatically updating the virtual group registration table 486 and the virtual group routing table 485. The virtual group distributed management sections 488 of the distributed network service equipment 411 as virtual group agents dynamically manage the virtual group registration tables 486 and the virtual group routing tables 485 distributed to the switches in coordination with each other based on topology change detection of a terminal move, a switch move, etc., whereby virtual groups are shared among the distributed network service equipment 411 in the network.

Virtual group agents distributed to the distributed network service equipment 411 can also be installed in virtual group servers each acting as a representative in virtual group units or for a virtual group cluster. The virtual group servers can manage the agent state and mediate communication between the agents and also dynamically manage the virtual group registration tables 486 and the virtual group routing tables 485 in coordination with each other as a VLAN switch agent function. The virtual group registration tables 486, the client definition tables 4103 shown in FIG. 61(*b*), and the virtual group routing tables 485 updated and managed in the virtual group servers are cached in the distributed VLAN switches and the virtual group sever distributes change information in the tables to the distributed network service equipment 411.

The branch line concentration unit 414 of the distributed network service equipment 411 connected to the floor trunk line 403 or floor branch lines 407 performs packet switching, temporarily stores the packet in a packet buffer 495a of a buffer memory 495, and sends the packet to the forwarding section 492 on a packet bus 496. A buffer management section 495b sends a packet pointer to virtual group queuing 497a, broadcast queuing 497b, and unknown group queuing 497c of a buffer pointer queuing table 497.

The distributed network service equipment 411 of the embodiment is characterized by the fact that a branch line facility local controller 498 forming the local control section 466 of the branch line facility control unit 413 controls the building facilities and that the branch line facility local controller 498 and LAN are integrated into a virtual group by a branch line facility control VLAN connection proxy 99; protocol conversion between the facility system and LAN is executed in a proxy conversion table 100. A facility management proxy agent 4101 bridges the local management agent 467 of the monitor unit 412 and the branch line facility local controller 498 for supporting control state monitor from the local operator console connected to a console control section 467a and integrated management of BA management, network management, disaster prevention/ security management, etc., from the center node 405. The local management agent 467 has an MIB (RMON) section 467b. In FIG. 59, numeral 4102 is a switch communication protocol control section for performing protocol control of switch communication in the distributed network service equipment 411. The switch communication protocol control section 4102 receives a virtual service management message and a virtual group message from the virtual group distributed management sections 488.

Figure 60:
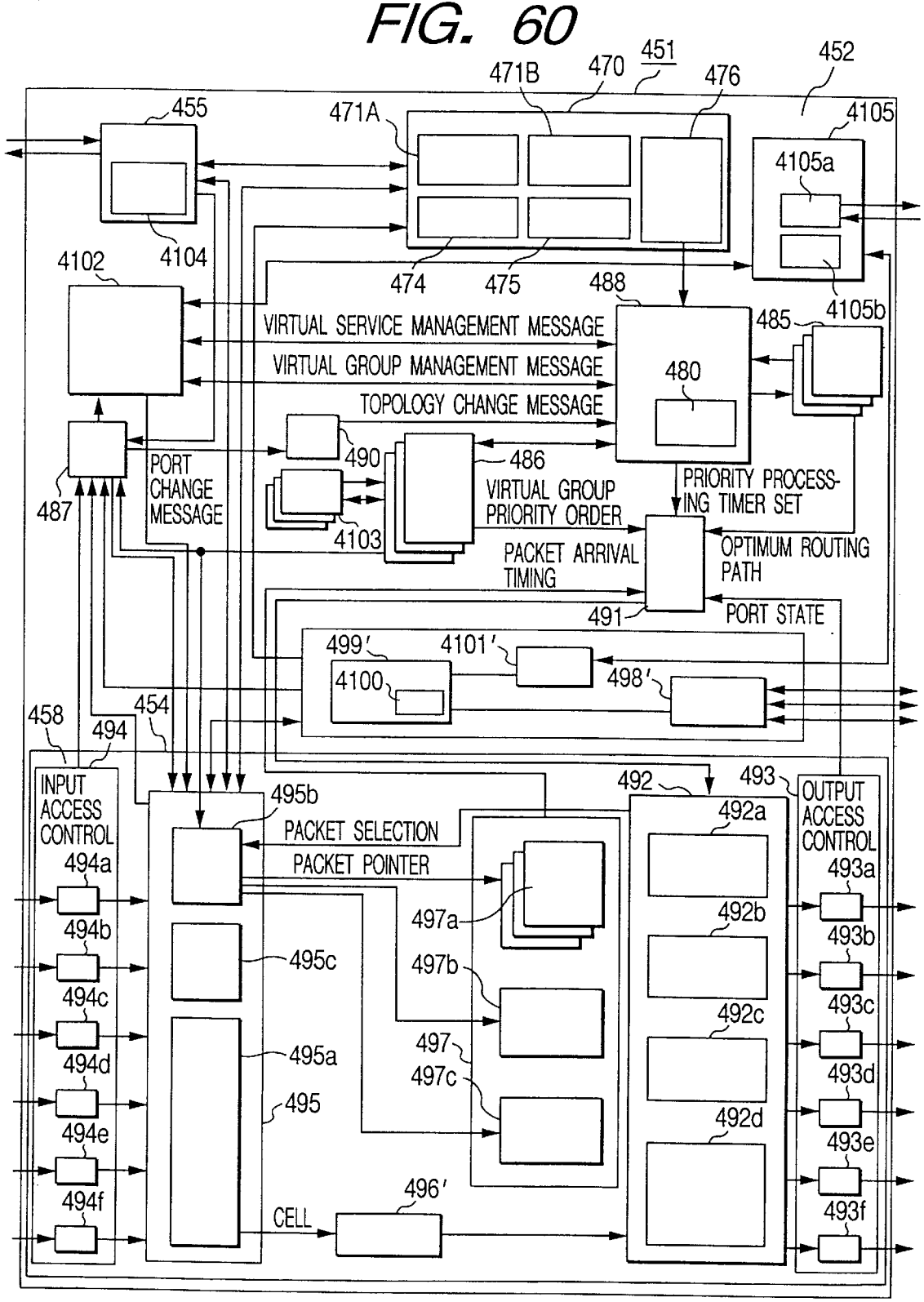
FIG. 60 is a detailed block diagram of integrated network service equipment in the invention.

FIG. 60 shows a more detailed configuration of the integrated network service equipment 451 used with the embodiment. Since the backbone wiring 404 is ATM, the backbone switch 458 of the trunk line concentration unit 454 performs cell switching.

Basically the integrated network service equipment 451 has the same functions as the distributed network service equipment 411. The monitor unit 452 comprises an integrated management agent 4105 corresponding to the local management agent 467. The integrated management agent 4105 has a console control section 4105a and an MIB section 4105b corresponding to the console control section 467a and the MIB section 467b of the local management agent 467. The WN connection unit 455 comprises a backbone buffer memory 4105. The trunk line concentration unit 454 comprises an input access control section 494, a buffer pointer queuing table 497, a forwarding section 492, an output access-control section 493, and a buffer memory 495 like the branch line concentration unit 414. The buffer memory 495 comprises a cell buffer 495a', a packet conversion cell conversion section 495c, and a buffer management section 495b for cell switching, and cells are sent to the forwarding section 492 on a cell bus 496'.

The trunk line facility control unit 453 comprises a trunk line facility control VLAN connection proxy 499' corresponding to the branch line facility control VLAN connection proxy 499 of the branch line facility control unit 413, a facility management proxy agent 4101' corresponding to the facility management proxy agent 4101, and a branch line facility controller 498' corresponding to the branch line facility controller 498.

The trunk line concentration unit 454 has an intranet routing/bridge protocol processing section 470 forming the VLAN learning/identification filtering section 461 and the intranet router 459, a virtual group identification section 487, a virtual group distributed management sections 488, a switch communication protocol control section 4102, virtual group routing tables 485, virtual group registration tables 486, and the client definition tables 4103 like the trunk line concentration unit 415 of the distributed network service equipment 411. Circuit parts identical with or similar to those previously described with reference to FIG. 59 are denoted by the same reference numerals in FIG. 60 and will not be discussed again.

When the intranet routing/bridge protocol processing section 470 of the intranet router 459 prepares a routing table containing learning filtering 471A, 471B of layer 402 and 403 addresses, the table is cached in the virtual group routing table (cut-through table) 485 of the virtual group distributed management sections 488, input packet is cut through, and the intranet routing/bridge protocol processing section 470 is bypassed. The intranet routing/bridge protocol processing section 470 converts into a LAN packet by LAN emulation from ATM in conformity with the ATM forum standard and performs virtual router processing by MPOA of upper layer. In addition to the filtering 471A, 471B, the intranet routing/bridge protocol processing section 470 contains LAN emulation 474, IP connection (RFC1577) MPOA 475, and route calculation 476 so as to be able to handle standard protocols such as 1-PNN1 and IP connection (RFC1577).

VLAN as a local intranet segment and a global internet segment are separated, routing of VLAN as an intranet segment is processed in the intranet routing table of the distributed network service equipment 411 close to a desktop, packets are filtered so that only internet segment traffic is sent to the ports to which the main router is connected, and the main router of the WAN connection unit 455 of the integrated network service equipment 451 processes routing connected to the internet or LAN in the internet routing table.

LAN of the backbone wiring 404 and the floor trunk lines 403 provides reliability and immediacy required for multiplexing information communication of the business (account) system and building facility control and monitor by dividing into virtual groups and classifying according to priority.

Further, since QoS is supported by adopting ATM for the backbone wiring 404 and the floor trunk lines 403, the reliability and immediacy can be guaranteed sufficiently. QoS is supported to desktops by also adopting ATM for the branch line system.

For space use in the embodiment, use of space below the floors is considered for designing the beam height of a building structure so as to reduce space for suspended ceiling lighting and air conditioning piping to a necessary minimum and make the access floor high for application to the equipment storage unit, document storage space of a residential room, etc., whereby the efficiency of the space use is improved furthermore.

Since backbone wiring 404 and the floor trunk lines 403 are desired to meet information transmission quality, namely, satisfy requirements depending on information such as reliability, emergency, delay time guarantee, high speed, and expandability, the ATM is appropriate for the backbone wiring 404 and the floor trunk lines 403. However, a system other than the ATM, such as function division by transmission quality level with more than one optimum high-speed Ethernet or a demand priority system, can also be used depending on the balance between costs and performance.

In the embodiment configured as described above, the information communication facility equipment and electric facility equipment can be distributed, thus a scalable IT infrastructure can be constructed at low costs. Moreover, with distributed network service machines, floor space is divided and a comfortable environment optimum for the user integrating a virtual network and BA facility equipment can be autonomously localized for each local residential space and be customized in accordance with user requirements. Places that can be accessed from shared space such as space below a floor is used for distributed placement and when a machine is added or changed, the effect on the residents of the building can be lessened; particularly, the system is installed below a floor, effective use of space can be made for reducing switchboard space on the floor wall face or EPS space and increasing residential space.

Since traffic is localized and concentration on the center is avoided, reliability is improved because of autonomous distribution and the system costs can be decreased because of economics of scale in manufacturing and standardization on proper scale of the residential units and distributed network service equipment.

29th Embodiment

Figure 62:
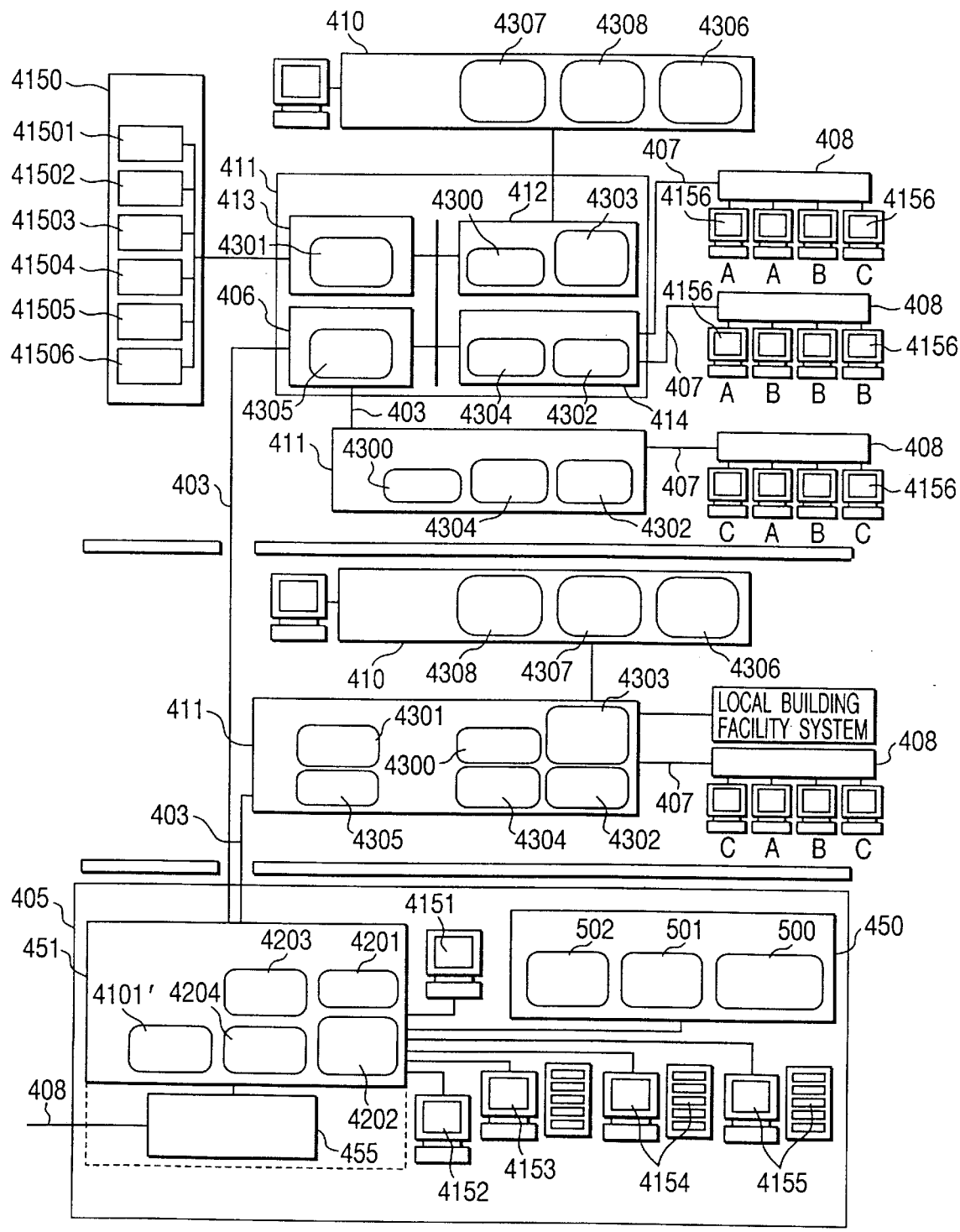
FIG. 62 is a system block diagram of the invention.

A twenty-ninth embodiment of the invention has a similar wiring structure to that of the twenty-eighth embodiment and has a system configuration as shown in FIG. 62.

The twenty-ninth embodiment is a system configuration example of common/local network service for providing a more intelligent network service function. As shown in FIG. 62, integrated network service equipment 451 in a center node 405 contains an integrated management agent 4201, a virtual network agent 4204, a virtual network service agent 4202, and a virtual user agent 4203, and a common network service server 450 in the center node 405 contains a common network management server 4500, a common information communication service server 4501, and a common building facility service server 4502.

On the other hand, distributed network service equipment 411 in a local node 401 or 401a contains a local management agent 4300, a facility management proxy agent 4301, a virtual network agent 4302, a virtual network service agent 4303, a virtual user agent 4304, and an integrated management agent 4305, and a local network service server 410 contains a local network management server 4306, a local information communication service server 4308, and a local building facility service server 4307.

A trunk line facility control unit 453 is built in the integrated network service equipment 451, as shown in FIGS. 61(a) and 61(b), and common building facilities are also connected to the side of floor trunk lines 404. In this case, a trunk line facility control VLAN connection proxy 499', a proxy conversion table 4100, a facility management proxy agent 4101', and a trunk line facility controller 498' are also built in the integrated network service equipment 451.

This configuration is a configuration wherein the floor branch lines 407 of the branch line facility control unit 413 shown in FIG. 58 are replaced with floor trunk lines 404. Corresponding to the figure, the lines are connected to integrated management agent, a virtual group identification section 487, a buffer 495, and an intranet routing/bridge protocol processing section 470.

In FIG. 62, numeral 4150 is a local building facility system which consists of a lighting subsystem 41501 for monitoring and controlling lighting load, an air conditioning subsystem 41502 for monitoring and controlling air conditioning facilities, a power distribution subsystem 41503 for monitoring and controlling wiring facilities, a disaster prevention subsystem 41504 for monitoring and controlling disaster prevention facilities, a safety subsystem 41505 for monitoring and controlling safety facilities, and a video subsystem 41506 for monitoring and controlling video machines.

Numeral 4151 is a network management manager, numeral 4152 is a building management manager, numeral 4153 is an enterprise server, numeral 4154 is a department server, numeral 4155 is a facility management server. Numeral 4156 denotes a client connected to a zone wiring box 408.

Figure 63:
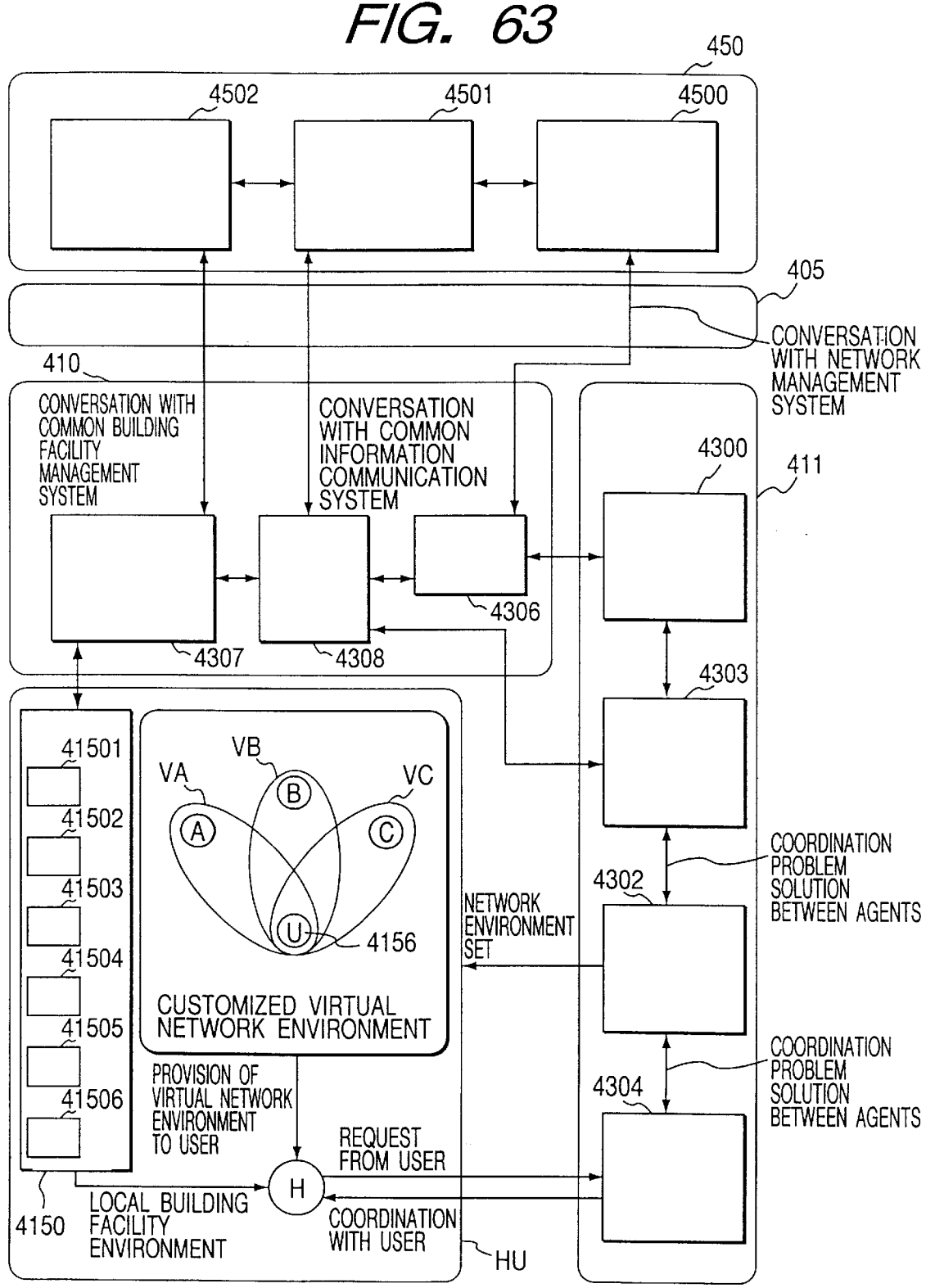
FIG. 63 is an operation illustration when virtual group agents are used in the invention.

FIG. 63 is an operation illustration when virtual group agents are used in the second embodiment of the invention. The agents perform automatic coordination problem solving so as to provide a total user environment of building facilities and information communication for residential unit HU and flexibly respond to a user move, addition, or change in free layout.

The common building facility service server 4502 of the common network service server 450 provides system management information and utilities, the common information communication service server 4501 integrates virtual network services and provides a virtual network function, and the common network management server 4500 provides network management information and a management function.

The local building facility service server 4307 of the local network service server 410 has a conversation with a common building facility management system via the integrated network service equipment 451 and the local information communication service server 4308 integrates virtual network services and provides a virtual network function and has a conversation with a common information communication system. The local network management server 4306 has a conversation with a network management system via integrated network service equipment 405.

The virtual network service agent 4303 of the distributed network service equipment 411 integrates virtual network services, provides a virtual network function, and coordinates with the virtual network agent 4302 for making coordination problem solution between the agents. The virtual network agent 4302 provides virtual network service, learns and corrects a virtual group registration table/routing table, and sets a network environment. Further, the virtual user agent 4304 provides virtual network service, GUI, and options, learns a user environment, and corrects a user environment table in response to a user H request or in coordination with user H.

In residential unit HU, virtual services A–C of virtual groups VA–VC and a client 4156 construct a customized virtual network environment for providing a virtual network environment for user H and a local building facility environment.

FIG. 46 shows virtual network service positioning in the embodiment. An information system is constructed by network computing, a user environment system, system management, and building management. An information environment is made up of virtual networks. Virtual network service exists between the information system and the information environment. Further, information wiring consists of hub, ATM switch, router, structured wiring system, and dedicated control bus. Information resources include hardware and software of computer, multimedia, database, data warehouse, online transaction processing, etc., and a local building facility system, etc.

The virtual network service positioning shown in FIG. 46 indicates positioning of application for providing a total environment of building facilities and information communication viewed from the user according to the invention. As shown here, according to the invention, a user environment system at the standpoint of the user can be provided by virtual network service integrating the system information resources of network computing, system management, building management, facility management, etc., into local distributed network service equipment 411 and local network service server 410 like a residential unit HU. An information environment in which user H can customize a comfortable environment in free layout in response to change in organization units such as single rooms/work groups as residential units HU integrating other systems of BA, etc., locally autonomously is provided as virtual network service.

FIG. 42 shows the agent operation as the system configuration of the agents of the embodiment. It is generally understood that an actual solution is always found under constraints such as rules and that the convergence time to the solution is shortened.

Figure 64:
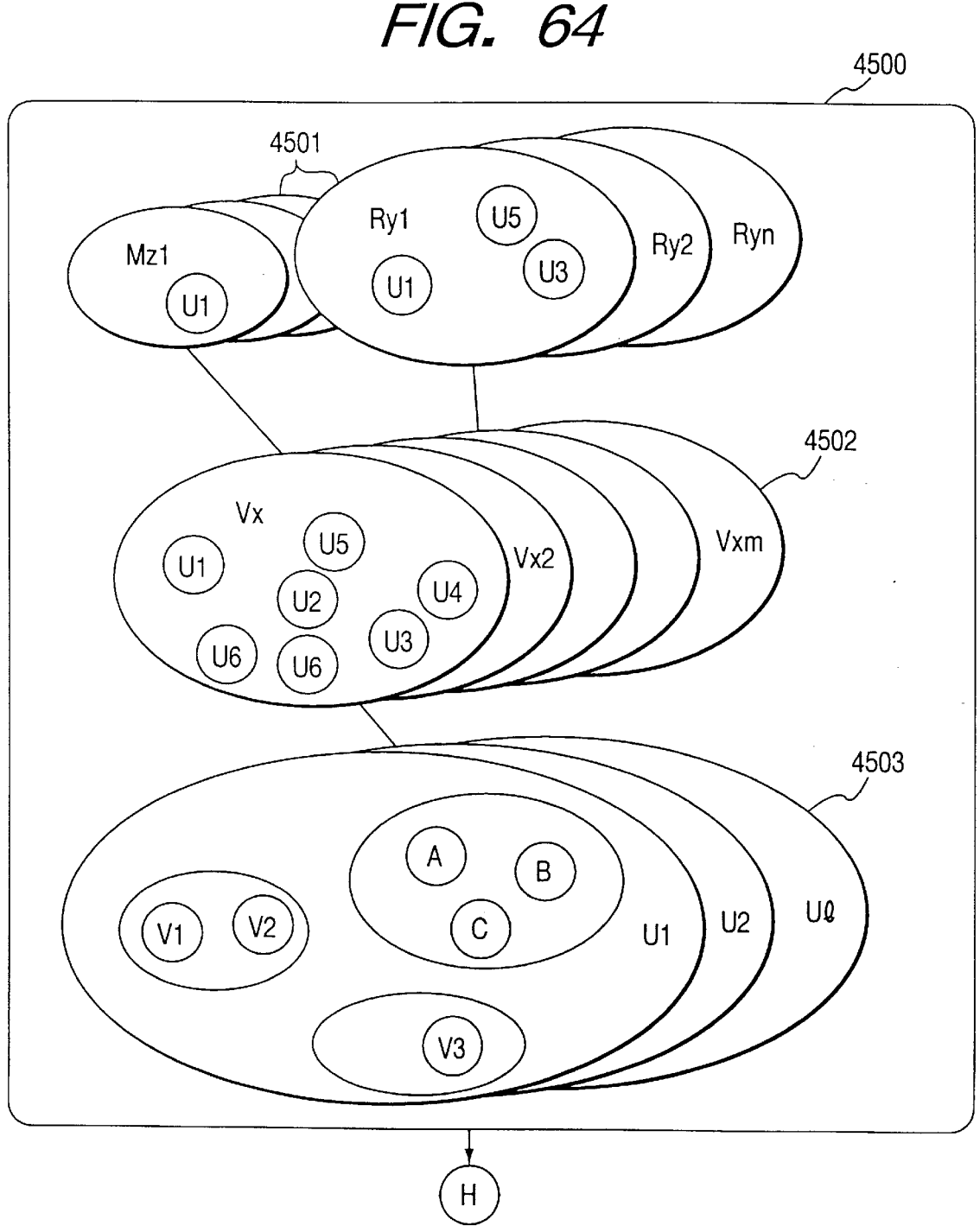
FIG. 64 is an illustration to show the relationship between virtual groups and user environment in the invention.

FIG. 64 shows the relationship between virtual groups and user environment. Virtual group registration/routing table image 4500 contains virtual network service table image 4501 containing a service linkage/learning table of information communication/building facilities Ry1 . . . and network management system MZ1, client definition table image 4502 containing virtual groups Vx1 . . . , and user environment table image 4503 consisting of clients U1 . . . having information communication/building facility service virtual groups V1 and V2, network computing virtual group 4503b consisting of services A to C, and network management virtual group V3. As shown in FIG. 64, in the relationship between the virtual groups VX1 . . . and user environment, network environments Ry1 . . . of building facilities and information communication are related to the virtual groups Vx1 . . . for integration as an user environment. In the embodiment, service is provided through the virtual groups; local service and common service are provided for each user/residential room autonomously from the local network service server 410, as shown in FIG. 63. Viewed from each user/residential room, distinction between the local service and common service is not considered and the common service is provided from the local network service server 410 having a conversation with the common network service server 450, whereby autonomy of a local node is raised and coordination between the agents is limited to the local range, thus speedy convergence is enabled in response to a user request.

If coordination problem solving by agents between servers as shown in FIG. 42 is also executed in a conversation between the common network service server 50 and the local network service server 410 and is divided into cycles of coordination problem solving at local level and coordination problem solving at server-to-server level facing common/local backbone for constructing a configuration of a 2-layer agent system, more advanced flexible service can be provided and moreover coordination problem solving cycle in local node below the local network service server 410 is divided, thus convergence is speeded up and fine service can be provided to the user level.

Figure 65:
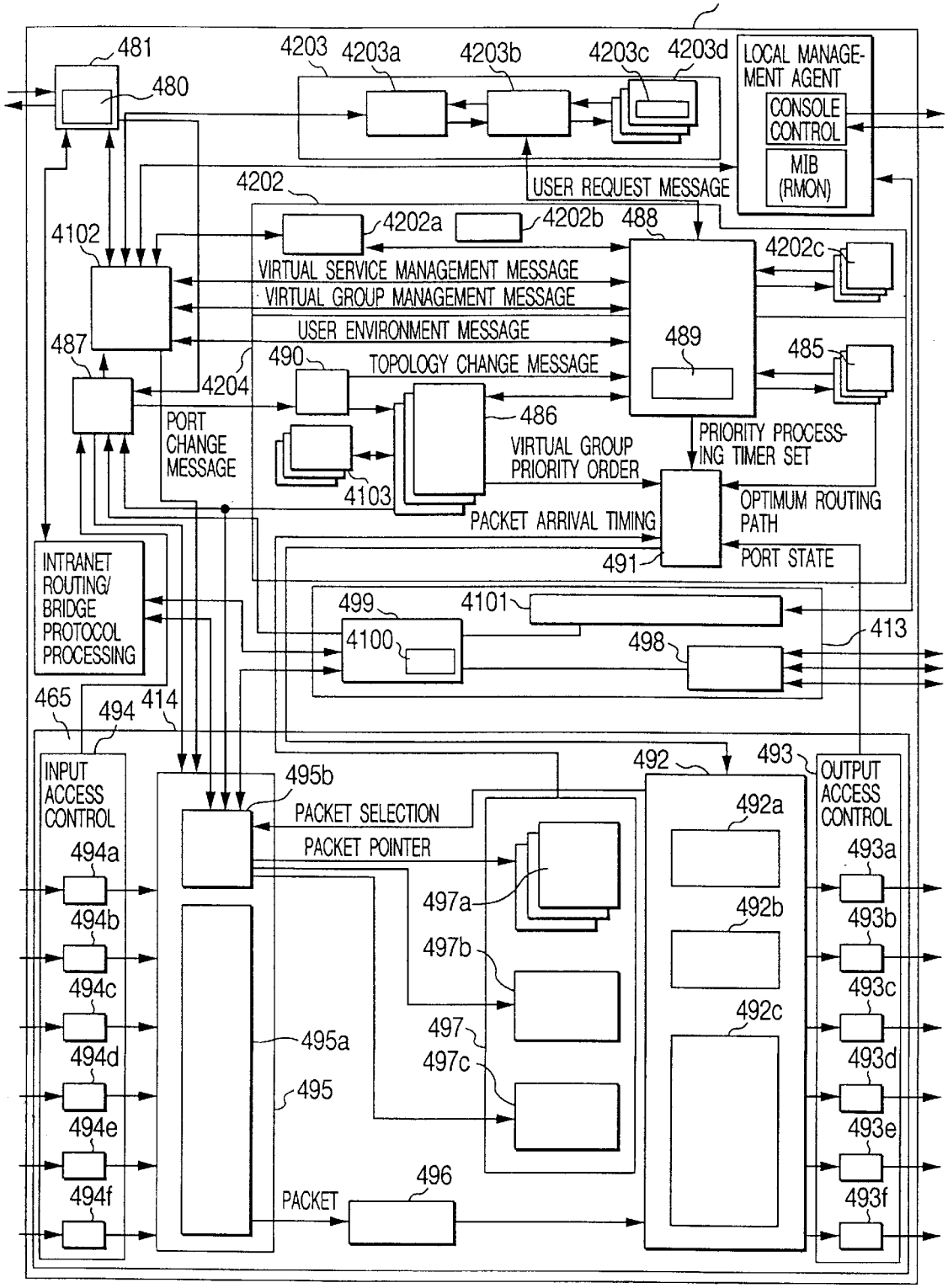
FIG. 65 is a detailed block diagram of distributed network service equipment using a packet switch in the invention.

FIG. 65 shows distributed network service equipment 411 of the embodiment using a packet switch. The distributed network service equipment 411 of the embodiment basically has the same configuration as the distributed network service equipment 411 of the first embodiment; the former differs from the latter in that a virtual user agent 4203 is provided in place of the intranet routing/bridge protocol processing section and that a virtual network service agent 4202 and a virtual network agent 4204 are provided. Sending processing 492c' of a forwarding section 492 corresponds to unicast/multicast.

Circuit parts identical with those previously described with reference to FIG. 59 are denoted by the same reference numerals in FIG. 65 and will not be discussed again.

The virtual user agent 4203 consists of a user command processing section 4203a, a virtual user distributed management section 4203b for conflict detection/plan correction, and a user environment table 4203d into which environment setting parameters 4203c are written. The virtual network service agent 4202 consists of a negotiation engine between agents 4202a, an agent rule (constraint) engine 4202b, a virtual network service table 4202c, and a virtual group distributed management section 488 shared with the virtual network agent 4204. The virtual network agent 4204 consists of a virtual group learning section 490, client definition tables 4103, virtual group registration tables 486, a virtual group control section 491, virtual group routing tables 485, and a virtual group distributed management section 488.

FIGS. 66(a) to 66(c) show tables used with the embodiment. A virtual group registration/routing table (providing the virtual group registration table 486 and virtual group routing table 485) in FIG. 66(a) is a table for managing routing information containing virtual group name, packet address, and switch port name for layer 402, 403 switching; it is placed in local node 401 or 401a. A user environment table/residential unit environment table in FIG. 66(b) is a table for managing transmission quality (QoS) for providing a network environment of information communication facilities in response to traffic demand for each virtual group; it is placed in local node 401. Further, a virtual network service table (service linkage/learning table) in FIG. 66(c) is a table for managing a virtual group of facilities for controlling information communication/building facility machines and providing a residential environment; it is placed in local node 401 or 401a.

The tables shown in FIGS. 66(a) to 66(c) are also placed in the center node 405 as management tables defined as common virtual groups like residential units. The following management functions of the entire building are contained as common service managed in the virtual network service table in FIG. 66(c):

General control function of BA monitor console of distribution panel shut-off machine priority control, peak cut, energy saving control, etc.

General control function of BA monitor console of control at power failure, power recovery.

Linkage with access management machines and machine operation access control, general security function.

Destination display function of application of a system in which distributed installation unit is provided with terminal origination function of PHS and installation position can be automatically determined in block units, namely, PHS roaming function.

As shown in FIG. 63, the virtual group agent is made up of the three types of agents different in role or character: Virtual user agent 4304, virtual network agent 4302, and virtual network service agent 4303. The virtual group registration/routing table as shown in FIG. 66(*a*) and the virtual network agent 4302 are placed in switches in a distributed manner, and the residential unit environment table as shown in FIG. 66(*b*) and the virtual user agent are placed in the switches or terminals in a distributed manner. In this configuration, the virtual network service agent 4303 and the virtual network service table as shown in FIG. 66 (*c*) are placed in the virtual network service agent 4303 in the distributed network service equipment shown in FIG. 60. As shown in FIG. 63, the virtual network service agents 4303 customize the environment to a user environment of a residential unit environment autonomously in conversation with the local network service server.

The virtual network service agent 4303 coordinates with the virtual network agent 4302 and the virtual network management server and the virtual network service agent 4303, the virtual user agent 4304, and the virtual network server distributed to the switches coordinate with each other for dynamically managing the virtual group registration/ routing table distributed to the switches, thereby autonomously customizing QOS (quality of service) of transmission band, delay time, etc., to the user environment of the residential unit environment for each virtual group in response to user demands and customizing the virtual network environment of user's VLAN network definition/ setting, network resource use requests, and terminal move, addition, change, etc., to the user environment for automatic configuration.

In the configuration in which the virtual group registration/routing table and virtual group agent are placed in the distributed network service equipment 411 in a distributed manner, the client addresses of the virtual groups and a user environment can be set in the virtual group registration/routing table. As shown in FIG. 42, the virtual group agents distributed to the switches dynamically manage the virtual group registration/routing table in coordination with each other in automatic response to user's network resource use requests, terminal move, addition, change, etc., in accordance with constraints and rules of conflict detection/negotiation/plan correction/learning preset for the network environment for the agents, thereby customizing network management and network service to the user environment and customizing the virtual network environment of user's virtual network definition/setting, network resource use requests, and terminal move, addition, change, etc., to the user environment of the residential unit for automatic configuration.

The virtual group agent is made up of the three types of agents different in role or character: Virtual user agent 4304, virtual network agent 4302, and virtual network service agent 4303, as shown in FIG. 63. The agents customize the virtual network environment to the user environment for automatic configuration in coordination with each other as shown in FIG. 42.

The network service server manages the agents of the switches and intercommunication with a network adopting a different communication system other than virtual groups. The agents manage the terminals in coordination with the agents of the switches. The network service server and the agent of each switch make up one coordination virtual group, and communication of virtual group with an external system is supported.

For multicast for each virtual group with virtual group server assigned to each virtual group, according to multicast setting previously registered in the virtual group agent of the switch by each server for a multicast request issued to the server from each client and multicast processing performed by the server for each client, the switch stores a multicast message packet pointer in the virtual group queuing table for multicast and executes multicast processing, whereby the switch supports the multicast of virtual group in coordination with server of each virtual group. The switch may have a server function.

For broadcast with virtual group server assigned to each virtual group, according to broadcast setting previously registered in the virtual group agent of the switch by each server so that if the server can deal with a broadcast request issued from each client by a protocol handled by the server, it responds to the broadcast request or that if the server cannot deal with the broadcast request, it forwards the request to router, the switch stores a multicast message packet pointer in the broadcast queuing table and forwards broadcast to the router, whereby the switch supports the broadcast of virtual group in coordination with server of each virtual group. The switch operating as a virtual LAN group at the second layer level routes broadcast for virtual group, but depends on an external router for communication with other than the virtual group.

As described above, in the first aspect of the invention, a virtual LAN system forms: a virtual group which is based on elements having physical attribute or logical attribute and constituting a virtual LAN, sets a client address and priority of the virtual group in a virtual group registration table; and allocates unicast and broadcast traffic bands in group units. Thus, a VLAN can be provided without changing already existing packets and already existing terminals can be built in virtual groups with no change.

In the second aspect of the invention, the LAN switch is provided with the virtual group agent for forming a virtual group for each terminal based on characteristics of a packet without adding an extra header or tag to the packet and independently of LAN switch ports, setting the client address and priority of the virtual group in the virtual group registration table, allocating unicast and broadcast traffic bands in group units, and executing dynamic automatic configuration management for a terminal move by the virtual group learning circuit. Thus, a VLAN can be provided without changing already existing packets and already existing terminals can be built in virtual groups with no change.

Further, the LAN switch is provided with the virtual group agent for entering the optimum connection port address indicating which port of each of distributed LAN switches which virtual group is connected to in the virtual group routing table, thereby cascading the LAN switches to the ports, allocating a plurality of virtual groups for each port, entering the MAC addresses of members for each virtual group, and selecting an optimum routing path between ports of each virtual group. Thus, virtual custom group setting wherein medium access methods, communication protocols, and application are mixed is enabled, and the virtual group configuration with the server covering different types of terminals and protocols as a nucleus is supported.

The virtual group agents distributed over the LAN switches dynamically manage the virtual group registration tables distributed over the switches in cooperation with each other. Thus, a virtual group can be automatically configured dynamically even for a terminal move. Moreover, in an environment in which a large number of switches are distributed, the virtual group agents of the LAN switches can automatically correct the virtual group configuration and optimum routing path in cooperation with each other, and further QOS (quality of service) is guaranteed by priority processing in virtual group units of applications, projects, etc.

Further, the port segment switching system may be adopted in the first aspect of the invention. The port segment switching system is capable of reconfiguring a plurality of ports that one or more switching hubs have as physical microsegments different from each other for transmitting and receiving a packet in microsegment units to which switching hub ports belong and combining switching hub ports arbitrarily for setting a common microsegment to the switching hubs. Thus, packets are transmitted and received between ports registered as microsegment members as if they were virtual repeaters sharing media, so that an independent microsegment in port units can also be shared among switching hubs at remote sites and moreover each microsegment can be set in port units. Thus, an efficient network can be easily constructed independently of the terminal types, network addresses, etc.

Further, in the present invention, there is provided a network switching system, which is adopted to the first aspect of the invention, comprising local switches for processing routing in VLANs as local intranet segments, a main router for processing routing in global internet segments, and a local router switch for filtering packets so as to send only internet segment traffic from the local switches to the main router. Thus, traffic of the main router is reduced and the processing capability of the main router is limited to performance required for internet connection, thus the load for the main router is lightened as compared with management of the intranet routing table by the main router as in the conventional system. Moreover, the local switches and the local router switch perform intranet routing processing, enabling high-speed routing. Thus, system costs are drastically decreased and intranet routing performance.can be enhanced.

Furthermore, in the above network switching system, the main router can manage network subnets, a gateway is set in the virtual group registration/routing tables contained in the local switches, and a packet entered in the gateway is encapsulated and forwarded to the main router, whereby the packet can be routed to a different local switch and can take part in a common virtual group from a segment in a different subnet, thus enabling taking part in any desired virtual segment from a different virtual segment.

Further, in the present invention, the switch-based network especially supports the virtual network customizing function, whereby bands are easily provided and transmission quality is easily guaranteed for improving performance as compared with handling at the application level of a database, etc., and the user can perform grouping in response to organizations/projects of an enterprise, etc., speedily and easily by customizing the user environment independently of specific application.

The user can customize the network resources and the utilities in free layout in units of workgroups, single rooms, conference rooms, etc.

A virtual LAN can be realized without changing already existing packets and already existing terminals can be built in a virtual group with no change for customizing the user environment.

Further, a virtual group in which medium access methods, protocols, and applications are mixed can be set, the virtual group configuration with a server compatible with different types of terminals and protocols as the nucleus is supported, and a user environment with various types of network service integrated can be customized.

Virtual groups are also automatically configured dynamically for a terminal move and moreover the agents of the switches can also coordinate with each other in an environment in which a large number of switches are distributed for automatically correcting the virtual group configuration containing the user environment and the optimum routing path.

Further, QOS user environment can also be customized by priority processing in virtual group units of applications, projects, etc.

A user environment system at the standpoint of the user can be provided by virtual network service integrating and making good use of information resources of systems of network computing, system management, building management, facility management, etc. An information environment for enabling the user to customize a comfortable environment in free layout in response to change in organization units of single rooms, workgroups, etc., integrating other systems of BA, etc., can be provided as virtual network service.

Further, in the present invention, an intelligent building system for executing communication and control used by a resident, such as an office, a plant, a hospital, or a building is divided into a plurality of residential units of the building, network service resources are distributed to the residential units so that service for the resident can be provided autonomously under local conditions meeting local requirements, functions and resources of local network service are integrated into a local node of each residential unit so that a plurality of local nodes autonomously provide network service, and common resources and common network service functions required for use of common building facilities, common service, and centralized management of the entire system are integrated into a center node. Thus, a plurality of local nodes can autonomously provide residential environment service containing environment measurement, monitor, and control using building facilities and information communication and the residential environment resources for residents containing air conditioning, security, and network are integrated into the local node by local network service, whereby residential environment service can be provided autonomously under local conditions meeting the local requirements. Further, the resources such as shared building facilities concerning the entire residential environment common to the residents such as maintenance and management of the entire system, efficiency improvement of facility use, and global information communication and the functions and resources of common network service are collected in the center node and use of the common building facilities of the entire system, common service and centralized management resources are integrated into the center node by the common network service. Thus, residential environment service can be provided autonomously under common conditions meeting the common requirements. Particularly, the resources are divided so that local resources and common resources are independent and that no conflict occurs in service. In an autonomously distributed system, when the whole balances resource consumption of a local portion, the local portion takes in whole control preferentially and suppresses local resource consumption and the local requirements can be most satisfied while the whole conditions are satisfied from among programs, for example, under fuzzy control, by a neuron network, etc.

Further, in the present invention, information communication service functions and resources and building facility service functions and resources required for local network service for a resident are distributed to residential units so that network service for the resident in an information communication network environment in a building such as an office, a plant, or a hospital can be provided autonomously under local conditions meeting local requirements, network service functions of local information communication service like a virtual network configuration setting a multicast group such as an electronic conference using multimedia or providing virtual common information space different from physical placement through a network and local building facility service like residential environment service such as air conditioning and lighting are integrated into a local network service server, communication, control, and monitor functions for providing local information communication resources and building facility resources used as resources for providing the local network service and service for a local resident autonomously under local conditions are integrated into distributed network service equipment, common information communication service such as access to an internet, WAN connection, and message communication throughout the entire building and common building facility service such as energy saving, building automation, and disaster and crime prevention are integrated into a common network service server, and common information communication facility resources and common building facility resources as common network service resources used as resources for providing the common network service and common service resources required for centralized management and communication, control, and monitor functions required for use of common and entire systems, common service, and centralized management are integrated into integrated network service equipment. Network service for the residents can be provided autonomously under local conditions meeting the local requirements. Common information communication service such as access to the internet, WAN connection, and message communication throughout the entire building and common building facility service such as energy saving, building automation, and disaster and crime prevention are integrated into the common network service server and common network service can be provided.

Since the information communication facility equipment and electric facility equipment in conformity with the standard can be distributed, a scalable IT infrastructure can be constructed at low costs. Moreover, with autonomously distributed network service machines, floor space is divided and a comfortable environment optimum for the user integrating a virtual network and BA facility equipment can be autonomously localized for each local residential space and be customized in accordance with user requirements.

Further, in the distributed integrated wiring system, building wiring may be made up of three layers of backbone wiring connecting a center node where the integrated network service equipment is installed and floor integrated wiring closets, floor trunk lines connecting the floor integrated wiring closets and equipment storage units placed in construction space, and floor branch lines connecting equipment storage units placed in building construction space such as space below a floor that can be accessed from shared space of the building and zone boxes or outlets and the local node where the distributed network service equipment is placed is the floor integrated wiring closet or the equipment storage unit placed in building construction space such as space below a floor that can be accessed from shared space of the building. Thus, the resources required for local network service can be collected in the local node. Effective use of space, batched design because of sharing with different facility piping, and reduction in construction costs are enabled and the effect on the building residents can be lessened when equipment is added or changed. Resultantly, the maintenance costs can be decreased.

Further, when the system is installed below a floor, effective use of space can also be made for reducing switchboard space on the floor wall face or EPS space and increasing residential space.

In a configuration in which virtual group registration tables and virtual group agents are placed in a network in a distributed manner, network service functions of local information communication service and building facility service are integrated into a local network service server, communication, control, and monitor functions for providing local information communication resources and building facility resources and service for a local resident autonomously under local conditions are integrated into distributed network service equipment, common information communication service and common building facility service are integrated into a common network service server, common information communication facility resources, common building facility resources, and communication, control, and monitor functions required for use of the entire system, common service, and centralized management are integrated into integrated network service equipment, local information communication service and local building facility service of building automation utilities, utilities of a different system, etc., common information communication service, common building facility service, and their linkage conditions can be set in a user environment or residential room unit setting area of the virtual group registration/routing table, and in automatic response to a user's network resource use request, a terminal move, addition, change, etc., the virtual group agents coordinate with each other and segment the information communication resources and building facility resources into virtual groups and dynamically manage the virtual group registration/routing tables in coordination with the local network service server and the common network service server, thereby customizing the linkage conditions of the local and common services for automatic configuration and providing the network service for the local resident autonomously under local conditions.

Further, in the present invention, there is provided a distributed integrated wiring system wherein in a configuration in which virtual network service agents, virtual group registration/routing tables, virtual network agents, user environment tables/residential room environment tables, and virtual user agents are placed in a network in a distributed manner, network service functions of local information communication service and building facility service are integrated into a local network service server, wherein communication, control, and monitor functions for providing local information communication resources and building facility resources and service for a local resident autonomously under local conditions are integrated into distributed network service equipment, wherein common information communication service and common building facility service are integrated into a common network service server, wherein common information communication facility resources, common building facility resources, and communication, control, and monitor functions required for use of the entire system, common service, and centralized management are integrated into integrated network service equipment, wherein local information communication service and local building facility service of building automation utilities, utilities of a different system, etc., common information communication service, common building facility service, and their linkage conditions can be set in a user environment or residential room unit setting area of the table, and wherein the virtual user agents and the virtual network service agents and the virtual network agents distributed to switches coordinate with each other in automatic response to a user's network resource use request, a terminal move, addition, change, etc., in accordance with constraints and rules of conflict detection/negotiation/plan correction/learning preset for the agents and the virtual network service agent dynamically manages the virtual group registration table in coordination with the local network service server and the common network service server, thereby customizing the linkage conditions of the local and common services, autonomously observing the state of each utility, learning optimum linkage conditions, and automatically setting the conditions for providing the network service for the local resident autonomously under local conditions.

Further, traffic is localized and concentration on the center is avoided, thus reliability is improved because of autonomous distribution and the system costs can be decreased because of economics of scale in manufacturing and standardization on proper scale of the residential units and distributed network service equipment.

What is claimed is:

1. A virtual LAN system, comprising:
   a virtual group based on elements having a physical attribute or a logical attribute and constituting a virtual LAN;
   a client address and priority of the virtual group set in a virtual group registration table;
   unicast and broadcast traffic bands allocated in group units; and
   a port segment switching system including:
      one or more switching hubs having a plurality of switching hub ports, a packet being transmitted and received in microsegment units to which the switching hub ports belong;
      wherein the virtual group of which members are the microsegment units to which the switching hub ports belong function as a virtual repeater; and
      wherein the switching hub ports are combined arbitrarily so as to set a common microsegment to the plurality of switching hubs.

2. The virtual LAN system according to claim 1, further comprising a plurality of segment patterns of microsegments previously registered in each switching hub, the segment patterns being selected by time period or in switching hub units, to form the virtual group of the microsegment, the virtual group having ports set by the segment patterns as members thereof.

3. The virtual LAN system according to claim 1, wherein a plurality of link paths are set in each switching hub for daisy-chaining the switching hubs, the virtual group of the microsegments is set to link path, switching hub ports being members of the virtual group, and wherein the virtual group of the plurality of microsegments are multiplexed among the switching hubs.

4. The virtual LAN system according to claim 1, wherein a plurality of switching hubs form a plurality of virtual LANs, the virtual group of the microsegments constituting members of the virtual LANs, switching hub ports being members of the virtual group, and a single microsegment or microsegments as members of virtual members are multiplexed among the switching hubs.

5. The virtual LAN system according to claim 4, wherein VLAN-IDs for identifying a plurality of virtual LANs are set, the VLAN-IDs and segment IDs for identifying the virtual group of microsegments to which ports belong are entered in a VLAN management table, and the segment ID is added to a packet between the switching hubs so as to multiplex a single microsegment or microsegments as members of the virtual members among the switching hubs.

6. The virtual LAN system according to claim 1, wherein the local switches for processing routing in virtual LANs as local intranet segments of the virtual LAN system are provided; and
   a local router switch for filtering packets so as to send only internet segment traffic from the local switches to a main router for processing routing in global internet segments.

7. The virtual LAN system according to claim 6, wherein the main router manages network subnets, a gateway is set in the virtual group registration/routing tables contained in the local switches, and a packet entered in the gateway is encapsulated and forwarded to the main router, wherein the packet can be routed to a different local switch and can take part in a common virtual group from a segment in a different subnet.

8. The virtual LAN system according to claim 1,
   wherein a plurality of virtual LANs of the virtual LAN system are placed in an intelligent building system for executing communication and control used by a resident, such as an office, a plant, a hospital, or a building in a distributed manner;
   network service resources are distributed to a plurality of residential units into which the intelligent building system is divided, so that service for the resident can be provided autonomously under local conditions meeting local requirements;
   a local node of each residential unit, into which functions and resources of local network service are integrated, a plurality of local nodes autonomously providing network service;
   a center node into which common resources and common network service functions required for use of common building facilities, common service, and centralized management of the entire system are integrated; and
   services of the distributed virtual LANs are integrated in the local nodes and the center node.

9. The virtual LAN system according to claim 8, wherein an integrated network service equipment is installed in the center node, and a distributed network service equipment is placed in the local node; and
   building wiring comprises:
      backbone wirings connecting the center node and floor integrated wiring closets;
      floor trunk lines connecting the floor integrated wiring closets and equipment storage units placed in construction space such as space below a floor that can be accessed from shared space of the building; and
      floor branch lines connecting the equipment storage units and zone boxes or outlets;
      wherein the local node is the floor integrated wiring closet or the equipment storage unit.

10. The virtual LAN system according to claim 1,
    wherein a plurality of virtual LANs of the virtual LAN system are placed in an information communication network environment in a distributed manner;
    residential units to which information communication service functions and resources and building facility service functions and resources required for local network service for a resident are distributed, so that network service for the resident in the information communication network environment in a building such as an office, a plant, or a hospital can be provided autonomously under local conditions meeting local requirements;

a local network service server into which network service functions of local information communication service like a virtual network configuration setting a multicast group such as an electronic conference using multimedia or providing virtual common information space different from physical placement through a network and local building facility service like residential environment service such as air conditioning and lighting are integrated;

distributed network service equipment into which communication, control, and monitor functions for providing local information communication resources and building facility resources used as resources for providing the local network service and service for a local resident autonomously under local conditions;

a common network service server into which common information communication service such as access to an internet, WAN connection, and message communication throughout the entire building and common building facility service such as energy saving, building automation, and disaster and crime prevention are integrated;

an integrated network service equipment into which common information communication facility resources and common building facility resources as common network service resources used as resources for providing the common network service and common service resources required for centralized management and communication, control, and monitor functions required for use of common and entire systems, common service, and centralized management are integrated; and services of the distributed virtual LANs are integrated in the local network service server, distributed network service equipment, common network service server, and integrated network service equipment.

11. The virtual LAN system according to claim 10, wherein the integrated network service equipment is installed in a center node, and the distributed network service equipment is placed in a local node; and building wiring comprises:
backbone wirings connecting the center node and floor integrated wiring closets;
floor trunk lines connecting the floor integrated wiring closets and equipment storage units placed in construction space such as space below a floor that can be accessed from shared space of the building; and
floor branch lines connecting the equipment storage units and zone boxes or outlets;
wherein the local node is the floor integrated wiring closet or the equipment storage unit.

12. The virtual LAN system according to claim 1, further comprising:
a port segment switching system including:
one or more switching hubs having a plurality of switching hub ports, a packet being transmitted and received in microsegment units to which the switching hub ports belong;
wherein the virtual group of microsegments of which members are the switching hub ports is formed in such a manner that microsegment units to which the switching hub ports belong function as a virtual repeater;
ports as client address and priority of the microsegment virtual group are set in the virtual group registration table, and unicast and broadcast traffic bands are allocated in group units in the virtual group registration table;
the microsegment virtual group of a connection port is set for a terminal move; and
a virtual group learning circuit executes dynamic automatic configuration management.

13. The virtual LAN system according to claim 1, wherein a user environment can be set in the virtual group registration table and thereby customizing the user environment.

14. A virtual LAN system including a virtual group agent having a virtual group registration table and a virtual group learning circuit;
wherein the virtual group agent forms a virtual group for each terminal based on characteristics of a packet without adding an extra header or tag to the packet and independently of LAN switch ports, sets a client address and priority of the virtual group in the virtual group registration/routing table, and allocates unicast and multicast traffic bands in group units;
wherein the virtual group agent executes dynamic automatic configuration management for a terminal move by the virtual group learning circuit;
wherein the virtual group agents have the virtual group registration/routing table in which the different virtual groups in network management and network service are formed in a virtual network into a plurality of segments;
the virtual group agents customize the network management and the network service dynamically in coordination with users in response to user demands;
wherein connection ports of the virtual groups are distributed to a plurality of switches distributed over a network;
the virtual group registration/routing table and the virtual group agents are placed in the switches in a distributed manner;
utilities comprising building automation utilities of air conditioning, lighting, and security, etc.; are segmented into the virtual groups; and the virtual group registration/routing table distributed to the switches is managed dynamically;
the virtual group agents coordinate with each other in response to a request for setting a virtual network related to resource use of a different system from the user; and
wherein a network service of customizing the utilities and automatic configuration for a user is executed.

15. The virtual LAN system according to claim 14, wherein client addresses of the virtual groups and a user environment is set in the virtual group registration/routing table;
the virtual group agents coordinate with each other in automatic response to operations comprising a user's network resource use request, a terminal move, addition, and change, segment resources of a different system into virtual groups in coordination with a different system management server, and dynamically manage the virtual group registration/routing table distributed to the switches;
wherein the linkage conditions of the building automation utilities and the utilities of the different system for automatic configuration are customized.

16. The virtual LAN system according to claim 14, wherein connection ports of the virtual groups are distributed to a plurality of switches distributed over a network;

the virtual group registration/routing table and the virtual group agents being distributed among the switches;

the virtual group agents coordinate with each other in automatic response to operations comprising a user's network resource use request, a terminal move, addition, and change, in accordance with constraints and rules of conflict detection/negotiation/plan correction/leaning preset for a network environment for the agents so as to dynamically manage the virtual group registration/routing table distributed to the switches;

wherein the network management and network service are customized and automatically configured.

17. The virtual LAN system according to claim 14, wherein connection ports of the virtual groups are distributed to a plurality of switches distributed over a network;

the virtual group agents have three types of agents different in character, virtual network agents, virtual user agents, virtual network service agents;

the virtual group registration/routing table and the virtual network agents are placed in the switches in a distributed manner;

wherein user environment table and the virtual user agents are placed in the switches or terminals in a distributed manner;

virtual network service agents segment resources of a different system into virtual groups and dynamically manage the virtual group registration/routing table distributed to the switches in coordination with virtual network agents and a different system management server; and wherein the virtual user agents and the virtual network agents distributed to the switches coordinate with each other for customizing the utilities of the different system in response to a virtual network setting request related to resource use of the different system from a user for automatic configuration.

18. The virtual LAN system according to claim 17, wherein the user environment table and virtual user agents are placed in the switches or terminals in a distributed manner;

the virtual network service agent is built in a local network manager of a distributed management system;

the virtual user agent and the virtual network agents distributed to the switches coordinate with each other in automatic response to operations comprising a user's network resource use request, a terminal move, addition, and change;

the virtual network service agent dynamically manages the virtual group registration/routing table distributed to the switches in coordination with the virtual network agent and a virtual network management server for managing and operating a multivendor virtual network; thereby customizing a multivendor integrated virtual network environment in addition to network management conforming to standard for automatic configuration in the local network manager.

19. The virtual LAN system according to claim 17, wherein the user environment table and virtual user agents are placed in the switches or terminals in a distributed manner;

the virtual network service agent is built in a network management manager for integrated management;

the virtual user agent and the virtual network agents distributed to the switches coordinate with each other in automatic response to operations comprising a user's network resource use request, a terminal move, addition, and change;

the virtual network service agent dynamically manages the virtual group registration/routing table distributed to the switches in coordination with the virtual network agent and a virtual network management server for managing and operating a multivendor virtual network; thereby customizing a multivendor integrated virtual network environment in addition to network management conforming to standard for automatic configuration.

20. The virtual LAN system according to claim 17, wherein the user environment table and virtual user agents are placed in the switches or terminals in a distributed manner;

linkage conditions of building automation utilities and utilities of a different system are set in a user environment setting area;

the virtual user agent and the virtual network agents distributed to the switches coordinate with each other in automatic response to operations comprising a user's network resource use request, a terminal move, addition, and change, in accordance with constraints and rules of conflict detection/negotiation/plan correction/learning preset for a network environment for the agents; and the virtual network agent coordinates with a virtual network management server for dynamically managing the virtual group registration/routing table distributed to the switches; thereby customizing the linkage conditions of the building automation utilities and the utilities of the different system, autonomously observing the state of each utility, learning an optimum linkage condition for automatic setting thereof.

21. The virtual LAN system according to claim 14, wherein the virtual group agents have the following three types of agents different in character; virtual network agents, virtual user agents and virtual network service agents;

the virtual network agents are placed in the switches in a distributed manner;

wherein user environment table and the virtual user agents are placed in the switches or terminals in a distributed manner;

virtual network service agents segment resources of a different system into virtual groups and dynamically manage the virtual group registration/routing table distributed to the switches in coordination with virtual network agents and a different system management server; and wherein the virtual user agents and the virtual network agents distributed to the switches coordinate with each other for customizing the utilities of the different system in response to a virtual network setting request related to resource use of the different system from a user for automatic configuration.

22. The virtual LAN system according to claim 21, wherein the user environment table and virtual user agents are placed in the switches or terminals in a distributed manner;

the virtual network service agent is built in a local network manager of a distributed management system;

the virtual user agent and the virtual network agents distributed to the switches coordinate with each other in automatic response to operations comprising a user's network resource use request, a terminal move, addition, and change;

the virtual network service agent dynamically manages the virtual group registration/routing table distributed to the switches in coordination with the virtual network agent and a virtual network management server for managing and operating a multivendor virtual network; thereby customizing a multivendor integrated virtual network environment in addition to network management conforming to standard for automatic configuration in the local network manager.

23. The virtual LAN system according to claim 21, wherein the user environment table and virtual user agents are placed in the switches or terminals in a distributed manner;

the virtual network service agent is built in a network management manager for integrated management;

the virtual user agent and the virtual network agents distributed to the switches coordinate with each other in automatic response to operations comprising a user's network resource use request, a terminal move, addition, and change;

the virtual network service agent dynamically manages the virtual group registration/routing table distributed to the switches in coordination with the virtual network agent and a virtual network management server for managing and operating a multivendor virtual network; thereby customizing a multivendor integrated virtual network environment in addition to network management conforming to standard for automatic configuration.

24. The virtual LAN system according to claim 21, wherein the user environment table and virtual user agents are placed in the switches or terminals in a distributed manner;

linkage conditions of building automation utilities and utilities of a different system are set in a user environment setting area;

the virtual user agent and the virtual network agents distributed to the switches coordinate with each other in automatic response to operations comprising a user's network resource use request, a terminal move, addition, and change, in accordance with constraints and rules of conflict detection/negotiation/plan correction/learning preset for a network environment for the agents; and the virtual network agent coordinates with a virtual network management server for dynamically managing the virtual group registration/routing table distributed to the switches; thereby customizing the linkage conditions of the building automation utilities and the utilities of the different system, autonomously observing the state of each utility, learning an optimum linkage condition for automatic setting thereof.

25. The virtual LAN system according to claim 14, wherein the registration/routing tables and the virtual group agents are placed in a network in a distributed manner;

network service functions of local information communication service and building facility service are integrated into a local network service server;

communication, control, and monitor functions for providing local information communication resources and building facility resources and service for a local resident autonomously under local conditions are integrated into a distributed network service equipment;

a common information communication service and common building facility service are integrated into a common network service server;

common information communication facility resources, common building facility resources, and communication, control, and monitor functions required for use of an entire system, common service, and centralized management are integrated into an integrated network service equipment;

local information communication service and local building facility service of utilities comprising building automation utilities, and utilities of a different system, common information communication service, common building facility service, and their linkage conditions can be set in a user environment unit or residential room unit setting area of the virtual group registration/routing table;

the virtual group agents coordinate with each other in automatic response to operations comprising a user's network resource use request, a terminal move, addition, and change, and segment the information communication resources and building facility resources into virtual groups and dynamically manage the virtual group registration/routing tables in coordination with the local network service server and the common network service server; and wherein the linkage conditions of the local and common services are customized for automatic configuration and wherein the network service is provided for the local resident autonomously under local conditions.

26. The virtual LAN system according to claim 14, wherein the virtual group agent comprises virtual network service agent, virtual network agent and virtual user agent;

virtual network service agent, virtual group registration/routing tables, virtual network agents, user environment/residential unit environment table and virtual user agents are distributed in a network;

network service functions of local information communication service and building facility service are integrated into a local network service server;

communication, control, and monitor functions for providing local information communication resources and building facility resources and service for a local resident autonomously under local conditions are integrated into a distributed network service equipment;

a common information communication service and common building facility service are integrated into a common network service server;

common information communication facility resources, common building facility resources, and communication, control, and monitor functions required for use of an entire system, common service, and centralized management are integrated into network service equipment;

local information communication service and local building facility service of utilities comprising building automation utilities, and utilities of a different system, common information communication service, common building facility service, and their linkage conditions can be set in a user environment or residential room unit environment setting area of the table;

the virtual user agents, the virtual network service agents and the virtual network agents distributed to switches coordinate with each other in automatic response to operations comprising a user's network resource use request, a terminal move, addition, and change, in accordance with constraints and rules of conflict detection/negotiation/plan correction/learning preset for the agents;

the virtual network service agent dynamically manages the virtual group registration/routing table in coordination with the local network service server and the common network service server;

wherein the linkage conditions of the local and common services are customized, the state of each utility is autonomously observed, optimum linkage conditions are learned, and the conditions are automatically set for providing the network service for the local resident autonomously under local conditions.

\* \* \* \* \*

UNITED STATES PATENT AND TRADEMARK OFFICE
CERTIFICATE OF CORRECTION

PATENT NO.   : 6,085,238
DATED        : July 4, 2000
INVENTOR(S)  : H. Yuasa et al.

It is certified that error appears in the above-identified patent and that said Letters Patent is hereby corrected as shown below:

Column 87,
Line 10 of the printed patent, "leaning" should be -- learning --.

Column 88,
Line 19 of the printed patent, after "of" delete -- . --.

Signed and Sealed this

Eighth Day of January, 2002

Attest:

JAMES E. ROGAN
Attesting Officer     Director of the United States Patent and Trademark Office